(12) United States Patent
Mook et al.

(10) Patent No.: US 12,280,446 B2
(45) Date of Patent: *Apr. 22, 2025

(54) IRRADIATION DEVICES WITH OPTICAL MODULATORS FOR ADDITIVELY MANUFACTURING THREE-DIMENSIONAL OBJECTS

(71) Applicant: General Electric Company, Schenectady, NY (US)

(72) Inventors: Joshua Tyler Mook, Loveland, OH (US); William Joseph Steele, Lawrenceburg, IN (US); Mary Kathryn Thompson, Fairfield Township, OH (US); David Scott Simmermon, Felicity, OH (US); Michael Thomas Gansler, Mason, OH (US)

(73) Assignee: General Electric Company, Evendale, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/892,412

(22) Filed: Aug. 22, 2022

(65) Prior Publication Data

US 2023/0072960 A1 Mar. 9, 2023

Related U.S. Application Data

(60) Provisional application No. 63/235,303, filed on Aug. 20, 2021.

(51) Int. Cl.
*B22F 10/20* (2021.01)
*B22F 10/28* (2021.01)
(Continued)

(52) U.S. Cl.
CPC ............ *B23K 26/064* (2015.10); *B22F 10/20* (2021.01); *B22F 10/28* (2021.01); *B22F 10/36* (2021.01);
(Continued)

(58) Field of Classification Search
CPC .............. B23K 26/064; B23K 26/0643; B23K 26/0676; B23K 26/0738; B23K 26/0648;
(Continued)

(56) References Cited

U.S. PATENT DOCUMENTS

| 3,875,067 A | 4/1975 | DeSorgo et al. |
| 4,804,975 A | 2/1989 | Yip |

(Continued)

FOREIGN PATENT DOCUMENTS

| CN | 207691194 U | 8/2018 |
| EP | 1894705 A2 | 3/2008 |

(Continued)

OTHER PUBLICATIONS

WO-2019240580-A1 (Year: 2019).*

(Continued)

*Primary Examiner* — Eric S Stapleton
(74) *Attorney, Agent, or Firm* — Dority & Manning, P.A.

(57) ABSTRACT

An irradiation device for additively manufacturing three-dimensional objects may include a beam generation device configured to generate an energy beam, an optical modulator including a micromirror array disposed downstream from the beam generation device, and a focusing lens assembly disposed downstream from the optical modulator. The micromirror array may include a plurality of micromirror elements configured to reflect a corresponding plurality of beam segment of the energy beam along a beam path incident upon the focusing lens assembly. The focusing lens assembly may include one or more lenses configured to focus the plurality of beam segments such that for respective ones of a plurality of modulation groups including a subset of micromirror elements, a corresponding subset of beam (Continued)

segments are focused to at least partially overlap with one another at a combination zone corresponding to the respective modulation group.

18 Claims, 44 Drawing Sheets

(51) Int. Cl.

| | | |
|---|---|---|
| *B22F 10/36* | (2021.01) | |
| *B22F 10/366* | (2021.01) | |
| *B22F 12/44* | (2021.01) | |
| *B23K 26/02* | (2014.01) | |
| *B23K 26/06* | (2014.01) | |
| *B23K 26/064* | (2014.01) | |
| *B23K 26/067* | (2006.01) | |
| *B23K 26/073* | (2006.01) | |
| *B23K 26/342* | (2014.01) | |
| *B29C 64/153* | (2017.01) | |
| *B33Y 30/00* | (2015.01) | |
| *G02B 3/00* | (2006.01) | |
| *G02B 26/08* | (2006.01) | |

(52) U.S. Cl.
CPC ............ *B22F 10/366* (2021.01); *B22F 12/44* (2021.01); *B23K 26/0643* (2013.01); *B23K 26/0676* (2013.01); *B23K 26/0738* (2013.01); *B23K 26/342* (2015.10); *B29C 64/153* (2017.08); *B33Y 30/00* (2014.12); *G02B 3/0056* (2013.01); *G02B 26/0833* (2013.01); *B23K 26/0648* (2013.01)

(58) Field of Classification Search
CPC .... B23K 26/342; B23K 26/067; B23K 26/34; B22F 10/36; B22F 10/366; B22F 12/44; B22F 10/20; B22F 10/28; B22F 12/46; B22F 12/42; B22F 10/364; B22F 12/45; B22F 10/362; B22F 12/90; G02B 3/0056; G02B 26/0833; B33Y 30/00; B33Y 10/00; B33Y 50/02; B29C 64/153; Y02P 10/25
USPC ....................................................... 219/121.6
See application file for complete search history.

(56) References Cited

U.S. PATENT DOCUMENTS

| | | | |
|---|---|---|---|
| 4,911,526 A | 3/1990 | Hsu et al. | |
| 4,945,032 A | 7/1990 | Murphy et al. | |
| 5,079,544 A | 1/1992 | DeMond et al. | |
| 5,619,245 A | 4/1997 | Kessler et al. | |
| 5,698,273 A | 12/1997 | Azad et al. | |
| 5,908,569 A | 6/1999 | Wilkening et al. | |
| 5,923,475 A | 7/1999 | Kurtz et al. | |
| 5,986,819 A | 11/1999 | Steinblatt | |
| 6,011,531 A | 1/2000 | Mei et al. | |
| 6,155,331 A | 12/2000 | Langer et al. | |
| 6,356,380 B1 | 3/2002 | Whitney | |
| 6,433,934 B1 | 8/2002 | Reznichenko et al. | |
| 6,554,600 B1 | 4/2003 | Hofmann et al. | |
| 6,717,106 B2 | 4/2004 | Nagano et al. | |
| 7,262,832 B2 | 8/2007 | Sekigawa | |
| 7,419,632 B2 | 9/2008 | Keller | |
| 7,568,445 B2 | 8/2009 | Rosenberger et al. | |
| 7,713,048 B2 | 5/2010 | Perret et al. | |
| 7,965,419 B2 | 6/2011 | Kakutani | |
| 8,073,315 B2 | 12/2011 | Philippi | |
| 8,317,508 B2 | 11/2012 | Bokodi et al. | |
| 8,379,271 B2 | 2/2013 | Kakutani | |
| 8,525,071 B2 | 9/2013 | Leuterer | |
| 8,547,641 B2 | 10/2013 | Capolla | |
| 8,639,071 B2 | 1/2014 | Aschke et al. | |
| 8,784,720 B2 | 7/2014 | Oberhofer et al. | |
| 9,221,100 B2 | 12/2015 | Schwarze et al. | |
| 9,308,583 B2 | 4/2016 | El-Dasher et al. | |
| 9,310,737 B2 | 4/2016 | Kojima | |
| 9,636,770 B2 | 5/2017 | Schwarze et al. | |
| 9,645,496 B2 | 5/2017 | Markle | |
| 9,742,155 B2 | 8/2017 | Dubost et al. | |
| 9,744,723 B2 | 8/2017 | Baumann et al. | |
| 9,855,625 B2 | 1/2018 | El-Dasher et al. | |
| 9,874,319 B2 | 1/2018 | Minor et al. | |
| 9,917,416 B2 | 3/2018 | Usuda et al. | |
| 9,925,715 B2 | 3/2018 | Cheverton et al. | |
| 9,958,251 B1 | 5/2018 | Brock et al. | |
| 10,058,920 B2 | 8/2018 | Buller et al. | |
| 10,105,907 B2 | 10/2018 | Valade | |
| 10,166,751 B2 | 1/2019 | Kramer et al. | |
| 10,186,068 B2 | 1/2019 | Qian | |
| 10,286,603 B2 | 5/2019 | Buller et al. | |
| 10,305,252 B2 | 5/2019 | Muendel et al. | |
| 10,328,685 B2 | 6/2019 | Jones et al. | |
| 10,336,055 B2 | 7/2019 | Das et al. | |
| 10,376,987 B2 | 8/2019 | DeMuth et al. | |
| 10,399,183 B2 | 9/2019 | Dallarosa et al. | |
| 10,415,798 B2 | 9/2019 | Herloski | |
| 10,444,492 B2 | 10/2019 | Hopkins et al. | |
| 10,562,132 B2 | 2/2020 | Zediker | |
| 10,569,363 B2 | 2/2020 | El-Dasher et al. | |
| 10,583,530 B2 * | 3/2020 | Karp | B29C 64/153 |
| 10,624,820 B2 | 4/2020 | Bonderer et al. | |
| 10,766,242 B2 | 9/2020 | Karp et al. | |
| 10,804,680 B2 | 10/2020 | Zediker et al. | |
| 10,940,536 B2 | 3/2021 | Zediker | |
| 10,971,896 B2 | 4/2021 | Zediker et al. | |
| 2003/0214571 A1 | 11/2003 | Ishikawa et al. | |
| 2009/0009730 A1 | 1/2009 | Destain | |
| 2010/0003619 A1 | 1/2010 | Das et al. | |
| 2013/0064706 A1 | 3/2013 | Schwarze et al. | |
| 2014/0252687 A1 | 9/2014 | El-Dasher et al. | |
| 2014/0263209 A1 | 9/2014 | Burris et al. | |
| 2015/0158111 A1 | 6/2015 | Schwarze et al. | |
| 2016/0158889 A1 | 6/2016 | Carter et al. | |
| 2016/0243649 A1 | 8/2016 | Zheng et al. | |
| 2017/0008126 A1 | 1/2017 | Long et al. | |
| 2017/0021454 A1 | 1/2017 | Dallarosa et al. | |
| 2017/0106445 A1 | 4/2017 | Schwarze et al. | |
| 2017/0203391 A1 | 7/2017 | Budge | |
| 2017/0304943 A1 | 10/2017 | Tsukui | |
| 2018/0162046 A1 | 6/2018 | Budge | |
| 2018/0190471 A1 | 7/2018 | Budge | |
| 2018/0207722 A1 | 7/2018 | Feldmann et al. | |
| 2018/0259732 A1 | 9/2018 | Pontiller-Schymura | |
| 2018/0318933 A1 | 11/2018 | Myerberg et al. | |
| 2018/0326655 A1 | 11/2018 | Herzog | |
| 2018/0345382 A1 * | 12/2018 | Roychowdhury | B33Y 10/00 |
| 2018/0361664 A1 | 12/2018 | Budge | |
| 2018/0361665 A1 | 12/2018 | Budge | |
| 2019/0009358 A1 | 1/2019 | Vorontsov | |
| 2019/0009369 A1 | 1/2019 | Vorontsov | |
| 2019/0099941 A1 | 4/2019 | Thompson et al. | |
| 2019/0099942 A1 | 4/2019 | Thompson et al. | |
| 2019/0111623 A1 | 4/2019 | Schodel et al. | |
| 2019/0160733 A1 | 5/2019 | Mirkin et al. | |
| 2019/0176265 A1 | 6/2019 | Bruck et al. | |
| 2019/0184494 A1 | 6/2019 | Bennett et al. | |
| 2019/0263055 A1 | 8/2019 | Keenan et al. | |
| 2019/0299286 A1 | 10/2019 | Feldmann et al. | |
| 2019/0308246 A1 | 10/2019 | Budge et al. | |
| 2019/0315064 A1 | 10/2019 | Budge et al. | |
| 2020/0023467 A1 * | 1/2020 | Hunze | B29C 64/282 |
| 2020/0039000 A1 | 2/2020 | Sweetland | |
| 2020/0108465 A1 | 4/2020 | Sweetland | |
| 2020/0230745 A1 | 7/2020 | Komsta et al. | |
| 2020/0271872 A1 | 8/2020 | Omori et al. | |
| 2021/0107062 A1 * | 4/2021 | Feldmann | B22F 12/226 |

(56) References Cited

U.S. PATENT DOCUMENTS

| | | |
|---|---|---|
| 2021/0323239 A1 | 10/2021 | Gonzalez et al. |
| 2022/0048256 A1 | 2/2022 | Michalica et al. |

FOREIGN PATENT DOCUMENTS

| | | | |
|---|---|---|---|
| EP | 2683516 A1 | 1/2014 | |
| WO | WO2019173000 A1 | 9/2019 | |
| WO | WO-2019240580 A1 * | 12/2019 | ............. B29C 64/00 |
| WO | WO202017214 A1 | 1/2020 | |
| WO | WO2021092475 A1 | 5/2021 | |

OTHER PUBLICATIONS

ALL3DP, 12 Pages. Retrieved Jul. 11, 2022 from website: https://all3dp.com/2/dlp-ys-sla-3d-printing-technologies-shootout/.

Bennett, Measuring UV Curing Parameters of Commercial Photopolymers Used in Additive Manufacturing, Addit Manuf, vol. 18, Dec. 2017, pp. 203-212. https://www.ncbi.nlm.nih.gov/pmc/articles/PMC5828039/.

Cutting Edge Optronics, Item ARR291P1800 H Package, Norhrop Gumman, 2 Pages. Retrieved Jul. 14, 2022 from webpage: http://catalog.cuttingedgeoptronics.com/item/high-power-laser-diodes/laser-diodes/arr291p1800.

Eibl et al., Alternative Beam Sources and Machine Concepts for Laser Powder Bed Fusion, IEEE, 2017 High Power Diode Lasers and Systems Conference (HPD), 2017, 2 Pages. https://ieeexplore.ieee.org/document/8261078.

EOS, The Technology for Tool-Free Injection Molding, 6 Pages. Retrieved Jul. 11, 2022 from webpage: https://www.eos.info/en/innovations/3d-printing-of-the-future/laserpro-fusion.

EOS, Video The Technology for Tool-Free Injection Molding. See attached webpage for Video https://www.eos.info/en/innovations/3d-printing-of-the-future/laserpro-fusion#video_67223.

Feng et al., Exposure Reciprocity Law in Photopolymerization of Multi-Functional Acrylates and Methacrylates, Macromolecular Chemistry and Physics, vol. 208, 2007, pp. 295-306.

Gao et al., Programmable Spectral Filter in C-Band Based on Digital Micromirror Device, Micromachines (Basel), PMC6471598, vol. 10, Issue 3, Mar. 2019, 163, 10 Pages. https://www.ncbi.nlm.nih.gov/pmc/articles/PMC6471598/pdf/micromachines-10-00163.pdf.

Gehner, MEMS AO Micro Mirror Development at IPMS, Fraunhofer IMPS, 30 Pages.

Hamamatsu, Fac Lens (Fast-Axis Collimating Lens), J10919 Series, Optical Lens, 2 Pages. Retrieved Jul. 14, 2022 from Webpage: https://www.hamamatsu.com/resources/pdf/etd/J10919_TOTH1005E.pdf.

Heebner et al., Programmable Beam Spatial Shaping System for the National Ignition Facility, LLNL-PROC-469093, Lawrence Livermore National Laboratory, Spie Photonics West, San Francisco CA, Feb. 4, 2011, 7 Pages.

Hellman et al., Angular and Spatial Light Modulation by Single Digital Micromirror Device for Multi-Image Output and Nearly-Doubled Etendue, Optical Express 21477, vol. 27, No. 15, Jul. 22, 2019, 20 Pages.

Helm et al., Laser Welding of Laser-Structured Copper Connectors for Battery Applications and Power Electronics, 2020, 12 Pages.

Hodgson et al., #3 Protecting Your Laser Diode, Application Note, ILX Lightwave A Newport Corporation Brand, 30 Pages. Retrieved Jul. 14, 2022 from webpage: https://www.newport.com/medias/sys_master/images/images/hc0/h01/8797049454622/AN03-Protecting-Your-Laser-Diode.pdf.

Hopkins et al., A High-Speed Large-Range Tip-Tilt-Piston Micromirror Array, Journal of Microelectromechanical Systems, vol. 26, No. 1, 2016, pp. 196-205.

Hwang et al., Design of Square-Shaped Beam Homogenizer for Petawatt-Class Ti:Sapphire Amplifier, Optics Express 9511, vol. 25, No. 9, May 1, 2017, 10 Pages.

Industrial Laser Solutions, Green Light-Enabled SLM Process to Allow Additive Manufacturing of Copper, Aug. 30, 2017, 7 Pages. https://www.industrial-lasers.com/additive-manufacturing/article/16490235/green-lightenabled-slm-process-to-allow-additive-manufacturing-of-copper.

Karp et al., Area Melting with Multi-Laser Arrays to Increase Build Rate for Metal Powder Bed Fusion Additive Manufacturing, Proceedings of Society of Photo-Optical Instrumentation Engineers (SPIE) 10909, Laser 3D Manufacturing VI, 1090909, Mar. 4, 2019, 7 Pages. https://www.spiedigitallibrary.org/conference-proceedings-of-spie/10909/1090909/Area-melting-with-multi-laser-arrays-to-increase-build-rate/10.1117/12.2513892.short?SSO=1.

Kowalski, The Development of Laser Diode Arrays for Printing Applications, Semiconductor Laser Diode Technology and Applications, pp. 263-287. https://pdfs.semanticscholar.org/13eb/4f2504eb4e47e34e915589lede4e04f28b10.pdf.

Kurtz et al., Chapter 3 Laser Beam Shaping in Array-Type Laser Printing Systems, Laser Beam Shaping Applications CRC Press, Routledge Handbooks Online, Mar. 1, 2017, 60 Pages. https://www.rotledgehandbooks.com/doi/10.1201/9781315371306-4.

Lachetta et al., Simulating Digital Micromirror Devices for Patterning Coherent Excitation Light in Structured Illumination Microscopy, 2020, 11 Pages.

Laser Diode Array, 12-Bar 1800W QCW Golden Bullet H Package, Northrop Grumman, 2 Pages. Retrieved Jul. 14, 2022 from webpage: http://catalog.cuttingedgeoptronics.com/Asset/12-bar_1800W_Golden_Bullet.pdf.

Laser Diode Bar Diagram, 1 Page. Retrieved Jul. 14, 2022 from webpage https://blog.romelasers.com/hs-fd/hubfs/Laser%20Diode%20Bar.png?t=1535667088653&width=348&name=Laser%20Diode%20Bar.png.

Laser Diode Control, Laser Diode Driver Basics and Design and Fundamentals, 12 Pages. Retrieved Jul. 14, 2022 from webpage: https://www.laserdiodecontrol.com/laser-diode-driver-basics-and-fundamentals.

LASERS 101—Laser Selection Guide, RPMC Lasers, 30 Pages. Retrieved Jul. 14, 2022 from webpage: https://go.romolasers.com/lasers-101-laser-selection-guide?_ga=2.52387232.889072292.1572965649-202158875.1572965649.

Limaye, Multi-Objective Process Planning Method for Mask Projection Stereolithography, Dissertation @ Georgia Institute of Technology, 2007, 324 Pages.

Limaye et al., Process Planning to Build Mask Projection Sterolithography Parts with Accurate Vertical Dimensions, 2007 International Solid Freeform Fabrication Symposium, Georgia Institute of Technology, 2007, pp. 159-173.

Martin et al., Dynamics of Pore Formation During Laser Powder Bed Fusion Additive Manufacturing, Nature Communications, vol. 10:1987, 2019, 10 Pages.

Matthews et al., Diode-Based Additive Manufacturing of Metals Using an Optically-Addressable Light Valve, Optical Express 11788, vol. 25, No. 10, May 15, 2017, pp. 11788-11800. https://opg.optica.org/oe/fulltext.cfm?uri=oe-25-10-11788.

Metelkova et al., On the Influence of Laser Defocusing in Selective Laser Melting of 316L, Additive Manufacturing, vol. 23, 2018, pp. 161-169.

Monocrom, Innovative Solder-Free Approach to Diode Bar Assemblies, 8 Pages. Retrieved Jul. 14, 2022 from webpage: https://www.monocrom.com/en/innovative-solder-free-approach-to-diode-bar-assemblies/.

Payne, Multiple Beam Laser Diode Additive Manufacturing for Metal Parts, Thesis University of Cambridge, Jul. 2017, 196 Pages.

Quantel Laser Diodes, Individual Addressable Lader Diode Array (IALDA)—40W CW Diode Bars, QD-C1840-ILADA, 2 Pages.

RESOU (Research at Osaka University), Additive Manufacturing (3D Printing) with Blue Direct Diode Laser Developed, a World First!, Engineering, Oct. 23, 2017, 5 Pages. https://resou.osaka-u.ac.jp/en/research/2017/20171024_1.

Roehling et al., Physics of Large-Area Pulsed Laser Powder Bed Fusion, Additive Manufacturing, vol. 46, 2021, 9 Pages.

(56) References Cited

OTHER PUBLICATIONS

Saunders, Formalloy Releases Latest Metal 3D Printing System: L-Series Machine with Blue Wavelength Laser Technology, 3D Printing, Sep. 21, 2017, 5 Page. https://3dprint.com/188512/formalloy-l-series-blue-laser/.

Smith et al., Single Chip Lidar with Discrete Beam Steering by Digital Micromirror Device, Optics Express 14732, vol. 25, No. 13, Jun. 26, 2017, 14 Pages.

Song et al., A Review of Micromirror Arrays, Precision Engineering, vol. 51, 2018, pp. 729-761.

Texas Instruments, DLP Products, 4 Pages. Retrieved Jul. 11, 2022 from website: http://www.ti.com/dlp-chip/getting-started.html.

Treusch et al., Chapter 6 High Power Diode Laser Arrays, High Power Laser Handbook, Access Engineering Library, 2011, 28 Pages.

Wagner, Micro Mirror SLM, Fraunhofer Institute for Photonic Microsystems (IPMS), Germany, 2017, 28 Pages.

Wagner et al., Micro/Nanosystems Technology, Optical MEMS, 43 Pages.

Wu et al., Fabrication of Two-Dimensional Arrays of Microlenses and their Applications in Photolithography, J. Micromech. Microeng., vol. 12, 2002, pp. 747-758.

Zavala-Arredondo et al., Diode Area Melting Single-Layer Parametric Analysis of 316L Stainless Steel Powder, The International Journal of Advanced Manufacturing Technology, vol. 94, 2018, pp. 2563-2576.

Zavala-Arredondo et al., Investigating the Melt Pool Properties and Thermal Effects of Multi-Laser Diode Area Melting, The International Journal of Advanced Manufacturing Technology, vol. 97, 2018, pp. 1383-1396. https://www.researchgate.net/publication/324770686_Investigating_the_melt_pool_properties_and_thermal_effects_of_multi-laser_diode_area_melting/link/5d26f206299bf1547cab7825/download.

Zavala-Arredondo et al., Laser Diode Area Melting for High Speed Additive Manufacturing of Metallic Components, Materials and Design, vol. 117, 2017, pp. 305-315. https://www.researchgate.net/publication/312316356_Laser_Diode_Area_Melting_for_High_Speed_Additive_Manufacturing_of_Metallic_Components.

* cited by examiner

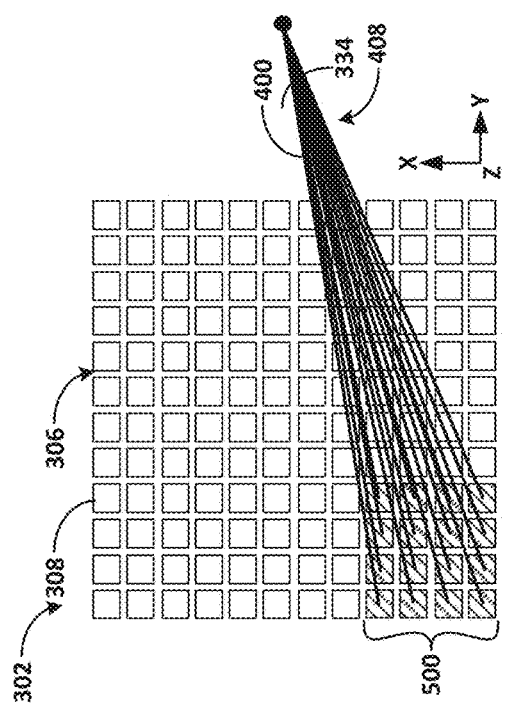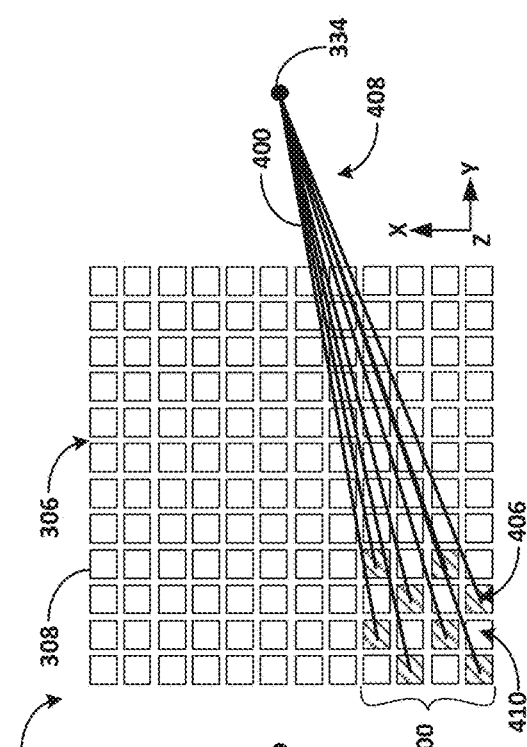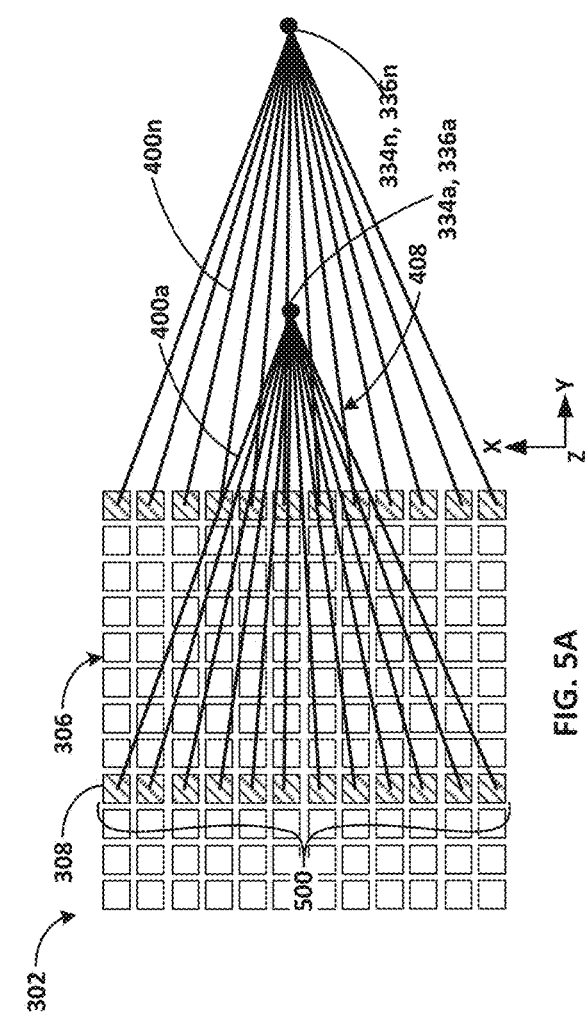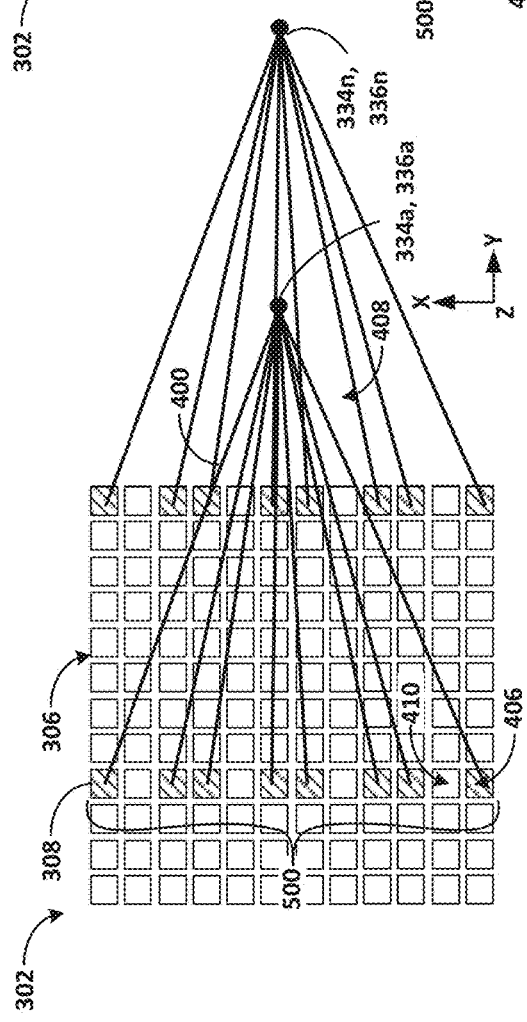

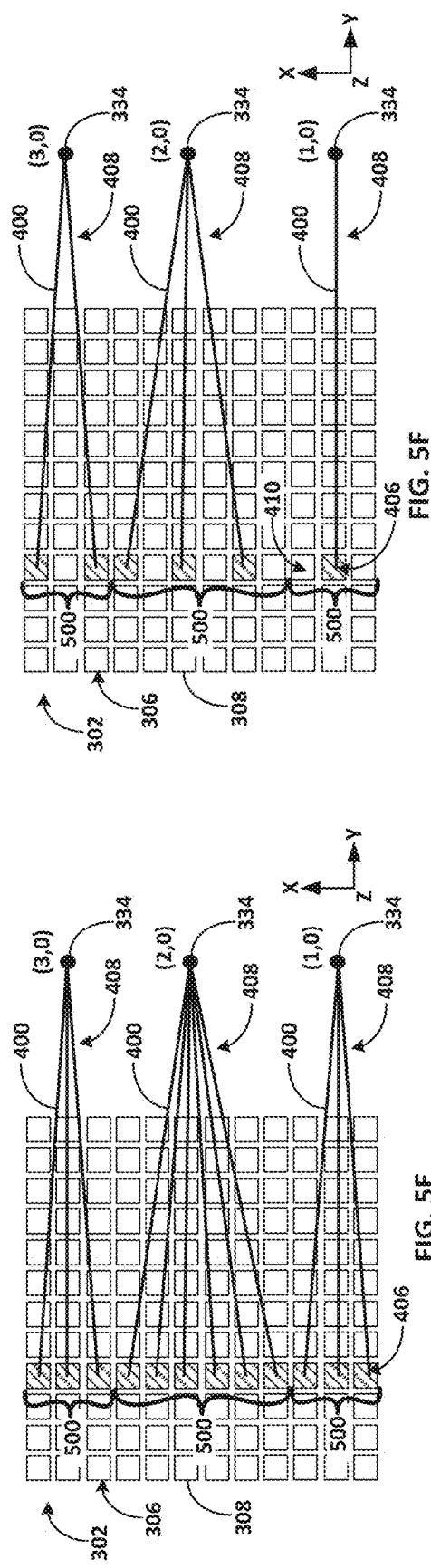
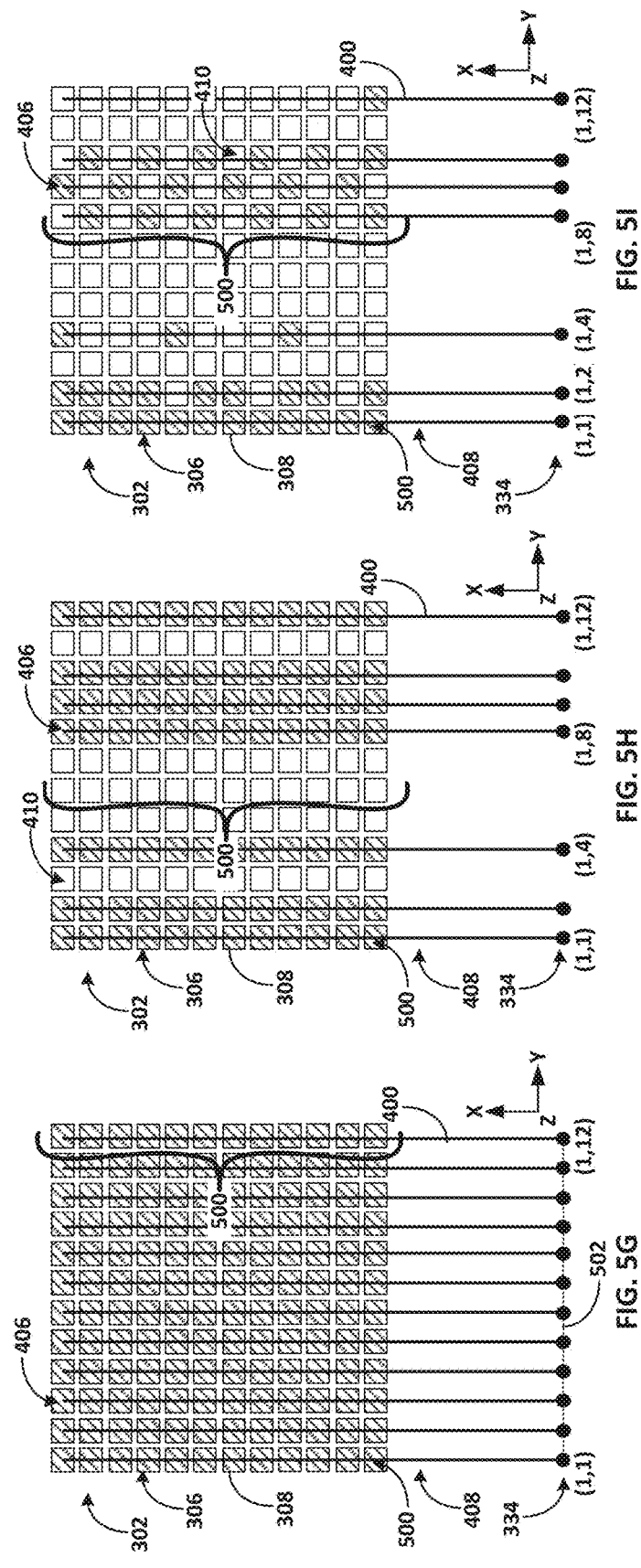

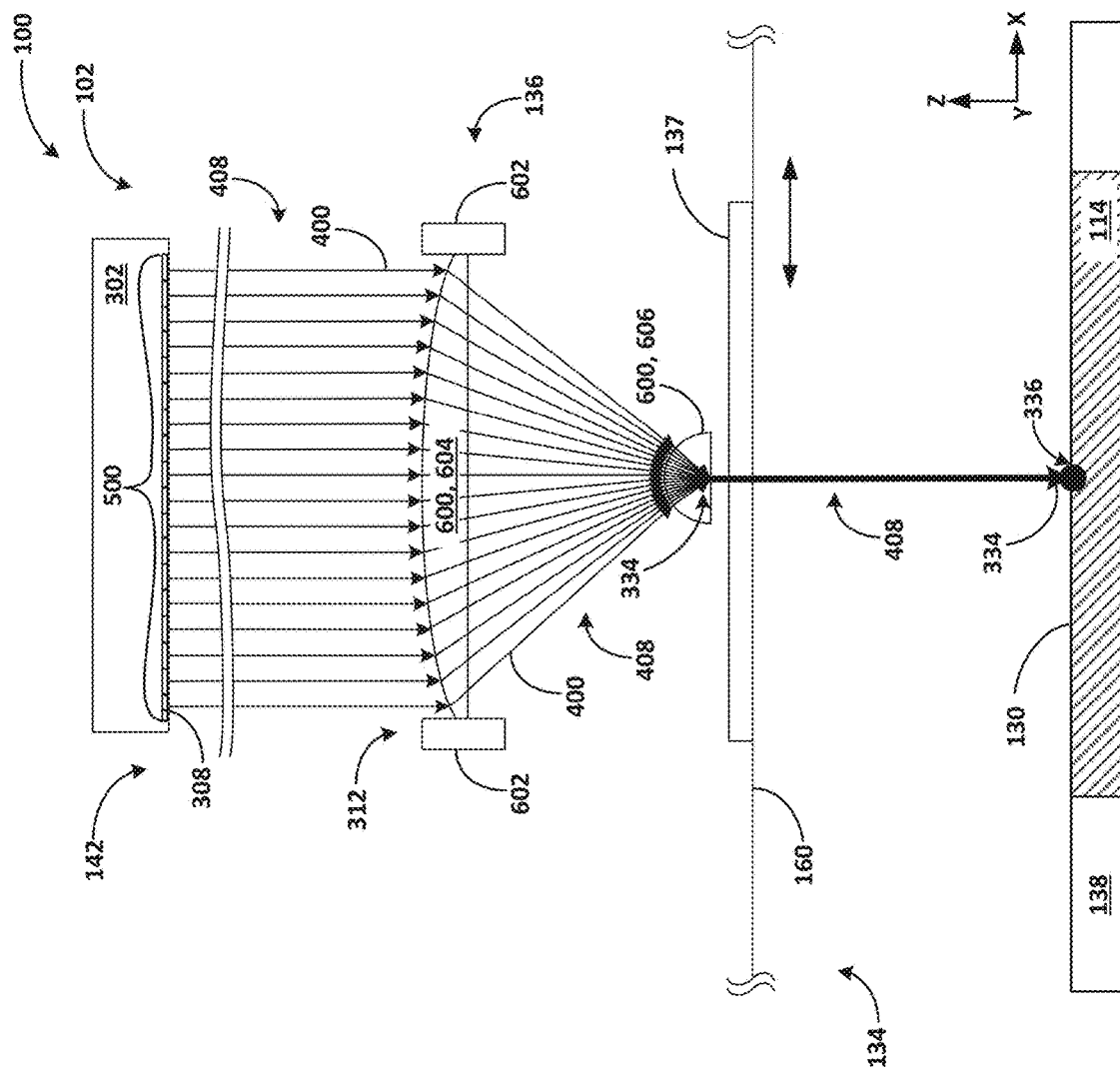

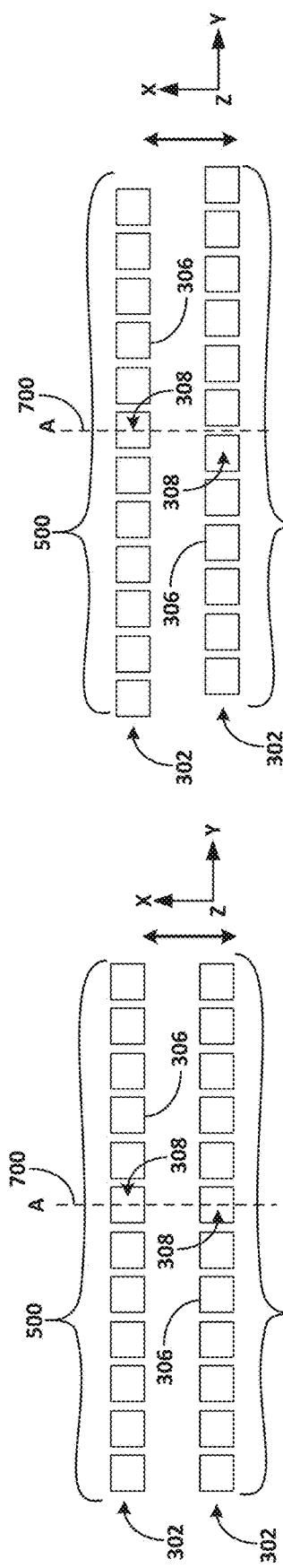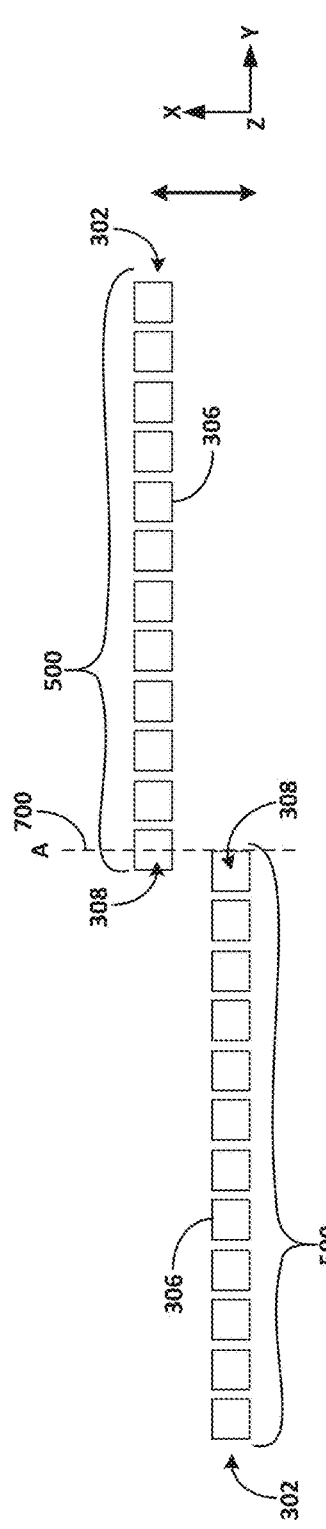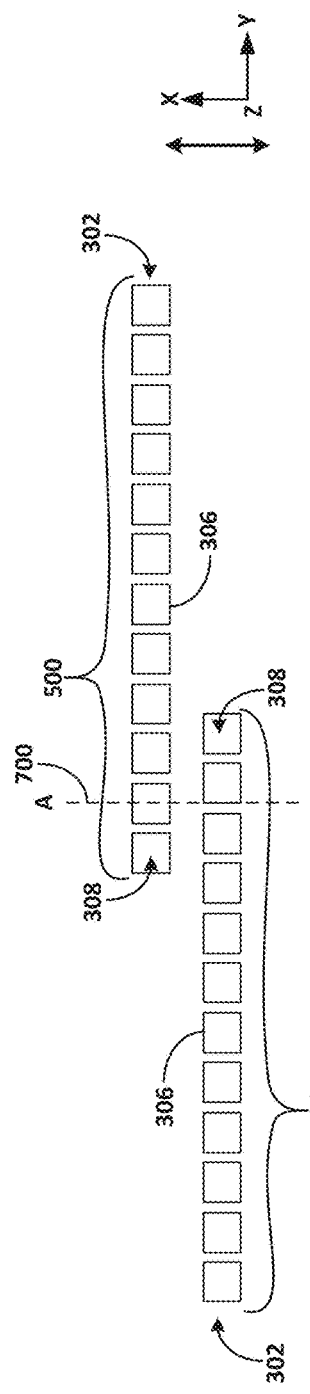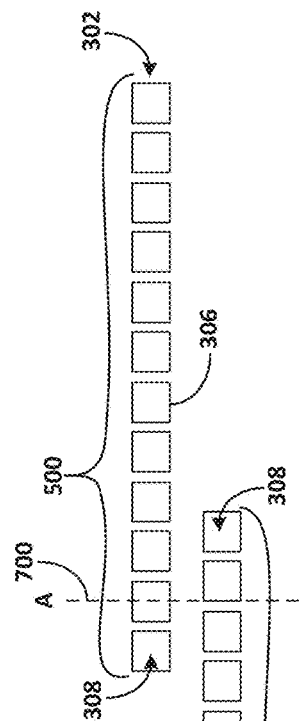

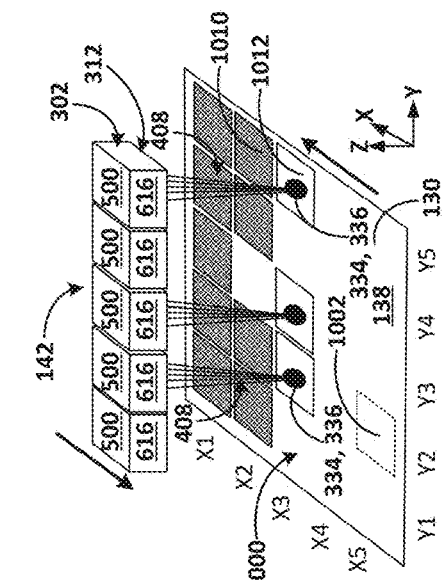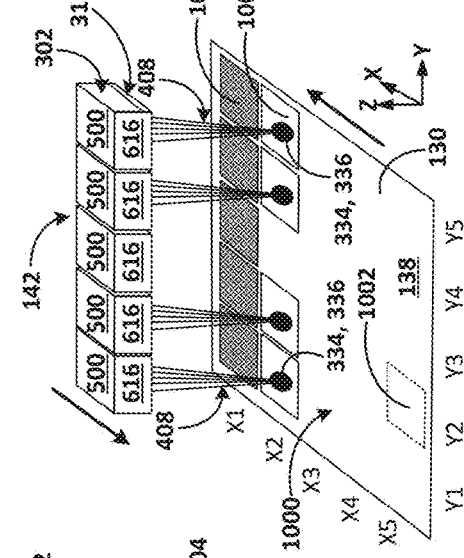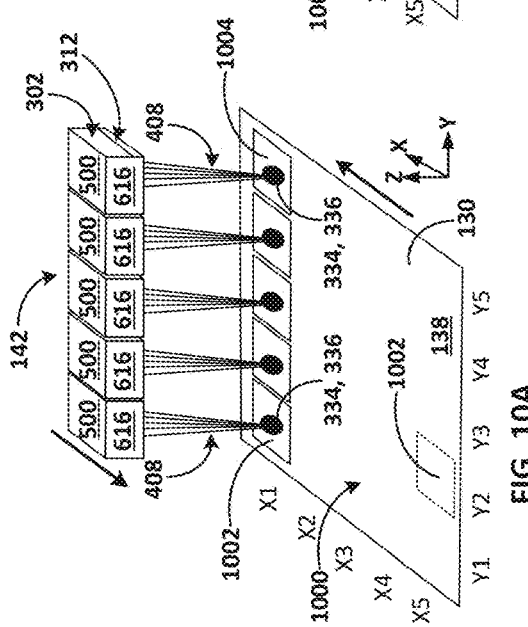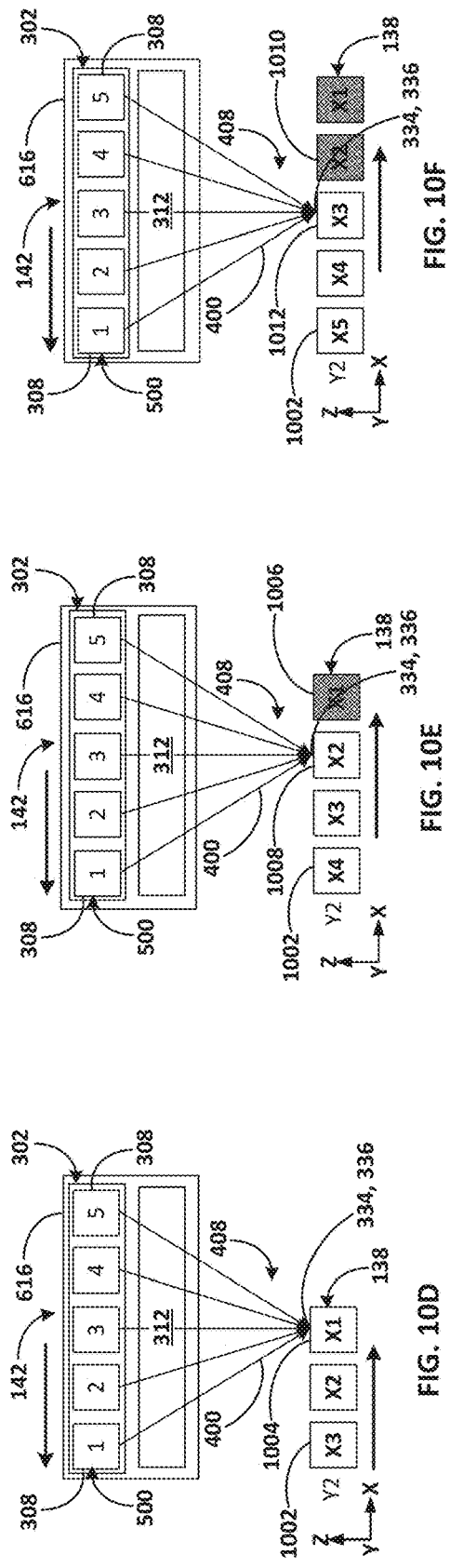

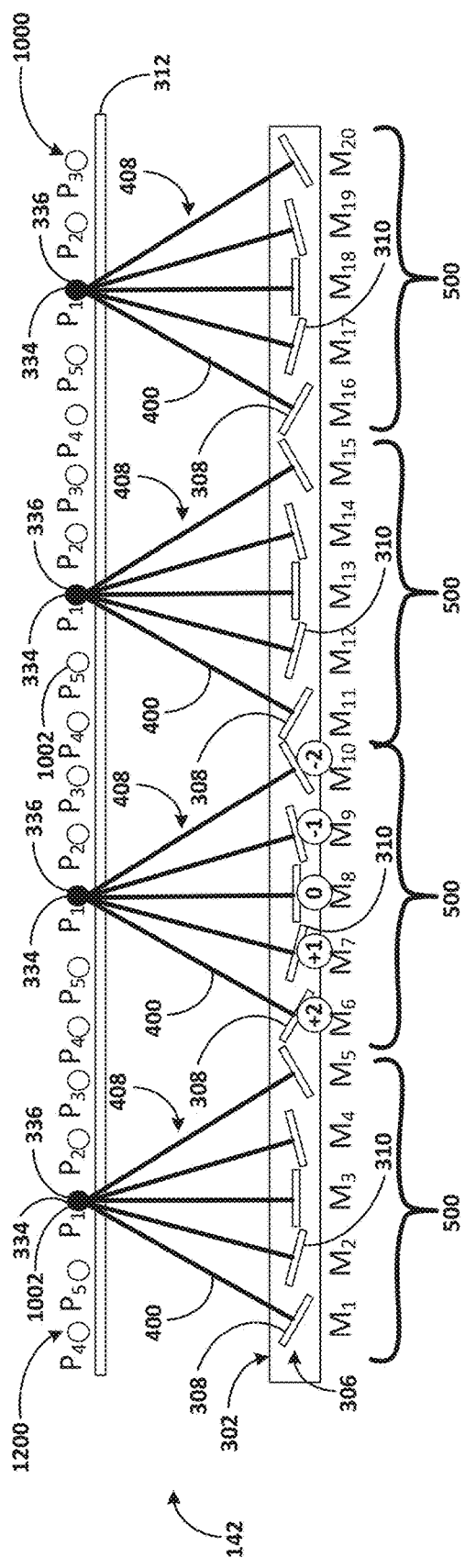
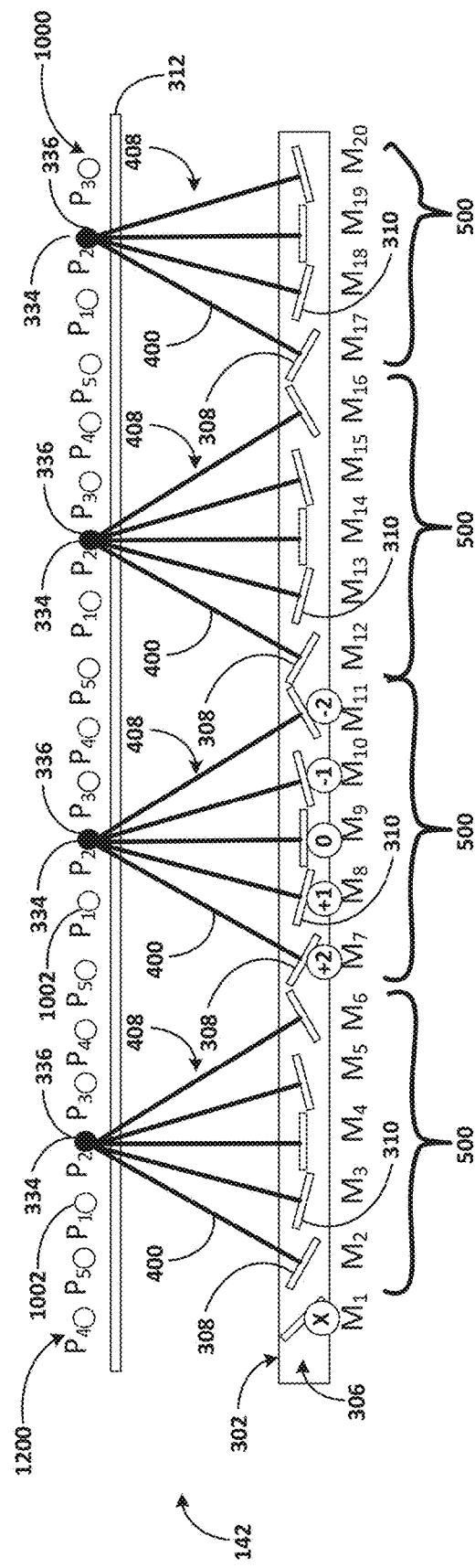
FIG. 12A
FIG. 12B

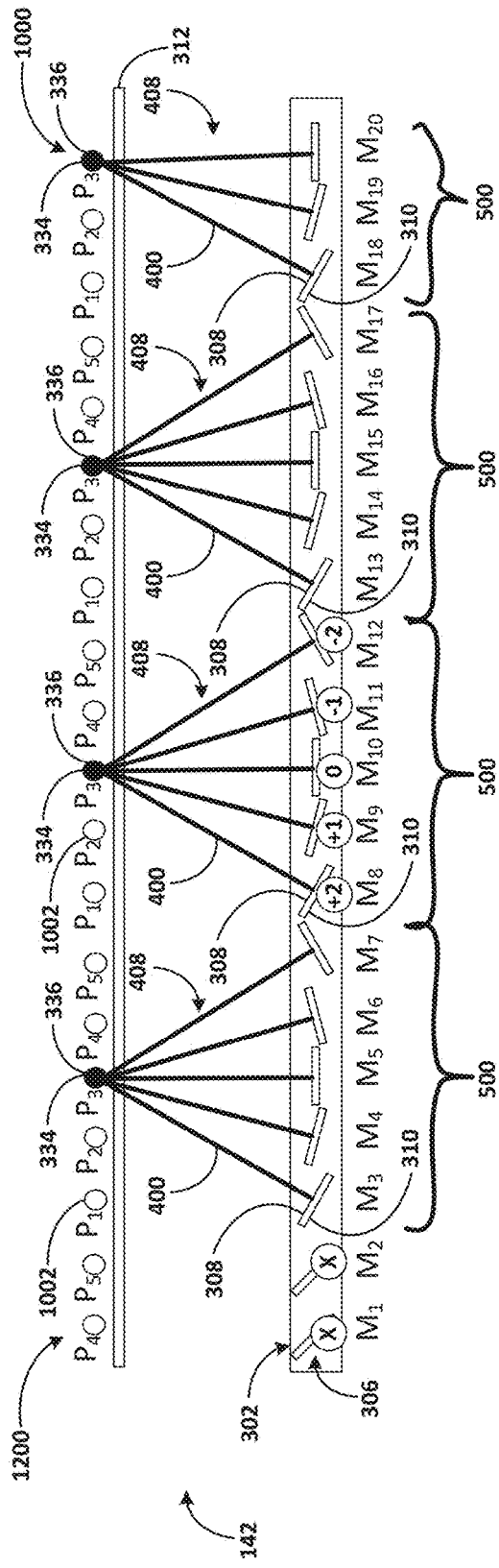
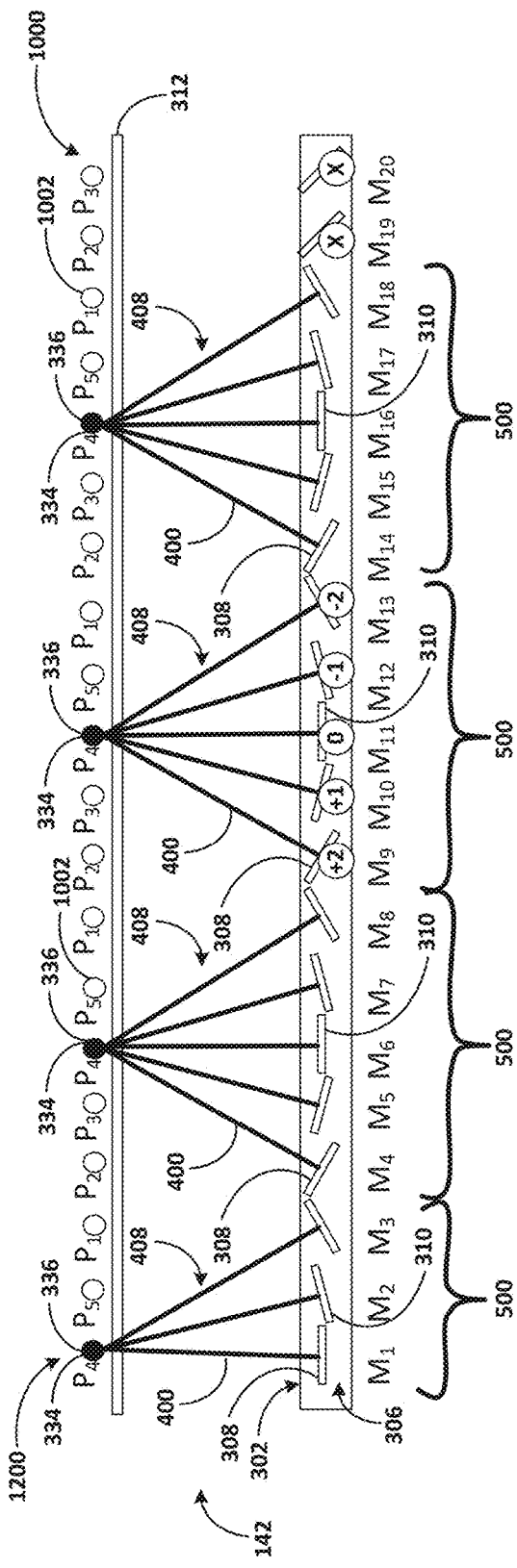
FIG. 12C
FIG. 12D

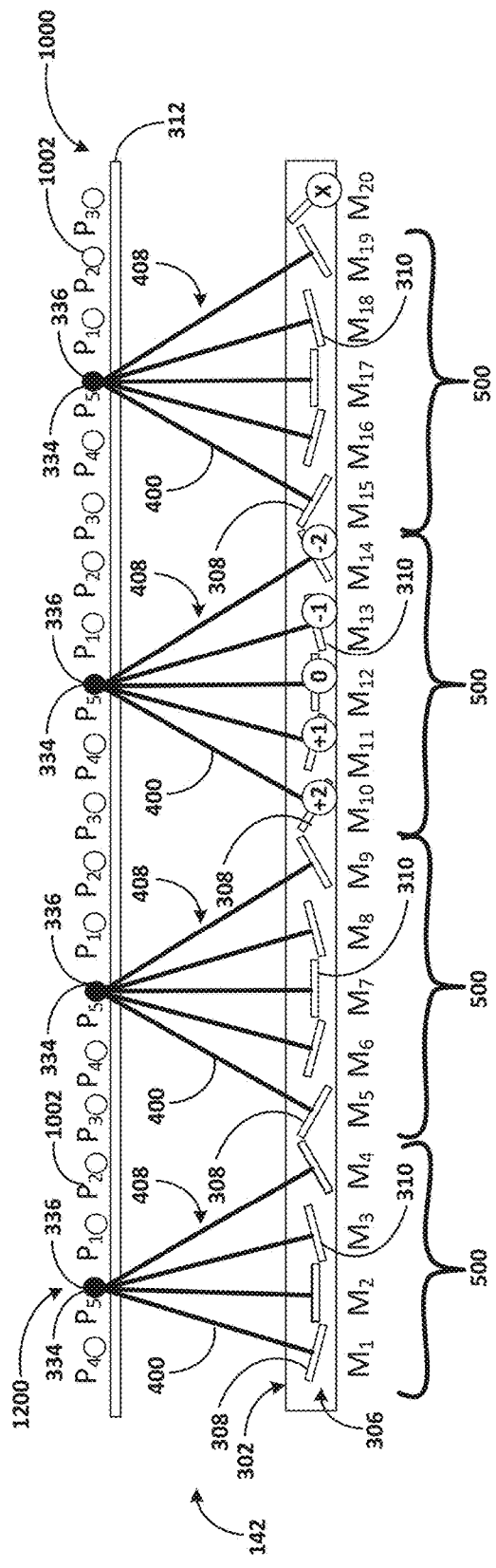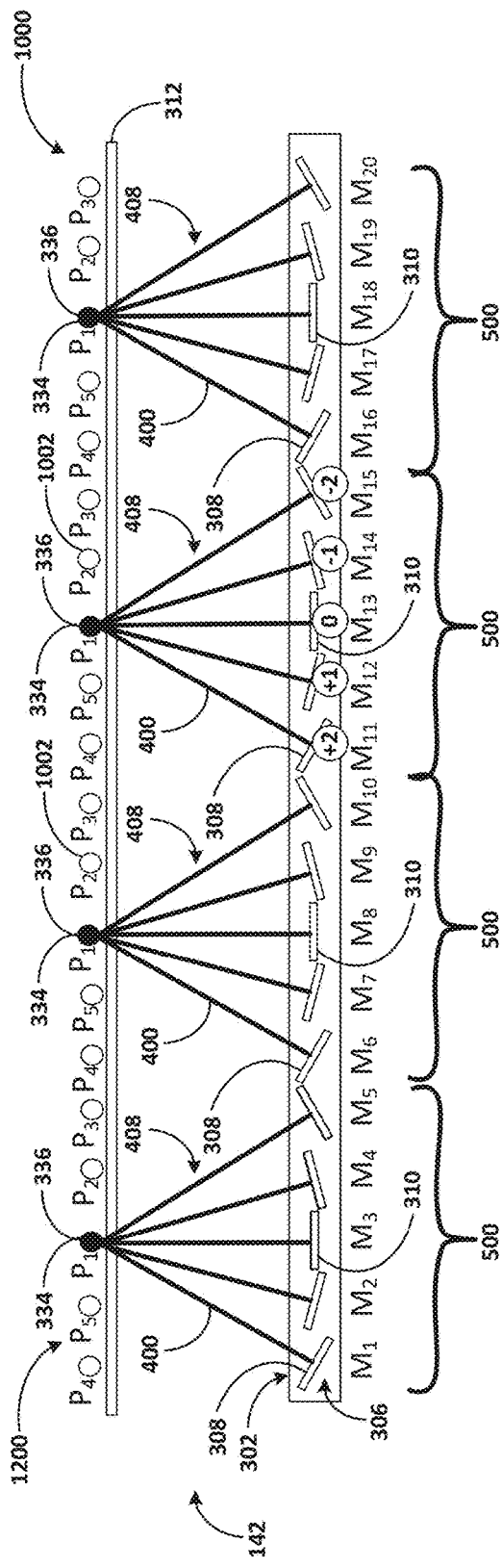
FIG. 12E
FIG. 12F

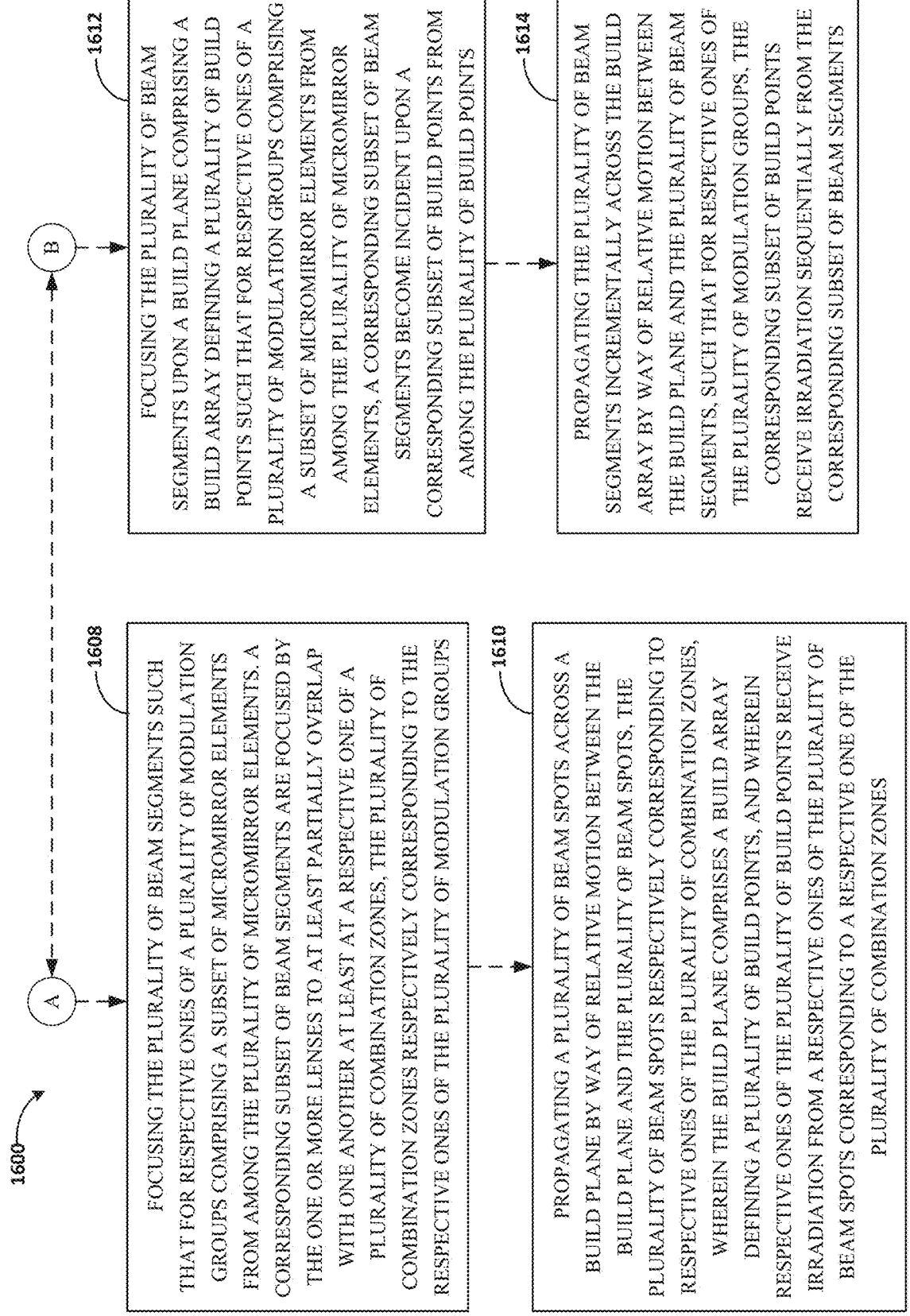

IRRADIATION DEVICES WITH OPTICAL MODULATORS FOR ADDITIVELY MANUFACTURING THREE-DIMENSIONAL OBJECTS

PRIORITY INFORMATION

The present application claims priority to U.S. Provisional Application No. 63/235,303 filed on Aug. 20, 2021, which is incorporated by reference herein for all purposes.

FIELD

The present disclosure generally pertains to irradiation devices for irradiating powder material to additively manufacture three-dimensional objects, such as irradiation devices used in powder bed fusion processes.

BACKGROUND

Three dimensional objects may be additively manufactured using a powder bed fusion process in which an energy beam generated by an irradiation device is directed onto a powder bed to melt and/or sinter sequential layers of powder material. The properties of the three dimensional object formed by melting and/or fusing the powder material may depend at least in part on one or more characteristics of the energy beam provided by the irradiation device and/or on the irradiation sequence performed by the irradiation device. Accordingly, it would be welcomed in the art to provide improved additive manufacturing systems and machines, including improved energy beam systems and/or irradiation devices, as well as improved irradiation sequences that may be performed by such energy beam systems and/or irradiation devices.

BRIEF DESCRIPTION OF THE DRAWINGS

A full and enabling disclosure, including the best mode thereof, directed to one of ordinary skill in the art, is set forth in the specification, which makes reference to the appended Figures, in which:

FIGS. 5A-5M schematically depict exemplary modulation groups that may be defined for an optical modulator and corresponding combination zones for a plurality of beam segments reflected by the modulation group;

FIGS. 6A-6H schematically depict exemplary focusing lens assemblies that may be included in an irradiation device to combine beam segments corresponding to respective modulation groups;

FIGS. 7A-7D schematically depict exemplary alignments of a plurality of optical modulators;

FIGS. 10A-10C schematically depict a perspective view of a build plane being irradiated by an irradiation device according to an exemplary irradiation sequence;

FIGS. 10D-10F schematically depict a side view of an exemplary irradiation sequence that may include the irradiation sequence depicted in FIGS. 10A-10C;

FIGS. 12A-12F schematically depict exemplary modulation cycles that may be included in an irradiation sequence;

FIGS. 16A and 16B schematically depicts an exemplary method of additively manufacturing a three-dimensional object.

Figure 1A:
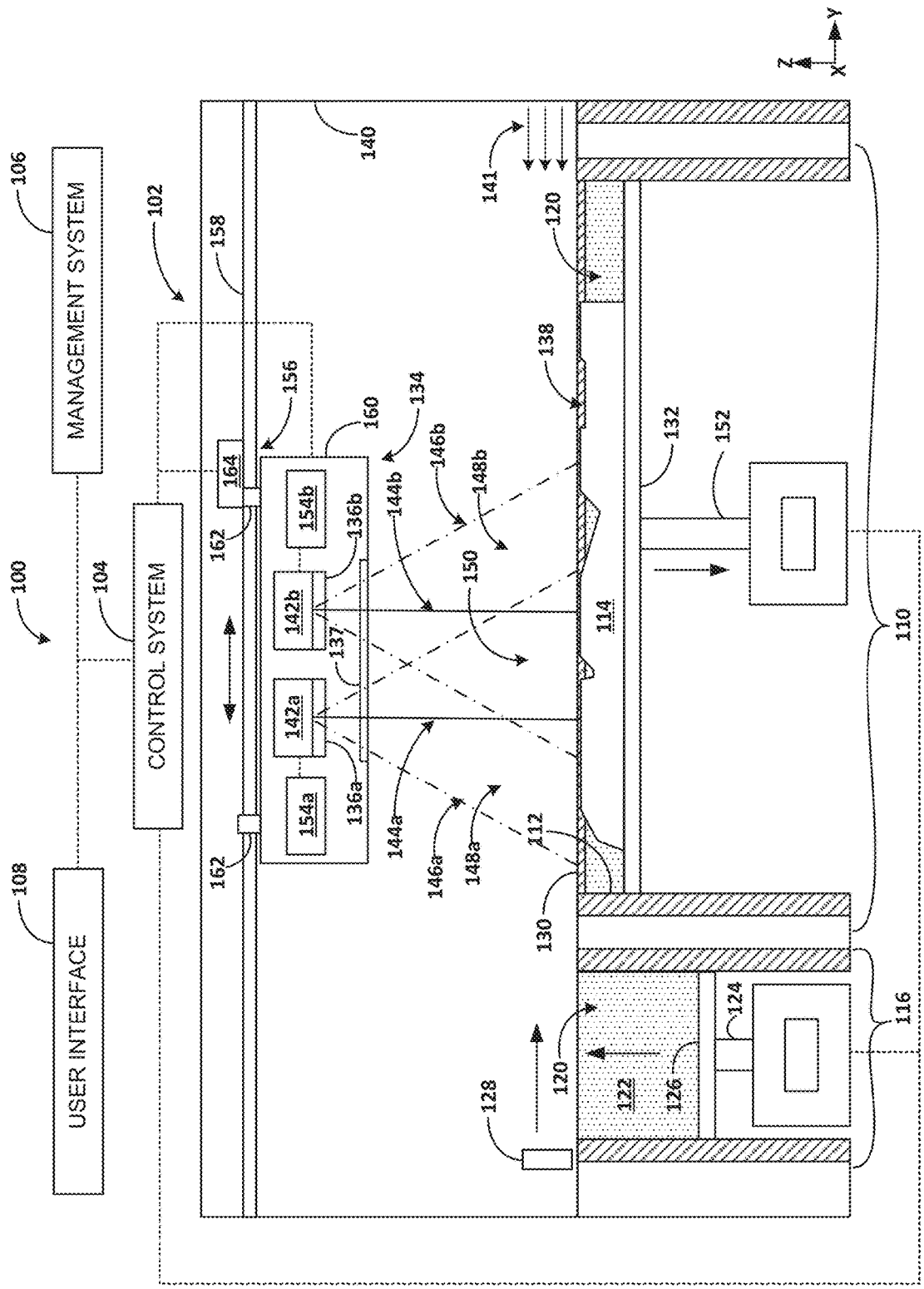
FIGS. 1A and 1B schematically depict exemplary additive manufacturing systems or machines.

Repeat use of reference characters in the present specification and drawings is intended to represent the same or analogous features or elements of the present disclosure.

DETAILED DESCRIPTION

Reference now will be made in detail to exemplary embodiments of the presently disclosed subject matter, one or more examples of which are illustrated in the drawings. Each example is provided by way of explanation and should not be interpreted as limiting the present disclosure. In fact, it will be apparent to those skilled in the art that various modifications and variations can be made in the present disclosure without departing from the scope of the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

It is understood that terms "upstream" and "downstream" refer to the relative direction with respect to fluid flow in a fluid pathway. For example, "upstream" refers to the direction from which the fluid flows, and "downstream" refers to the direction to which the fluid flows. It is also understood that terms such as "top", "bottom", "outward", "inward", and the like are words of convenience and are not to be construed as limiting terms. As used herein, the terms "first", "second", and "third" may be used interchangeably to distinguish one component from another and are not intended to signify location or importance of the individual components. The terms "a" and "an" do not denote a limitation of quantity, but rather denote the presence of at least one of the referenced item.

Approximating language, as used herein throughout the specification and claims, may be applied to modify any quantitative representation that could permissibly vary without resulting in a change in the basic function to which it is related. Accordingly, a value modified by a term or terms, such as "about," "substantially," and "approximately," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The present disclosure generally provides additive manufacturing machines and methods of additively manufacturing three-dimensional objects. Exemplary additive manufacturing machines and methods may utilize irradiation devices that emit an energy beam that exhibits a relatively lower intensity and/or power density in comparison to existing irradiation devices typically utilized in powder bed fusion processes. For example, an additive manufacturing machine may operate with an energy beam that imparts a power density and/or intensity to the build plane commensurate with a conduction irradiation regime. As used herein, the term "conduction irradiation" or "conduction irradiation regime" refers to an irradiation regime in a powder bed fusion process in which heat is transferred into the powder bed predominately through heat conduction such that the thermal conductivity of the powder material is the limiting factor for the depth of the melt pool. The temperature of the melt pool with conduction irradiation generally remains below the vaporization temperature of the powder material. With a conduction irradiation regime, the width of a melt pool is typically much greater than the depth of the melt pool. A melt pool resulting from conduction irradiation may have an aspect ratio of less than about 1.0 (width/depth), such as from about 0.1 to about 1.0, such as from about 0.1 to about 0.5, or such as from about 0.5 to about 1.0. A melt pool resulting from conduction irradiation may have a depth of from about 10 micrometers ($\mu m$) to about 250 $\mu m$, such as from about 10 $\mu m$ to about 50 $\mu m$, such as from about 50 $\mu m$ to about 100 $\mu m$, or such as from about 100 $\mu m$ to about 250 $\mu m$.

Conduction irradiation may be differentiated from penetration irradiation. As used herein, the term "penetration irradiation" or "penetration irradiation regime" refers to an irradiation regime in a powder bed fusion process in which the temperature of the melt pool exceeds the vaporization temperature of the powder material to an extent that an energy beam penetrates into a vapor capillary formed by expanding gasses releasing from the vaporizing power material. With penetration irradiation, the temperature of the melt pool adjacent to the vapor capillary generally exceeds the vaporization temperature of the powder material. With a penetration irradiation regime, the width of a melt pool is typically much smaller than the depth of the melt pool. A melt pool resulting from penetration irradiation may have an aspect ratio of greater than about 1.0 (width/depth), such as from about 1.0 to about 18.0, such as from about 1.0 to about 5.0, such as from about 5.0 to 10.0, or such as from about 10.0 to about 18.0. A melt pool resulting from penetration irradiation may have a depth of from about 100 $\mu m$ to about 1 millimeter (mm), such as from about 100 $\mu m$ to about 250 $\mu m$, such as from about 250 $\mu m$ to about 500 $\mu m$, or such as from about 500 $\mu m$ to about 800 $\mu m$.

Exemplary additive manufacturing machines may include an irradiation device that includes an optical modulator. The optical modulator may include a micromirror device, such as a digital micromirror device, or the like. A micromirror device may be configured as a micro-opto-electro-mechanical system that includes an integration of mechanical, optical, and electrical systems that involve manipulation of optical signals a very small sizes. An exemplary micromirror device may include a micromirror array made up of a plurality of micromirror elements respectively coupled to an addressable element. The addressable elements may be actuated to cause the corresponding micromirror element to move to respective ones of a plurality of modulation states. As used herein, the term "modulation state" refers to a position or orientation of a micromirror elements imparted by a corresponding addressable element and/or the position or orientation of the addressable element. The term modulation state may be used with reference to one or more micromirror elements and/or with reference to a corresponding one or more addressable elements. By way of example, a micromirror element may be titled in a first direction in a first modulation state, causing a beam segment reflected by the micromirror element to be directed to a focusing lens assembly. Additionally, or in the alternative, a micromirror element may be tilted in a second direction in a second modulation state, causing a beam segment reflected by the micromirror element to be directed to a beam stop. As used herein, the term "beam segment" refers to a cross-sectional portion of an energy beam propagating along an optical path that includes reflection by a respective micromirror element of an optical modulator. An optical modulator may include a micromirror array made up of a plurality of micromirror elements. An energy beam that becomes incident upon a micromirror array may be described with reference to a plurality of beam segments, with respective ones of the plurality of beam segments corresponding to respective ones of the plurality of micromirror elements of the optical modulator.

An irradiation devices that includes such an optical modulator may be advantageously utilized with a conduction irradiation regime. The relatively lower intensity and/or power density associated with conduction irradiation may allow for the use of optical modulators with a relatively large pixel density, thereby allowing for increased resolution when irradiating the powder bed. The increased resolution realized by the present disclosure may be utilized to facilitate sophisticated irradiation strategies that provide for improved temperature control and/or improved material properties of three dimensional objects formed during an additive manufacturing process. Additionally, or in the alternative, the increased resolution realized by the present disclosure may be utilized to produce three dimensional objects that have smaller features, improved surface properties, and/or greater dimensional tolerances.

In some embodiments, a plurality of beam segments may be combined to at least partially overlap with one another. The plurality of beam segments may be combined by way of a focusing lens assembly that includes one or more optical elements that have a particular configuration or arrangement that provides for their combination and/or by way of the modulation state of the respective micromirror elements causing the plurality of beam segments to propagate in a direction that provides for their combination. The respective modulation states may be coordinated with the configuration or arrangement of the focusing lens assembly.

A plurality of beam segments that are combined with one another may be described in association with an optical modulator by reference to a modulation group. As used herein, the term "modulation group" refers to a subset of micromirror elements and/or corresponding addressable elements of an optical modulator. In some embodiments, a modulation group may include a subset of micromirror elements and/or corresponding addressable elements of an optical modulator that are respectively actuated to a modulation state that causes a corresponding plurality of beam segments to become incident upon a focusing lens assembly and/or a build plane. Additionally, or in the alternative, a modulation group may include one or more of micromirror elements and/or corresponding addressable elements of an optical modulator that are respectively actuated to a modulation state that causes a corresponding one or more beam segments to become incident upon a beam stop. In some embodiments, a modulation group may include a subset of micromirror elements and/or corresponding addressable elements of an optical modulator that are respectively actuated to a modulation state that causes the corresponding plurality of beam segments to be combined to at least partially overlap with one another at least at a combination zone. Additionally, or in the alternative, in some embodiments, a modulation group may include a subset of micromirror elements and/or corresponding addressable elements of an optical modulator that are respectively actuated to a modulation state that causes the corresponding plurality of beam segments to become incident upon a build plane without overlapping with one another. When a plurality of beam segments corresponding to a modulation group at least partially overlap with one another at a combination zone, such combination zone may coincide with a focal point of a focusing lens assembly of the irradiation device and/or a beam spot on the powder bed. An optical modulator may be described with reference to a plurality of modulation groups, with respective ones of the plurality of modulation groups including a corresponding subset of addressable elements and/or micromirror elements. The plurality of modulation groups may provide a corresponding plurality of subsets of beam segments, such as a corresponding plurality of subsets of beam segments that combine and/or at least partially overlap with one another a respective ones of a plurality of combination zones, and/or a corresponding plurality of subsets of beam segments that become incident upon a build plane without overlapping with one another. The combination of the beam segments corresponding to the respective modulation groups may provide a plurality of beam spots with an increased intensity and/or power density relative to the intensity and/or power density of the energy beam upstream from the optical modulator, such as relative to the intensity and/or power density of the energy beam when emitted from a beam generation device and/or when incident upon the optical modulator. A plurality of combination zones respectively corresponding to a plurality of modulation groups may be directed onto the build plane in the form of a pattern, such as along the build plane, generated according to beam modulation instructions. For example, the pattern may include a linear or curvilinear arrangement of combination zones, which may be adjacent to one another and/or overlapping with one another. Additionally, or in the alternative, a plurality of beam segments corresponding to a modulation group may propagate incrementally across a build plane comprising a build array defining a plurality of build points such that a subset of build points in the build array respectively receive irradiation sequentially from the plurality of beam segments corresponding to the modulation group, for example, from a plurality of beam segments that become incident upon the build plane without overlapping with one another.

In some embodiments, the optical modulator may be utilized to provide a plurality of beam spots respectively corresponding to a combination zone. The plurality of beam spots may be scanned across a powder bed in a coordinated manner, such as in the form of a linear or curvilinear arrangement of beam spots. The plurality of beam spots may be respectively defined by a combination zone corresponding to a modulation group that includes a subset of addressable elements of the optical modulator. However, in some embodiments the beam segments need not be combined. The linear or curvilinear arrangement of beam spots may be scanned across the powder bed while respective addressable elements of the optical modulator may be modulated according to beam modulation instructions. The powder bed can be irradiated with good resolution while the beam spots are modulated by the optical modulator. With a conduction irradiation regime, heat transfer from adjacent beam spots are limited by the thermal conductivity of the powder material, and as such, the melt pool corresponding to respective beam spots can be substantially confined to specified build points of the powder bed. In some embodiments, the presently disclosed additive manufacturing machines may allow for a powder bed to be irradiated with a resolution that approaches or corresponds to a pixel density of the optical modulator. Additionally, or in the alternative, the presently disclosed additive manufacturing machines may allow for a powder bed to be irradiated with a resolution exhibiting a build point dimension that is smaller than a diameter of the energy beam emitted by an energy beam device. For example, the voxel dimension may correspond to the pixel density of the optical modulator.

As described herein, the presently disclosed subject matter involves the use of additive manufacturing machines or systems. As used herein, the term "additive manufacturing" refers generally to manufacturing technology in which components are manufactured in a piece-by-piece or a layer-by-layer manner. An exemplary additive manufacturing machine may be configured to utilize any suitable additive manufacturing technology. The additive manufacturing machine may utilize an additive manufacturing technology that includes a powder bed fusion (PBF) technology, such as a direct metal laser melting (DMLM) technology, a selective laser melting (SLM) technology, a directed metal laser sintering (DMLS) technology, or a selective laser sintering (SLS) technology. In an exemplary PBF technology, thin layers of powder material are sequentially applied to a build plane and then selectively melted or fused to one another in a layer-by-layer manner to form one or more three-dimensional objects. Additively manufactured objects are generally monolithic in nature and may have a variety of integral sub-components.

Additionally or alternatively suitable additive manufacturing technologies may include, for example, Fused Deposition Modeling (FDM) technology, Direct Energy Deposition (DED) technology, Laser Engineered Net Shaping (LENS) technology, Laser Net Shape Manufacturing (LNSM) technology, Direct Metal Deposition (DMD) technology, Digital Light Processing (DLP) technology, Vat Polymerization (VP) technology, Stereolithography (SLA) technology, and other additive manufacturing technologies that utilize an energy beam or other energy source to solidify an additive manufacturing material such as a powder material. In fact, any suitable additive manufacturing modality may be utilized with the presently disclosed the subject matter.

Additive manufacturing technology may generally be described as fabrication of objects by building objects point-by-point, line-by-line, or layer-by-layer, typically in a vertical direction. Other methods of fabrication are contemplated and within the scope of the present disclosure. For example, although the discussion herein refers to the addition of material to form successive layers, the presently disclosed subject matter may be practiced with any additive manufacturing technology or other manufacturing technology, including layer-additive processes, layer-subtractive processes, or hybrid processes.

The additive manufacturing processes described herein may be used for forming components using any suitable material. For example, the material may be metal, ceramic, polymer, epoxy, photopolymer resin, plastic, concrete, or any other suitable material that may be in solid, liquid, powder, sheet material, wire, or any other suitable form, or combinations thereof. Exemplary materials may include metals, polymers, or ceramics, as well as combinations thereof. Additionally, or in the alternative, exemplary materials may include metals, ceramics, or binders, as well as combinations thereof. Exemplary ceramics may include ultra-high-temperature ceramics, and/or precursors for ultra-high-temperature ceramics, such as polymeric precursors. Each successive layer of powder material. Each successive layer may be, for example, between about 10 μm and 200 μm, although the thickness may be determined based on any number of parameters and may be any suitable size.

As used herein, the term "build plane" refers to a plane defined by a surface upon which an energy beam impinges during an additive manufacturing process. Generally, the surface of a powder bed defines the build plane. During irradiation of a respective layer of the powder bed, a previously irradiated portion of the respective layer may define a portion of the build plane, and/or prior to distributing powder material across a build module, a build plate that supports the powder bed generally defines the build plane.

It is understood that terms "upstream" and "downstream" refer to the relative direction with respect to fluid flow in a fluid pathway. For example, "upstream" refers to the direction from which the fluid flows, and "downstream" refers to the direction to which the fluid flows. It is also understood that terms such as "top", "bottom", "outward", "inward", and the like are words of convenience and are not to be construed as limiting terms. As used herein, the terms "first", "second", and "third" may be used interchangeably to distinguish one component from another and are not intended to signify location or importance of the individual components. The terms "a" and "an" do not denote a limitation of quantity, but rather denote the presence of at least one of the referenced item.

Approximating language, as used herein throughout the specification and claims, may be applied to modify any quantitative representation that could permissibly vary without resulting in a change in the basic function to which it is related. Accordingly, a value modified by a term or terms, such as "about," "substantially," and "approximately," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The presently disclosed subject matter will now be described in further detail. FIGS. 1A and 1B, and FIGS. 2A and 2B, schematically depict exemplary additive manufacturing systems 100. As shown, an additive manufacturing system 100 may include one or more additive manufacturing machines 102. It will be appreciated that the additive manufacturing systems 100 and machines 102 shown in FIGS. 1A and 1B, and FIGS. 2A and 2B, are provided by way of example and not to be limiting. In fact, the subject matter of the present disclosure may be practiced with any suitable additive manufacturing system 100 and machine 102 without departing from the scope of the present disclosure.

As shown, the one or more additive manufacturing machines 102 may include a control system 104. The control system 104 may be included as part of the additive manufacturing machine 102 or the control system 104 may be associated with the additive manufacturing machine 102. The control system 104 may include componentry integrated as part of the additive manufacturing machine 102 and/or componentry that is provided separately from the additive manufacturing machine 102. Various componentry of the control system 104 may be communicatively coupled to various componentry of the additive manufacturing machine 102.

The control system 104 may be communicatively coupled with a management system 106 and/or a user interface 108. The management system 106 may be configured to interact with the control system 104 in connection with enterprise-level operations pertaining to the additive manufacturing system 100. Such enterprise level operations may include transmitting data from the management system 106 to the control system 104 and/or transmitting data from the control system 104 to the management system 106. The user interface 108 may include one or more user input/output devices to allow a user to interact with the additive manufacturing system 100.

As shown, for example, in FIG. 1A, an additive manufacturing machine 102 may include a build module 110 that includes a build chamber 112 within which an object or objects 114 may be additively manufactured. An additive manufacturing machine 102 may include a powder module 116 that contains a supply of powder material 120 housed within a supply chamber 122. The build module 110 and/or the powder module 116 may be provided in the form of modular containers configured to be installed into and removed from the additive manufacturing machine 102 such as in an assembly-line process. Additionally, or in the alternative, the build module 110 and/or the powder module 116 may define a fixed componentry of the additive manufacturing machine 102.

The powder module 116 may include a powder piston 124 that actuates a powder supply floor 126 during operation of the additive manufacturing machine 102. As the powder supply floor 126 actuates, a portion of the powder material 120 is forced out of the powder module 116. A recoater 128 such as a blade or roller sequentially distributes thin layers of powder material 120 across a build plane 130 above the build module 110. A build platform 132 supports the sequential layers of powder material 120 distributed across the build plane 130. A build platform 132 may include a build plate (not shown) secured thereto and upon which an object 114 may be additively manufactured.

Figure 1B:
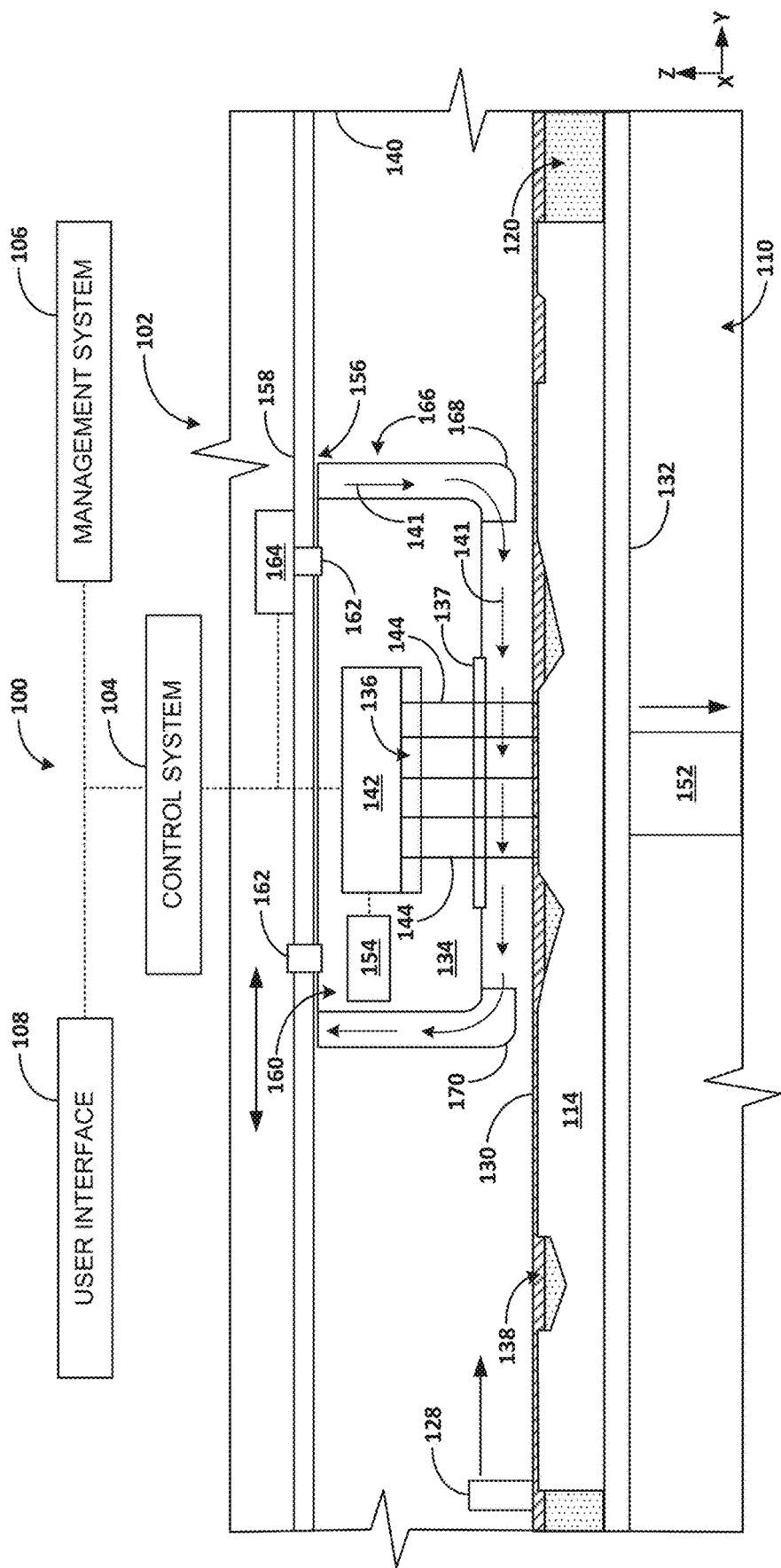

As shown, for example, in FIGS. 1A and 1B, an additive manufacturing machine 102 may include an energy beam system 134 configured to generate one or more of energy beams and to direct the respective energy beams onto the build plane 130 to selectively solidify respective portions of the powder bed 138 defining the build plane 130. The energy beams may be laser beams or beams from any other suitable energy source, such as LEDs or other light sources, and so forth. As the respective energy beams selectively melt or fuse the sequential layers of powder material 120 that define the powder bed 138, the object 114 begins to take shape. The one or more energy beams or laser beams may include electromagnetic radiation having any suitable wavelength or wavelength range, such as a wavelength or wavelength range corresponding to infrared light, visible light, and/or ultraviolet light.

Typically, with a DMLM, EBM, or SLM system, the powder material 120 is fully melted, with respective layers being melted or re-melted with respective passes of the energy beams. With DMLS or SLS systems, typically the layers of powder material 120 are sintered, fusing particles of powder material 120 to one another generally without reaching the melting point of the powder material 120. The energy beam system 134 may include componentry integrated as part of the additive manufacturing machine 102 and/or componentry that is provided separately from the additive manufacturing machine 102.

The energy beam system 134 may include one or more irradiation devices 142 configured to generate a plurality of energy beams 144 and to direct the energy beams 144 upon the build plane 130. As shown, for example, in FIG. 1A, an energy beam system 134 may include a plurality of irradiation devices 142, such as a first irradiation device 142 and a second irradiation device 142. The one or more irradiation devices may respectively include an energy beam source, a scanner, and optical assembly. The optical assembly may include a plurality of optical elements 136 configured to direct the energy beam onto the build plane 130. By way of example, the one or more optical elements 136 may include one more focusing lenses that focus an energy beam 144 on a build plane 130. Additionally, or in the alternative, the energy beam system 134 may include a window 137, such as a protective glass, that separates one or more components of the energy beam system 134 from the environment of a process chamber 140 within which powder material 120 is irradiated by the one or more energy beams 144 to additively manufacture a three-dimensional object 114.

A flow of inert process gas 141 may be supplied to the process chamber 140, for example, to remove contaminants such as fumes and soot from the process chamber 140 and/or to reduce the tendency of such contaminants to deposit on the on the window 137, optical elements 136, or other componentry of the energy beam system 134. Additionally, or in the alternative, the flow if inert process gas 141 may reduce the tendency of such contaminants to interfere with the energy beams 144 used to irradiate the powder material 120.

The plurality of energy beams 144 may become incident upon the build plane 130, for example, after passing through one or more optical elements 136 and/or a window 137 of the energy beam system 134. Additionally, or in the alternative, an irradiation device 142 may include a scanner configured to direct the plurality of energy beams 144 onto the powder bed 138. An exemplary scanner may include a galvo scanner, an electro-optic modulator, an acousto-optic modulator, a piezo-driven mirror, or the like. To irradiate a layer of the powder bed 138, the one or more irradiation devices 142 respectively direct the plurality of energy beams 144 across the respective portions of the build plane 130 to melt or fuse the portions of the powder material 120 that are to become part of the object 114.

As shown in FIG. 1A, the energy beam system 134 may include a first irradiation device 142a and a second irradiation device 142b. The first irradiation device 142a may include a first optical assembly that includes a first one or more optical elements 136a, and/or the second irradiation device 142b may include a second optical assembly that includes a second one or more optical elements 136b. Additionally, or in the alternative, an energy beam system 134 may include three, four, six, eight, ten, or more irradiation devices, and such irradiation devices may respectively include an optical assembly that includes one or more optical elements 136. The plurality of irradiation devices 142 may be configured to respectively generate one or more energy beams that are respectively scannable within a scan field incident upon at least a portion of the build plane 130 to melt or fuse the portions of the powder material 120 that are to become part of the object 114. For example, the first irradiation device 142a may generate a first energy beam 144a that is scannable within a first scan field 146a incident upon at least a first build plane region 148a. The second irradiation device 142b may generate a second energy beam 144b that is scannable within a second scan field 146b incident upon at least a second build plane region 148b. The first scan field 146a and the second scan field 146b may overlap such that the first build plane region 148a scannable by the first energy beam 144a overlaps with the second build plane region 148b scannable by the second energy beam 144b. The overlapping portion of the first build plane region 148a and the second build plane region 148b may sometimes be referred to as an interlace region 150. Portions of the powder bed 138 to be irradiated within the interlace region 150 may be irradiated by the first energy beam 144a and/or the second energy beam 144b in accordance with the present disclosure.

To irradiate a layer of the powder bed 138, the one or more irradiation devices (e.g., the first irradiation device 142a and the second irradiation device 142b) respectively direct the plurality of energy beams (e.g., the first energy beam 144a and the second energy beam 144b) across the respective portions of the build plane 130 (e.g., the first build plane region 148a and the second build plane region 148b) to melt or fuse the portions of the powder material 120 that are to become part of the object 114. The first layer or series of layers of the powder bed 138 are typically melted or fused to the build platform 132, and then sequential layers of the powder bed 138 are melted or fused to one another to additively manufacture the object 114. As sequential layers of the powder bed 138 are melted or fused to one another, a build piston 152 gradually moves the build platform 132 to make room for sequential layers of powder material 120. As the build piston 152 gradually lowers and sequential layers of powdered material 120 are applied across the build plane 130, the next sequential layer of powder material 120 defines the surface of the powder bed 138 coinciding with the build plane 130. Sequential layers of the powder bed 138 may be selectively melted or fused until a completed object 114 has been additively manufactured.

Still referring to FIGS. 1A and 1B, an additive manufacturing machine 102 may include an imaging system 154 configured to monitor one or more operating parameters of an additive manufacturing machine 102, one or more parameters of an energy beam system 134, and/or one or more operating parameters of an additive manufacturing process. The imaging system may a calibration system configured to calibrate one or more operating parameters of an additive manufacturing machine 102 and/or of an additive manufacturing process. The imaging system 154 may be a melt pool monitoring system. The one or more operating parameters of the additive manufacturing process may include operating parameters associated with additively manufacturing a three-dimensional object 114. The imaging system 154 may be configured to detect an imaging beam such as an infrared beam from a laser diode and/or a reflected portion of an energy beam (e.g., a first energy beam 144*a* and/or a second energy beam 144*b*).

An energy beam system 134 and/or an imaging system 154 may include one or more detection devices. The one or more detection devices may be configured to determine one or more parameters of an energy beam system 134, such as one or more parameters associated with irradiating the sequential layers of the powder bed 138 based at least in part on an assessment beam detected by the imaging system 154. One or more parameters associated with irradiating the sequential layers of the powder bed 138 may include irradiation parameters and/or object parameters, such as melt pool monitoring parameters. The one or more parameters determined by the imaging system 154 may be utilized, for example, by the control system 104, to control one or more operations of the additive manufacturing machine 102 and/or of the additive manufacturing system 100. The one or more detection devices may be configured to obtain assessment data of the build plane 130 from a respective assessment beam. An exemplary detection device may include a camera, an image sensor, a photo diode assembly, or the like. For example, a detection device may include charge-coupled device (e.g., a CCD sensor), an active-pixel sensor (e.g., a CMOS sensor), a quanta image device (e.g., a QIS sensor), or the like. A detection device may additionally include a lens assembly configured to focus an assessment beam along a beam path to the detection device. An imaging system 154 may include one or more imaging optical elements (not shown), such as mirrors, beam splitters, lenses, and the like, configured to direct an assessment beam to a corresponding detection device.

In addition, or in the alternative to determining parameters associated with irradiation the sequential layers of the powder bed 138, the imaging system 154 may be configured to perform one or more calibration operations associated with an additive manufacturing machine 102, such as a calibration operation associated with the energy beam system 134, one or more irradiation devices 142 or components thereof, and/or the imaging system 154 or components thereof. The imaging system 154 may be configured to project an assessment beam and to detect a portion of the assessment beam reflected from the build plane 130. The assessment beam may be projected by an irradiation device 142 and/or a separate beam source associated with the imaging system 154. Additionally, and/or in the alternative, the imaging system 154 may be configured to detect an assessment beam that includes radiation emitted from the build plane 130, such as radiation from an energy beam 144 reflected from the powder bed 138 and/or radiation emitted from a melt pool in the powder bed 138 generated by an energy beam 144 and/or radiation emitted from a portion of the powder bed 138 adjacent to the melt pool. The imaging system 154 may include componentry integrated as part of the additive manufacturing machine 102 and/or componentry that is provided separately from the additive manufacturing machine 102. For example, the imaging system 154 may include componentry integrated as part of the energy beam system 134. Additionally, or in the alternative, the imaging system 154 may include separate componentry, such as in the form of an assembly, that can be installed as part of the energy beam system 134 and/or as part of the additive manufacturing machine 102.

Still referring to FIGS. 1A and 1B, in some embodiments, an additive manufacturing machine may include a positioning system 156 configured to move an energy beam system 134 and/or one or more components thereof relative to the build plane 130. The positioning system 156 may be configured to move the energy beam system 134 and/or one or more components thereof to specified build coordinates and/or along specified build vectors corresponding to a cartesian coordinate system in accordance with control commands provided, for example, by the control system 104. The control commands may be provided, for example, to carry out operations of the one or more energy beam system 134 and/or of the additive manufacturing machine 102 in accordance with the present disclosure. The positioning system 156 may include one or more gantry elements 158 configured to move the energy beam system 134 and/or one or more components thereof across the powder bed. Respective gantry elements 158 may be configured to move the energy beam system 134 and/or one or more components thereof in one or more directions, such as an X-direction, a Y-direction, and/or a Z-direction. In some embodiments, the positioning system 156 may be coupled to a housing assembly 160 that contains one or more components of the energy beam system 134, such as one or more irradiation devices 142 and or one or more imaging systems 154. The housing assembly 160 may be coupled to one or more gantry elements 158 by one or more gantry mounts 162. The positioning system 156 may include a drive motor 164 configured to move the housing assembly 160 and/or the one or more components the energy beam system 134 according to instructions for the control system 104. The positioning system 156 may include componentry typically associated with a gantry system, such as stepper motors, drive elements, carriages, and so forth.

The energy beam system 134 may be positioned at any suitable location within the process chamber 140. Additionally, or in the alternative, the energy beam system 134 may be coupled to a perimeter wall of the process chamber 140. In some embodiments, as shown, for example, in FIG. 1B, an energy beam system 134 may be positioned in close proximity to the build plane 130. As shown in FIG. 1B, an inertization system 166 may supply a flow of inert process gas 141 to a region of the process chamber 140 between the energy beam system 134 and the powder bed 138. The inertization system 166 may include a supply manifold 168 and a return manifold 170. As shown in FIG. 1B, the supply manifold 168 and/or the return manifold 170 may be coupled to the housing assembly 160. With the supply manifold 168 and/or the return manifold 170 coupled to the housing assembly 160, a relatively small volume of space between the energy beam system 134 and the powder bed 138 may be inertized, as opposed to inertizing an entire process chamber 140. Additionally, or in the alternative, contaminants may have a shorter path to travel before being drawn into the return manifold 170 by the flow of inert process gas 141.

Figure 2A:
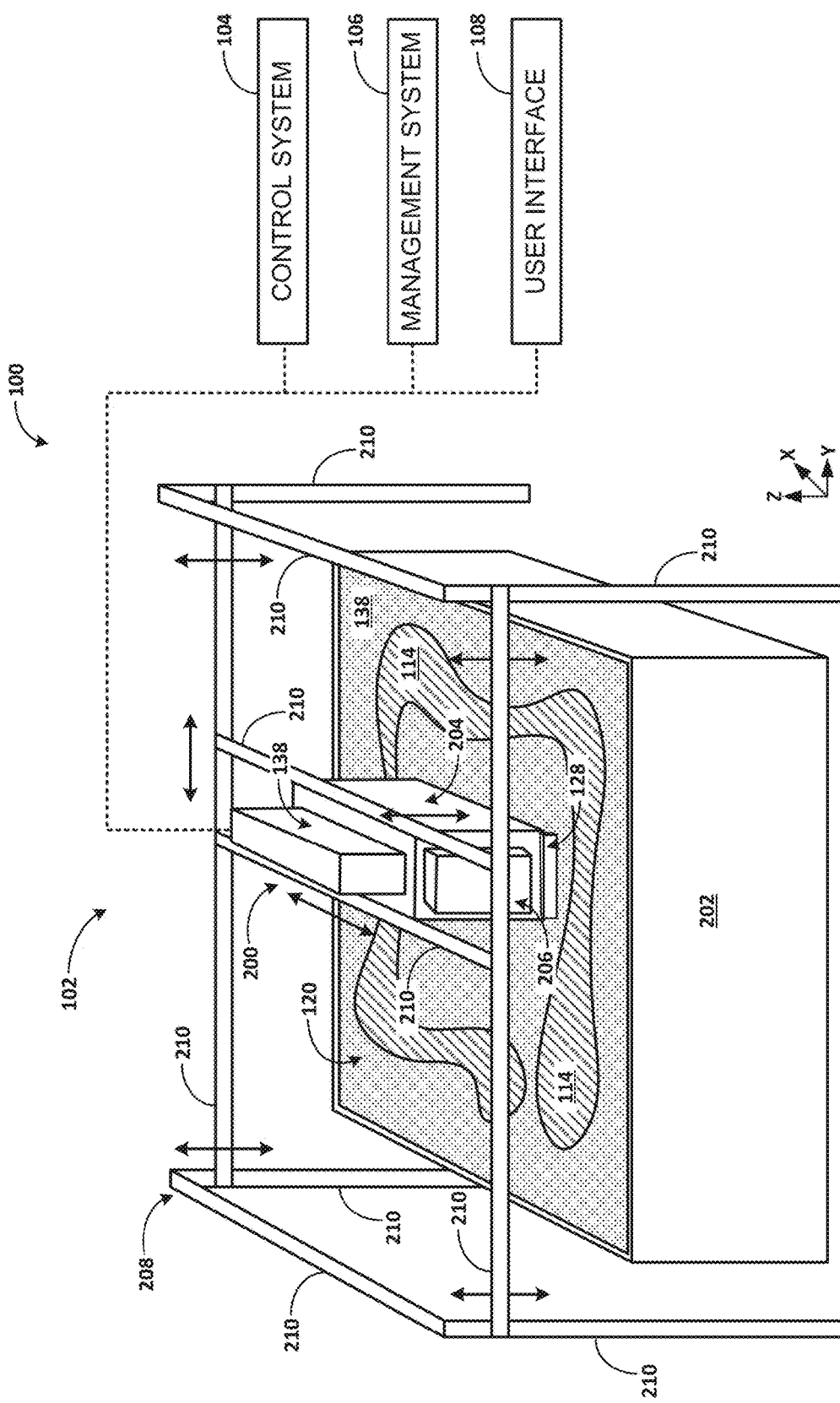
FIGS. 2A and 2B schematically depict further exemplary additive manufacturing systems or machines.
Figure 2B:
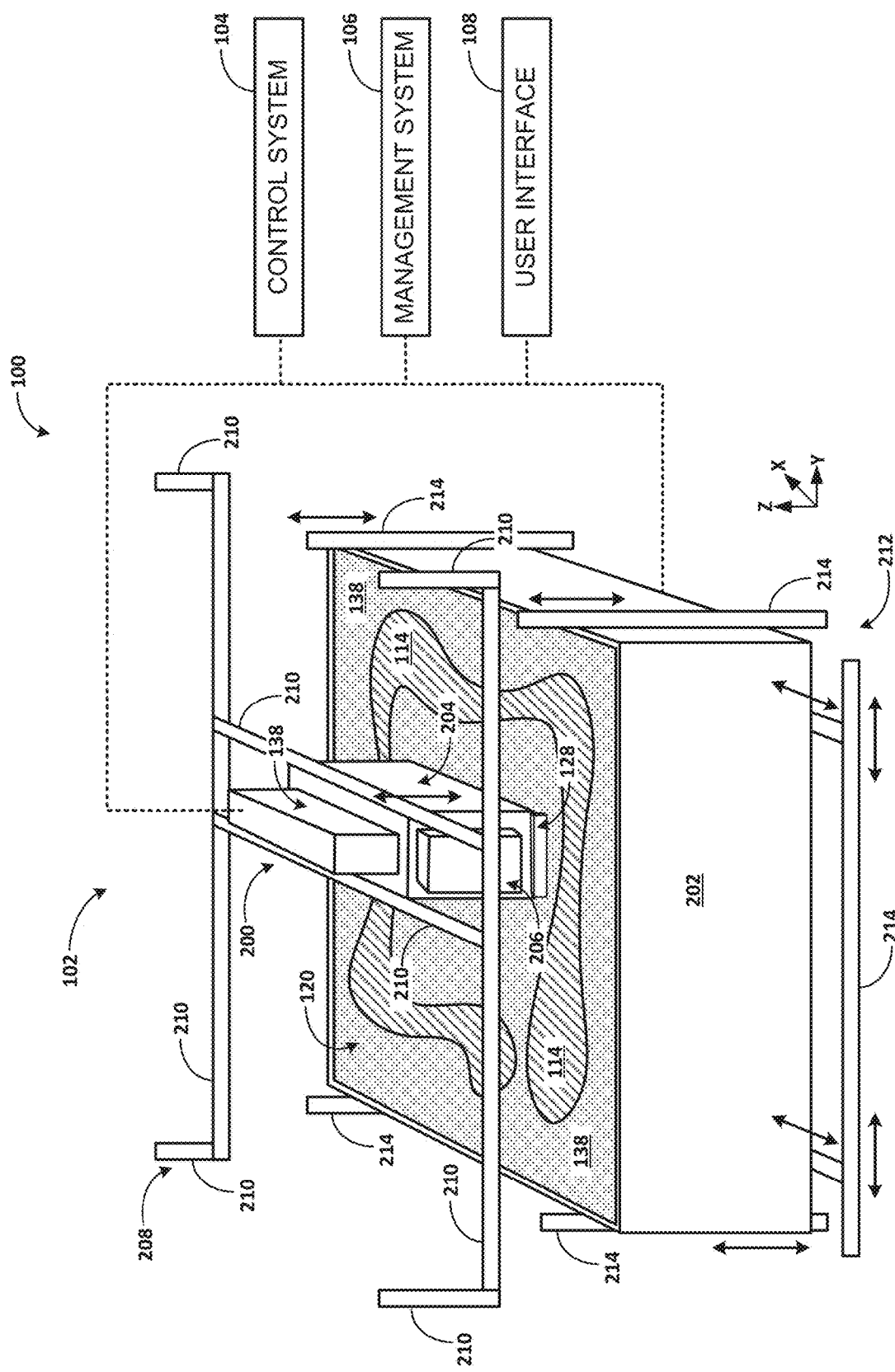

Referring now to FIGS. 2A and 2B, an additive manufacturing system 100 or additive manufacturing machine 102 may include one or more build units 200 configured to selectively solidify powder material 120 to additively manufacture a three-dimensional object 114. In some embodiments, the additive manufacturing system 100 or additive manufacturing machine 102 may be configured for large format additive manufacturing. For example, one or more build units 200 may be configured to irradiate a powder bed 138 supported by a build vessel 202 that includes a cross-sectional area that exceeds the cross-sectional area of the one or more build units 200. Likewise, an object 114 additively manufactured with the additive manufacturing machine 102 may have a cross-sectional area that is larger than the one or more build units 200. The one or more build units 200 and/or the build vessel 202 may be movable relative to one another, for example, to perform large-format additive manufacturing operations.

As shown in FIGS. 2A and 2B, an exemplary build unit 200 may include an energy beam system 134 and an irradiation chamber 204. The build unit 200 may be configured to irradiate powder material 120 within a region of the powder bed coinciding the perimeter of the irradiation chamber 204. The one or more build units 200 may be movable relative to the build vessel 202, and/or the build vessel 202 may be movable relative to one or more build units 200. For example, a build unit 200 and/or a build vessel 202 may be movable in one or more directions, such as an X-direction, a Y-direction, and/or a Z-direction. Movement of a build unit 200 relative to the build vessel 202 may be configured to allow the build unit 200 to access various regions of the powder bed 138 so that the energy beam system 134 may irradiate powder material 120 in respective regions. The energy beam system 134 may be configured as described with reference to FIG. 1. The energy beam system 134 may include one or more irradiation devices 142 and/or other components as described herein. The irradiation chamber 204 may be configured to provide an inert environment for irradiating the powder bed 138. A flow of inert process gas may be supplied to the irradiation chamber 204, for example, to remove contaminants such as fumes and soot from the irradiation chamber 204 and/or to reduce the tendency for such contaminants from depositing on the optical elements 136 and/or from interfering with the energy beams 144 used to irradiate the powder material 120. In some embodiments, a build unit 200 may include a powder supply hopper 206 configured to supply powder material 120 to a build vessel 202. Additionally, or in the alternative, powder material 120 may be supplied by a powder module 116 as described with reference to FIG. 1.

Figure 14A:
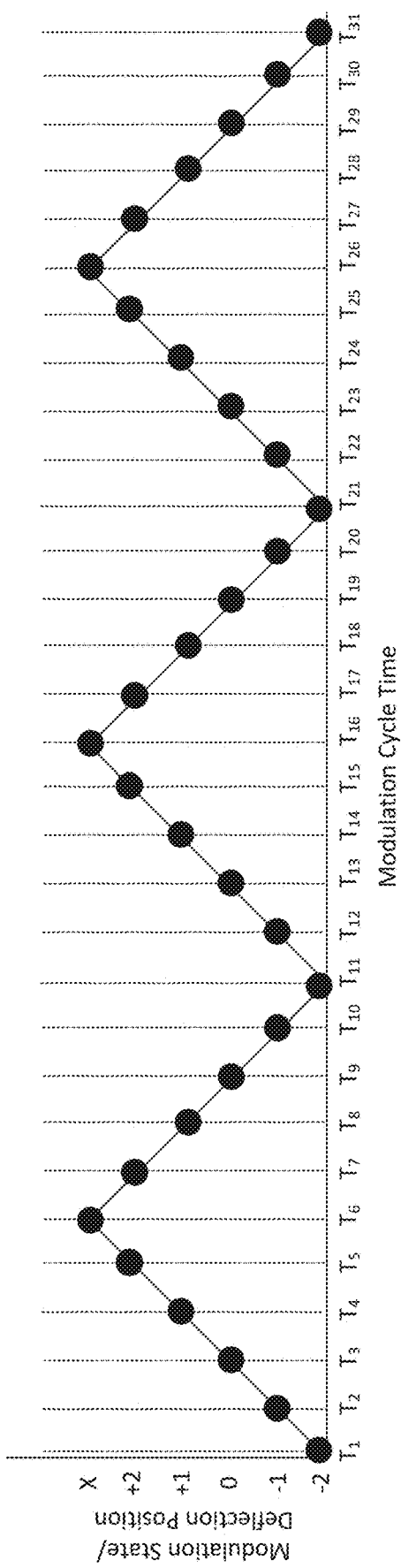
FIGS. 14A-14H-2 schematically depict exemplary pulse cycles that may be coordinated with exemplary modulation cycles in an irradiation sequence.
Figure 14B:
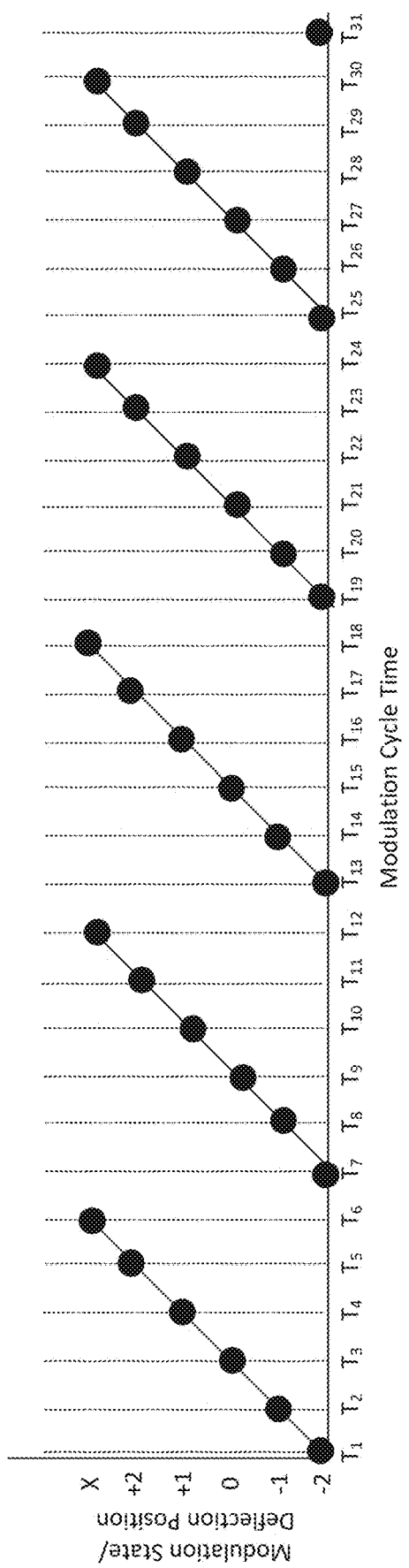
Figure 14C:
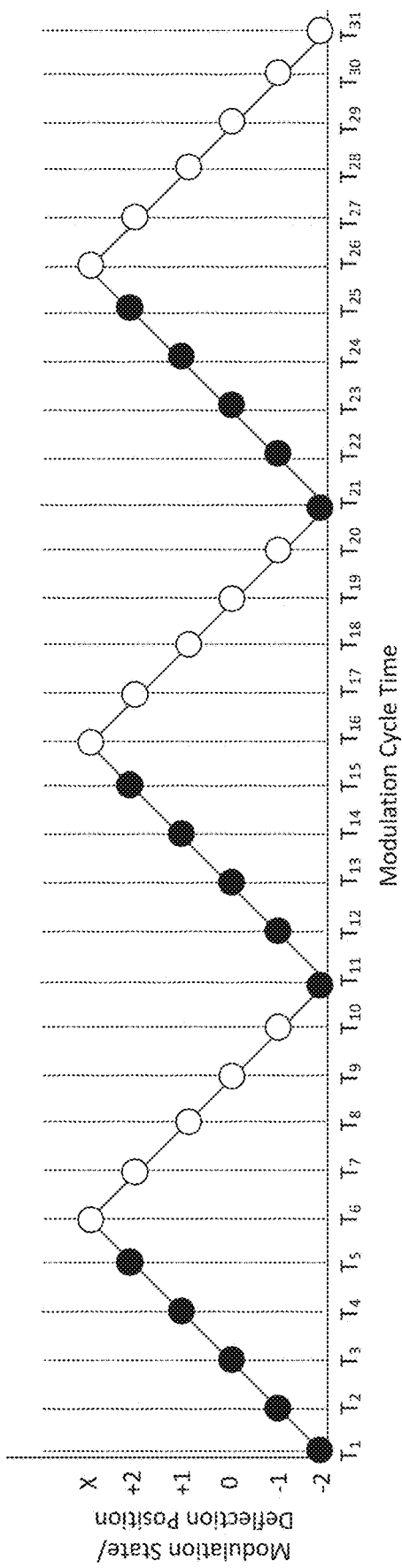
Figure 14D:
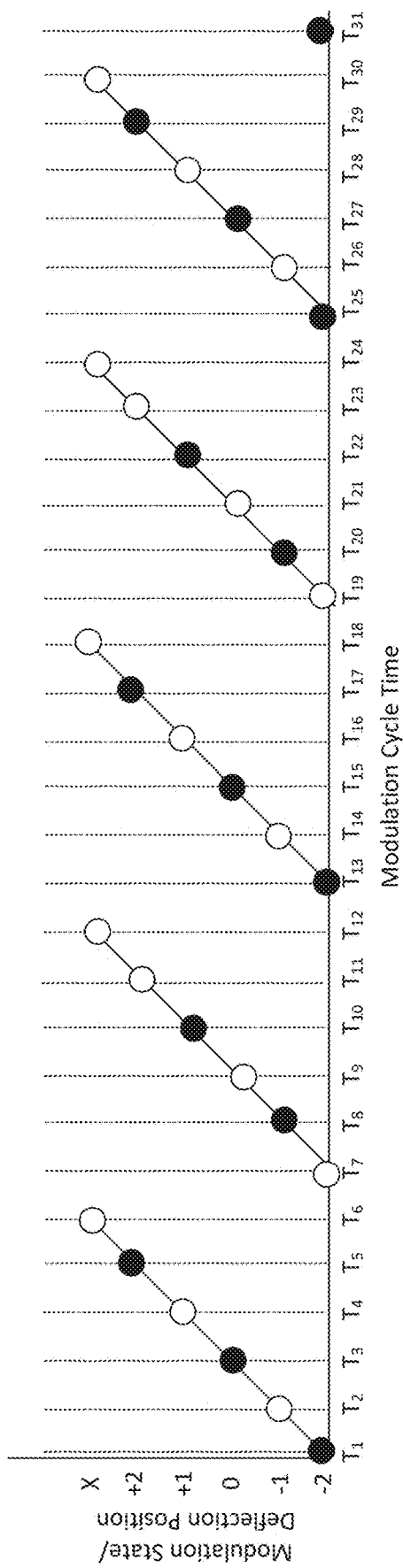
Figure 14E:
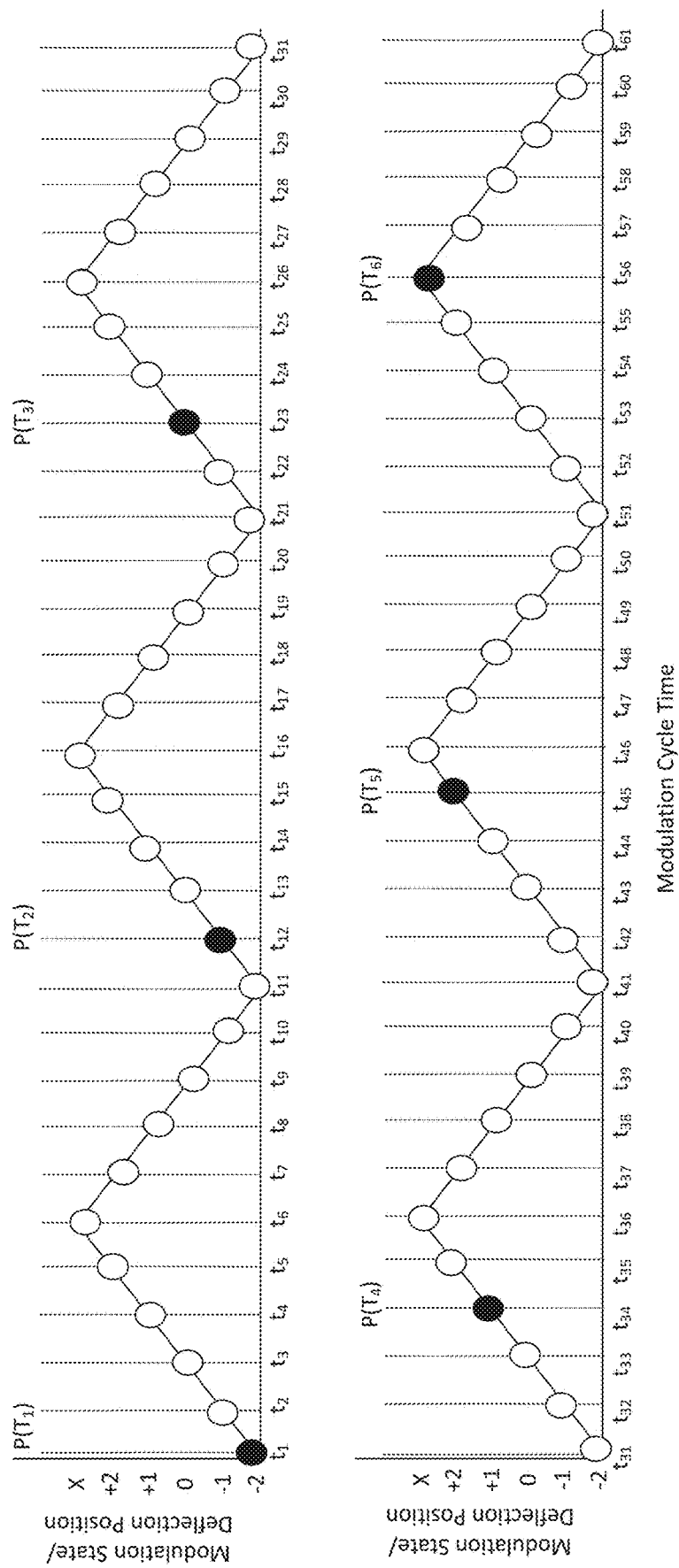
Figure 14F:
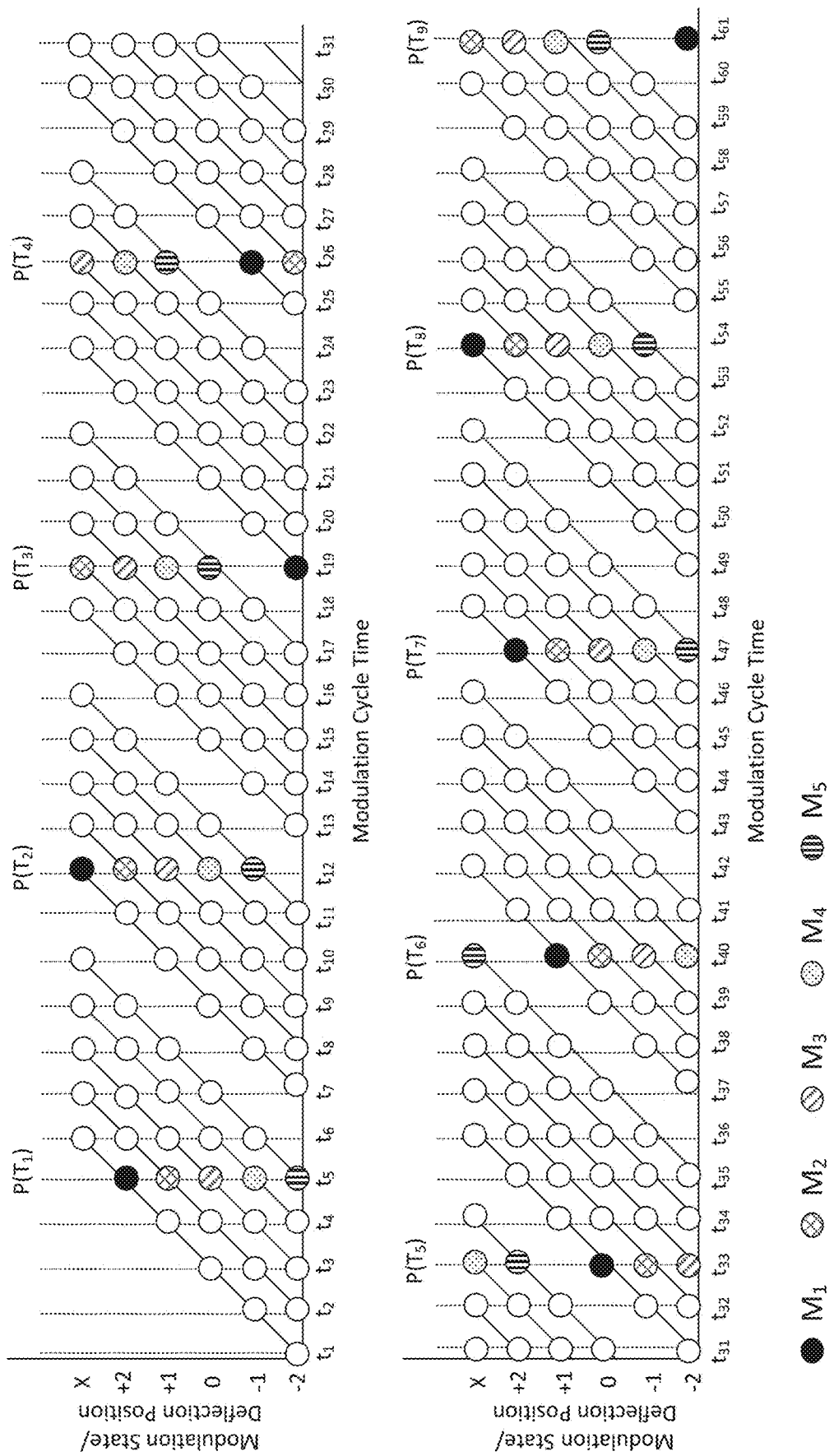
Figure 14G:
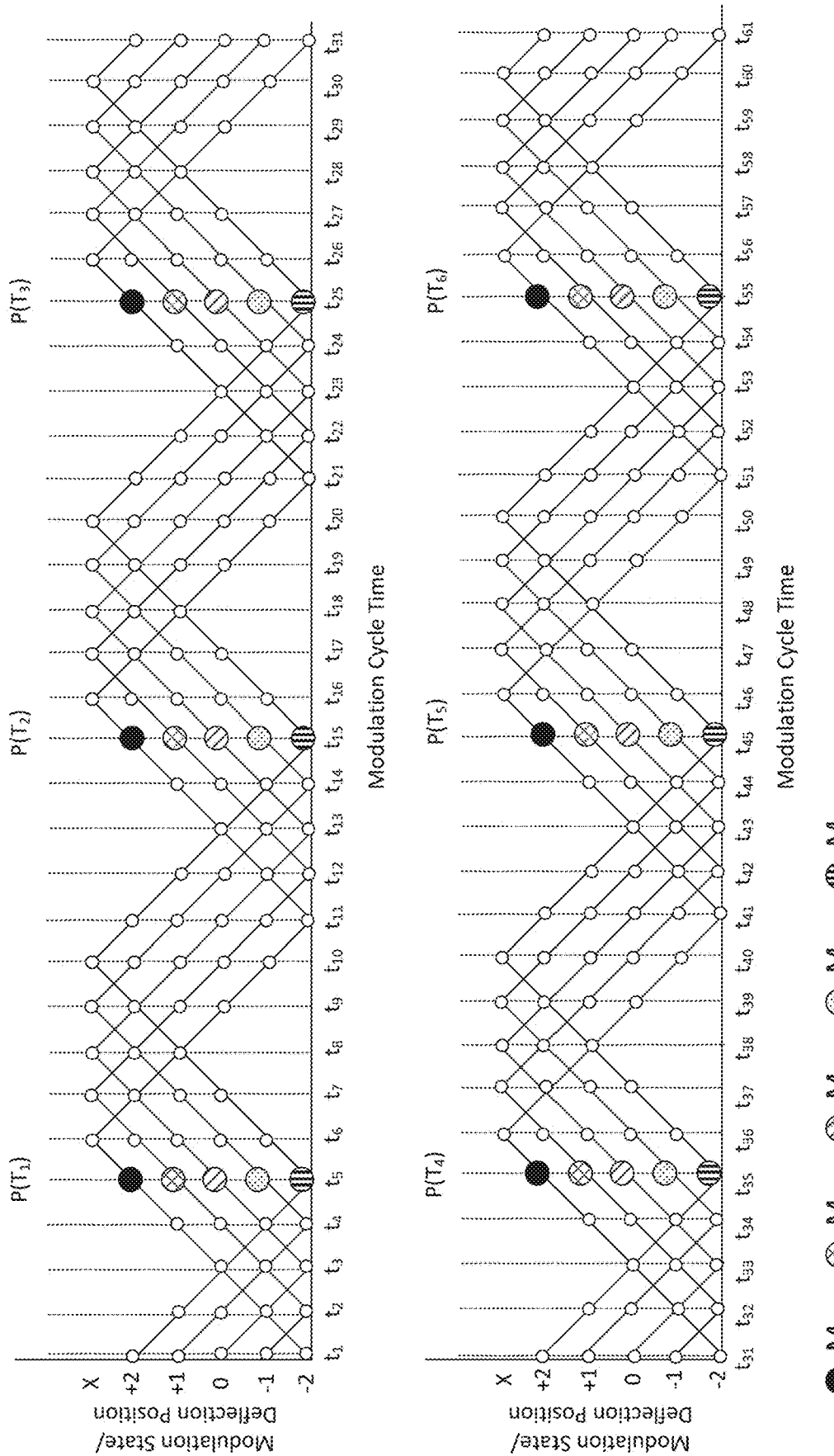
Figures 1, 14H:
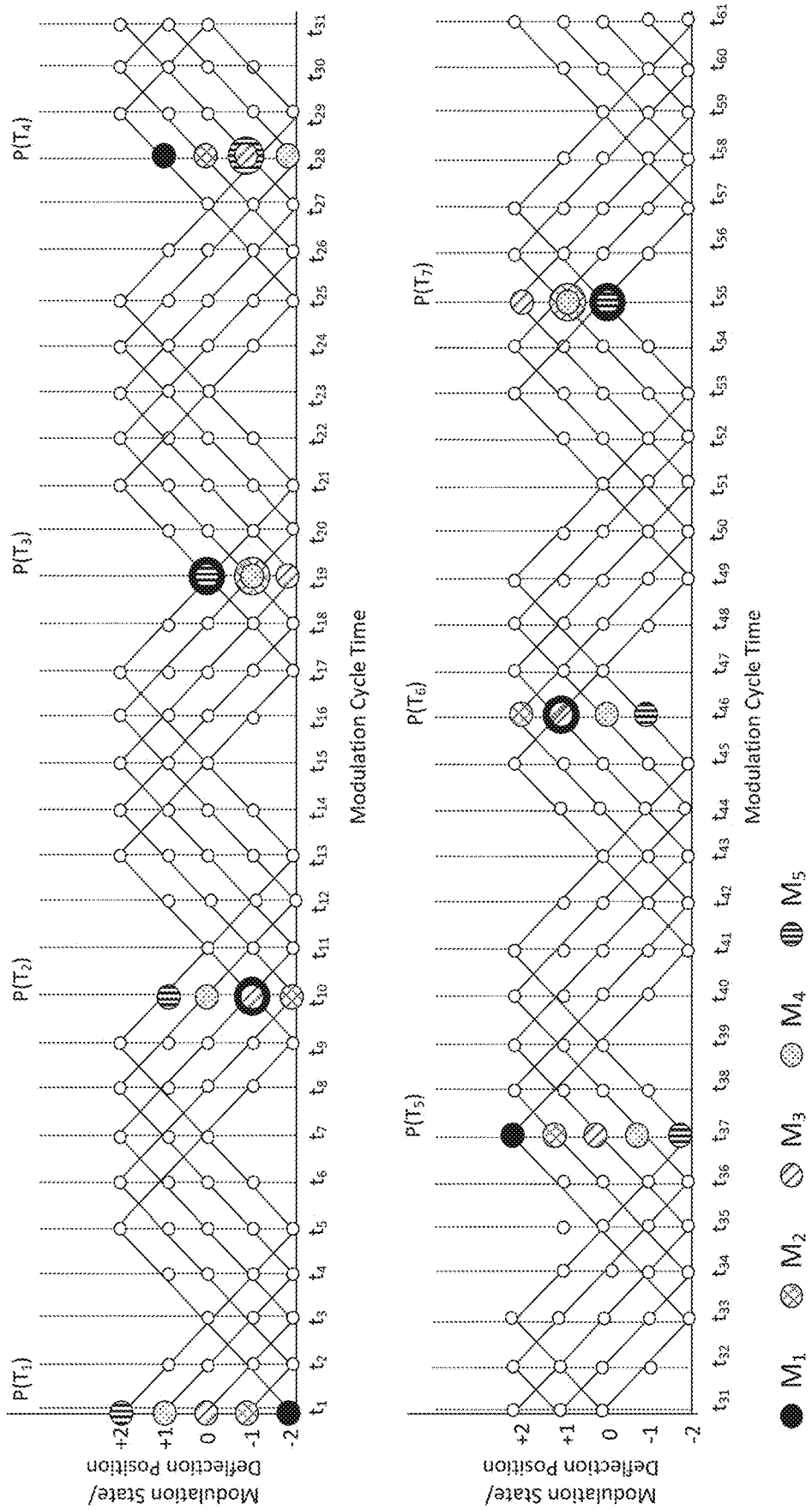

As shown in FIG. 1, the one or more build units 200 may be operably coupled to a build unit-positioning system 208. The build unit-positioning system 208 may be configured to move the one or more build units 200 to specified build coordinates and/or along specified build vectors corresponding to a three-dimensional cartesian coordinate system in accordance with control commands provided, for example, by the control system 104. The control commands may be provided, for example, to carry out operations of the one or more build units 200 and/or the respective components thereof. The build unit-positioning system 208 may include one or more build unit-gantry elements 210 configured to movably support the one or more build units 200. The build unit-gantry elements 210 may include componentry typically associated with a gantry system, such as stepper motors, drive elements, carriages, and so forth. Respective build unit-gantry elements 210 may be configured to move the one or more build units 200 in one or more directions, such as an X-direction, a Y-direction, and/or a Z-direction.

As shown in FIG. 2A, the one or more build vessels 202 may be operably coupled to a build vessel-positioning system 212. The build vessel-positioning system 212 may be configured to move the build vessel 202 to specified build coordinates and/or along specified build vectors corresponding to a three-dimensional cartesian coordinate system in accordance with control commands provided, for example, by the control system 104. The control commands may be provided, for example, to carry out operations of the one or more build units 200 in accordance with the present disclosure. The build vessel-positioning system 212 may include one or more build vessel-gantry elements 214 configured to movably support the build vessel 202. Respective build vessel-gantry elements 214 may be configured to move the build vessel 202 in one or more directions, such as an X-direction, a Y-direction, and/or a Z-direction.

The one or more build vessels 212 may be operably coupled to a build vessel-positioning system 212 in addition to, or in the alternative to, one or more build units 200 operably coupled to a build unit-positioning system 208. For example, an additive manufacturing machine 102 may include a build vessel-positioning system 212 and one or more stationary build units 200. Additionally, or in the alternative, an additive manufacturing machine 102 may include a build vessel-positioning system 212 and a build unit-positioning system 208. The build vessel-positioning system 212 may be configured to move a build vessel 202 in one or more directions, and the build vessel-positioning system 212 may be configured to move a build vessel 202 in one or more directions. For example, the build vessel-positioning system 212 may be configured to move a build vessel 202 in an X-direction and/or a Y-direction. Additionally, or in the alternative, the build unit-positioning system 208 may be configured to move a build unit 200 in a Z-direction.

A build vessel-positioning system 212 may be configured to move a build vessel 202 horizontally while one or more build units 200 selectively irradiate portions of the powder material 120 in the build vessel 202. For example, the build vessel-positioning system 212 may be configured to move a build vessel 202 in accordance with an X-Y coordinate system. Additionally, or in the alternative, a build unit-positioning system 208 may be configured to move a build unit 200 horizontally while the build unit 200 selectively irradiates portions of the powder material 120 in the build vessel 202. For example, the build vessel-positioning system 212 may be configured to move a build vessel 202 in accordance with an X-Y coordinate system. A vertical position of the one or more build units 200 and/or the build vessel 202 may be augmented in connection with the addition of sequential layers of powder material 120 to the build vessel 202 and selective irradiation of the respective layers of powder material 120 in the build vessel 202. The build vessel-positioning system 212 may be configured to sequentially move the build vessel 202 vertically to provide room for the next sequential layer of powder material 120 to be added to the build vessel 202. Additionally, or in the alternative, the build unit-positioning system 208 may be configured to sequentially move a build unit 200 vertically to provide room for the next sequential layer of powder material 120 to be added to the build vessel 202. Movements of the build unit 200 and/or the build vessel 202 may be carried out before, during, or after, irradiating a sequential layer of powder material 120.

Figure 3A:
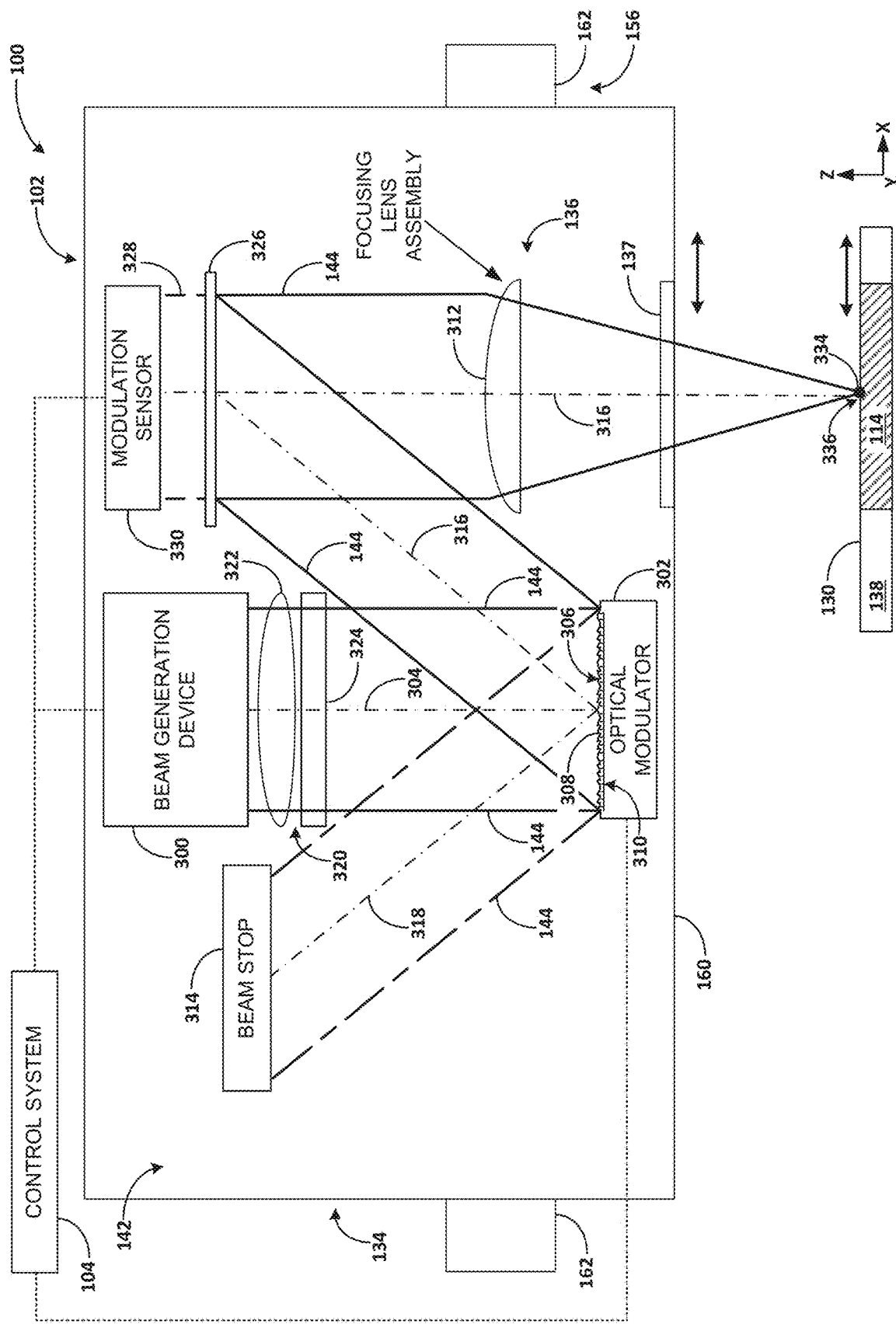
FIGS. 3A and 3B schematically depict exemplary energy beam systems with one or more irradiation devices that may be included in an additive manufacturing machine.
Figure 3B:
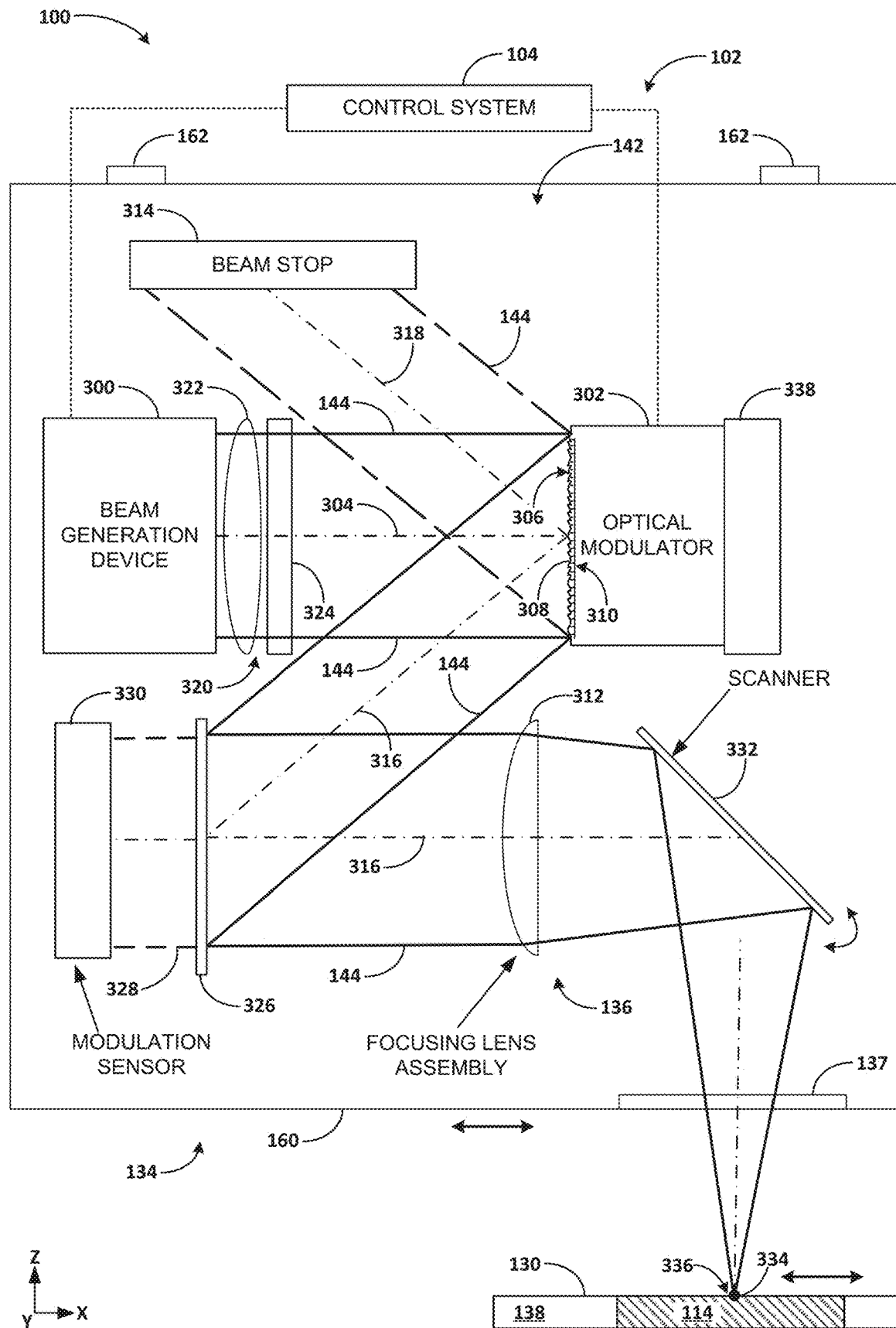

Now referring to FIGS. 3A and 3B, exemplary energy beam systems 134 and irradiation devices 142 are further described. An energy beam system 134 may include one or more irradiation devices 142. The irradiation devices 142 described herein may be utilized in an additive manufacturing system 100 and/or an additive manufacturing machine 102. Other uses are also contemplated. For example, exemplary irradiation device 142 may be utilized in laser welding systems, laser machining systems, laser ablation systems, laser cutting systems, laser drilling systems, laser micromanufacturing systems, and the like. As shown in FIGS. 3A and 3B, an exemplary irradiation device 142 may include a beam generation device 300 and an optical modulator 302 disposed downstream from the beam generation device 300. The beam generation device 300 may be configured to provide an energy beam 144. The energy beam 144 may be emitted from the beam generation device 300 with a power level and/or intensity suitable for melting and/or sintering powder material 120. In some embodiments, the power level and/or intensity of the energy beam 144 may be suitable for a conduction irradiation regime. The energy beam 144 may follow a beam path 304 that coincides with an optical axis of the energy beam 144, extending from the beam generation device 300 to the solid-state optical modulator 302.

The optical modulator 302 may include a micromirror array 306 that includes a plurality of micromirror elements 308 respectively coupled to an addressable element 310. The optical modulator 302 may be configured to direct cross-sectional portions of the energy beam 144 incident upon the micromirror array 306 towards a focusing lens assembly 312 and/or towards a beam stop 314 respectively disposed downstream from the optical modulator 302, depending on a modulation state of respective addressable elements 310. For example, in a first modulation state, an addressable element 310 may cause a micromirror element 308 to direct a corresponding beam segment along an irradiation beam path 316 leading to the focusing lens assembly 312. Beam segments that propagate through the focusing lens assembly 312 may be utilized to irradiate powder material 120 at the build plane 130. The focusing lens assembly 312 may include one or more lenses or other optical elements configured to direct the respective beam segments onto the build plane 130. Additionally, or in the alternative, in a second modulation state, an addressable element 310 may cause a micromirror element 308 to direct a corresponding beam segment along an extraction beam path 318 leading to a beam stop 314. The beam stop 314 may include an energy absorbing medium configured to absorb energy from the beam segments that become incident upon the beam stop 314. Additionally, or in the alternative, the beam stop 314 may include optical elements configured to recycle the energy from the beam segments propagating to the beam stop 314 and thereby reduce energy losses.

In addition to the focusing lens assembly 312, an irradiation device 142 may include a beam conditioning assembly 320 that includes one or more optical elements configured to focus and/or otherwise condition the energy beam 144 prior to becoming incident upon the optical modulator 302. In some embodiments, the beam conditioning assembly 320 may include a beam collimator 322. The beam collimator 322 may include one or more lenses and/or other optical elements configured to collimate the energy beam 144. Additionally, or in the alternative, the beam conditioning assembly may include a beam homogenizer 324. The beam homogenizer 324 may be configured to provide a uniform power distribution across a cross-sectional profile of the energy beam 144. For example, an energy beam 144 may have a Gaussian power distribution as emitted by an irradiation device 142 and/or after having been collimated by the beam collimator 322. In some embodiments, the beam homogenizer 324 may be configured to provide a top-hat power distribution. Additionally, or in the alternative, the beam homogenizer 324 may be configured to provide a plurality of beam segments that have a substantially uniform intensity and/or powder level. An exemplary beam homogenizer 324 may include one or more microlens arrays in front of a condenser lens. Another exemplary beam homogenizer 324 may include a rod lens or light pipe. Additionally, or in the alternative, the beam homogenizer 324 may include a lens element aperture configured to conform the energy beam 144 to a cross-sectional profile that that corresponds to a surface area of the optical modulator 302. For example, the beam homogenizer 324 may provide an energy beam 144 that exhibits a rectangular cross-sectional profile, such as from an energy beam 144 that exhibits a circular cross-sectional profile.

The irradiation device 142 may include any one or more other optical elements that may be suitable for the particular embodiment. For example, as shown in FIGS. 3A and 3B, the irradiation device may include one or more dichroic elements 326, such as dichroic mirror, configured to split a measurement beam 328 from the energy beam 144. The measurement beam 328 may propagate to a modulation sensor 330. The modulation sensor 330 may include a charge-coupled device (e.g., a CCD sensor), an active-pixel sensor (e.g., a CMOS sensor), a quanta image device (e.g., a QIS sensor), or the like. The modulation sensor 330 may be configured to provide data pertaining to modulation of the energy beam 144 by the optical modulator 302. The data may be utilized by a control system 104, such as for process monitoring and control of the optical modulator 302 and/or of the beam generation device 300. For example, the modulation sensor 330 may be configured to determine whether the energy beam 144, as modulated by the optical modulator 302, corresponds to beam modulation instructions provided by the control system 104 and/or to provide adjustments to the beam modulation instructions and/or to the operation of the optical modulator 302 and/or the operation of the beam generation device 300.

In some embodiments, as shown in FIG. 3A, the modulated portions of the energy beam 144 may propagate through the focusing lens assembly and directly onto the build plane 130. The modulated portions of the energy beam 144 may pass through one or more optical elements 136, and/or a window 137, that separates the components of the irradiation device 142 from the process chamber 140. Additionally, or in the alternative, as shown in FIG. 3B, the irradiation device 142 may include a scanner 332, such as a galvo-scanner, a MEMS scanner, or the like. The scanner 332 may be configured to direct the plurality of beam segments along the build plane 130 to irradiate specified locations of the powder bed 138. As shown in FIG. 3A, the irradiation device 142 may be movable relative to the powder bed 138. For example, the irradiation device 142 may be coupled to one or more gantry elements 158 of a positioning system 156 configured to movably support the irradiation device 142 and/or one or more components thereof. Additionally, or in the alternative, as shown in FIG. 3B, the irradiation device 142 may be stationary, and the scanner 332 may direct the modulated energy beam 144 to various locations of the powder bed 138. Additionally, or in the alternative, the powder bed 138 may be movable relative to the irradiation device 142.

The focusing lens assembly 312 may include one or more optical elements, such as lenses, mirrors, or the like, configured to focus respective beam segments onto the build plane 130. In some embodiments, an optical modulator 302 may reflect a plurality of subsets of beam segments to the focusing lens assembly 312. Respective ones of the plurality of subsets of beam segments may be associated with a respective modulation group that includes a corresponding subset of addressable elements 310. The focusing lens assembly 312 may cause the plurality of subsets of beam segments corresponding to a respective modulation group to at least partially overlap with one another. In some embodiments, the focusing lens assembly 312 may cause the plurality of subsets of beam segments corresponding to a respective modulation group to at least partially overlap with one another at a combination zone 334. The combination zone 334 may correspond with a focal point of the focusing lens assembly 312. Additionally, or in the alternative, the combination zone 334 may correspond with and/or align with the build plane 130. In some embodiments, the combination zone 334 may be selectively offset in the z-direction from the build plane 130, such as slightly above the build plane and/or slightly below the build plane 130. Additionally, or in the alternative, the focusing lens assembly 312 may cause the plurality of subsets of beam segments corresponding to a respective modulation group to become aligned with a common optical axis, such as the optical axis corresponding to the irradiation beam path 316. For example, the respective beam segments may at least partially overlap one another at a plurality of points along the irradiation beam path 316. A plurality of combination zones 334 respectively coinciding with a corresponding plurality of modulation groups may become incident upon the build plane 130 in the form of beam spots 336 that have a particular pattern, such as a linear or curvilinear arrangement of beam spots 336. Respective beam spots 336 corresponding to the combination zones 334 may be adjacent to one another and/or overlapping with one another.

The optical modulator 302 may be configured to actuate respective addressable elements 310 according to beam modulation instructions from a control system 104 associated with the irradiation device 142. Addressable elements 310 of the optical modulator 302 corresponding to respective ones of the plurality of modulation groups may be actuated according to the beam modulation instructions to irradiate powder material 120 at the build plane with the specified pattern of combination zones 334. The combination of the beam segments may provide a plurality combination zones 334 that respectively exhibit an increased intensity and/or power density relative to a point upstream from the optical modulator 302, such as relative to the intensity and/or power density of the energy beam 144 when emitted from the beam generation device 300 and/or when incident upon the optical modulator 302. The intensity and/or power density of the plurality of combination zones may correspond to a conduction irradiation regime. A plurality of beam spots 336 coinciding with the respective combination zones 334 may be scanned across the powder bed 138 in a coordinated manner or pattern, such as in the form of a linear or curvilinear arrangement of beam spots 336. In some embodiments, as shown, for example, in FIG. 3B, the irradiation device may include a cooling element 338 configured to cool the optical modulator 302.

The control system 104 may include a controller configured to cause respective ones of the plurality of addressable elements 310 to actuate the corresponding micromirror elements 308 according to the beam modulation instructions. The beam modulation instructions may define a modulation state corresponding to respective ones of the plurality of modulation groups that include a subset of addressable elements 310 from among the plurality of addressable elements 310 of the optical modulator 302. When the plurality of subsets of micromirror elements 308 are respectively actuated according to the modulation state defined by the modulation instructions, such as a first modulation state, the corresponding plurality of subsets of beam segments incident upon the respective micromirror elements 308 may follow an optical path, such as an irradiation beam path 316, to the focusing lens assembly 312 and onward to the build plane 130. Additionally, or in the alternative, when micromirror elements 308 are actuated, for example, according to a second modulation state, the corresponding plurality of subsets of beam segments incident upon the respective micromirror elements follow an optical path, such as an extraction beam path 318, to the beam stop 314.

Figure 4A:
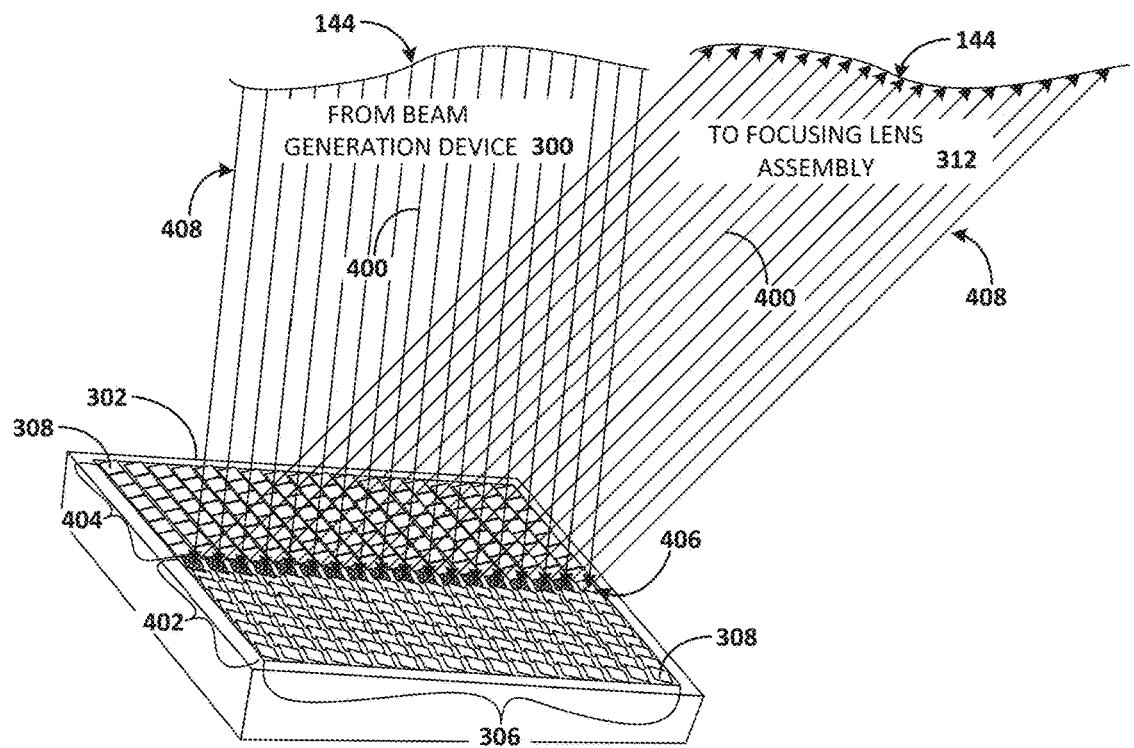
FIGS. 4A-4G schematically depict exemplary optical modulators that may be included in an irradiation device.
Figure 4B:
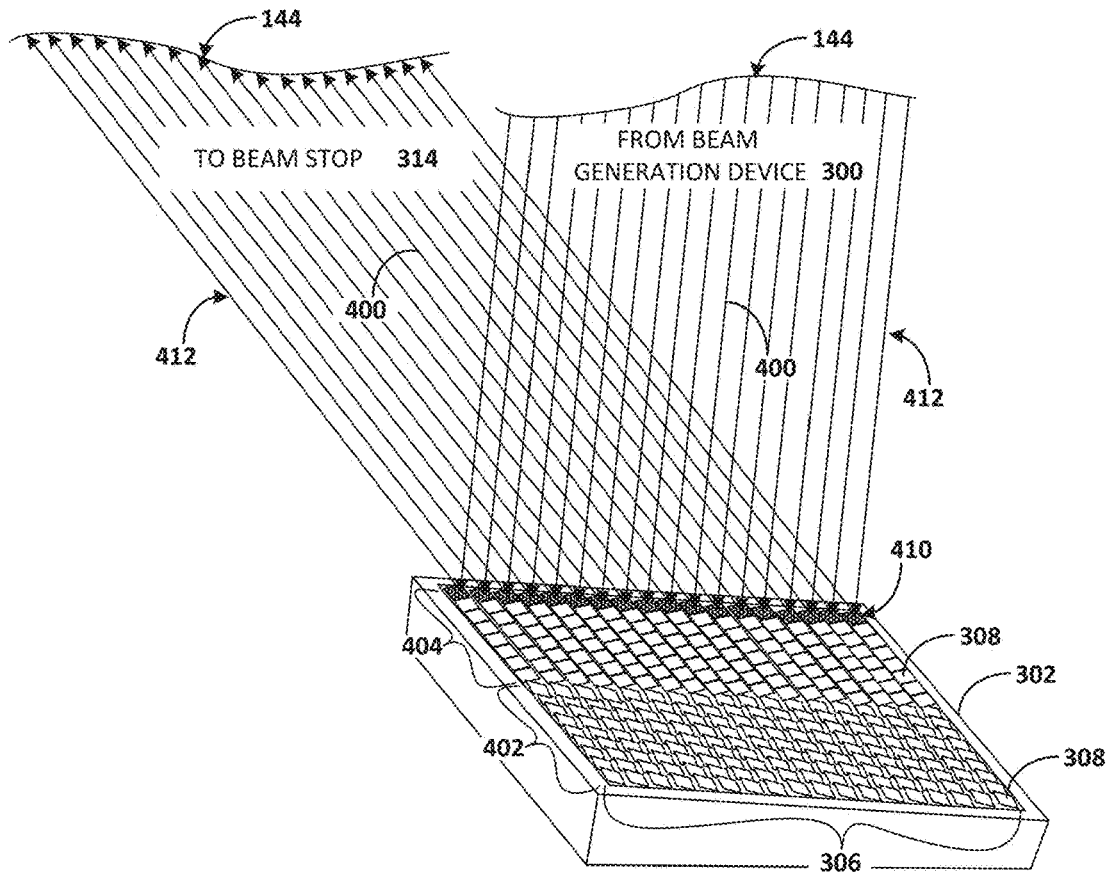

Now referring to FIGS. 4A-4G, exemplary optical modulators 302 are further described. As shown in FIGS. 4A and 4B, an optical modulator 302 may include a micromirror array 306 that includes a plurality of micromirror elements 308. An energy beam 144 may have a cross-sectional profile configured to become incident on all or substantially all of the micromirror elements 308 of the micromirror array 306. For example, the energy beam 144 may have a rectangular cross-sectional profile, which may correspond to a rectangular profile of the micromirror array 306. The energy beam 144 may have a nominal amount of underlap and/or overlap with the micromirror array 306, which may be determined by way of a calibration procedure, for example, using a modulation sensor 330. As shown in FIGS. 4A and 4B, a plurality of beam segments 400 may become incident upon respective micromirror elements 308 of the micromirror array 306. Beam segments 400 corresponding to a row or column of micromirror elements 308 are depicted for illustrative purposes; however, it will be appreciated that additional beam segments 400 may become incident upon the other micromirror elements 308 in the micromirror array 306. Respective micromirror elements 308 may be oriented in a plurality of orientations respectively corresponding to a plurality of modulation states. As shown, a first micromirror element group 402 may exhibit a first modulation state. Additionally, or in the alternative, a second micromirror element group 404 may exhibit a second modulation state. By way of example, the first micromirror element group 402 is shown tilted towards the right and the second micromirror element group 404 is shown titled towards the left. The first micromirror element group 402 and the second micromirror element group 404 may respectively represent a modulation group. Additionally, or in the alternative, the first micromirror element group 402 and the second micromirror element group 404 may respectively include a plurality of modulation groups. As shown in FIG. 4A, beam segments 400 that become incident upon micromirror elements 308 oriented according to the first modulation state may reflect towards a focusing lens assembly 312. As shown in FIG. 4B, beam segments 400 that become incident upon micromirror elements 308 oriented according to the second modulation state may reflect towards a beam stop 314.

The first micromirror element group 402 may include a plurality of subsets of micromirror elements 308. Respective ones of the plurality of subsets of micromirror elements 308 may represent a modulation group. Additionally, or in the alternative, a modulation group may be described with reference to a plurality of subsets of micromirror elements 308. For example, as shown in FIG. 4A, the first micromirror element group 402 may include a first micromirror element-subset 406. A first beam segment-subset 408 that becomes incident upon the first micromirror element-subset 406 may propagate towards the focusing lens assembly 312. The first beam segment-subset 408 may include a plurality of beam segments 400 respectively corresponding to the plurality of micromirror elements 308 in the first micromirror element-subset 406. The second micromirror element group 404 may include a second plurality of subsets of micromirror elements 308. For example, as shown in FIG. 4B, the second micromirror element group 404 may include a second micromirror element-subset 410. A second beam segment-subset 412 that becomes incident upon the second micromirror element-subset 410 may propagate towards the beam stop 314. The second beam segment-subset 412 may include a plurality of beam segments 400 respectively corresponding to the plurality of micromirror elements 308 in the second micromirror element-subset 410. The first micromirror element-subset 406 and/or the second micromirror element-subset 410 may include a plurality of micromirror elements 308 arranged in a row or column. Other arrangements are also contemplated, including columns, arrays, and/or regions, as well as spatially separated columns, arrays, and/or regions.

Figure 4C:
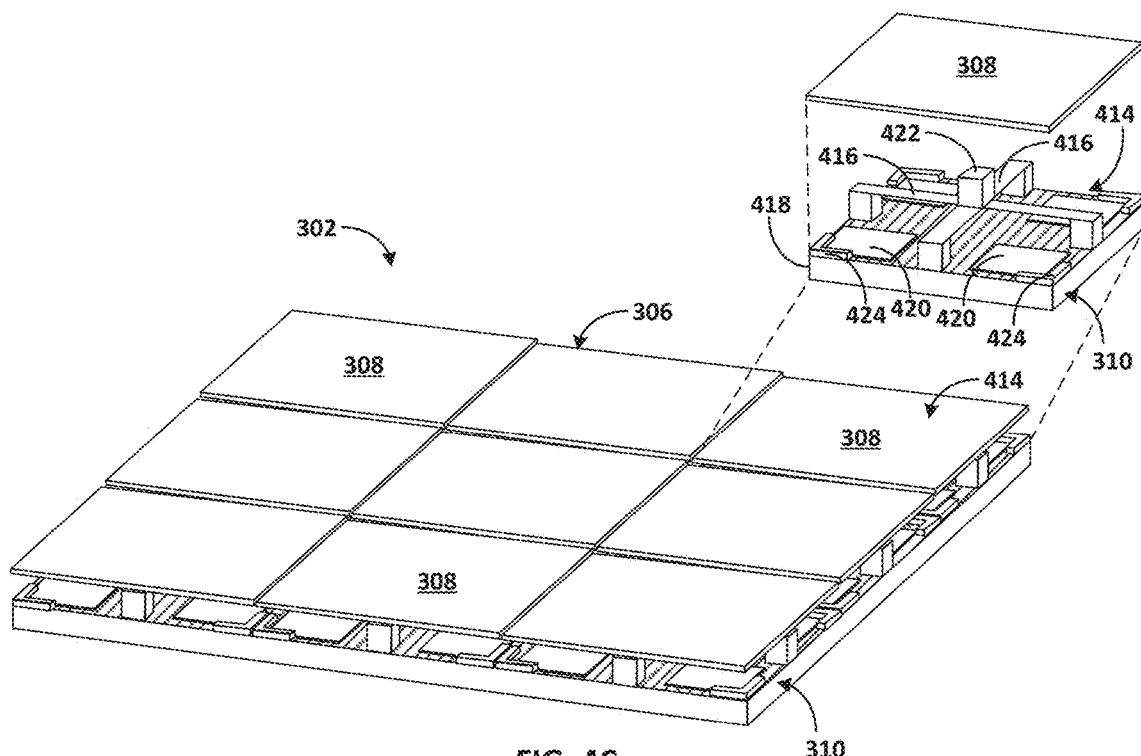
Figure 4D:
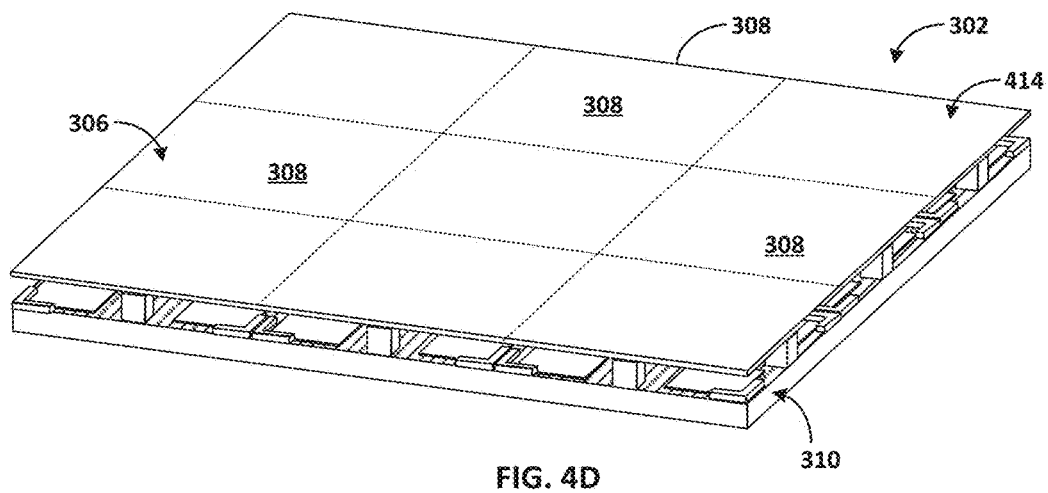

As shown in FIGS. 4C and 4D, an optical modulator 302 may include a micromirror array 306 operably coupled to a plurality of addressable elements 310. The plurality of addressable elements 310 may be respectively configured to actuate a corresponding micromirror element 308 of the micromirror array 306. The micromirror array 306 may be configured as a two-dimensional array or as a one-dimensional array. The exemplary optical modulators 302 shown in FIGS. 4C and 4D are illustrated as having plate-type addressable elements 310. However, optical modulators 302 with other addressable elements 310 are also contemplated, including comb-type addressable elements 310, thermal addressable elements 310, Lorentz addressable elements 310, and piezoelectric addressable elements 310. As shown in FIG. 4C, the micromirror array 306 may be configured as an array of discrete micromirror elements 308. As shown in FIG. 4D, the micromirror array may be configured as a continuous membrane with respect to which the term "micromirror elements" 308 refers to portions of the continuous membrane configured to deform locally according to movements of the respective addressable elements 310.

An optical modulator 302 may be configured as a semiconductor element, such as CMOS semiconductor element or any other suitable a MOSFET semiconductor element. The semiconductor element may include an array of addressable elements 310 with respective micromirror elements 308 coupled to respective addressable elements 310. An exemplary addressable element 310 may include a flexure assembly 414 configured to utilize elastic deformation to achieve specified motions corresponding to respective modulation states. The flexure assembly may include one or more flexure elements 416 coupled to a base plate 418. Exemplary flexure elements may be configured as slender wires or flat blade elements configured to exhibit elastic deformation. An exemplary addressable element 310 may additionally include one or more electrodes 420 configured to receive an electric current from circuitry, such as CMOS or other MOSFET circuitry. The electrodes 420 may exhibit an electrostatic field corresponding to a modulation state introduced by way of the circuitry of the semiconductor element. The electrostatic field exhibited by an electrode 420 of an addressable element 310 may attract and/or repel an adjacent portion of a corresponding micromirror element 308 coupled to the flexure assembly 414, causing the micromirror element 308 to tip, tilt, or extend in accordance with the electrostatic field corresponding to the respective modulation state. The flexure assembly 414 may include a post element 422 coupling the respective micromirror element 308 to the flexure elements 416 of the flexure assembly 414.

Figures 4E, 4F, 4G:
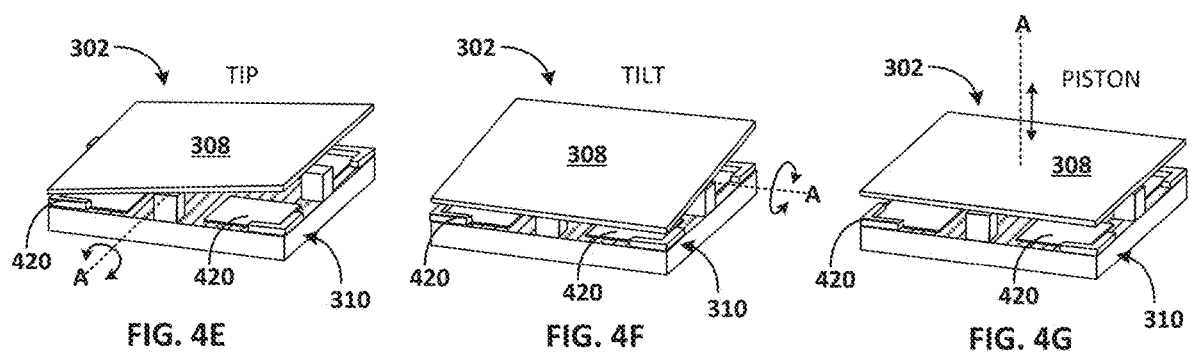

Exemplary optical modulators 302 may be configured to exhibit a plurality of modulation states corresponding to tip, tilt, or piston motions, as well as combinations of these. FIG. 4E shows an optical modulator 302 configured to exhibit a plurality of modulation states corresponding to tip motion. FIG. 4F shows an optical modulator 302 configured to exhibit a plurality of modulation states corresponding to tilt motion. FIG. 4G shows an optical modulator 302 configured to exhibit a plurality of modulation states corresponding to a piston motion. An optical modulator 302 configured to exhibit a plurality of modulation states corresponding to each of a tip motion, a tilt motion, and a piston motion may sometimes be referred to as a TTP optical modulator. An optical modulator 302 configured to exhibit a plurality of modulation states corresponding to each of a tip motion and a tilt motion may sometimes be referred to as a TT optical modulator. An optical modulator 302 configured to exhibit a plurality of modulation states corresponding each of a tip motion and a piston motion may sometimes be referred to as a TP optical modulator.

An optical modulator 302 may include addressable elements 310 configured to be actuated to provide a modulation state by way of a digital actuator, an analog actuator, or a resonant actuator. An optical modulator 302 that includes a digital actuator may utilize discrete signals configured to move respective micromirror elements 308 to discrete positions. These discrete positions may be set by mechanical stops 424 that ensure the micromirror element 308 stops at the discrete positions according to the modulation state corresponding to the discrete signal. By way of example, a TT optical modulator that includes a digital actuator may exhibit eight (8) discrete modulation states corresponding to respective degrees of freedom associated with bidirectional tip actuation and bidirectional tilt auction. A TP optical modulator that includes a digital actuator may similarly exhibit eight (8) discrete modulation states. As another example, a TTP optical modulator that includes a digital actuator may exhibit sixteen (16) discrete modulation states. An optical modulator 302 that includes an analog actuator may be configured to drive and hold an addressable element 310 to any position within a range of motion corresponding to an analog signal. An optical modulator 302 that includes a resonant actuator may be configured to utilize a harmonic actuation signal to actuate an addressable elements 310. The harmonic actuation signal may correspond to a resonant frequency of the flexure assembly 414 and/or one or more flexure elements 416 thereof, such that flexion of the respective flexure elements 416 becomes amplified. The harmonic actuation signal may provide a sinusoidal actuation motion of the addressable elements 310. In some embodiments, the harmonic actuation may be synchronized with a pulse frequency of a beam generation device 300.

An optical modulator 302 may be described with reference to a mirror area ($A_m$) according to the following relationship: $A_m = \gamma_F L^2$, where $\gamma_F$ is the directed fill factor and L is the pitch. The directed fill factor ($\gamma_F$) refers to the percent of the area of the micromirror array 306 that reflects the energy beam 144 from only the micromirror elements 308 of micromirror array 306. The directed fill factor distinguishes portion of the energy beam 144 reflected by the micromirror elements 308 as opposed to portions of the energy beam 144 that may be reflected by portions of the optical modulator accessible by the energy beam propagating through gaps between adjacent micromirror elements 308. The pitch (L) of the optical modulator refers to the square root of the area occupied by the micromirror elements 308 in the micromirror array 306. The pitch may correspond to an average distance between center points of adjacent micromirror elements 308. The pitch may differ as between the x-direction and the y-direction. An exemplary optical modulator 302 may have a mirror area ($A_M$) of from about 100 millimeters squared ($mm^2$) to about 2,500 $mm^2$, such as from about 100 $mm^{2v}$ to about 400 $mm^2$, such as from about 400 $mm^2$ to about 800 $mm^2$, such as from about 800 $mm^2$ to about 1,500 $mm^2$, or such as from about 1,500 $mm^2$ to about 2,500 $mm^2$. An exemplary optical modulator 302 may have a pitch of from about 10 micrometers (µm) to about 500 µm, such as from about 10 µm to about 50 µm, such as from about 50 µm to about 100 µm, such as from about 100 µm to about 250 µm, or such as from about 250 µm to about 500 µm. An exemplary optical modulator 302 may have a fill factor of from about 75% to about 100%, such as from about 90% to about 100%, such as from about 95% to about 100%, or such as from about 99% to about 100%. An exemplary optical modulator 302 may have a micromirror array 306 that includes a number of micromirror elements 308 ranging from about $1\times10^4$ to about $1\times10^7$, such as from about $1\times10^5$ to about $1\times10^6$, such as from about $1\times10^6$ to about $5\times10^6$, or such as from about $5\times10^6$ to about $1\times10^7$.

Figure 5J:
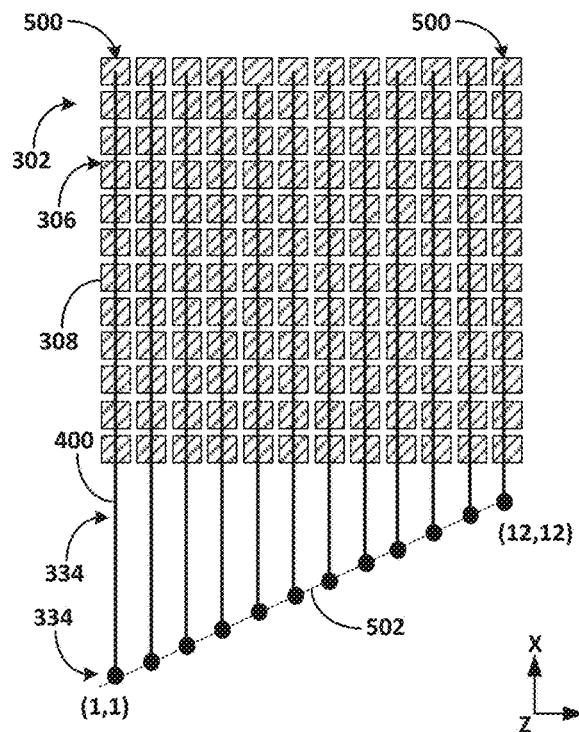

Referring now to FIGS. 5A-5M, exemplary modulation groups are further described. FIGS. 5A-5M schematically depict exemplary modulation groups 500 that may be defined for an optical modulator 302. The configuration and arrangement of the micromirror elements 308 included in the exemplary modulation groups 500 shown in FIGS. 5A-5M are provided by way of example and not to be limiting. Modulation groups with other configurations and arrangements of micromirror elements 308 are also contemplated. As shown in FIG. 5A, a modulation group 500 may include a row or column of micromirror elements 308. As shown in FIG. 5B, a modulation group 500 may include a sub-array that includes a plurality of rows and columns. The number of micromirror elements 308 included in a modulation group 500 may be determined based at least in part on one or more irradiation parameters associated with the corresponding combination zone, such as a specified intensity and/or power density of the irradiation imparted to the powder bed 138 by the beam segments corresponding to the combination zone 334. The intensity and/or power density of the irradiation imparted to the powder bed 138 by a respective combination zone 334 may be proportional to the number of beam segments corresponding to the respective combination zone. By way of example, as shown in FIG. 5A, twelve (12) beam segments are combined with one another at a combination zone 334. The twelve (12) beam segments may at least partially overlap with one another at the combination zone 334, such that the intensity and/or power density of the irradiation imparted to the powder bed 138 with respect to the combination zone 334 may be increased by a factor of 12×. As another example, as shown in FIG. 5B, sixteen (16) beam segments are combined with one another at a combination zone 334. The sixteen (16) beam segments may at least partially overlap with one another at the combination zone 334, such that the intensity and/or power density of the irradiation imparted to the powder bed 138 with respect to the combination zone 334 may be increased by a factor of 16×. It will be appreciated that a modulation group 500 may include any number of micromirror elements 308 and that the intensity and/or power density of the imparted to the powder bed 138 with respect to a combination zone 334 may be increased proportionally to the number of beam segments corresponding to the specified number of micromirror elements 308 included in the modulation group 500.

In some embodiments, a number of micromirror elements 308 included in a modulation group 500 may be adjusted and/or controlled, for example, to provide a specified intensity and/or power density of the irradiation imparted to the powder bed 138 with respect to the combination zone 334 corresponding to the modulation group 500. For example, as shown in FIGS. 5A and 5B, all of the micromirror elements 308 included in a modulation group 500 may exhibit a modulation state that includes the respective beam segment in the combination zone 334. Additionally, or in the alternative, as shown in FIGS. 5C and 5D, a subset of the total number of micromirror elements 308 in a modulation group 500 may exhibit a modulation state that includes the respective beam segment 400 in the combination zone 334. Remaining micromirror elements 308 in the modulation group 500 may exhibit a modulation state that excludes the respective beam segment 400 to the combination zone 334. For example, a first subset of micromirror elements 308 in the modulation group 500 may exhibit a modulation state that directs the respective beam segment 400 to the focusing lens assembly 312 and/or to the build plane 130. The modulation state of the first subset of micromirror elements 308 may include a corresponding plurality of beam segments 400 in the combination zone 334. The modulation group 500 may include a first micromirror element-subset 406, and the first micromirror element-subset 406 may provide a first beam segment-subset 408 corresponding to a combination zone 334. Additionally, or in the alternative, a second subset of micromirror elements 308 in the modulation group 500 may exhibit a modulation state that directs the respective beam segment 400 to the beam stop 314 (see, e.g., FIG. 4B). The modulation state of the second subset of micromirror elements 308 may exclude a corresponding plurality of beam segments 400 from the combination zone 334 (see, e.g., FIG. 4B). The modulation group 500 may include a second micromirror element-subset 410, and the second micromirror element-subset 410 may provide a second beam segment-subset 412 correspondingly excluded from the combination zone 334.

As shown in FIGS. 5C and 5D, a modulation group 500 may include a first micromirror element-subset 406 that provides a first beam segment-subset 408 representing beam segments 400 that are combined with one another at least at a combination zone 334. The beam segments 400 in the first beam segment-subset 408 may be combined at the combination zone 334 and utilize to irradiate the powder bed 138. A modulation group 500 may include second micromirror element-subset 410 that provides a second beam segment-subset 412 representing beam segments 400 that are excluded from the combination zone 334. The beam segments 400 included in the second beam segment-subset 412 may be directed to the beam stop 314 (see, e.g., FIG. 4B). The intensity and/or power density of the irradiation imparted to the powder bed 138 with respect to the combination zone 334 may be adjusted and/or controlled for a modulation group 500 at least in part by changing the number of micromirror elements 308 that provide a corresponding beam segment 400 to the combination zone 334. For example, the intensity and/or power density of the irradiation imparted to the powder bed 138 with respect to the combination zone 334 may be adjusted and/or controlled for a modulation group 500 at least in part by assigning micromirror elements 308 to the first micromirror element-subset 406, such as by allocating micromirror elements 308 of a modulation group 500 as between the first micromirror element-subset 406 and the second micromirror element-subset 410.

By way of illustration, FIG. 5C shows a modulation group 500 that includes twelve (12) micromirror elements 308, with eight (8) of the micromirror elements 308 in the modulation group 500 included in the first micromirror element-subset 406, providing a combination zone 334 that includes eight (8) beam segment-subset 408. The remaining four (4) the micromirror elements 308 in the modulation group 500 may be included in a second micromirror element-subset 410, with the corresponding second beam segment-subset 412 being excluded from the combination zone 334, and, for example, being directed to the beam stop 314. For the example illustrated in FIG. 5C, the power level and/or intensity of the irradiation provided by modulation group 500 may be adjusted by a factor of 0.75 relative to including all twelve (12) of the beam segments 400 in the combination zone 334. As another example, FIG. 5D shows a modulation group 500 that includes sixteen (16) micromirror elements 308, with eight (8) of the micromirror elements 308 in the modulation group 500 included in the first micromirror element-subset 406, providing a combination zone 334 that includes eight (8) beam segment-subset 408. The remaining eight (8) the micromirror elements 308 in the modulation group 500 may be included in a second micromirror element-subset 410, with the corresponding second beam segment-subset 412 being excluded from the combination zone 334, and, for example, being directed to the beam stop 314. For the example illustrated in FIG. 5D, the power level and/or intensity of the irradiation provided by modulation group 500 may be adjusted by a factor of 0.5 relative to including all sixteen (16) of the beam segments 400 in the combination zone 334. The number of micromirror elements 308 in a modulation group 500 that provide a beam segments 400 included in a corresponding combination zone 334 may be adjusted by a factor of from 0.0 to 1.0, such as from 0.1 to 1.0, or such as from 0.5 to 1.0, for example, to provide irradiation with a specified power level and/or intensity for the corresponding combination zone 334.

Referring to FIGS. 5E through 5M, in some embodiments, a plurality of modulation groups 500, whether including a row or column of micromirror elements 308 and/or a sub-array of micromirror elements 308, may provide a corresponding plurality of combination zones 334 that extend across the build plane 130 in a row or column. The orientation of the row or column of micromirror elements 308 in a modulation group 500 may correspond to an x-axis of an energy beam system 134, such as a direction of movement of an irradiation device 142 relative to a build plane 130. The orientation of the row or column of micromirror elements 308 in a modulation group 500 may be determined in reference to the projection of the corresponding combination zone upon the build plane 130, rather than the physical orientation of the micromirror array 306 within an irradiation device 142. For example, it will be appreciated that an energy beam path may include a plurality of optical elements such as lenses, mirrors, and the like, such that the coordinates of a micromirror array 306 may correspond to the coordinate system of an energy beam system 134 regardless of the physical orientation of the micromirror array 306 within the irradiation device 142. In some embodiments, the plurality of combination zones 334 may have an orientation corresponding to a y-axis of the energy beam system 134, such as perpendicular to a direction of movement of an irradiation device 142 relative to the build plane 130. Alternatively, a row or column of micromirror elements 308 that make up a modulation group 500 may have any other specified orientation.

As shown in FIGS. 5E and 5F, a plurality of modulation groups 500 may be configured and arranged to provide a plurality of combination zones 334 that impart irradiation to the powder bed 138 in sequence and/or in a series with one another. For example, a first modulation group 500 may provide a first plurality of beam segments 400 that at least partially overlap with one another at a first combination zone 334, and a second modulation group 500 may provide a second plurality of beam segments 400 that at least partially overlap with one another at a second combination zone 334. The first combination zone 334 and the second combination zone 334 may irradiate a portion of the powder bed 138 in sequence with one another. Additionally, or in the alternative, a third modulation group 500 may provide a third plurality of beam segments 400 that at least partially overlap with one another at a third combination zone 334. The second combination zone 334 and the third combination zone 334 may irradiate a portion of the powder bed 138 in sequence with one another. In some embodiments, the first combination zone 334 may provide preheating and the second combination zone 334 may provide irradiation sufficient to melt and/or fuse the powder material 120. The preheating provided by the first combination zone 334 may impart energy to the powder bed 138 at a level selected to preheat the powder material 120, for example, without melting and/or fusing the powder material 120. The second combination zone 334 may impart energy to the powder bed 138 at a level selected to melt and/or fuse the powder material 120, for example, in accordance with a conduction irradiation regime. The intensity and/or power density of the second combination zone 334 may be greater than the intensity and/or power density of the first combination zone 334. Additionally, or in the alternative, the third combination zone 334 may provide post-heating. The third combination zone 334 may impart energy to the powder bed 138 at a level selected to post-heat the powder material 120, for example, while allowing the melted and/or fused powder material to cool and/or while allowing a melt pool to solidify, for example, at a controlled rate. The intensity and/or power density of the third combination zone 334 may be less than the intensity and/or power density of the second combination zone 334.

By way of further illustration, the first combination zone 334 may provide a first beam spot 336 that becomes incident upon the build plane 130 at a first location and the second combination zone 334 may provide a second beam spot 336 that becomes incident upon the build plane 130 at a second location. Additionally, or in the alternative, the third combination zone 334 may provide a third beam spot 336 that becomes incident upon the build plane 130 at a third location. The first location may have coordinates upon the build plane 130 that precede the coordinates upon the build plane 130 of the second location. For example, as shown, the first location may have coordinates of (1,0) and the second location may have coordinates of (2,0). Additionally, or in the alternative, the third location may have coordinates upon the build plane 130 that follow the coordinates upon the build plane 130 of the second location. For example, as shown, the third location may have coordinates of (3,0). The first beam spot 336 corresponding to the first modulation group may become incident upon the powder bed 138 at the first location concurrently with the second beam spot 336 corresponding to the second modulation group 500 becoming incident upon the powder bed 138 at the second location. Additionally, or in the alternative, the first beam spot 336 corresponding to the first modulation group 500 may become incident upon the powder bed 138 at the first location prior to the second beam spot 336 corresponding to the second modulation group 500 becoming incident upon the powder bed 138 at the first location. The third beam spot 336 corresponding to the third modulation group 500 may become incident upon the powder bed 138 at the third location concurrently with the first beam spot 336 corresponding to the first modulation group 500 becoming incident upon the powder bed 138 at the first location and/or concurrently with the second beam spot 336 corresponding to the second modulation group 500 becoming incident upon the powder bed 138 at the second location.

As shown in FIG. 5F, the intensity and/or power density of the irradiation imparted to the powder bed 138 with respect to the first combination zone 334, the second combination zone 334, and/or the third combination zone 334 may be adjusted and/or controlled at least in part by changing the number of micromirror elements 308 that provide a corresponding beam segment 400 to the respective combination zone 334. For example, the intensity and/or power density of the irradiation imparted to the powder bed 138 with respect to the first combination zone 334, the second combination zone 334, and/or the third combination zone 334 may be adjusted and/or controlled as described with reference to FIGS. 5C and 5D.

As shown, for example, in FIGS. 5G through 5I, a plurality of modulation groups 500 may be configured and arranged to provide a plurality of combination zones 334 that impart irradiation to the powder bed 138 in parallel with one another. For example, a first modulation group 500 may provide a first plurality of beam segments 400 that at least partially overlap with one another at a first combination zone 334, and a second modulation group 500 may provide a second plurality of beam segments 400 that at least partially overlap with one another at a second combination zone 334. The first combination zone 334 and the second combination zone 334 may irradiate a portion of the powder bed 138 in parallel with one another. Additionally, or in the alternative, a third modulation group 500 may provide a third plurality of beam segments 400 that at least partially overlap with one another at a third combination zone 334. The second combination zone 334 and the third combination zone 334 may irradiate a portion of the powder bed 138 in parallel with one another. Any number of modulation groups 500 may provide corresponding combination zones 334 configured and arranged to irradiate respective portions of the powder bed 138 in parallel with one another.

For example, as shown in FIG. 5G, twelve (12) modulation groups 500 respectively provide twelve (12) combination zones 334 configured and arranged to irradiate the powder bed 138 in parallel with one another. The respective combination zones 334 may provide corresponding beam spots 336 that respectively become incident upon the build plane 130 at locations that are arranged in parallel with one another. For example, the twelve (12) combination zones 334 shown in FIG. 5G may become incident upon the build plane 130 at coordinates from (1,1) to (1,12). The beam spots 336 respectively corresponding to the plurality of modulation segments 500 may become incident upon the build plane 130 concurrently with one another. The respective beam spots 336 may propagate across the build plane 130 in coordination with one another, such as in parallel with one another. For example, the twelve (12) combination zones 334 shown in FIG. 5G may advance across the build plane 130 from coordinates (1,1) through (1,12), to coordinates (2,1) through (2,12), and from coordinates (2,1) through (2,12), to coordinates (3,1) through (3,12), and so forth.

As shown, for example, in FIG. 5H, micromirror elements 308 that belong to a modulation group 500 coinciding with a location of the build plane 130 to be irradiated may exhibit a modulation state that directs the respective beam segment 400 to the build plane 130. Additionally, or in the alternative, micromirror elements 308 that belong to a modulation group 500 coinciding with a location of the build plane 130 that is not to be irradiated may exhibit a modulation state that directs the respective beam segment 400 to the beam stop 314. By way of illustration, FIG. 5H shows twelve (12) modulation groups 500 arranged in columns, of which, seven (7) modulation groups 500 are providing a first beam segment-subset 408 corresponding to a combination zone 334. The combination zones 334 corresponding to the seven (7) modulation groups 500 are shown as irradiating the build plane 130 at locations having coordinates (1,1), (1,2), (1,4), (1,8) through (1,10), and (1,12). The five (5) modulation groups 500 shown in FIG. 5H that are not providing a first beam segment-subset 408 corresponding to a combination zone 334 may instead provide a second beam segment-subset 412, which may be directed to the beam stop 314. For example, as shown in FIG. 5H, locations of the build plane 130 having coordinates (1,3), (1,5) through (1,7), and (1,11) may correspond to modulation groups 500 that are not providing a first beam segment-subset 408 corresponding to a combination zone 334 and that may instead provide a second beam segment-subset 412, which may be directed to the beam stop 314.

Referring, for example to FIG. 5I, in addition or in the alternative to whether or not a respective modulation groups 500 directs a first beam segment-subset to the build plane 130, the respective modulation groups 500 may include a first micromirror element-subset 406 that provides a first beam segment-subset 408 representing beam segments 400 that are utilize to irradiate a respective location on the powder bed 138, and a second micromirror element-subset 410 that provides a second beam segment-subset 412 representing beam segments 400 that are not utilized to irradiate the respective location on the powder bed 138. For example, FIG. 5I shows a plurality of modulation groups 500 that respectively include twelve (12) micromirror elements 308. A first modulation group 500 coinciding with a location of the build plane 130 having coordinates (1,1) has a first micromirror element-subset 406 that includes twelve (12) micromirror elements 308. A second modulation group 500 coinciding with a location of the build plane 130 having coordinates (1,2) has a first micromirror element-subset 406 that includes nine (9) micromirror elements 308. A third modulation group 500 coinciding with a location of the build plane 130 having coordinates (1,4) has a first micromirror element-subset 406 that includes three (3) micromirror elements 308. A plurality of modulation groups 500 respectively coinciding with location of the build plane 130 having coordinates of (1,8) through (1,10) respectively have a first micromirror element-subset 406 that includes six (6) micromirror elements 308. A modulation group coinciding with a location of the build plane 130 having coordinates (1,12) has a first micromirror element-subset 406 that includes one (1) micromirror element 308.

Referring now, for example, to FIG. 5G, and to FIGS. 5J through 5M, in some embodiments, a plurality of modulation groups 500 may respectively provide a plurality of combination zones 334 with corresponding beam spots 336 configured and arranged upon the build plane 130 in the form of a pattern 502, such as a linear or curvilinear arrangement of beam spots 336. As shown in FIGS. 5G and 5J, a plurality of modulation groups 500 may provide a plurality of combination zones 334 with corresponding beam spots 336 arranged in a pattern 502 that includes a linear arrangement of beam spots 336 incident upon the build plane 130. The linear arrangement of beam spots 336 may be oriented perpendicular to a direction of motion of the beam spots 336 across the build plane 130. For example, the plurality of combination zones 334 shown in FIG. 5G may correspond to a linear arrangement of beam spots 336 oriented perpendicular to a direction of motion of the beam spots 336. Additionally, or in the alternative, the linear arrangement of beam spots 336 may be oriented parallel to a direction of motion of the beam spots 336 across the build plane 130. For example, the plurality of combination zones 334 shown in FIG. 5G may correspond to a linear arrangement of beam spots 336 oriented parallel to a direction of motion of the beam spots 336. Additionally, or in the alternative, the linear arrangement of beam spots 336 may be oriented oblique to a direction of motion of the beam spots 336 across the build plane 130. For example, the plurality of combination zones 334 shown in FIG. 5J may correspond to a linear arrangement of beam spots 336 oriented oblique to a direction of motion of the beam spots 336 across the build plane 130.

Figure 5K:
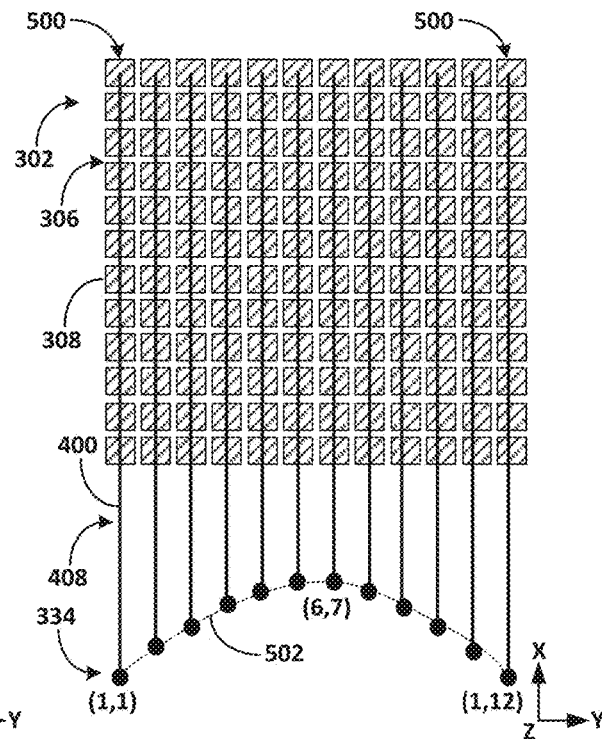
Figure 5L:
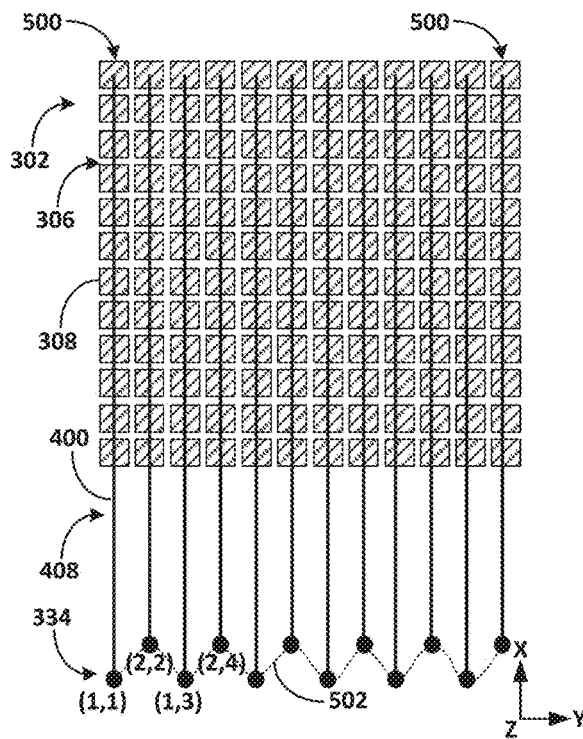

As shown in FIGS. 5K and 5L, a plurality of modulation groups 500 may provide a plurality of combination zones 334 with corresponding beam spots 336 arranged in a pattern 502 that includes a curvilinear arrangement of beam spots 336 incident upon the build plane 130. The curvilinear arrangement of beam spots 336 may be configured and arranged in any suitable curvilinear manner, including, for example, a parabolic arrangement, a hyperbolic arrangement, a sinusoidal arrangement, a polynomial arrangement, and the like, as well as combinations of these. Additionally, or in the alternative, the curvilinear arrangement of beam spots 336 may have any suitable oriented relative to a direction of motion of the beam spots 336 across the build plane 130. For example, the plurality of combination zones 334 shown in FIG. 5K may correspond to a curvilinear arrangement of beam spots 336 that includes a parabolic or hyperbolic arrangement. The parabolic or hyperbolic arrangement may have any suitable orientation relative to a direction of motion of the beam spots 336 across the build plane 130. For example, a parabolic arrangement may have a directrix oriented parallel, perpendicular, or oblique to a direction of motion of the beam spots 336 across the build plane 130. A hyperbolic arrangement may have an asymptote oriented parallel, perpendicular, or oblique to a direction of motion of the beam spots 336 across the build plane 130. As another example, the plurality of combination zones 334 shown in FIG. 5L may correspond to a curvilinear arrangement of beam spots 336 that includes a sinusoidal arrangement. The sinusoidal arrangement may have any suitable orientation relative to a direction of motion of the beam spots 336 across the build plane 130. For example, a sinusoidal arrangement may have a midline oriented parallel, perpendicular, or oblique to a direction of motion of the beam spots 336 across the build plane 130.

Figure 5M:
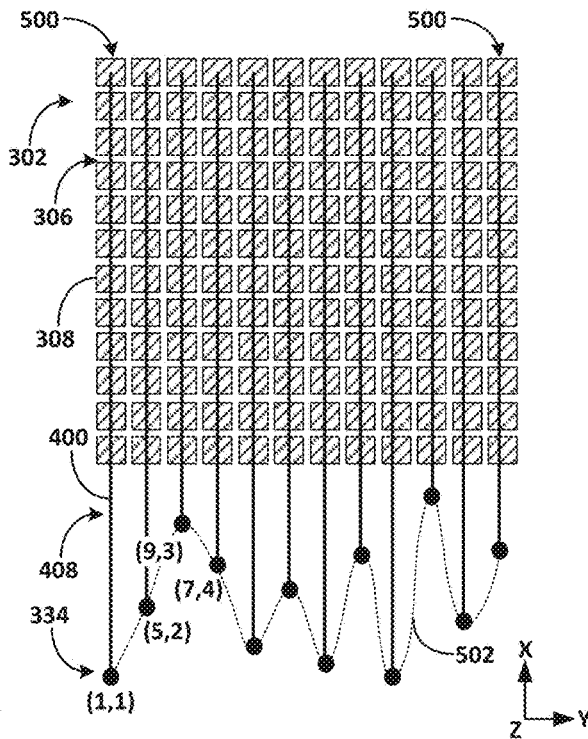

As shown in FIG. 5M, a plurality of modulation groups 500 may provide a plurality of combination zones 334 with corresponding beam spots 336 arranged in a pattern 502 that includes a pseudorandom arrangement of beam spots 336 incident upon the build plane 130. The pseudorandom arrangement of beam spots 336 may be deterministic and repeatable, and yet may appear patternless. For example, the pseudorandom arrangement may be provided by a pseudorandom number generator.

Figure 5N:
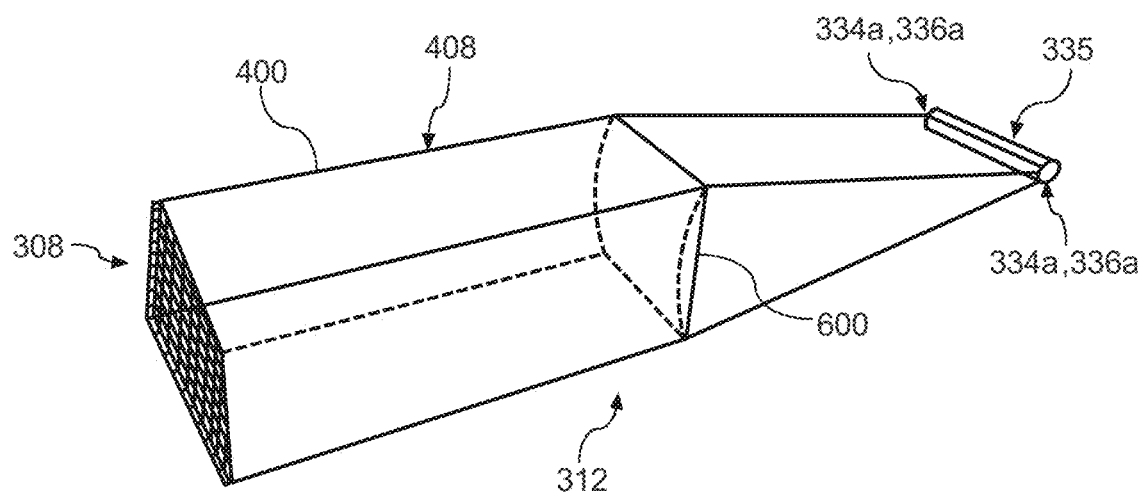
FIG. 5N schematically depicts a focusing lens assembly converging a plurality of beam segments from a beam generation device into a plurality of beam spots having a linear arrangement.

FIG. 5N schematically depicts a focusing lens assembly 312, including a cylindrical lens 600 converging a plurality of beam segments 400 from a beam generation device 308 into a plurality of beam spots 336a-336n having a linear arrangement 335. It is noted that the beam spots 336 in the embodiments shown in FIGS. 5A-5M may be converged into a linear arrangement with a focusing lens assembly 312, even though the focusing lens assembly 312 is not shown. For example, the beam segments 400 in the embodiments of FIGS. 5A and 5C converge to a linear arrangement of beam spots 336a-336n through a focusing lens assembly 312 (as shown in FIG. 5N).

Referring now to FIGS. 6A-6H, exemplary focusing lens assemblies 312 are further described. As shown, a focusing lens assembly 312 may include one or more lenses 600 supported by a housing 602. The one or more lenses 600 of the focusing lens assembly 312 may be configured to cause a plurality of beam segments 400 corresponding to a modulation group 500 to be at least partially combined with one another. The one or more lenses 600 of the focusing lens assembly 312 may be configured to cause the plurality of beam segments 400 to be combined with one another so as to at least partially overlap with one another at least at a combination zone 334. In some embodiments, the one or more lenses 600 may include one or more cylindrical lenses, such as one or more plano-convex cylindrical lenses. A cylindrical lens, such as a plano-convex cylindrical lens, may focus a plurality of beam segments along a single axis. In some embodiments, a focusing lens assembly 312 may include a plurality of cylindrical lenses respectively corresponding to respective ones of a plurality of modulation groups 500. The plurality of cylindrical lenses may provide a plurality of combination zones 334 that exhibit a linear or curvilinear pattern. The plurality of cylindrical lenses may be configured as an array of cylindrical lenses, which may sometimes be referred to as a lenticular lens. Additionally, or in the alternative, the one or more lenses 600 may include a microlens array that includes a plurality of small lenses formed of a common substrate, such as a homogeneous glass or semiconductor substrate. A microlens array may include a 1-dimensional array of lens. For example, a microlens array may include an array of cylindrical microlenses. Additionally, or in the alternative, a microlens array may include a 2-dimensional microlens array. For example, a microlens array may include an array of spherical lenses, or an array of polygonal lenses, such as hexagonal lenses or rectangular lenses.

A microlens array may have a pitch of from about 10 micrometers ($\mu$m) to about 500 $\mu$m, such as from about 10 $\mu$m to about 50 $\mu$m, such as from about 50 $\mu$m to about 100 $\mu$m, such as from about 100 $\mu$m to about 250 $\mu$m, or such as from about 250 $\mu$m to about 500 $\mu$m. As used with reference to a microlens array, the term "pitch" refers to an average distance between center points of adjacent microlenses in the microlens array. In some embodiments, a microlens array may have a pitch that coincides with a pitch of an optical modulator 302. An exemplary microlens array may have a number of microlenses ranging from about 1×10^4 to about 1×10^7, such as from about 1×10^5 to about 1×10^6, such as from about 1×10^6 to about 5×10^6, or such as from about 5×10^6 to about 1×10^7.

In some embodiments, a microlens array may have a fill factor of from about 75% to about 99.9%, such as from about 90% to about 100%, such as from about 95% to about 99.9%, or such as from about 99% to about 99.9%. As used with reference to a microlens array, the term "fill factor" refers to the percent of the area of the microlens array that is occupied by the microlenses of the microlens array. By way of illustration, a square array of spherical microlenses without any space between the microlenses may have a fill factor of π/4, or about 78.5%. As another example, a hexagonal array of spherical microlenses without any space between the microlenses may have a fill factor of about 96.7%. A microlens array with cylindrical microlenses may have a fill factor of up to about 99.9%. The fill factor of the microlens array may be coordinated with the fill factor of an optical modulator 302. Additionally, or in the alternative, the configuration and arrangement of the lenses of the microlens array may be coordinated with the configuration and arrangement of the micromirror elements 308 of a micromirror array 306. For example, a microlens array may include a hexagonal arrangement of lenses, and/or hexagonal lenses, in coordination with a micromirror array 306 that includes hexagonal micromirror elements. The microlens array may include an anti-reflective coating. The areas between the microlenses of the microlens array may include a mask that blocks light from being transmitted through the areas between microlenses. Exemplary microlens arrays may be manufactured using semiconductor fabrication techniques.

Figure 6A:
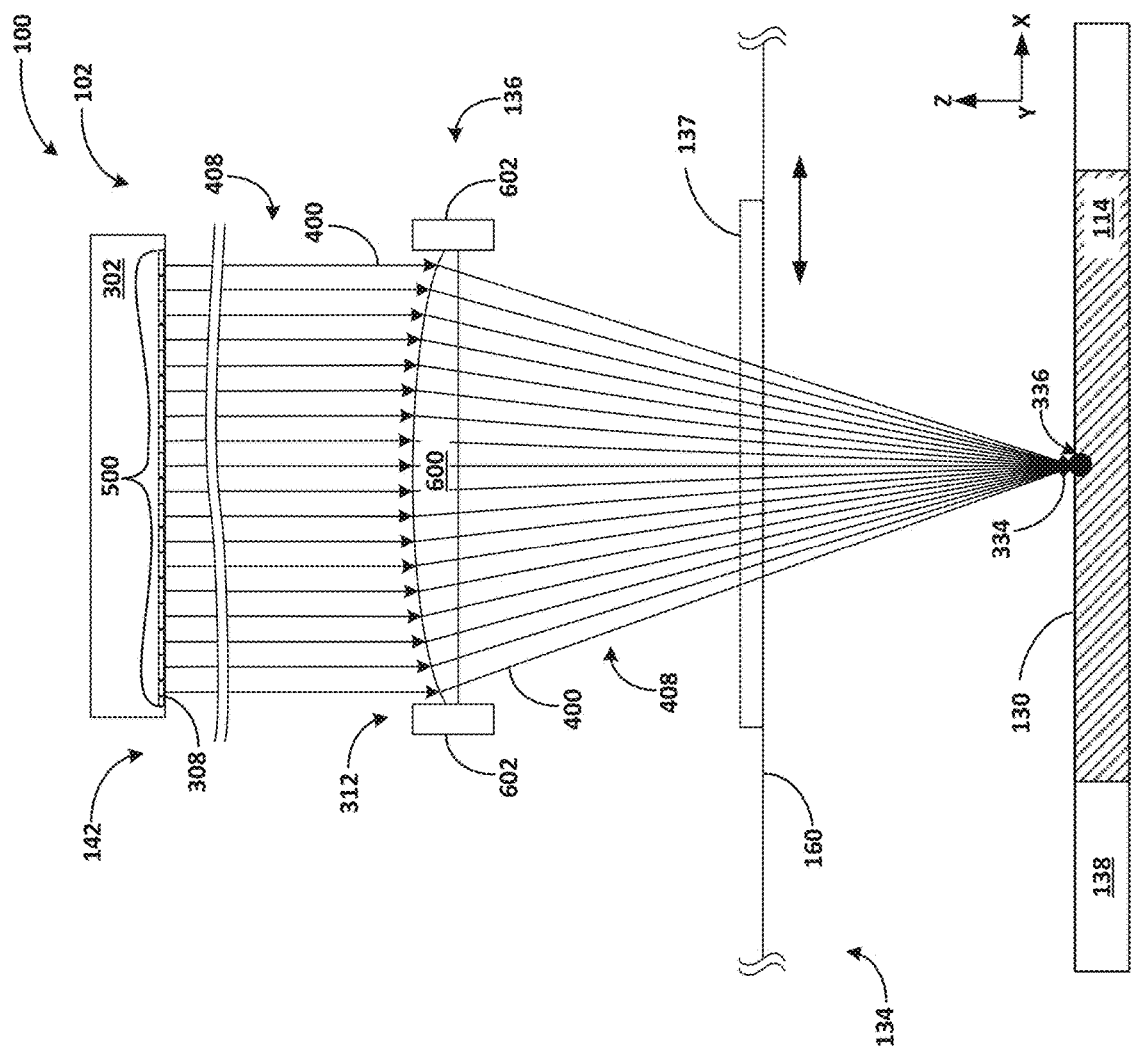
Figure 6B:
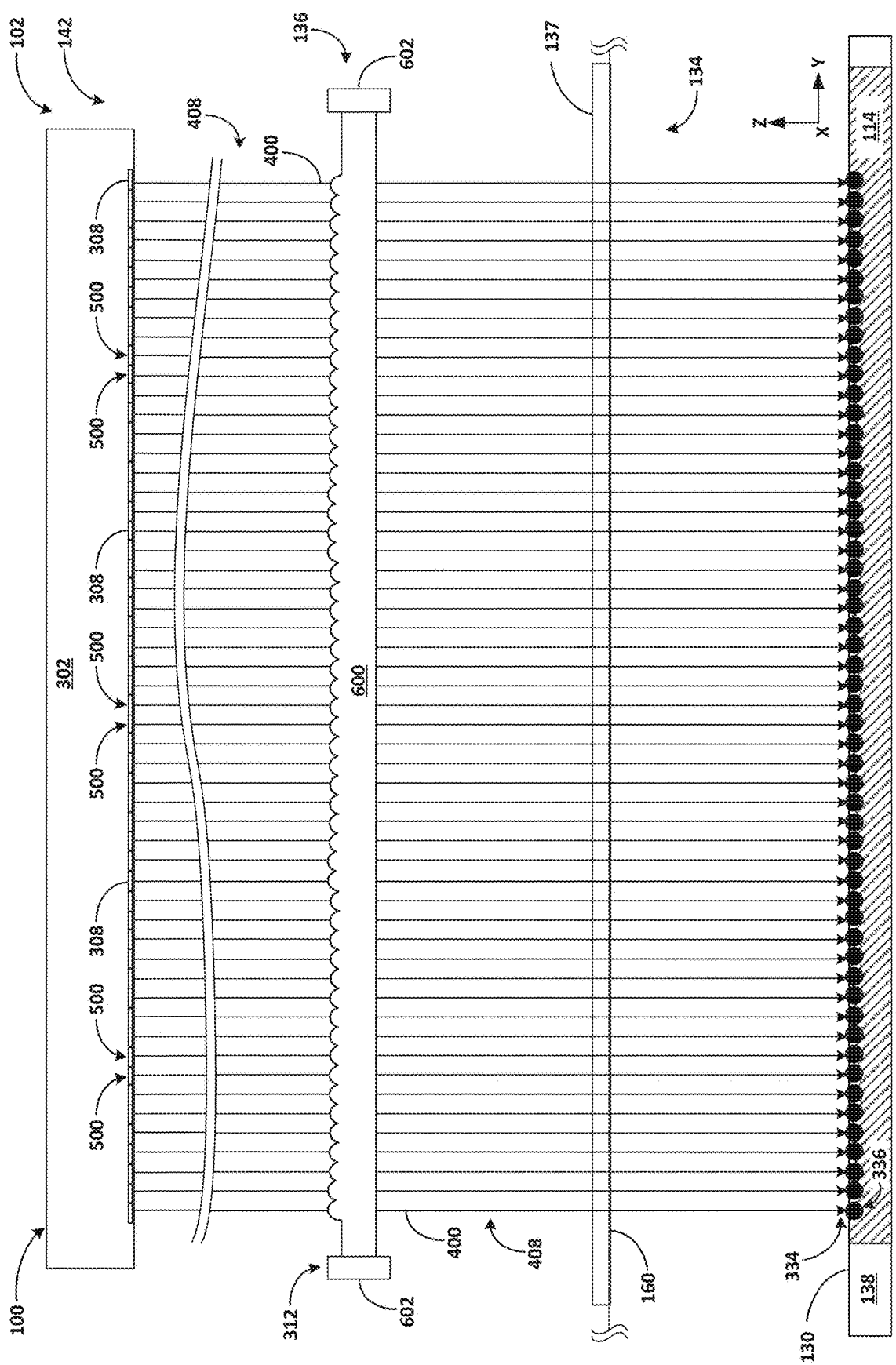

As shown in FIG. 6A, the one or more lenses 600 of the focusing lens assembly 312 may focus a plurality of beam segments 400 with respect to a first axis, such as an x-axis. Thus, the combination zone 334 may be a plurality of beam spots 336 along the y-axis across the build plane 130. The one or more lenses 600 may be configured as cylindrical lenses, such as cylindrical microlenses. The plurality of beam segments 400 may belong to a beam segment-subset 408 corresponding to a modulation group 500. In some embodiments, one or more lenses 600, such as an array of cylindrical lenses, may focus a plurality of subsets of beam segments 400 respectively corresponding to respective ones of a plurality of modulation groups 500 along a first axis. Additionally, or in the alternative, as shown in FIG. 6B, a plurality of cylindrical lenses, such as a plurality of cylindrical microlenses in a microlens array, may provide a plurality of beam segment-subsets 408 with corresponding combination zones 334 that exhibit a linear or curvilinear pattern with respect to second axis, such as a y-axis. In some embodiments, the plurality of beam segment-subsets 408 may be collimated relative to the second axis, such as the y-axis. The linear or curvilinear pattern exhibited by the plurality of combination zones 334 may provide a corresponding plurality of beam spots 336 upon the powder bed 138. The plurality of beam spots 336 may exhibit a linear or curvilinear pattern. When irradiating the powder bed 138, the plurality of beam spots 336 may propagate across the powder bed 138. For example, as shown in FIG. 6A, the plurality of beam spots 336 may propagate across the powder bed 138 in a direction transverse to the direction of focus imparted by a cylindrical lens, such as a direction perpendicular to the direction of focus imparted by a cylindrical microlens array.

Figure 6C:
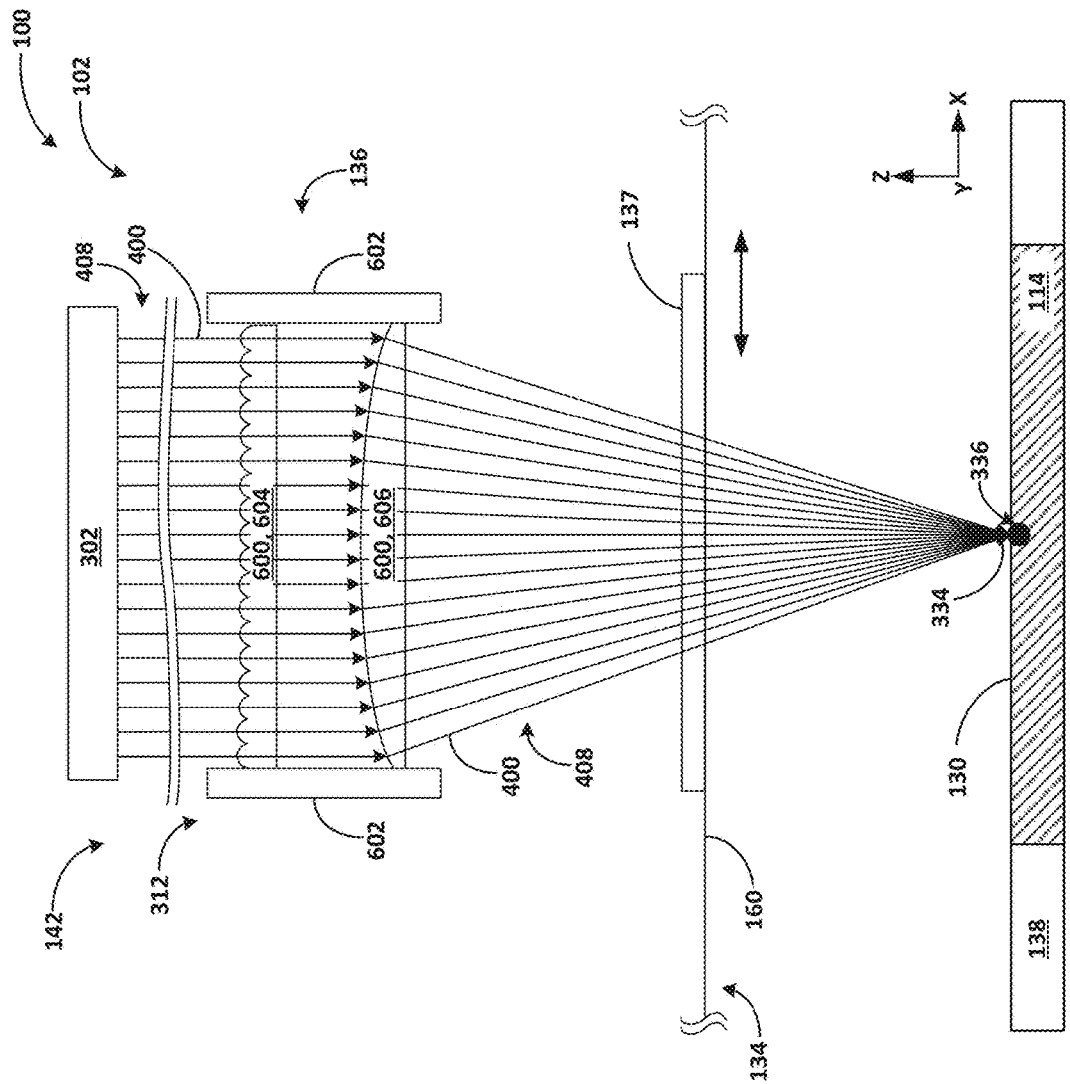

As shown in FIG. 6C, in some embodiments, a focusing lens assembly 312 may include a first lens 604 and a second lens 606. The first lens may be configured as a cylindrical lens or a cylindrical lens array, such as a microlens array that includes cylindrical microlenses. The first lens 604 may focus a plurality of beam segments 400 and/or beam segment-subsets 408 in with respect to a first axis, such as a y-axis. Additionally, or in the alternative, the second lens 606 may focus the plurality of beam segments 400 and/or beam segment-subsets 408 in a second direction, such as an x-direction.

Figure 6D:
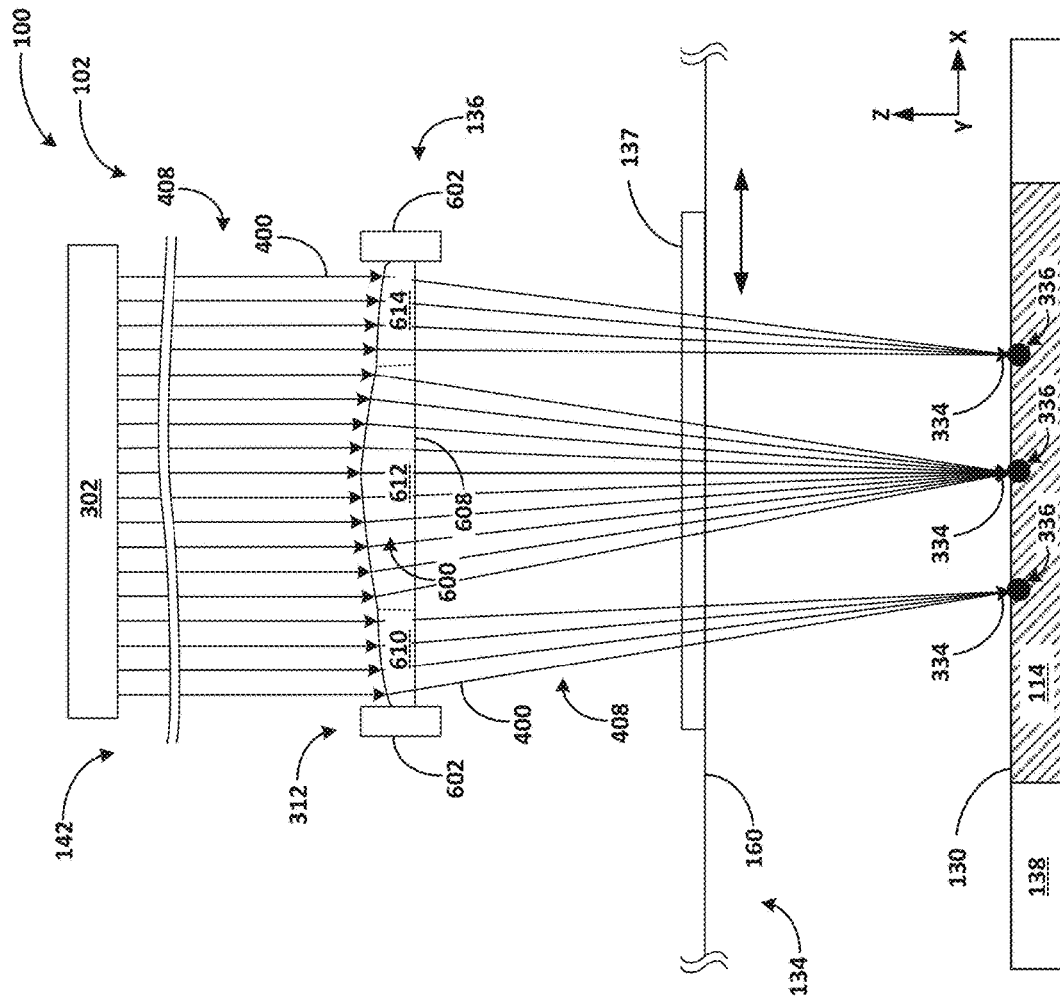

As shown in FIG. 6D, in some embodiments, a focusing lens assembly 312 may include a multi-focal lens 608, such as a bifocal lens or a trifocal lens. As shown, a multi-focal lens 608 may include a first focal region 610, and a second focal region 612. Additionally, or in the alternative, a multi-focal lens 608 may include a third focal region 614. The first focal region 610 may provide a first combination zone 334. In some embodiments, the first focal region 610 and/or the first combination zone 334 may provide preheating. The preheating provided by the first focal region 610 and/or the first combination zone 334 may impart energy to the powder bed 138 at a level selected to preheat the powder material 120, for example, without melting and/or fusing the powder material 120. Additionally, or in the alternative, the second focal region 612 may provide a second combination zone 334. The second focal region 612 and/or the second combination zone 334 may provide irradiation sufficient to melt and/or fuse the powder material 120. For example, the second focal region 612 and/or the second combination zone 334 may melt and/or fuse the powder material 120 in accordance with a conduction irradiation regime. The intensity and/or power density of the second focal region 612 and/or the second combination zone 334 may be greater than the intensity and/or power density of the first focal region 610 and/or the first combination zone 334. Additionally, or in the alternative, the third focal region 614 and/or the third combination zone 334 may provide post-heating. The third focal region 614 and/or the third combination zone 334 may impart energy to the powder bed 138 at a level selected to post-heat the powder material 120, for example, while allowing the melted and/or fused powder material to cool, such as at a specified and/or controlled rate, and/or while allowing a melt pool to solidify, for example, at a specified and/or controlled rate. The intensity and/or power density of the third focal region 614 and/or the third combination zone 334 may be less than the intensity and/or power density of the second focal region 612 and/or the second combination zone 334.

Figure 6F:
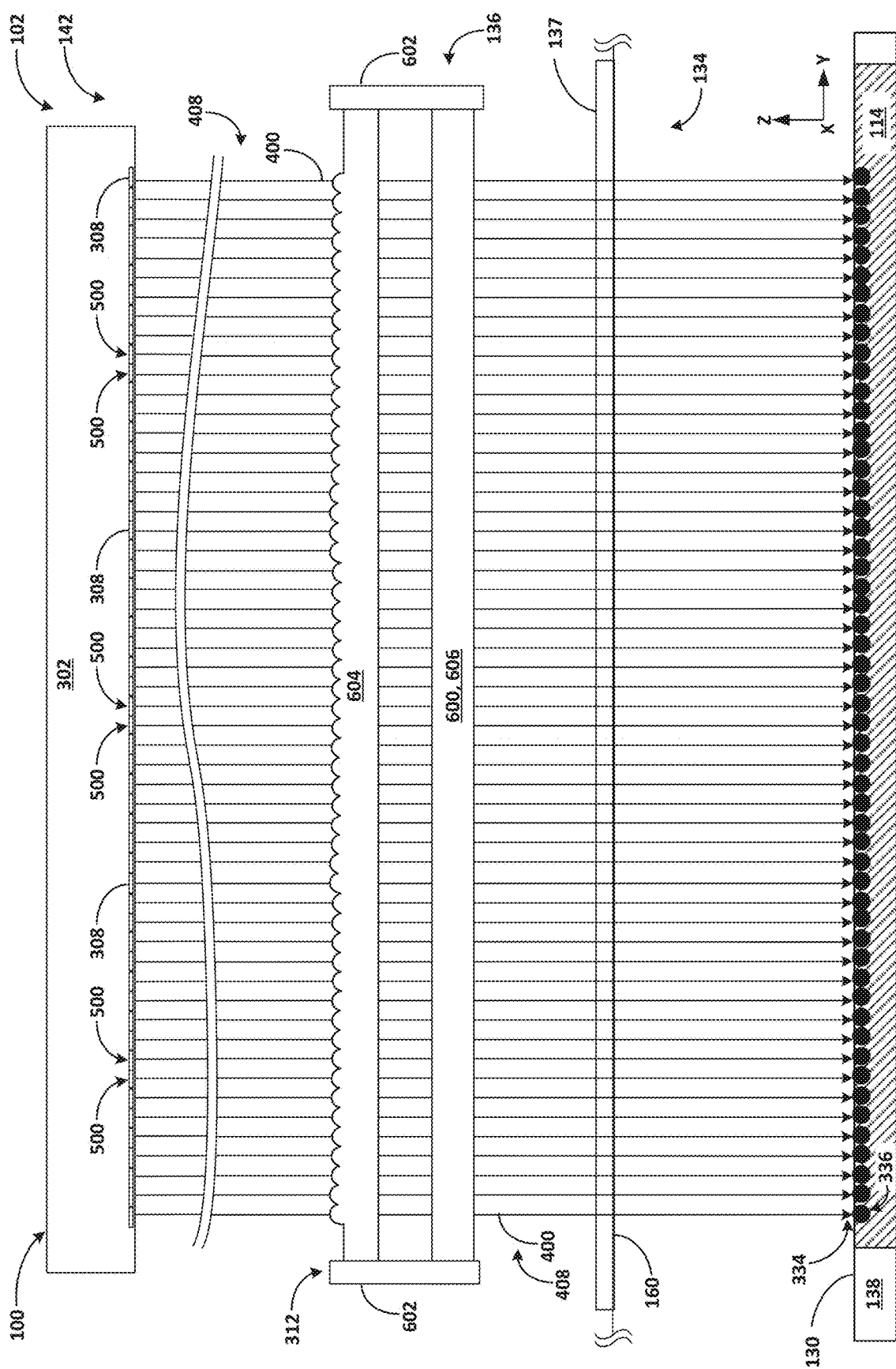

As shown in FIGS. 6E and 6F, in some embodiments, a focusing lens assembly 312 may include a first lens 604 and a second lens 606. The first lens may be configured as a cylindrical lens or a cylindrical lens array, such as a microlens array that includes cylindrical microlenses. The first lens 604 may focus a plurality of beam segments 400 and/or beam segment-subsets 408 in a first direction, such as a x-direction. Additionally, or in the alternative, the second lens 606 may collimate the plurality of beam segments 400 and/or beam segment-subsets 408. The plurality of beam segments 400 may be combined with one another at a combination zone 334 coinciding with the second lens 606. For example, the combination zone 334 may be at the second lens 606, upstream from the second lens 606 and/or downstream from the second lens 606. The first lens 604 may combine the beam segments 400 at a combination zone 334, and the second lens 606 may collimate the plurality of beam segments 400. In some embodiments, the first lens 604 may collimate the plurality of beam segments 400 with respect to a first axis, such as a y-axis, and the second lens 606 may collimate the plurality of beam segments 400 with respect to a second axis, such as an x-axis. The beam segment-subset 408 corresponding to the plurality of beam segments 400 may propagate from the second lens 606 to the build plane 130, providing a beam spot 336 that includes at least partially overlapping beam segments 400 having been combined with one another at the combination zone 334 coinciding with the second lens 606.

Figure 6G:
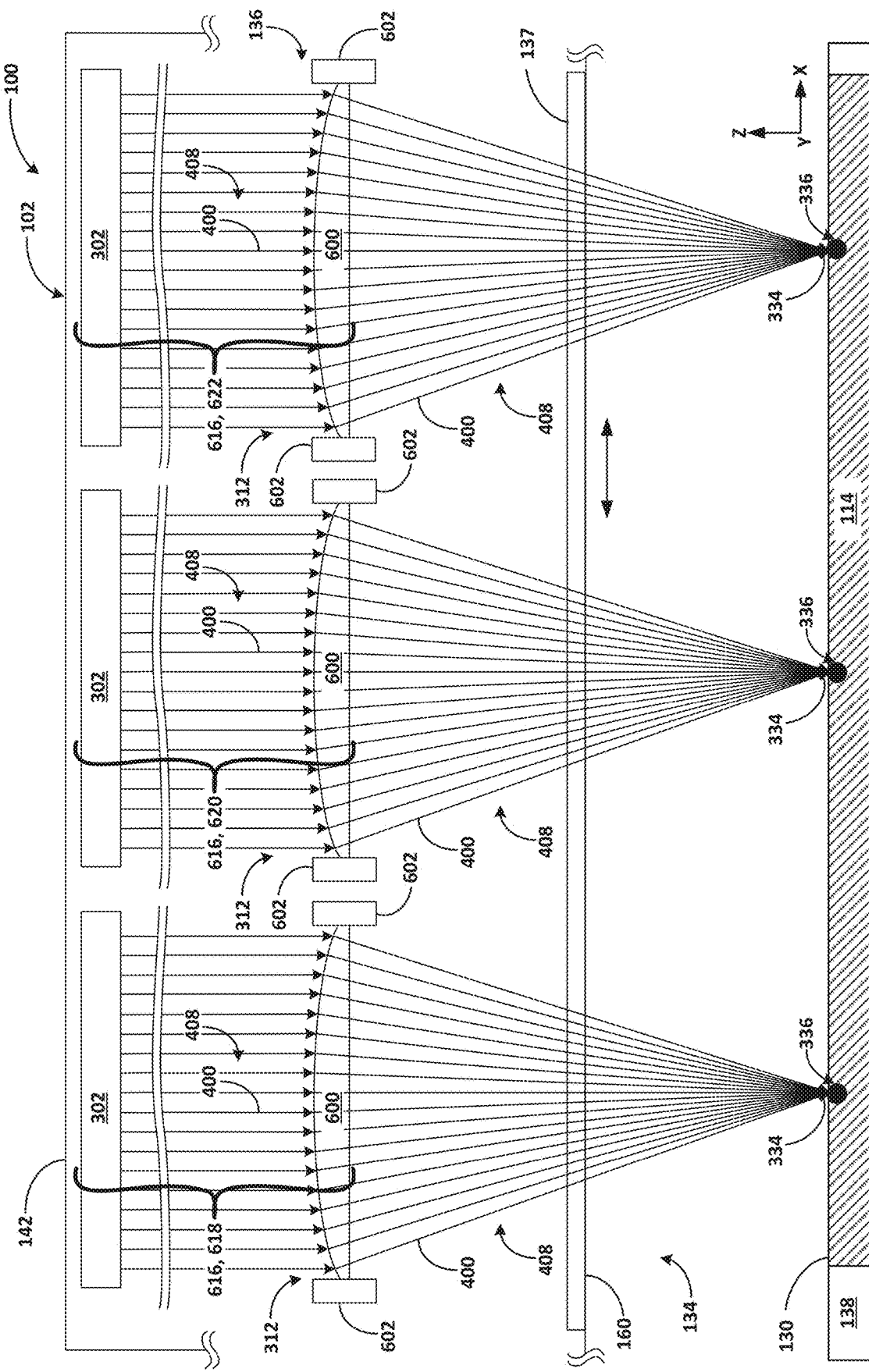
Figure 6H:
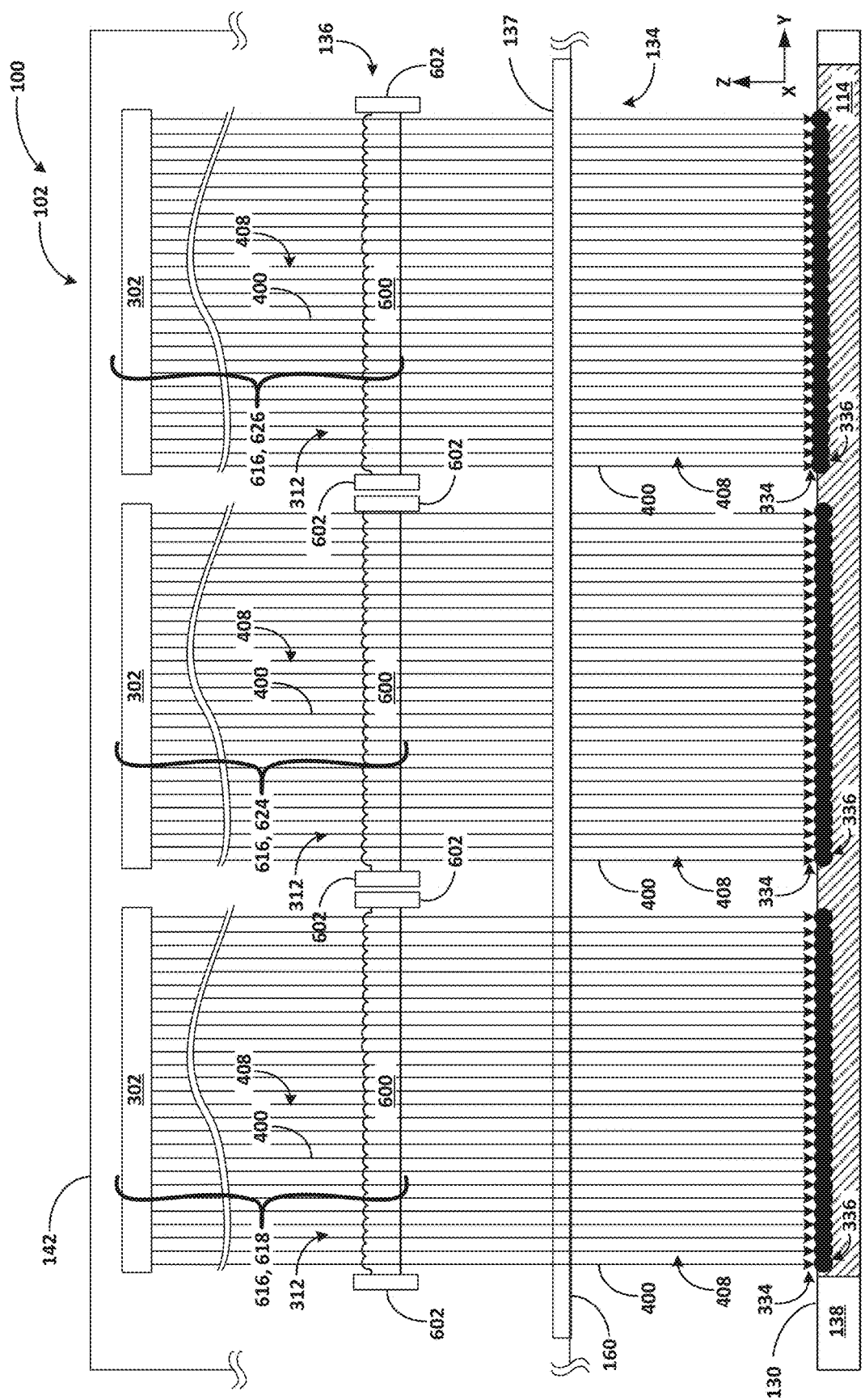

As shown in FIGS. 6G and 6H, in some embodiments, an irradiation device 142 may include a plurality of optical modulators 302 and a corresponding plurality of focusing lens assemblies 312. An optical modulator 302 and a corresponding focusing lens assembly 312 may sometimes be referred to as a beam combination group 616. An irradiation device 142 may include a plurality of beam combination groups 616. The plurality of beam combination groups 616 may be arranged adjacent to one another. A plurality of beam combination groups 616 may be arranged adjacent to one another in one or more directions, such as along an x-axis as shown in FIG. 6G and/or along a y-axis as shown in FIG. 6H. In some embodiments, the plurality of beam combination groups 616 may be arranged in an array, such as a 1-dimensional array and/or a 2-dimensional array. A 2-dimensional array may include a first plurality of beam combination groups 616 arranged adjacent to one another in a first direction, such as along an x-axis, and a second plurality of beam combination groups 616 arranged adjacent to one another in a second direction, such as along a y-axis. A plurality of beam combination groups 616 may be incorporated into a common irradiation device 142. Additionally, or in the alternative, a plurality of irradiation devices 142 may respectively include one or more beam combination groups 616.

The plurality of beam combination groups 616 may respectively provide a plurality of beam segment-subsets 408 with corresponding combination zones 334 that exhibit a linear or curvilinear pattern. The linear or curvilinear pattern exhibited by the plurality of combination zones 334 may provide a corresponding plurality of beam spots 336 upon the powder bed 138. As shown in FIG. 6G, the plurality of beam combination groups 616 may be configured and arranged adjacent to one another such that when the one or more irradiation devices 142 cause the respective beam spots 336 corresponding to the plurality of combination zones 334 to propagate across the powder bed 138, a plurality of combination zones 334 corresponding to the first beam combination group 618 may provide a first plurality of beam spots 336 that precedes a second plurality of beam spots 336 corresponding to a second plurality of combination zones 334 provided by the second beam combination group 620. Additionally, or in the alternative, the plurality of beam combination groups 616 may be configured and arranged adjacent to one another such that when the one or more irradiation devices 142 cause the respective beam spots 336 corresponding to the plurality of combination zones 334 to propagate across the powder bed 138, a plurality of combination zones 334 corresponding to a third beam combination group 622 may provide a third plurality of beam spots 336 that follow the second plurality of beam spots 336 corresponding to the second plurality of combination zones 334 provided by the second beam combination group 620.

In some embodiments, the first beam combination group 616 and/or the first plurality of combination zones 334 may provide preheating. The preheating provided by the first beam combination group 618 and/or the first plurality of combination zones 334 may impart energy to the powder bed 138 at a level selected to preheat the powder material 120, for example, without melting and/or fusing the powder material 120. Additionally, or in the alternative, the second beam combination group 620 and/or the second plurality of combination zones 334 may provide irradiation sufficient to melt and/or fuse the powder material 120. For example, second beam combination group 620 and/or the second plurality of combination zones 334 may melt and/or fuse the powder material 120 in accordance with a conduction irradiation regime. The intensity and/or power density of the second beam combination group 620 and/or the second plurality of combination zones 334 may be greater than the intensity and/or power density of the first beam combination group 618 and/or the first plurality of combination zones 334. In some embodiments, the third beam combination group 622 and/or the third plurality of combination zones 334 may provide post-heating. The third beam combination group 622 and/or the third plurality of combination zones 334 may impart energy to the powder bed 138 at a level selected to post-heat the powder material 120, for example, while allowing the melted and/or fused powder material to cool and/or while allowing a melt pool to solidify, for example, at a controlled rate. The intensity and/or power density of the third beam combination group 622 and/or the third plurality of combination zones 334 may be less than the intensity and/or power density of the second plurality of beam spots 336 corresponding to the second plurality of combination zones 334.

As shown in FIG. 6H, the plurality of beam combination groups 616 may be configured and arranged adjacent to one another such that a linear or curvilinear pattern defined by a plurality of combination zones 334 may include combination zones corresponding to a plurality of adjacently disposed beam combination groups 616. The plurality of beam combination groups 616 may together provide a linear or curvilinear pattern that includes a plurality of combination zones 334 from respective ones of the plurality of beam combination groups 616. For example, a first plurality of combination zones 334 corresponding to a first beam combination group 618 may be adjacently disposed relative to a fourth plurality of combination groups 334 corresponding to a fourth beam combination group 624. Additionally, or in the alternative, the fourth plurality of combination groups 334 corresponding to the fourth beam combination group 624 may be adjacently disposed relative to a fifth plurality of combination zones 334 corresponding to a fifth beam combination group 626. The linear or curvilinear pattern of combination zones 334 may provide a plurality of beam spots 336 that extend across a width of a powder bed 138, such as an entire width of the powder bed 138. Additionally, or in the alternative, the linear or curvilinear pattern of combination zones 334 may provide a plurality of beam spots 336 that extend across about 5% to about 100% of a total width of a powder bed 138, such as from about 10% to about 30%, such as from about 30% to about 60%, or such as from about 60% to about 90% of a total width of the powder bed 138.

In some embodiments, a first plurality of beam segments 400, such as a first beam segment-subset 408, and a second plurality of beam segments 400, such as a second beam segment-subset 408, may be caused to at least partially overlap with one another at a combination zone 334. The combination zone 334 may be located at an interlace region 150 of the build plane 130. The first plurality of beam segments 400, such as the first beam segment-subset 408, may be provided by a first irradiation device 142a. Additionally, or in the alternative, the second plurality of beam segments 400, such as the second beam segment-subset 408, may be provided by a second irradiation device 142b. Additionally, or in the alternative, the first plurality of beam segments 400 and the second plurality of beam segments 400 may be provided by the same irradiation device 142. For example, the first plurality of beam segments 400 may correspond to a first beam combination group 618, and the second plurality of beam segments 400 may correspond to a second beam combination group 620. The first plurality of beam segments 400 (e.g., the first beam segment-subset 408) and the second plurality of beam segments 400 (e.g., the second beam segment-subset 408) may be caused to overlap by one or more optical elements of the focusing lens assembly 312 and/or by a scanner 332, as shown, for example, in FIGS. 1A and 3B.

Figure 6I:
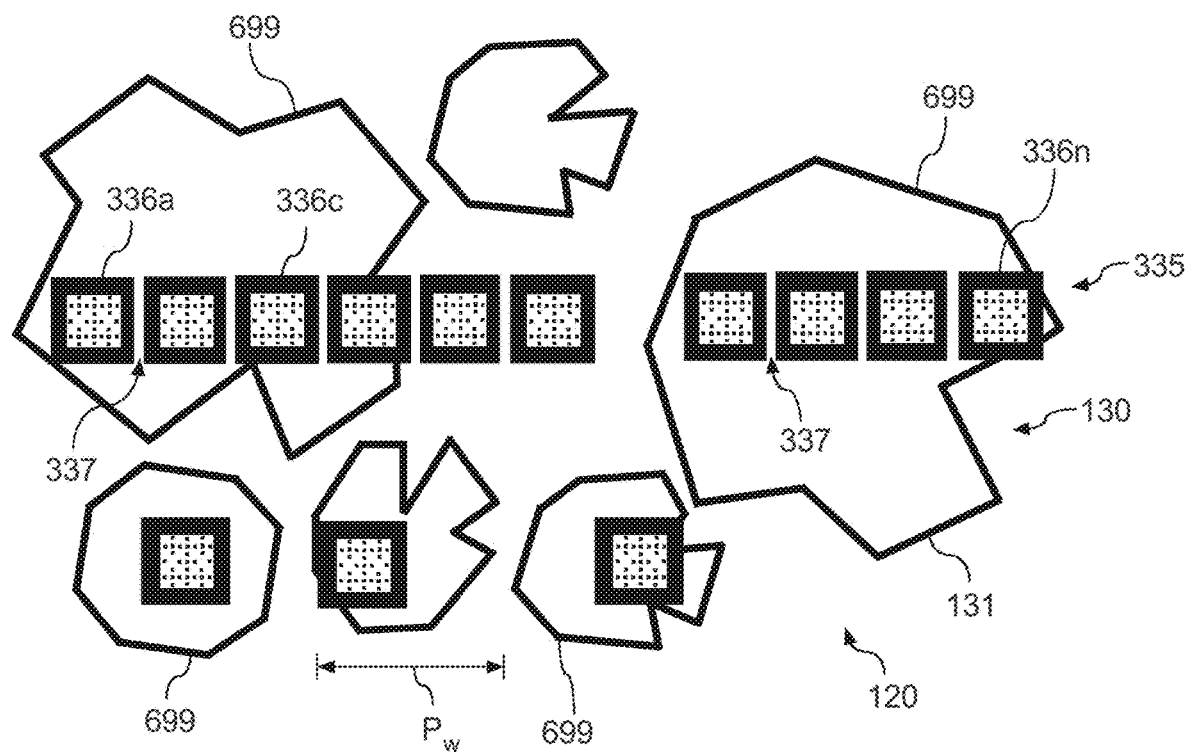
FIG. 6I schematically depicts a plurality of beam spots having a linear arrangement on a surface of a powder bed defined by a plurality of particles, wherein the space between adjacent beam spots has a space width that is less than an average particle size of the plurality of particles.

FIG. 6I schematically depicts a plurality of beam spots 336a-336n having a linear arrangement 335 on a build plane 130 formed by the powder material 120 defined by a plurality of particles 121. The space 337 between adjacent beam spots 336 has a space width that is less than an average particle size $P_w$ of the plurality of particles 121. In one embodiment, the space 337 between adjacent beam spots 336 has an aspect ratio of a width of each space 337 to a width $P_w$ of the beam spot 336 that is less than 0.5. In one embodiment, each space 337 width corresponds to the width between adjacent micromirrors from the beam generating device. For instance, referring to FIG. 5A, the micromirror elements of the subset of micromirror elements are spaced apart according to an aspect ratio of the space to a width of the micromirror elements that is less than 0.5.

As shown in FIGS. 7A-7D, a plurality of optical modulators 302 may be aligned with one another, for example, with respect to a reference axis 700. The plurality of optical modulators 302 aligned with respect to the reference axis 700 may be integrated into a common irradiation device 142. A plurality of optical modulators 302 aligned with respect to the reference axis 700 may correspond to a common beam combination group 616. Additionally, or in the alternative, a plurality of optical modulators 302 from separate beam combination group 616 and/or separate irradiation devices 142 may be aligned with respect to a reference axis 700. In some embodiments, a plurality of optical modulators 302 may be aligned in such a manner that at least some of the micromirror elements 308 of the respective optical modulators coincide with one another with respect to a reference axis 700. For example, as shown in FIGS. 7A-7D, a first micromirror element 308 of a first optical modulator 302 may be aligned with a second micromirror element 308 of a second optical modulator 302. Additionally, or in the alternative, a first plurality of micromirror elements 308 of a first optical modulator 302 may be aligned with a second plurality of micromirror elements 308 of a second optical modulator 302. The first micromirror element or plurality of micromirror elements 308 may be associated with a first modulation group 500, and/or the second micromirror element or plurality of micromirror elements 308 may be associated with a second modulation group 500. The reference axis 700 may transect the first micromirror element 308 of the first optical modulator 302 and the second micromirror element 308 of the second optical modulator 302. In some embodiments, the reference axis 700 may coincide with a direction of motion of the irradiation device 142 and/or a direction of motion relative to the powder bed 138. For example, the reference axis 700 may be parallel with the direction of motion. The reference axis 700 may correspond to an x-axis of an energy beam system 134. The orientation of the reference axis 700 may be determined in reference to the projection of corresponding combination zones 334 upon the build plane 130, rather than the physical orientation of the micromirror array 306 within an irradiation device 142. For example, it will be appreciated that an energy beam path may include a plurality of optical elements such as lenses, mirrors, and the like, such that the coordinates of a micromirror array 306 may correspond to the coordinate system of an energy beam system 134 regardless of the physical orientation of the micromirror array 306 within the irradiation device 142.

As shown, for example, in FIG. 7A, a first micromirror element 308 of a first optical modulator 302 may be aligned with a second micromirror element 308 of a second optical modulator 302. Additionally, or in the alternative, a first row or column of micromirror elements 308 of a first optical modulator 302 may be aligned with a second row or column of micromirror elements 308 of a second optical modulator 302. As shown, for example, in FIG. 7B, a first micromirror element 308 of a first optical modulator 302 may be offset with respect to a second micromirror element 308 of a second optical modulator 302. Additionally, or in the alternative, a first row or column of micromirror elements 308 of a first optical modulator 302 may be offset with respect to a second row or column of micromirror elements 308 of a second optical modulator 302. In some embodiments, the offset may correspond to a fraction of a pitch of the micromirror array 306. For example, the offset may correspond to one-half of the pitch of the micromirror array 306. The first micromirror element 308 and/or the first row of micromirror elements 308 may be associated with a first modulation group 500. The second micromirror element 308 and/or the second row of micromirror elements 308 may be associated with a second modulation group 500. A reference axis 700 may transect a first micromirror element 308 from among a first row of micromirror elements 308 of a first optical modulator 302. The reference axis 700 may transect a second micromirror element 308 from among a second row micromirror elements 308 of a second optical modulator 302. The reference axis 700 may be perpendicular to the first row of micromirror elements 308 and/or to the second row of micromirror elements 308.

As shown, for example, in FIG. 7A, the first micromirror element 308 and/or the first row of micromirror elements 308 may be centered on the reference axis 700. As shown, for example, in FIG. 7B, a second micromirror element 308 and/or the second row of micromirror elements 308 may be offset with respect to the reference axis 700, such as by a fraction of the pitch of the micromirror array 306. As shown in FIGS. 7C and 7D, a first row of micromirror elements 308 of a first optical modulator 302 and a second row of micromirror elements 308 of a second optical modulator 302 may partially overlap one another with respect to a reference axis 700. For example, as shown in FIG. 7C, a first micromirror element 308 from among a first row of micromirror elements 308 of a first optical modulator 302 may overlap a second micromirror element 308 from among a second row of micromirror elements 308 of a second optical modulator 302. The first micromirror element 308 may overlap the second micromirror element 308 by a distance that is less than the pitch of the micromirror array 306, such as one-half of the pitch of the micromirror array 306. Additionally, or in the alternative, as shown in FIG. 7D, a plurality of micromirror elements 308 from among the first row of micromirror elements 308 of the first optical modulator 302 may overlap a plurality of micromirror elements 308 from among the second row of micromirror elements 308.

Referring now to FIGS. 8A-8F, exemplary combination zones 334 are further described. As shown in FIGS. 8A-8F, a combination zone 334 represents a region along an irradiation beam path 316 at which a plurality of beam segments 400 are combined to at least partially overlap with one another. A combination zone 334 may coincide with a beam spot 336 upon the powder bed 138 that includes a region of the powder bed where the plurality of beam segments 400 become incident upon the powder material 120. Additionally, or in the alternative, a combination zone 334 may be located at least partially above and/or at least partially below the build plane 130 defined by the powder bed 138. In some embodiments, the configuration and arrangement of the combination zone 334 may be selected at least in part to provide a specified intensity and/or power density to the powder bed 138.

Figure 8C:
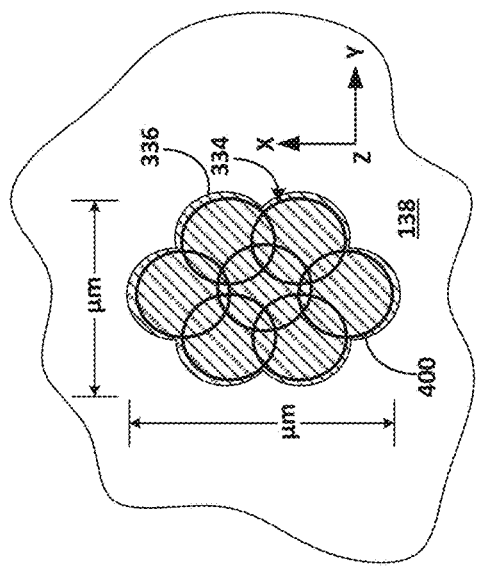
FIGS. 8A-8F schematically depict exemplary combination zones.
Figure 8B:
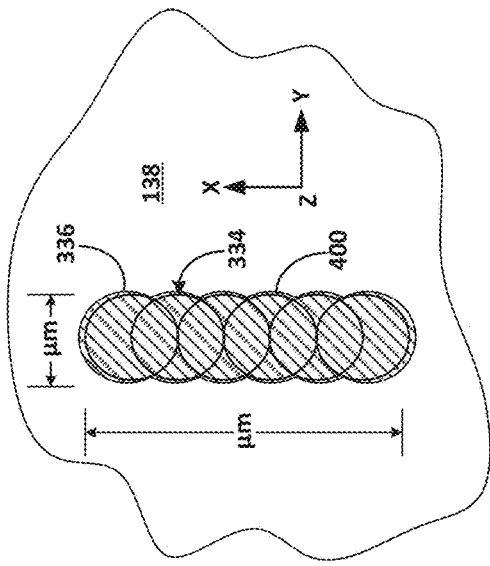
Figure 8A:
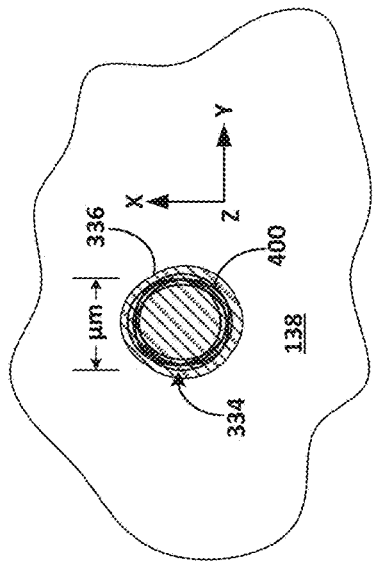
Figure 8F:
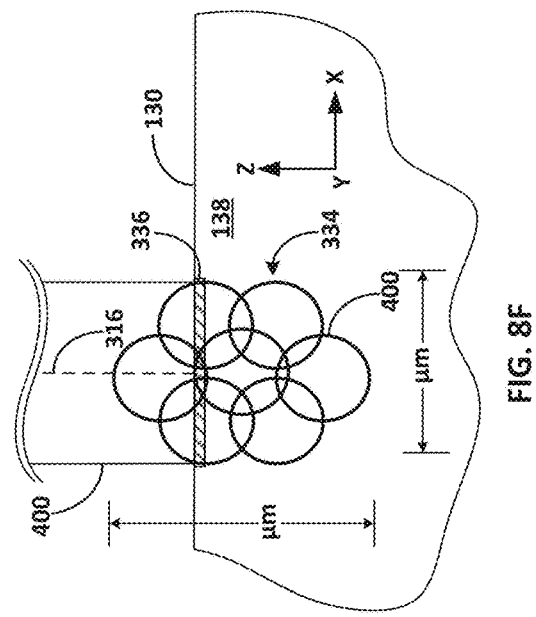
Figure 8E:
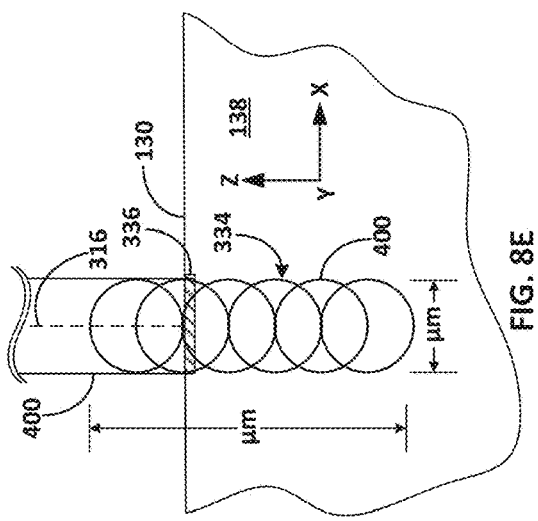
Figure 8D:
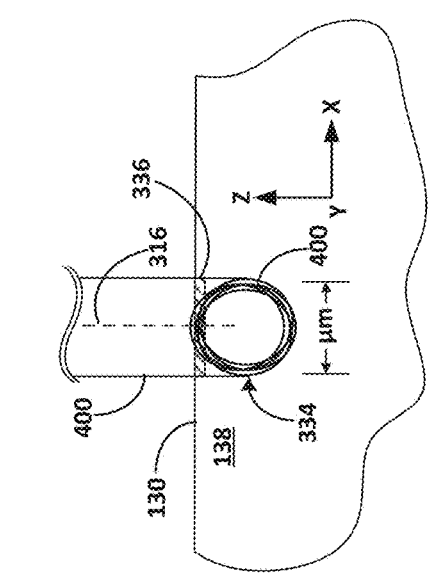

As shown in FIGS. 8A and 8D, the combination zone 334 may include a plurality of beam segments 400 that overlap with one another at a mutual location, such as a mutual location defined by mutual coordinates. For example, as shown in FIG. 8A, the combination zone 334 may include a plurality of beam segments 400 that share mutual coordinates in respect of an x-axis and a y-axis. Additionally, or in the alternative, as sown in FIG. 8D, the combination zone 334 may include a plurality of beam segments 400 that share mutual coordinates in respect of a z-axis, an/or as in respect of a z-axis and an x-axis. In some embodiments, FIGS. 8A and 8D may represent a combination zone 334 that includes a plurality of beam segments 400 that share mutual coordinates in respect of an x-axis, a y-axis, and a z-axis. A beam spot 336 corresponding to a combination zone 334 may have a cross-sectional area that coincided with a cross-sectional area of a respective beam segment 400, such as when the plurality of beam segments 400 corresponding to the combination zone 334 share mutual coordinates in respect of x-axis and a y-axis.

Additionally, or in the alternative, as shown in FIGS. 8B, 8C, 8E, and 8F, and a combination zone 334 may include a plurality of beam segments 400 that partially overlap with one another. In some embodiments, as shown, for example, in FIGS. 8C, 8D, and 8F, the beam spot 336 corresponding to the combination zone 334 may have a cross-sectional area that is larger than a cross-sectional area of a respective beam segment 400. For example, the combination zone 334 may include a plurality of beam segments 400 that have different coordinates from one another at least in respect of the x-axis and/or the y-axis. The respective beam segments may at least partially overlap with one another in respect of the x-axis and/or the y-axis, for example, such that the cross-sectional area of the beam spot 336 is larger than the cross-sectional area of a respective beam segment 400. Additionally, or in the alternative, as shown in FIGS. 8E and 8F, the combination zone 334 may include a plurality of beam segments 400 that have different coordinates from one another at least in respect of the z-axis. The plurality of beam segments 400 may at least partially overlap with one another at least in respect of the z-axis. Additionally, or in the alternative, as shown, for example, in FIG. 8E, the plurality of beam segments 400 may at least partially overlap with one another in respect of the z-axis, while having mutual coordinates in respect of the x-axis and/or the y-axis. As shown in FIG. 8F, the plurality of beam segments 400 may at least partially overlap with one another, while having differing coordinates in respect of the x-axis, the y-axis, and/or the z-axis.

Figure 9:
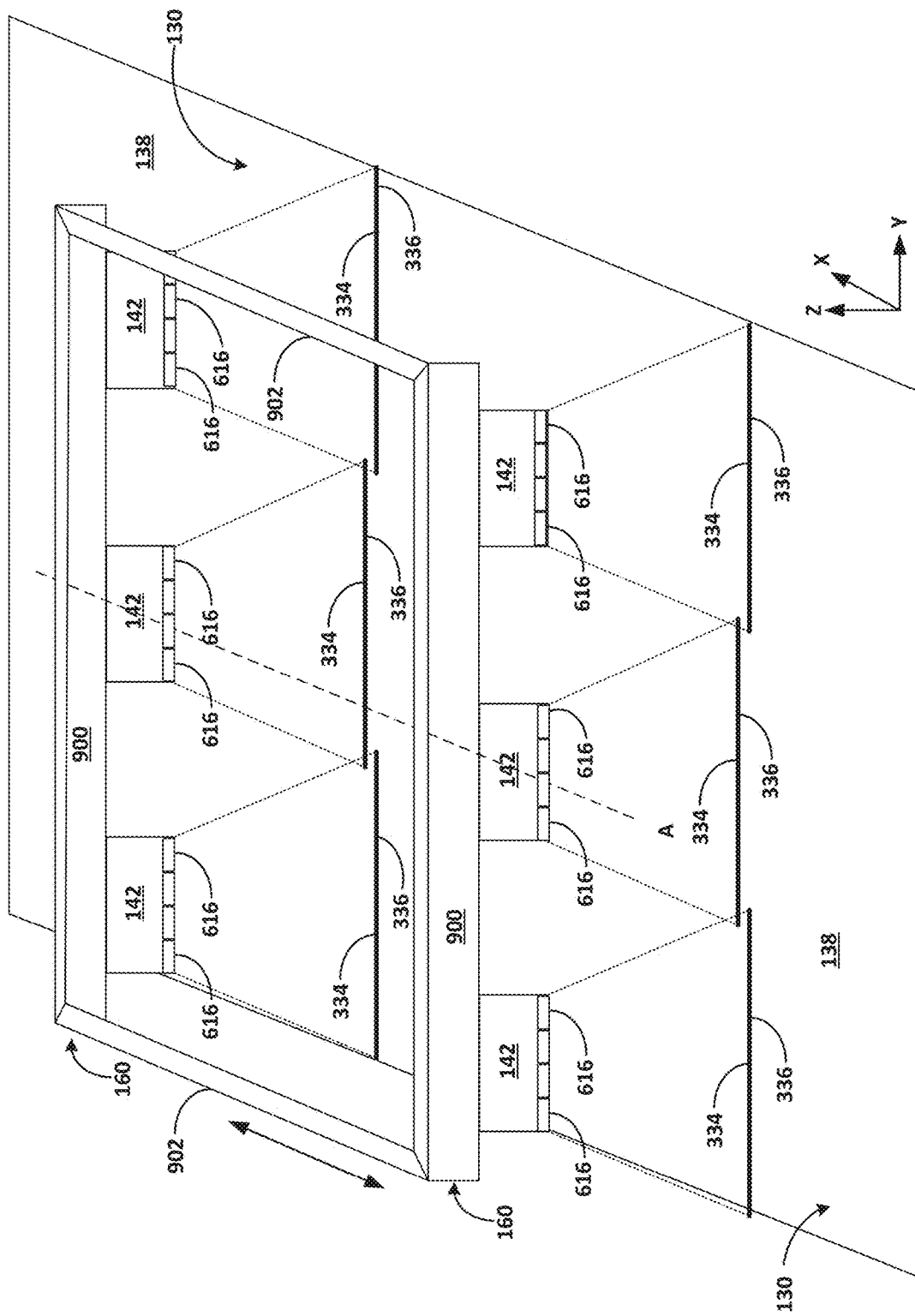
FIG. 9 schematically depicts an exemplary configuration of an energy beam system that includes a plurality of irradiation devices.

Referring now to FIG. 9, in some embodiments, an energy beam system 134 may include one or more housing assemblies 160 that respectively include a plurality of irradiation devices 142. A plurality of housing assemblies 160 may be coupled to one another. Additionally, or in the alternative, a plurality separate housing assemblies 160 may be provided. The plurality of housing assemblies 160 may be movable relative to the build plane 130, separately and/or as a group. For example, a plurality of housing assemblies 160 may be movable relative to the build plane 130 by way of a positioning system 156 coupled to the respective housing assemblies 160. Additionally, or in the alternative, the plurality of housing assemblies 160 may be movable relative to the build plane 130 by way of a build unit-positioning system 208 as shown, for example, in FIG. 2A, and/or by way of a build vessel-positioning system 212, as shown, for example, in FIG. 2B.

A housing assembly 160 may include a plurality of irradiation devices coupled to the housing assembly and/or disposed within the housing assembly 160. For example, a plurality of irradiation devices 142 may be coupled to a pylon 900. The pylon 900 may be disposed within the housing assembly 160 and/or the pylon 900 may define at least a portion of the housing assembly 160. A plurality of pylons 900 may be couple to one another by one or more joists 902. The one or more joists 902 may be disposed within the housing assembly 160 and/or the one or more joists 902 may define at least a portion of the housing assembly 160. Additionally, or in the alternative, one or more joists 902 may be coupled to an exterior portion of a respective housing assembly 160.

As shown in FIG. 9, respective ones of the plurality of irradiation devices 142 may include one or more beam combination groups 616. The one or more beam combination groups 616 may respectively include one or more optical modulators 302 and a corresponding one or more focusing lens assemblies 312. The one or more beam combination groups 616 may respectively provide a plurality of beam segment-subsets 408 that respectively include a plurality of beam segments 400 that combine with one another at a combination zone 334. A plurality of combination zones 334 corresponding to the one or more beam combination groups 616 of a respective irradiation device 142 may exhibit a linear or curvilinear pattern. Additionally, or in the alternative, a plurality of beam spots 336 upon the powder bed 138 corresponding to the plurality of combination zones 334 may exhibit a linear or curvilinear pattern. As shown in FIG. 9, the linear or curvilinear pattern of combination zones 334 and/or beam spots 336 corresponding to respective irradiation devices 142 and/or the respective beam combination groups 616 may be coordinated with one another, for example, to extend across a region of the powder bed 138. A first linear or curvilinear pattern of combination zones 334 and/or beam spots 336 corresponding to a first irradiation device 142 and/or a first one or more beam combination groups 616 may be at least partially aligned with a second linear or curvilinear pattern of combination zones 334 and/or beam spots 336 corresponding to a second irradiation device 142 and/or a second one or more beam combination groups 616. In some embodiments, the first linear or curvilinear pattern of combination zones 334 and/or beam spots 336 may overlap with the second linear or curvilinear pattern of combination zones 334 and/or beam spots 336 in respect of one or more axes of the build plane 130, such as in respect of the y-axis of the build plane 130.

A first housing assembly 160 and/or a first pylon 900 may be disposed in front of a second housing assembly 160 and/or a second pylon 900. When the respective beam spots 336 propagate across the build plane 130, the beam spots 336 corresponding to the first housing assembly 160 and/or the first pylon 900 may become incident upon a region of the powder bed 138 prior to the beam spots 336 corresponding to the second housing assembly 160 and/or the second pylon 900. In some embodiments, a first one or more irradiation devices 142 and/or a first one or more beam combination groups 616 associated with a first housing assembly 160 and/or a first pylon 900 may be utilized for preheating. For example, the first one or more irradiation devices 142 and/or the first one or more beam combination groups 616 may provide a plurality of beam spots 336 that impart energy to the powder bed 138 at a level selected to preheat the powder material 120, for example, without melting and/or fusing the powder material 120. Additionally, or in the alternative, a second one or more irradiation devices 142 and/or a second one or more beam combination groups 616 associated with a second housing assembly 160 and/or a second pylon 900 may provide irradiation sufficient to melt and/or fuse the powder material 120. For example, the second one or more irradiation devices 142 and/or the second one or more beam combination groups 616 may provide a plurality of beam spots 336 that melt and/or fuse the powder material 120 in accordance with a conduction irradiation regime. The intensity and/or power density of the plurality of beam spots 336 from the second one or more irradiation devices 142 and/or the second one or more beam combination groups 616 may be greater than the intensity and/or power density of the plurality of beam spots 336 from the first one or more irradiation devices 142 and/or the first one or more beam combination groups 616.

In some embodiments, a third one or more irradiation devices 142 and/or a third one or more beam combination groups 616 associated with a third housing assembly 160 and/or a third pylon 900 may provide post-heating. For example, the third one or more irradiation devices 142 and/or the third one or more beam combination groups 616 may provide a plurality of beam spots 336 that impart energy to the powder bed 138 at a level selected to post-heat the powder material 120, for example, while allowing the melted and/or fused powder material to cool and/or while allowing a melt pool to solidify, for example, at a controlled rate. The intensity and/or power density of the plurality of beam spots 336 from the third one or more irradiation devices 142 and/or the third one or more beam combination groups 616 may be less than the intensity and/or power density of the plurality of beam spots 336 from the second one or more irradiation devices 142 and/or the second one or more beam combination groups 616.

It will be appreciated that, while two rows of irradiation devices 142 and/or beam combination groups 616 are shown in FIG. 9, any number of rows of irradiation devices 142 and/or beam combination groups 616 may be provided. For example, a first row of irradiation devices 142 and/or beam combination groups 616 may provide preheating. A second row of irradiation devices 142 and/or beam combination groups 616 may melt and/or fuse the powder material 120, for example, in accordance with a conduction irradiation regime. A third row of irradiation devices 142 and/or beam combination groups 616 may provide preheating. Additionally, or in the alternative, a first row of irradiation devices 142 and/or beam combination groups 616 may melt and/or fuse the powder material 120, for example, in accordance with a conduction irradiation regime, and a second row of irradiation devices 142 and/or beam combination groups 616 may provide preheating.

Referring now to FIGS. 10A-10F, exemplary irradiation sequences are further described. As shown in FIGS. 10A-10F, a build plane 130 that includes a powder bed 138 may be described with reference to a build array 1000 that includes a plurality of build points 1002. As shown, respective build points 1002 in the build array 1000 may be identified with reference to a coordinate system, such as an (X,Y,Z) cartesian coordinate system. FIGS. 10A-10C schematically depict a perspective view of a build plane 130, with a build array 1000 being irradiated by an irradiation device 142 according to an exemplary irradiation sequence. By way of example, the build array 1000 includes build points 1002 located from (X1,Y1) to (X5,Y5). FIGS. 10D-10F schematically depict a side view of the irradiation sequence depicted in FIGS. 10A-10C, respectively, with respect to column Y2 of the build array 1000. As shown in FIGS. 10D-10F, relative movement between the irradiation device 142 and the build plane 130 and/or build array 1000 may include the irradiation device moving from right to left and/or the build plane 130 moving from left to right. As shown, an exemplary irradiation sequence may include a plurality of beam spots 336 propagating across the build plane and/or the build array 1000 with relative movement between the irradiation device 142 and the build plane 130 and/or build array 1000. Additionally, or in the alternative, an exemplary irradiation sequence may include a plurality of beam spots 336 propagating across the build plane and/or the build array 1000 with movement of the plurality of beam segment-subsets 408 corresponding to the plurality of beam spots 336 relative to the build plane and/or the build array 1000.

As shown in FIG. 10A, an irradiation device 142 may reflect a plurality of beam spots 336 onto the build plane 130. The plurality of beam spots 336 may respectively correspond to a plurality of combination zones 334. Respective ones of the plurality of beam spots 336 and/or the plurality of combination zones 334 may correspond to a beam combination group 616 of the irradiation device and/or a modulation group 500 of the optical modulator 302. The respective beam spots 336 may become incident upon a corresponding build point 1002 of the build array 1000. For example, a plurality of adjacent beam spots 336 may become incident upon a corresponding plurality of adjacent build points 1002. The plurality of adjacent beams pots 336 and/or the corresponding plurality of adjacent build points 1002 may define a pattern, such as a linear or curvilinear pattern. Irradiation from the plurality of beam spots 336 may provide a plurality of irradiated beam spots 1004. The irradiated beam spots 1004 may be preheated, melted or sintered, and/or post-heated by the plurality of beam spots. The irradiation provided by the plurality of beam spots 336 may respectively include a plurality of beam segments 400 defining beam segment-subset 408 corresponding to a respective modulation group 500 and/or a respective beam combination group 616. Respective modulation groups 500 and/or corresponding micromirror elements 308 may be modulated according to modulation instructions from a control system 104. The modulation instructions may cause the optical modulator 302 to modulate respective modulation groups 500 and/or corresponding micromirror elements 308 based at least in part on a build file that defines build points 1002 of a build array 1000 to be irradiated in order to additively manufacture a three-dimensional object 114.

As shown in FIGS. 10A and 10D, a plurality of beam spots 336 may become incident upon a first plurality of build points 1002 of the build array 1000. The first plurality of build points 1002 may have coordinates located at (X1,Y1)

through (X1,Y5). As shown in FIGS. 10A and 10D, the plurality of beam spots 336 may irradiate the first plurality of build points 1002. As shown in FIGS. 10B and 10E, the irradiation from the plurality of beam spots 336 may provide a first plurality of irradiated build points 1006, while relative movement between the irradiation device 142 and the build plane 130 may advance the plurality of beam spots 336 to a second plurality of build points 1008. The second plurality of build points 1008 may be adjacent to the first plurality of build points 1002 and/or to the first plurality of irradiated build points 1006.

As shown in FIG. 10B, the second plurality of build points 1008 may have coordinates located at (X2,Y1), (X2,Y2), (X2,Y4), and (X2,Y5). The modulation instructions may be configured to cause the build point 1002 located at (X2,Y2) not to receive a beam spot 336. The build point 1002 located at (X2,Y2) may receive no irradiation, for example, when modulation instructions do not include instructions to irradiate the build point 1002. For example, the build point 1002 may not define part of an object 114 being additively manufactured, and/or additional irradiation may be unnecessary at the build point 1002. The modulation group 500 and/or corresponding micromirror elements 308 corresponding to the build point 1002 located at (X2,Y2) may be modulated so as to direct the respective plurality of beam segments 400 along an extraction beam path 318, for example, leading to a beam stop 314 (see, e.g., FIGS. 3A and 3B, FIG. 4B). Thus, the beam segment-subset 408 corresponding to the build point 1002 located at (X2,Y2) may be directed along the extraction beam path 318 rather than directing the plurality of beam segments 400 along an irradiation beam path 316 through the focusing lens assembly 312 and leading to the build point located at (X2,Y2).

As shown in FIGS. 10B and 10E, the plurality of beam spots 336 may irradiate the second plurality of build points 1008. As shown in FIGS. 10C and 10F, the irradiation from the plurality of beam spots 336 may provide a second plurality of irradiated build points 1010, while relative movement between the irradiation device 142 and the build plane 130 may advance the plurality of beam spots 336 to a third plurality of build points 1012. The third plurality of build points 1012 may be adjacent to the second plurality of build points 1008 and/or to the second plurality of irradiated build points 1010.

As shown in FIG. 10C, the third plurality of build points 1012 may have coordinates located at (X3,Y2), (X3,Y3), and (X3,Y5). The modulation instructions may be configured to cause the build point 1002 located at (X3,Y1) and (X3,Y4) not to receive a beam spot 336. The modulation groups 500 and/or corresponding micromirror elements 308 corresponding to the build points 1002 located at (X3,Y1) and (X3,Y4) may be modulated so as to direct the respective plurality of beam segments 400 along an extraction beam path 318, for example, leading to a beam stop 314 (see, e.g., FIGS. 3A and 3B, FIG. 4B). Thus, the respective beam segment-subsets 408 corresponding to the build points 1002 located at (X3,Y1) and (X3,Y4) may be directed along the extraction beam path 318 rather than directing the plurality of beam segments 400 along an irradiation beam path 316 through the focusing lens assembly 312 and leading to the build points respectively located at (X3,Y1) and (X3,Y4). The plurality of beam spots 336 may irradiate the third plurality of build points 1008, and so-on, as relative movement between the irradiation device 142 and the build plane 130 advances the plurality of beam spots 336 to successive regions of the build array 1000.

The irradiation sequence described with reference to FIGS. 10A-10F may represent preheating, melting or sintering, and/or post-heating. In some embodiments, one or more preheating treatments may be performed using the irradiation sequence described with reference to FIGS. 10A-10F, followed by one or more melting or sintering treatment performed using the irradiation sequence described with reference to FIGS. 10A-10F. Additionally, or in the alternative, one or more melting or sintering treatments may be performed using the irradiation sequence described with reference to FIGS. 10A-10F, followed by one or more post-heating treatment performed using the irradiation sequence described with reference to FIGS. 10A-10F. The preheating treatment may precede the melting or sintering by any suitable interval, and/or the melting or sintering treatment may precede the post-heating treatment by any suitable interval. Additionally, or in the alternative, a plurality of preheating treatments may be separated by any suitable interval, a plurality of melting or sintering treatments may be separated by any suitable interval, and/or a plurality of post-heating treatments may be separated by any suitable interval. The respective interval or intervals may be described with reference to a number of build points 1002 and/or with reference to time.

In some embodiments, a first plurality of built points 1002 undergoing a first treatment may be adjacent to a second plurality of build points 1002 undergoing a second treatment. Additionally, or in the alternative, a first plurality of build points 1002 undergoing a first treatment and a second plurality of build points 1002 undergoing a second treatment may be separated from one another by an interval defined by a plurality of build points 1002. The number of build points 1002 separating the first plurality of build points 1002 undergoing the first treatment and the second plurality of build points 1002 undergoing the second treatment may be determined based at least in part on a thermal conductivity of the powder material 120. Additionally, or in the alternative, the number of build points 1002 of separation may be determined based at least in part on a rate of relative movement between the irradiation device 142 and the build plane 130. The first treatment may be a preheating treatment and the second treatment may be a melting or sintering treatment. Additionally, or in the alternative, the first treatment may be a melting or sintering treatment and the second treatment may be a post-heating treatment. Additionally, or in the alternative, the first treatment may be a first preheating treatment and the second treatment may be a second preheating treatment. Additionally, or in the alternative, the first treatment may be a first melting or sintering treatment and the second treatment may be a second melting or sintering treatment. Additionally, or in the alternative, the first treatment may be a first post-heating treatment and the second treatment may be a second post-heating treatment.

In some embodiments, the number of build points 1002 of separation may allow for a rate of heating imparted by the first treatment at a respective build point 1002 to cause the temperature of the respective build point 1002 to change at a specified rate that depends at least in part on the thermal conductivity of the powder material 120. For example, the rate of heating imparted by the first treatment may cause the temperature of the respective build point 1002 to change at a rate limited by the thermal conductivity of the powder material 120. Additionally, or in the alternative, the number of build points 1002 of separation may allow for a rate of heating imparted by the second treatment at a respective build point 1002 to cause the temperature of the respective build point 1002 to change at a specified rate that depends at least in part on the thermal conductivity of the powder material 120. For example, the rate of heating imparted by the second treatment may cause the temperature of the respective build point 1002 to change at a rate limited by the thermal conductivity of the powder material 120. The thermal conductivity of the powder material 120 may be determined based at least in part on the composition of the powder material 120 and/or based at least in part on the extent to which the powder material has been consolidated, for example, melted or sintered, by the respective treatments.

Figure 11A:
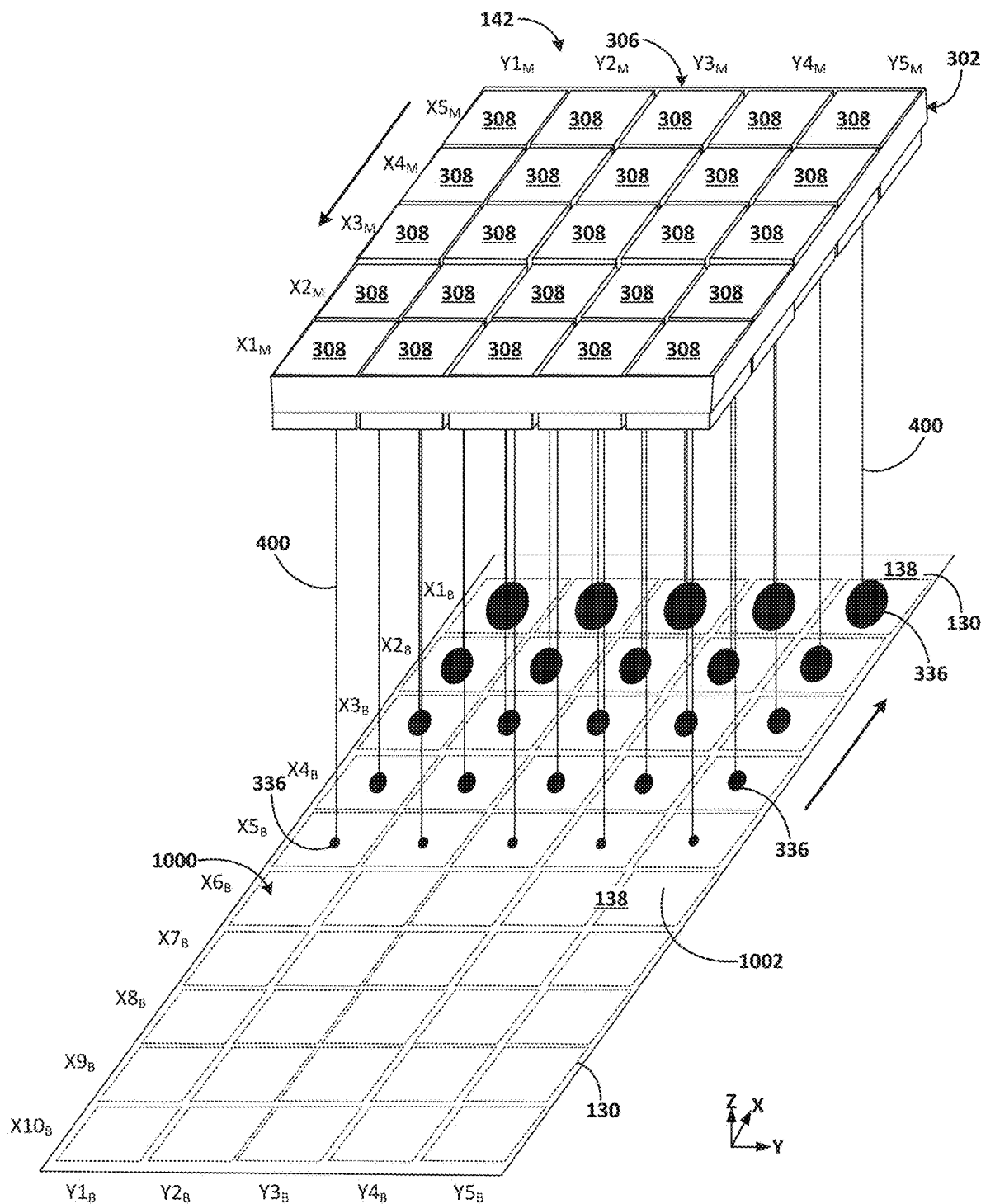
FIG. 11A schematically depicts a perspective view of a build plane being irradiated by an irradiation device according to another exemplary irradiation sequence.

Referring now to FIGS. 11A-11G, another exemplary irradiation sequence is described. FIGS. 11A-11G show a build plane 130 that includes a powder bed 138 that may be described with reference to a build array 1000 that includes a plurality of build points 1002. The respective build points 1002 in the build array 1000 may be identified with reference to a coordinate system, such as an (X,Y,Z) cartesian coordinate system. FIG. 11A schematically depicts a perspective view of the build plane 130, with the build array 1000 being irradiated by an irradiation device 142 according to an exemplary irradiation sequence. By way of example, the build array 1000 includes build points 1002 located from (X1,Y1) to (X10,Y5). FIGS. 11B-11G schematically depict a side view of the irradiation sequence depicted in FIG. 11A, with respect to column Y2 of the build array 1000.

As shown in FIG. 11A, an irradiation device 142 may include an optical modulator 302 configured to reflect a plurality of beam segments 400 onto the build plane 130. The plurality of beam spots 336 may respectively correspond to one or more beam segments 400 reflected by a respective micromirror element 308 of a micromirror array 306. In some embodiments, a micromirror array 306 may include a plurality of micromirror elements 308 that are respectively configured to reflect a beam segment 400 along an irradiation beam path 316 to respective ones of a corresponding plurality of build points 1002 of a build array 1000. The micromirror array 306 and the build array 1000 may be related to one another by a mapping relationship. The mapping relationship may include respective micromirror elements 308 of the micromirror array 306 associated with or coordinated to respective build points 1002 in the build array 1000. As shown, the optical modulator 302 may include a micromirror array 306 that includes micromirror elements 308 with coordinates $(X1_M, Y1_M)$ through $(X5_M, Y5_M)$. Additionally, or in the alternative, the build plane 130 may include a build array 1000 that includes build points 1002 with coordinates $(X1_B, Y1_B)$ through $(X10_B, Y5_B)$.

As shown in FIG. 11A, the micromirror elements 308 with coordinates $(X1_M, Y1_M)$ through $(X5_M, Y5_M)$ may be mapped or coordinated to the build points 1002 with coordinates $(X1_B, Y1_B)$ through $(X5_B, Y5_B)$. For example, a micromirror element 308 located at $(X1_M, Y1_M)$ may provide a beam segment 400 that becomes incident upon a build point located at $(X5_B, Y1_B)$. Additionally, or in the alternative, a micromirror element 308 located at $(X5_M, Y5_M)$ may provide a beam segment 400 that becomes incident upon a build point located at $(X1_B, Y5_B)$. As the beam segments 400 propagate across the build plane 130 and/or the build array 1000, for example, with relative motion between the build plane 130 and the plurality of beam segments 400, and/or with relative motion between the irradiation device 142 and the build plane 130, the mapping relationship between the micromirror array 306 and the build array 1000 may increment. The mapping relationship may increment such that at a first increment, a first micromirror element 308 located at a first position in the micromirror array 306 may provide a first beam segment 400 that becomes incident upon a first build point 1002 in the build array 1000, and at a second increment, the first micromirror element 308 located at the first position in the micromirror array 306 may provide a second beam segment 400 that becomes incident upon a second build point 1002 in the build array 1000. For example, at a first increment, a micromirror element 308 located at $(X1_M, Y1_M)$ may provide a beam segment 400 that becomes incident upon a build point located at $(X5_B, Y1_B)$, and/or at a second increment the micromirror element 308 located at $(X1_M, Y1_M)$ may provide a beam segment 400 that becomes incident upon a build point located at $(X6_B, Y1_B)$. Additionally, or in the alternative, at a first increment, a micromirror element 308 located at $(X5_M, Y5_M)$ may provide a beam segment 400 that becomes incident upon a build point located at $(X1_B, Y5_B)$, and/or at a second increment, a micromirror element 308 located at $(X5_M, Y5_M)$ may provide a beam segment 400 that becomes incident upon a build point located at $(X2_B, Y5_B)$.

Respective build points 1002 may receive irradiation from a plurality of beam segments 400 respectively corresponding to a plurality of micromirror elements 308. The plurality of micromirror elements 308 may define a modulation group 500 and/or may be part of a modulation group 500. The plurality of beam segments 400 may propagate incrementally across the build array such that the plurality of build points receive irradiation from at least some of the plurality of beam segments with relative motion between the plurality of beam segments 400 and the build plane 130, and/or with relative motion between the irradiation device 142 and the build plane 130. Additionally, or in the alternative, the mapping of the micromirror elements 308 to the build points 1002 may increment with relative motion between the plurality of beam segments 400 and the build plane 130, and/or with relative motion between the irradiation device 142 and the build plane 130. The plurality of build points may receive irradiation from at least some of the plurality of beam segments 400. The irradiation imparted to a respective build point may be imparted sequentially by a plurality of beam segments 400. For example, respective ones of a plurality of beam segments 400 may become incident upon the build plane 130 without overlapping with one another, and the respective beam segments 400 may become incident upon a respective build point sequentially with such relative motion. Additionally, or in the alternative, respective ones of the plurality of micromirror elements 308 in the modulation group 500 may respectively provide a fraction of the total energy imparted to a respective build point 1002. For example, respective ones of the plurality of micromirror elements 308 in a modulation group 500 may respectively provide a pro-rata portion of the total energy imparted to a respective build point 1002. Additionally, or in the alternative, respective ones of the plurality of micromirror elements 308 in a modulation group 500 may respectively provide a weighted portion of the total energy imparted to a respective build point 1002. The weighted portion may differ as between respective ones of the plurality of micromirror elements 308 in the modulation group 500.

As depicted in FIG. 11A, the beam spots 336 on the respective build points 1002 are shown with increasing size to illustrate an increasing proportion of energy imparted to the respective build points 1002 as the plurality of beam segments propagate across the build array 1000, for example, with relative motion between the irradiation device 142 and the build plane 130. The total number of micromirror elements 308 that provide a corresponding beam segment 400 to a respective build point 1002 may be selected based at least in part on the total quantity of energy to be imparted to the respective build point 1002. By way of example, five micromirror elements 308 may sequentially provide about a corresponding beam segment 400 that imparts about twenty percent (20%) of the total energy imparted to the respective build point 1002. As shown in FIG. 11A, the build points 1002 located at $(X5_B,Y1_B)$ through $(X5_B,Y5_B)$ of the build array 1000 may receive irradiation from a beam segment 400 corresponding to the micromirror element 308 respectively located at $(X1_M,Y1_M)$ through $(X1_M,Y5_M)$ of the micromirror array 306. In some embodiments, the irradiation imparted to the respective build points 1002 located at $(X5_B,Y1_B)$ through $(X5_B,Y5_B)$ of the build array 1000 at the point of the irradiation sequence depicted in FIG. 11A may represent about twenty percent (20%) of the total energy to be imparted to the respective build points 1002 located at $(X5_B,Y1_B)$ through $(X5_B,Y5_B)$. Additionally, or in the alternative, the build points 1002 located at $(X1_B,Y1_B)$ through $(X1_B,Y5_B)$ of the build array 1000 may receive irradiation sequentially from a plurality of beam segments 400 respectively corresponding to the micromirror element 308 located at $(X1_M,Y1_M)$ through $(X5_M,Y5_M)$ of the micromirror array 306. For example, the build point 1002 located at $(X1_B,Y1_B)$ may receive irradiation sequentially from a plurality of beam segments 400 respectively corresponding to the micromirror element 308 located at $(X1_M,Y1_M)$ through $(X5_M,Y1_M)$ of the micromirror array 306. Likewise, the build point 1002 located at $(X1_B,Y5_B)$ may receive irradiation sequentially from a plurality of beam segments 400 respectively corresponding to the micromirror element 308 sequentially located at $(X1_M,Y5_M)$ through $(X5_M,Y5_M)$ of the micromirror array 306. In some embodiments, the irradiation imparted to the respective build points 1002 located at $(X1_B,Y1_B)$ through $(X1_B,Y5_B)$ of the build array 1000 at the point of the irradiation sequence depicted in FIG. 11A may represent about one-hundred percent (100%) of the total energy to be imparted to the respective build points 1002 located at $(X5_B,Y1_B)$ through $(X5_B,Y5_B)$. For example, as shown, respective micromirror elements 308 may provide a beam segment 400 that imparts a respective twenty percent (20%) of the total energy imparted to the respective build point 1002. In some embodiments, the proportion of energy imparted to a build point 1002 by a respective micromirror element 308 may be from about 0.01% to about 50%, such as from about 0.01% to about 20%, such as from about 0.1% to about 20%, such as from about 1% to about 10%, such as from about 1% to about 5%, such as from about 10% to about 20%, or such as from about 20% to about 50%.

FIGS. 11B-11G depict a further exemplary irradiation sequence. The irradiation sequence depicted in FIGS. 11B-11G may represent a subsequent portions of the exemplary irradiation sequence depicted in FIG. 11A. For example, FIG. 11B may depict a side view of a portion of the irradiation sequence depicted in FIG. 11A corresponding to column $(Y2_M)$ of the micromirror array 306 and column $(Y2_B)$ of the build array 1000. As shown in FIGS. 11B-11G, relative movement between the irradiation device 142 and the build plane 130 and/or build array 1000 may include the irradiation device moving from right to left and/or the build plane 130 moving from left to right. The build points 1002 may receive a sequential dose of irradiation from a plurality of beam segments 400 respectively corresponding to a plurality of micromirror elements 308 in a modulation group 500. The plurality of micromirror elements 308 that provide the corresponding plurality of beam segments 400 may be adjacent to one another and/or spaced apart from one another. The plurality of beam segments 400 corresponding to the respective micromirror elements 308 in the modulation group 500 may become incident upon respective ones of a plurality of build points 1002 in sequence, for example, with relative movement between the irradiation device 142 and the build plane 130 and/or build array 1000. The build points 1002 shown in FIGS. 11B-11G are shaded to represent a proportion of irradiation relieved by the sequence of beam segments 400 becoming incident upon the respective build point 1002.

Figure 11B:
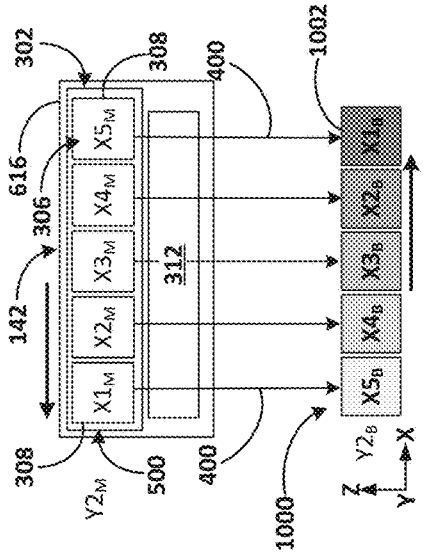
FIGS. 11B-11G schematically depict a side view of an exemplary irradiation sequence that may include the irradiation sequence depicted in FIG. 11A.

At a point in the irradiation sequence depicted in FIG. 11B, the micromirror array 306 and the build array 1000 may be mapped or coordinated to one another, for example, such that the micromirror elements 308 located at $(X1_M, Y2_M)$ through $(X5_M,Y2_M)$ may be mapped or coordinated with the build points 1002 respectively located at $(X5_B,Y2_B)$ through $(X1_B,Y2_B)$. The build point 1002 located at $(X5_B, Y2_B)$ of the build array 1000 may receive irradiation from a beam segment 400 corresponding to the micromirror element 308 located at $(X1_M,Y2_M)$ of the micromirror array 306. The build point 1002 located at $(X4_B,Y2_B)$ of the build array 1000 may receive irradiation from a beam segment 400 corresponding to the micromirror element 308 located at $(X2_M,Y2_M)$ of the micromirror array 306 and may have previously received irradiation from a beam segment 400 corresponding to the micromirror element 308 located at $(X1_M,Y2_M)$ of the micromirror array 306. The build point 1002 located at $(X3_B,Y2_B)$ of the build array 1000 may receive irradiation from a beam segment 400 corresponding to the micromirror element 308 located at $(X3_M,Y2_M)$ of the micromirror array 306, and may have previously received irradiation from a beam segment 400 corresponding to the micromirror element 308 located at $(X2_M,Y2_M)$ of the micromirror array 306 and from a beam segment 400 corresponding to the micromirror element 308 located at $(X1_M,Y2_M)$ of the micromirror array 306. The build point 1002 located at $(X2_B,Y2_B)$ of the build array 1000 may receive irradiation from a beam segment 400 corresponding to the micromirror element 308 located at $(X4_M,Y2_M)$ of the micromirror array 306, and may have previously received irradiation from a beam segment 400 corresponding to the micromirror element 308 located at $(X3_M,Y2_M)$ of the micromirror array 306, from a beam segment 400 corresponding to the micromirror element 308 located at $(X2_M, Y2_M)$ of the micromirror array 306, and from a beam segment 400 corresponding to the micromirror element 308 located at $(X1_M,Y2_M)$ of the micromirror array 306. The build point 1002 located at $(X1_B,Y2_B)$ of the build array 1000 may receive irradiation from a beam segment 400 corresponding to the micromirror element 308 located at $(X5_M,Y2_M)$ of the micromirror array 306, and may have previously received irradiation from a beam segment 400 corresponding to the micromirror element 308 located at $(X4_M,Y2_M)$ of the micromirror array 306, from a beam segment 400 corresponding to the micromirror element 308 located at $(X3_M,Y2_M)$ of the micromirror array 306, from a beam segment 400 corresponding to the micromirror element 308 located at $(X2_M,Y2_M)$ of the micromirror array 306, and from a beam segment 400 corresponding to the micromirror element 308 located at $(X1_M,Y2_M)$ of the micromirror array 306.

Figure 11C:
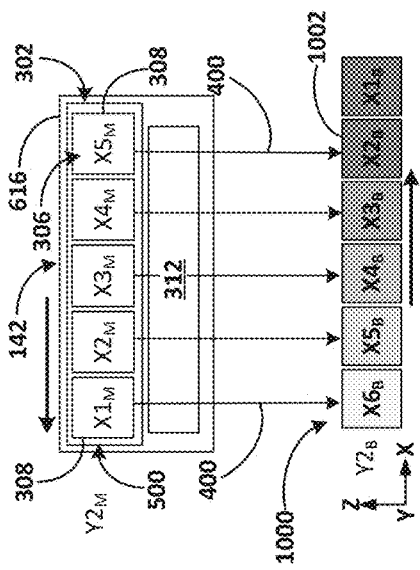
Figure 11D:
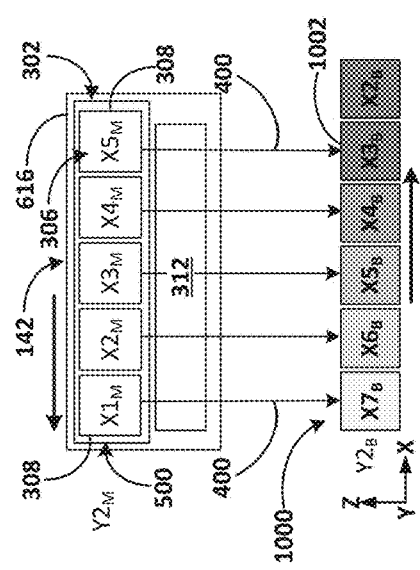
Figure 11E:
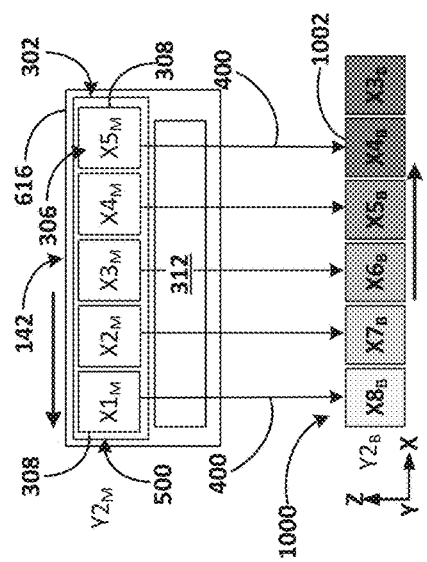
Figure 11F:
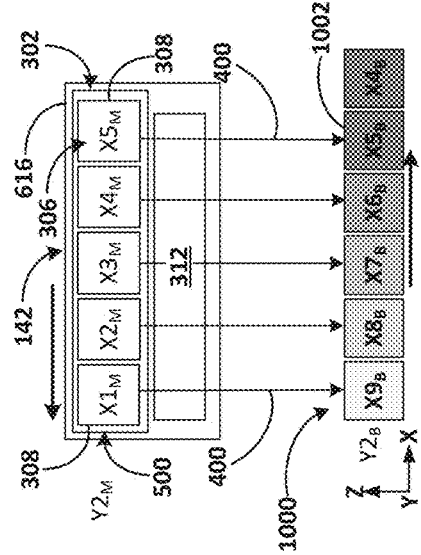

As shown in FIG. 11C, with relative movement between the irradiation device 142 and the build plane 130 and/or build array 1000, mapping between the micromirror elements 308 of the micromirror array 306 and the build points 1002 of the build array may increment from the point in the irradiation sequence depicted in FIG. 11B, for example, such that the micromirror elements 308 located at $(X1_M, Y2_M)$ through $(X5_M, Y2_M)$ may be mapped or coordinated with the build points 1002 respectively located at $(X6_B, Y2_B)$ through $(X2_B, Y2_B)$. At the point in the irradiation sequence depicted in FIG. 11C, the build point 1002 located at $(X6_B, Y2_B)$ may receive irradiation from a first beam segment 400 corresponding to the micromirror element 308 located at $(X1_M, Y2_M)$ of the micromirror array 306. The irradiation from the first beam segment 400 corresponding to the micromirror element 308 located at $(X1_M, Y2_M)$ of the micromirror array 306 may be the first or initial dose of irradiation received by the build point 1002 located at $(X6_B, Y2_B)$ for the irradiation sequence depicted in FIGS. 11B-11G. Additionally, or in the alternative, the build point 1002 located at $(X2_B, Y2_B)$ may receive irradiation from a fifth beam segment 400 corresponding to the micromirror element 308 located at $(X5_M, Y2_M)$ of the micromirror array 306. The irradiation from the fifth beam segment 400 corresponding to the micromirror element 308 located at $(X5_M, Y2_M)$ of the micromirror array 306 may be the fifth or concluding dose of irradiation received by the build point 1002 located at $(X2_B, Y2_B)$ for the irradiation sequence depicted in FIGS. 11B-11G. The build points 1002 located at $(X5_B, Y2_B)$ through $(X3_B, Y2_B)$ of the build array 1000 may respectively receive irradiation from beam segments corresponding to the micromirror elements 308 respectively located at $(X2_M, Y2_M)$ through $(X4_M, Y2_M)$ of the micromirror array, which may represent the second, third, and fourth dose of irradiation received by the build points 1002 located at $(X5_B, Y2_B)$ through $(X3_B, Y2_B)$ of the build array 1000. The build point 1002 located at $(X1_B, Y2_B)$ may receive no irradiation, having previously received irradiation from a sequence of beam segments 400 corresponding to the micromirror elements 308 respectively located at $(X1_M, Y2_M)$ through $(X5_M, Y2_M)$.

The irradiation sequence may similarly increment as shown, for example, in FIGS. 11D through 11G, with relative movement between the irradiation device 142 and the build plane 130 and/or build array 1000. Mapping between the micromirror elements 308 of the micromirror array 306 and the build points 1002 of the build array may increment from the respective preceding point in the irradiation sequence, for example, to a point in the irradiation sequence shown in FIG. 11G, such that the micromirror elements 308 located at $(X1_M, Y2_M)$ through $(X5_M, Y2_M)$ may be mapped or coordinated with the build points 1002 respectively located at $(X10_B, Y2_B)$ through $(X4_B, Y2_B)$. At the point in the irradiation sequence depicted in FIG. 11G, the build point 1002 located at $(X5_B, Y2_B)$ may have received irradiation from a complete sequence of beam segments 400 respectively corresponding to a modulation group 500 that includes a plurality of micromirror elements 308 from the micromirror array 306. For example, the build point 1002 located at $(X5_B, Y2_B)$ may have received a first dose of irradiation from a first beam segment 400 corresponding to a first micromirror element 308 at the point in the irradiation sequence depicted in FIG. 11B. Additionally, or in the alternative, the build point 1002 located at $(X5_B, Y2_B)$ may have received a second dose of irradiation from a second beam segment 400 corresponding to a second micromirror element 308 at the point in the irradiation sequence depicted in FIG. 11C, a third dose of irradiation from a third beam segment 400 corresponding to a third micromirror element 308 at the point in the irradiation sequence depicted in FIG. 11D, a fourth dose of irradiation from a fourth beam segment 400 corresponding to a fourth micromirror element 308 at the point in the irradiation sequence depicted in FIG. 11E, and/or a fifth dose of irradiation from a fifth beam segment 400 corresponding to a fifth micromirror element 308 at the point in the irradiation sequence depicted in FIG. 11F.

Figure 11G:
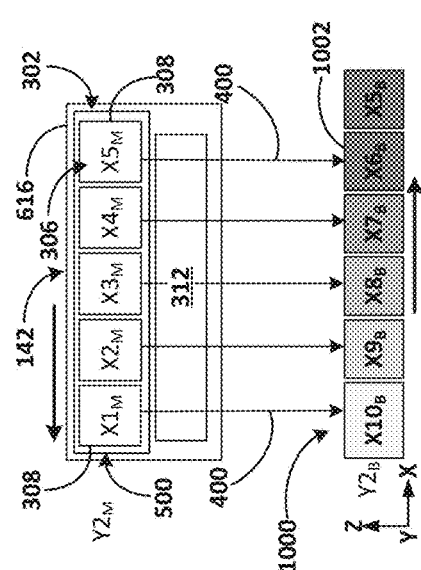

As shown in FIG. 11G, at least some of the build points 1002 in the build array 1000 may receive no irradiation. For example, the build point 1002 located at $(X5_B, Y2_B)$ of the build array 1000 may receive no irradiation at the point in the irradiation sequence depicted in FIG. 11G, having already received irradiation from a sequence of beam segments 400 sufficient to provide a specified intensity and/or power density for irradiating the build point 1002 according to modulation instructions carried out by the control system 104 and/or the optical modulator. The irradiation received by the build point 1002 located at $(X5_B, Y2_B)$ of the build array 1000 may correspond to a complete sequence of beam segments 400 from the plurality of micromirror elements 308 in the modulation group 500. Additionally, or in the alternative, the build point 1002 may receive no irradiation when, as described, for example, with reference to FIG. 10B, modulation instructions do not include instructions to irradiate the build point 1002. For example, the build point 1002 may not define part of an object 114 being additively manufactured, and/or additional irradiation may be unnecessary at the build point 1002. As shown in FIG. 11G, the build point 1002 located at $(X6_B, Y2_B)$ may have received irradiation from a sequential plurality of beam segments 400 respectively corresponding to the plurality of micromirror elements 308 located at $(X1_M, Y2_M)$ through $(X5_M, Y2_M)$. The build point 1002 located at $(X7_B, Y2_B)$ may have received irradiation from a sequential plurality of beam segments 400 respectively corresponding to the plurality of micromirror elements 308 located at $(X1_M, Y2_M)$ through $(X4_M, Y2_M)$. The build point 1002 located at $(X8_B, Y2_B)$ may have received irradiation from a sequential plurality of beam segments 400 respectively corresponding to the plurality of micromirror elements 308 located at $(X1_M, Y2_M)$ through $(X3_M, Y2_M)$. The build point 1002 located at $(X9_B, Y2_B)$ may have received irradiation from a sequential plurality of beam segments 400 respectively corresponding to the plurality of micromirror elements 308 located at $(X1_M, Y2_M)$ through $(X2_M, Y2_M)$. The build point 1002 located at $(X10_B, Y2_B)$ may have received irradiation from an initial beam segment 400 in a sequential plurality of beam segments 400, with the initial beam segment 400 corresponding to the micromirror element 308 located at $(X1_M, Y2_M)$.

As depicted in FIGS. 11A-11G, each build point 1002 in a build array 1000 may receive irradiation from a sequential plurality of beam segments 400 respectively corresponding to a plurality of micromirror elements 308 in a micromirror array 306, such as a plurality of micromirror elements 308 that define a modulation group 500 and/or that are included in a modulation group 500. Build points 1002 that are not intended to be irradiated, such as build points 1002 that are located outside of a build region for a respective layer of a three-dimensional object 114, may be bypassed by the sequential plurality of beam segments 400. The sequential plurality of beam segments 400 may irradiated a build point 1002 and/or may bypass a build point 1002, for example, based at least in part on a build file that defines build points 1002 of a build array 1000 to be irradiated in order to additively manufacture a three-dimensional object 114. Modulation instructions may cause the optical modulator 302 to modulate respective modulation groups 500 and/or corresponding micromirror elements 308 based at least in part on the build file. Respective modulation groups 500 and/or corresponding micromirror elements 308 may be modulated according to modulation instructions from a control system 104. In some embodiments, a build point 1002 may be bypassed by each of a plurality of beam segments respectively corresponding to a plurality of micromirror elements 308 in a modulation group 500. Additionally, or in the alternative, a build point 1002 may be bypassed by a portion of the micromirror elements 308 in the modulation group 500, with remaining micromirror elements 308 in the modulation group providing a beam segment 400 that becomes incident upon the respective build point 1002. For example, with reference to FIGS. 4A, 4B, 5C, 5D, 5F, 5H, and/or 5I, a respective build point 1002 may be irradiated by a sequential plurality of beam segments 400 corresponding to a first beam segment-subset 408 that becomes incident upon a first micromirror element-subset 406. Additionally, or in the alternative, a respective build point 1002 may be bypassed by a sequential plurality of beam segments 400 corresponding to a second beam segment-subset 412 that becomes incident upon a second micromirror element-subset 410. The beam segments 400 in the first beam segment-subset 408 corresponding to the respective build point 1002 may sequentially propagate along an irradiation beam path 316 towards the focusing lens assembly 312 and onto the respective build point 1002. The beam segments 400 in the second beam segment-subset 412 corresponding to the respective build point 1002 may sequentially propagate along an extraction beam path 318, for example, to a beam stop 314.

Referring now to FIGS. 12A-12F, another exemplary irradiation sequence is described. The irradiation sequence described with reference to FIGS. 12A-12F may be performed together with the irradiation sequences described with reference to FIGS. 10A-10F and/or FIGS. 11A-11G, in whole or in part, such as concurrently in combination with one another and/or with respect to different regions of a build plane and/or different portions of an additive manufacturing process. Additionally, or in the alternative, the irradiation sequence described with reference to FIGS. 12A-12F may be performed as a stand-alone irradiation sequence, for example, without also utilizing the irradiation sequences described with reference to FIGS. 10A-10F and/or FIGS. 11A-11G.

As shown in FIG. 12A, in some embodiments, an irradiation device 142 may include one or more optical modulators 302 that include addressable elements 310 configured to modulate the corresponding micromirror elements 308 to a plurality of respectively different modulation states. For example, as shown, an addressable element 310 may be configured to modulate a corresponding micromirror element 308 to a plurality of modulation states that may correspond to a plurality of deflection positions, such as deflection positions of (−2), (−1), (0), (+1), and (+2). In some embodiments, a deflection position of (−2) may correspond to a "landed off" position and/or a deflection position of (+2) may correspond to a "landed on" position of the respective micromirror element. A "landed on" position may correspond to a micromirror element 308 abutting a mechanical stops 424 that aligns the micromirror element 308 with an irradiation beam path 316. A "landed off" position may correspond to a micromirror element 308 abutting a mechanical stops 424 that aligns the micromirror element 308 with an extraction beam path 318. In some embodiments, an irradiation device 142 may be configured such that any one or more of the deflection positions of (−2), (−1), (0), (+1), and/or (+2) may align a micromirror element 308 with an irradiation beam path 316. The plurality of deflection positions may refer to positions of the micromirror elements 308 across a range of motion imparted by the corresponding addressable elements 310. For example, a micromirror element may tilt from a (−2) deflection positions to a (+2) deflection position. The (−2) and (+2) deflection positions may respectively represent opposite ends of a range of motion. For example, the (−2) and (+2) deflection positions may correspond to mechanical stops 424 at opposite ends of a range of motion (see, e.g., FIGS. 4C-4G). The (0) deflection position may represent an intermediate position, such as a midpoint between the (−2) and (+2) deflection positions. The (−1) deflection position may represent a midpoint between the (−2) and (0) deflection positions, such as a midpoint between the intermediate position and an end of a range of motion. The (+1) deflection position may represent a midpoint between the (+2) and (0) deflection positions, such as a midpoint between the intermediate position and an end of a range of motion.

Additionally, or in the alternative, the plurality of deflection positions may respectively correspond to a plurality of modulation states of a respective micromirror element 308 that corresponds to an addressable element 310 that is movable in a plurality of degrees of freedom motions. For example, a TT optical modulator may be actuated to a plurality of modulation states that may correspond to deflection positions of (−2), (−1), (0), (+1), and (+2). The (−2) and (+2) deflection positions may correspond to opposite ends of a range of motion for a tip motion. The (−1) and (+1) deflection positions may correspond to opposite ends of a range of motion for a tilt motion. The (0) deflection position may represent an intermediate position, such as a midpoint between the (−2) and (+2) deflection positions corresponding to the tip motion and/or a midpoint between the (−1) and (+1) deflection positions corresponding to the tilt motion. As another example, a TP optical modulator may be actuated to a plurality of modulation states that may correspond to deflection positions, for example, with (−2) and (+2) deflection positions corresponding to opposite ends of a range of motion for a tip motion or tilt option, (−1) and (+1) deflection positions corresponding to opposite ends of a range of motion for a piston motion, and/or a (0) deflection position corresponding to an intermediate position, such as a midpoint between the (−2) and (+2) deflection positions corresponding to the tip or tilt motion and/or a midpoint between the (−1) and (+1) deflection positions corresponding to the piston motion. As yet another example, a TTP optical modulator may be actuated to a plurality of modulation states that may correspond to deflection positions of (−3), (−2), (−1), (0), (+1), (+2), and (+3). The (−3) and (+3) deflection positions may respectively correspond to opposite ends of a range of motion for a tilt motion. The (−2) and (+2) deflection positions may correspond to opposite ends of a range of motion for a tip motion. The (−1) and (+1) deflection positions may correspond to opposite ends of a range of motion for a piston motion. The (0) deflection position may represent an intermediate position, such as a midpoint between the (−3) and (+3) deflection positions, between the (−2) and (+2) deflection positions, and/or between the (−1) and (+1) deflection positions. Additionally, or in the alternative, rather than representing ends of a range of motion, the (−2) and (+2) deflection positions, may represent intermediate positions in the range of motion. The (−3) and (+3) deflection positions and/or the (−1) and (+1) deflection positions may also represent intermediate positions in the range of motion.

In some embodiments, at least one modulation state may correspond to an orientation that causes a micromirror element 308 to direct a corresponding beam segment 400 along an extraction beam path 318 leading, for example, to a beam stop 314. As described with reference to FIGS. 12A-12F, the respective micromirror elements 308 may include at least an additional modulation state corresponding to an (X) deflection position that orients a beam segment 400 along the extraction beam path 318. For example, as shown in FIG. 12A, a micromirror element located at ($M_1$) of the micromirror array 306 may exhibit a modulation state corresponding to an (X) deflection position with an orientation that reflects a beam segment 400 along an extraction beam path 318, such as to a beam stop 314. Additionally, or in the alternative, as shown in FIG. 12C, micromirror elements 308 located at ($M_1$) and ($M_2$) may exhibit a modulation state corresponding to an (X) deflection position, and/or as shown in FIG. 12D, located at ($M_{19}$) and ($M_{20}$) may exhibit a modulation state corresponding to an (X) deflection position, with a respective orientation that reflects a beam segment 400 along an extraction beam path 318, such as to a beam stop 314.

As shown in FIGS. 12A-12F, a modulation group 500 may include a plurality micromirror elements 308 that provide a corresponding plurality of beam segments 400 that combine to at least partially overlap with one another at a combination zone 334 when the plurality of micromirror elements 308 in the modulation group 500 exhibit respective ones of a plurality of different modulation states. For example, as shown, the plurality of different modulation states may correspond to deflection positions of (−2), (−1), (0), (+1), and (+2). The plurality of different modulation states may optionally include a modulation state corresponding to a deflection position of (X), with an orientation that reflects a beam segment 400 along an extraction beam path 318, such as to a beam stop 314. The (X) deflection position may be in addition to the deflection positions of (−2), (−1), (0), (+1), and (+2), or the (X) deflection position may be in the alternative to one or more of the deflection positions of (−2), (−1), (0), (+1), and (+2). A micromirror element 308 may include a plurality of modulation groups 500 respectively including a plurality of micromirror elements 308 that may exhibit respective ones of a plurality of different modulation states, corresponding, for example, to deflection positions of (−2), (−1), (0), (+1), and (+2), and/or to deflection positions of (X), (−2), (−1), (0), (+1), and (+2), and/or to deflection positions of (X), (−1), (0), (+1), and (+2).

The optical modulator 302 may cause the micromirror elements 308 to undergo a modulation cycle, that includes cycling the plurality of micromirror elements 308 through a sequence of modulation states that reflect a respective beam segment 400 to a combination zone 334 in the combination zone array 1200. The sequence of modulation states may correspond to deflection positions of (−2), (−1), (0), (+1), and (+2). Micromirror elements that reflect a beam segment 400 along an extraction beam path 318 may have a deflection position of (X). By way of example, the modulation cycle may include a plurality of micromirror elements 308 cycling through a sequence that progresses from a (−2) deflection position, to a (−1) deflection position, to a (0) deflection position, to a (+1) deflection position, to a (+2) deflection position. The sequence may continue from the (+2) deflection position to the (−2) deflection position. Additionally, or in the alternative, the sequence may continue in the opposite direction, for example, from the (+2) deflection position to the (+1) deflection position, and so forth. Additionally, or in the alternative, the sequence may cycle through a plurality of modulation states in a pseudorandom pattern provided, for example, by a pseudorandom number generator. The pseudorandom number generator may be configured to position the micromirror elements 308 in respective ones of the plurality of modulation states a substantially equal number of instances over a specified time interval. For example, pseudorandom number generator may provide for the respective micromirror elements 308 to exhibit respective ones of the plurality of modulation states with an equivalent number of instances over the specified time interval with a variance of +/−10%, such as +/−5%, such as +/−1%, or such as +/−0.1%.

An energy beam 144 may become incident upon the micromirror array 306 when the respective micromirror elements 308 are respectively oriented in a respective one of the plurality of modulation states. The respective micromirror elements 308 may reflect a corresponding beam segment 400 when oriented in the respective ones of the plurality of modulation states. The respective beam segments 400 may be reflected to a respectively different combination zone 334 depending at least in part on the modulation state of the respective micromirror element 308. The micromirror array 306 may be mapped or coordinated to a combination zone array 1200. The combination zone array 1200 may include a plurality of combination zones 334. The combination zone array 1200 may correspond to, and/or may be mapped to, a build array 1000. For example, the combination zone array 1200 may equate to the build array 1000. Additionally, or in the alternative, the combination zone array 1200 and the build array 1000 may have respectively different spatial locations. In some embodiments, the combination zone array 1200 may be spatially located along an irradiation beam path 316 in proximity to a focusing lens assembly 312. For example, the combination zone array 1200 may be spatially located within a spatial domain occupied by a focusing lens of the focusing lens assembly 312, or upstream from a focusing lens assembly 312, or downstream from a focusing lens assembly 312. Additionally, or in the alternative, the combination zone array 1200 may be spatially located above the build plane 130, such as between the focusing lens assembly 312 and the build plane 130.

The micromirror array 306 may include a plurality of modulation groups 500. An exemplary modulation group 500 may include a plurality of micromirror elements 308 respectively oriented in a plurality of different modulation states, and respective ones of the plurality of micromirror elements 308 may respectively reflect a corresponding beam segment 400 to a common combination zone in the combination zone array 1200. By way of example, the plurality of different modulation states may respectively correspond to deflection positions of (−2), (−1), (0), (+1), and (+2). As shown, for example, in FIG. 12A, one of the modulation groups 500 may include a plurality of micromirror elements 308 respectively located at ($M_6$), ($M_7$), ($M_8$), ($M_9$), and ($M_{10}$) of the micromirror array 306. The plurality of micromirror elements 308 may reflect a corresponding plurality of beam segments 400 to a combination zone 334 spatially located at ($P_1$) of the combination zone array 1200. A first micromirror element 308 located at ($M_6$) may reflect a first beam segment 400 to the combination zone 334 spatially located at ($P_1$) of the combination zone array 1200. A second micromirror element 308 located at ($M_7$) may reflect a second beam segment 400 to the combination zone 334 spatially located at ($P_1$). A third micromirror element 308 located at ($M_8$) may reflect a third beam segment 400 to the combination zone 334 spatially located at ($P_1$). A fourth micromirror element 308 located at ($M_9$) may reflect a fourth beam segment 400 to the combination zone 334 spatially located at ($P_1$). A fifth micromirror element 308 located at ($M_{10}$) may reflect a fifth beam segment 400 to the combination zone 334 spatially located at ($P_1$).

The irradiation sequence shown in FIGS. 12A-12F may include a plurality of micromirror elements being modulated to respectively different modulation states. As the micromirror elements sequence through a plurality of respectively different modulation states, the plurality of beam segments 400 in a beam segment-subset 408 may be directed to respectively different combination zones 334 in the combination zone array 1200. As the micromirror elements 308 cycle through the irradiation sequence, the plurality of beam segments 400 may be combined at a plurality of different combination zones 334, such as a sequence of combination zones 334. The sequence may repeat, such that the respective micromirror elements 308 direct beam segments 400 to a plurality of different combination zones 334 in a repeating sequence. FIGS. 12A-12F show an exemplary repeating sequence.

As illustrated, by way of example, in FIGS. 12A-12F, at a first point in the irradiation sequence, shown, for example, in FIG. 12A, a beam segment-subset 408 may include a plurality of beam segments 400 reflected to a combination zone 334 spatially located at ($P_1$) in the combination zone array 1200. At a second point in the irradiation sequence, shown, for example, in FIG. 12B, a beam segment-subset 408 may include a plurality of beam segments 400 reflected to a combination zone 334 spatially located at ($P_2$) in the combination zone array 1200. At a third point in the irradiation sequence, shown, for example, in FIG. 12C, a beam segment-subset 408 may include a plurality of beam segments 400 reflected to a combination zone 334 spatially located at ($P_3$) in the combination zone array 1200. At a fourth point in the irradiation sequence, shown, for example, in FIG. 12D, a beam segment-subset 408 may include a plurality of beam segments 400 reflected to a combination zone 334 spatially located at ($P_4$) in the combination zone array 1200. At a fifth point in the irradiation sequence, shown, for example, in FIG. 12E, a beam segment-subset 408 may include a plurality of beam segments 400 reflected to a combination zone 334 spatially located at ($P_5$) in the combination zone array 1200. At a sixth point in the irradiation sequence, shown, for example, in FIG. 12F, a beam segment-subset 408 may include a plurality of beam segments 400 reflected, once again, to a combination zone 334 spatially located at ($P_1$) in the combination zone array 1200.

In some embodiments, the particular micromirror elements 308 included in a modulation group 500 may differ as between respective points in an irradiation sequence. At sequential points in the irradiation sequence, a modulation group 500 may differ by at least one micromirror element 308. For example, one or more micromirror elements 308 may be added to a modulation group 500 and/or one or more micromirror elements 308 may be subtracted from a modulation group 500 at respective points in the irradiation sequence. The number of micromirror elements 308 in a modulation group 500 may remain constant over a plurality of points in an irradiation sequence. Additionally, or in the alternative, the number of micromirror elements 308 in a modulation group 500 may remain constant over a plurality of points in an irradiation sequence. In some embodiments, one or more modulation groups 500 may incrementally propagate in one or more directions across a micromirror array 306 in coordination with incremental points in the irradiation sequence. Additionally, or in the alternative, the beam segment-subsets 408 respectively corresponding to the modulation groups 500 may combine at a respective combination zone 334 spatially located at an incrementally propagating point of the combination zone array 1200.

By way of example, as shown in FIGS. 12A-12F, at a first point in the irradiation sequence, shown, for example, in FIG. 12A, a beam segment-subset 408 combining at a combination zone 334 spatially located at ($P_1$) in the combination zone array 1200 may correspond to a modulation group 500 that includes micromirror elements located at ($M_6$), ($M_7$), ($M_8$), ($M_9$), and ($M_{10}$) of the micromirror array 306. At a second point in the irradiation sequence, shown, for example, in FIG. 12B, a beam segment-subset 408 combining at a combination zone 334 spatially located at ($P_2$) in the combination zone array 1200 may correspond to a modulation group 500 that includes micromirror elements located at ($M_7$), ($M_8$), ($M_9$), ($M_{10}$), and ($M_{11}$) of the micromirror array 306. At a third point in the irradiation sequence, shown, for example, in FIG. 12C, a beam segment-subset 408 combining at a combination zone 334 spatially located at ($P_3$) in the combination zone array 1200 may correspond to a modulation group 500 that includes micromirror elements located at ($M_8$), ($M_9$), ($M_{10}$), ($M_{11}$), and ($M_{12}$) of the micromirror array 306. At a fourth point in the irradiation sequence, shown, for example, in FIG. 12D, a beam segment-subset 408 combining at a combination zone 334 spatially located at ($P_4$) in the combination zone array 1200 may correspond to a modulation group 500 that includes micromirror elements located at ($M_9$), ($M_{10}$), ($M_{11}$), ($M_{12}$), and ($M_{13}$) of the micromirror array 306. At a fifth point in the irradiation sequence, shown, for example, in FIG. 12E, a beam segment-subset 408 combining at a combination zone 334 spatially located at ($P_5$) in the combination zone array 1200 may correspond to a modulation group 500 that includes micromirror elements located at ($M_{10}$), ($M_{11}$), ($M_{12}$), ($M_{13}$), and ($M_{14}$) of the micromirror array 306. At a sixth point in the irradiation sequence, shown, for example, in FIG. 12F, a beam segment-subset 408 combining at a combination zone 334 spatially located at ($P_1$) in the combination zone array 1200 may correspond to a modulation group 500 that includes micromirror elements located at ($M_{11}$), ($M_{12}$), ($M_{13}$), ($M_{14}$), and ($M_{15}$) of the micromirror array 306.

Figure 13A:
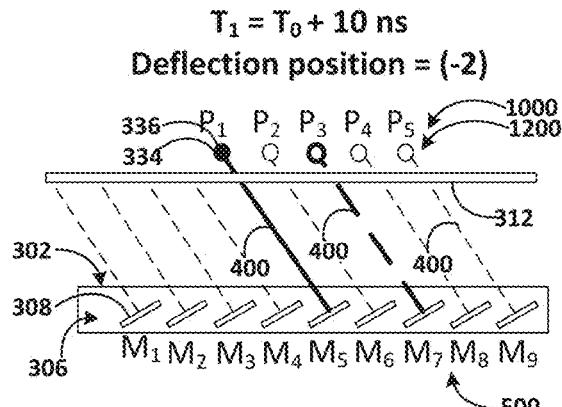
FIGS. 13A-13S, schematically depict further exemplary modulation cycles that may be included in an irradiation sequence.
Figure 13B:
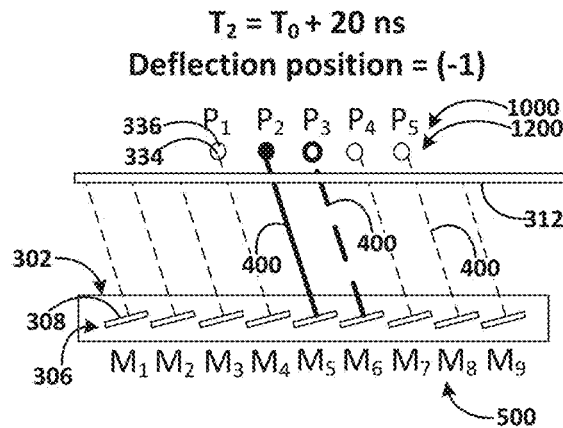
Figure 13C:
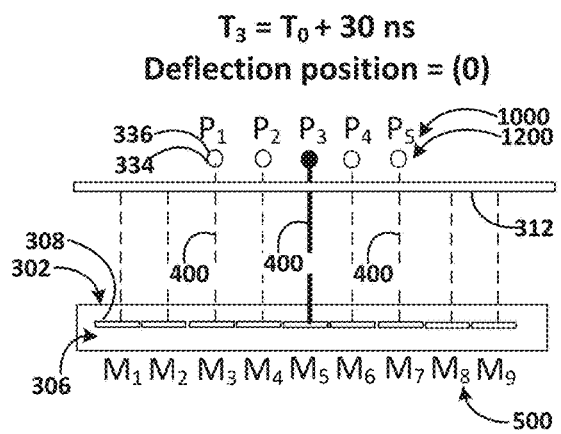
Figure 13D:
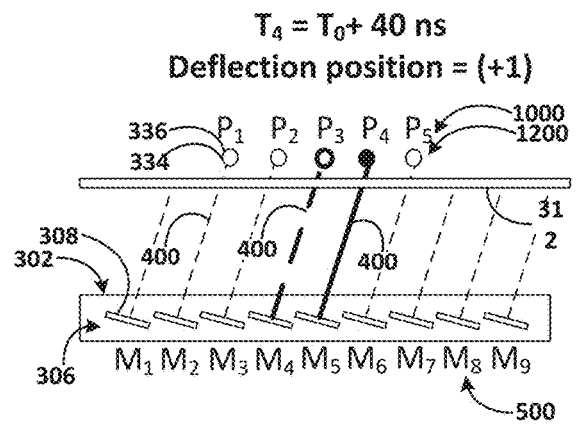
Figure 13E:
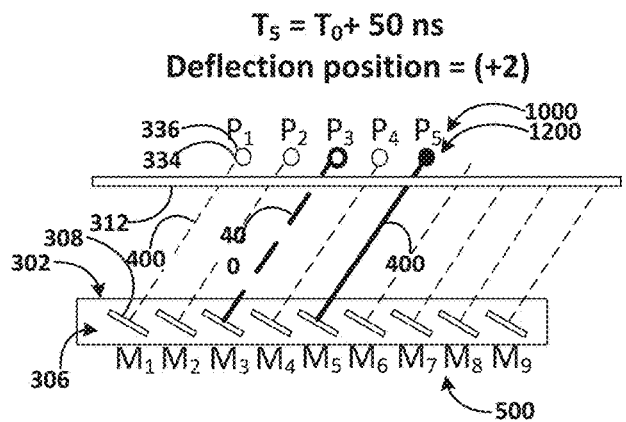
Figure 13F:
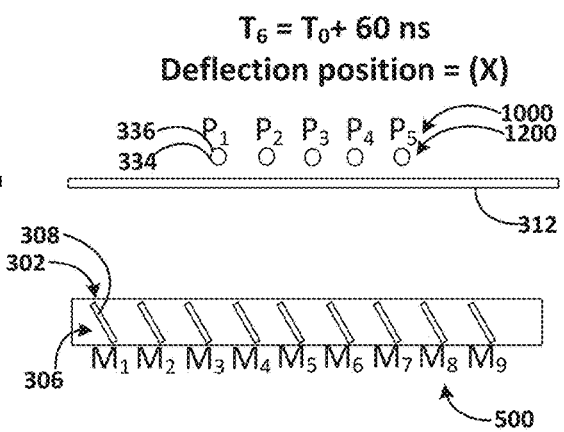
Figure 13G:
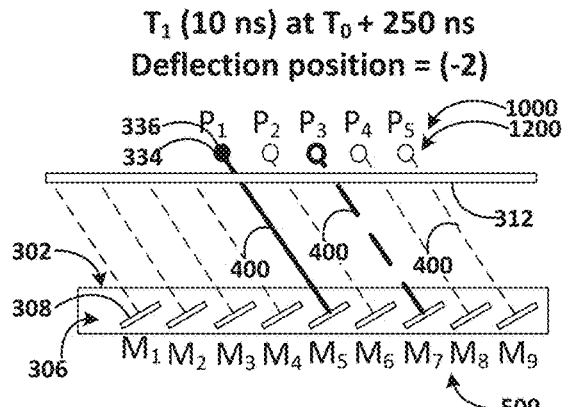
Figure 13H:
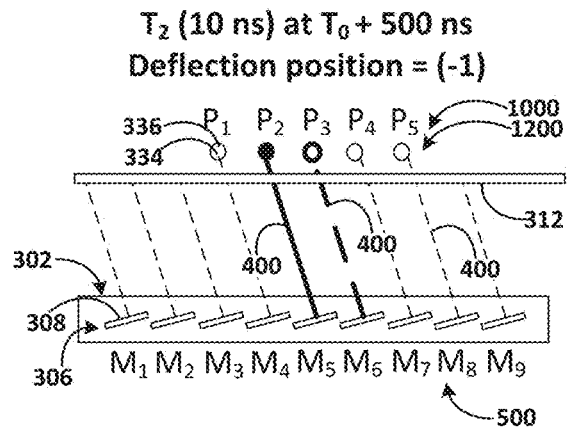
Figure 13I:
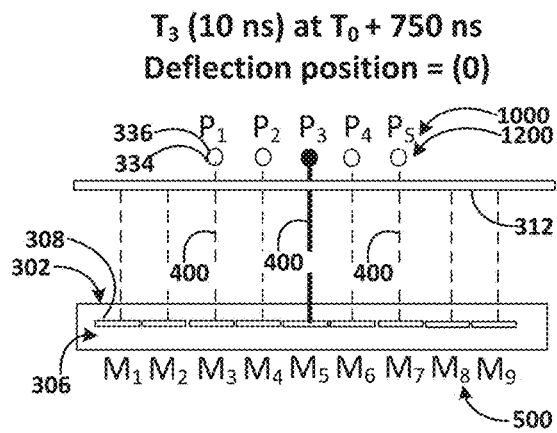
Figure 13J:
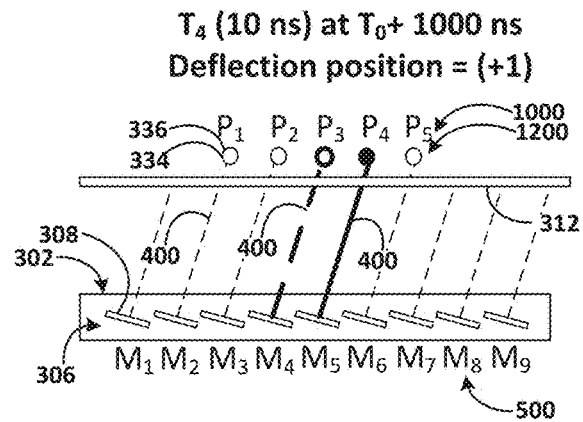
Figure 13K:
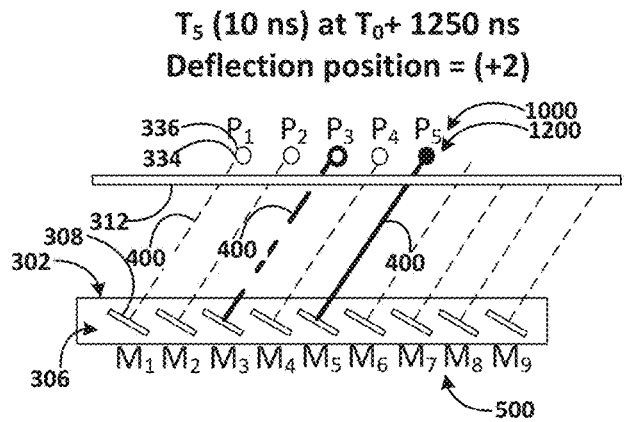
Figure 13L:
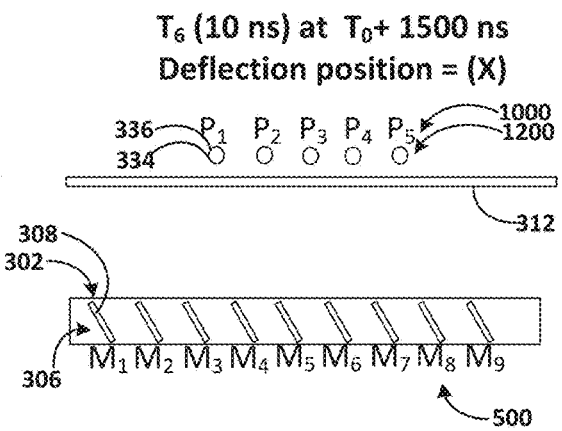
Figure 13M:
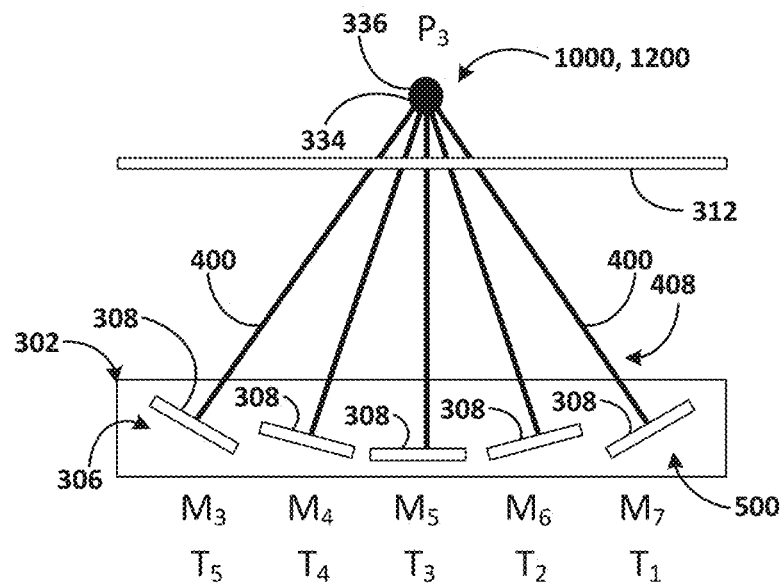
Figure 13N:
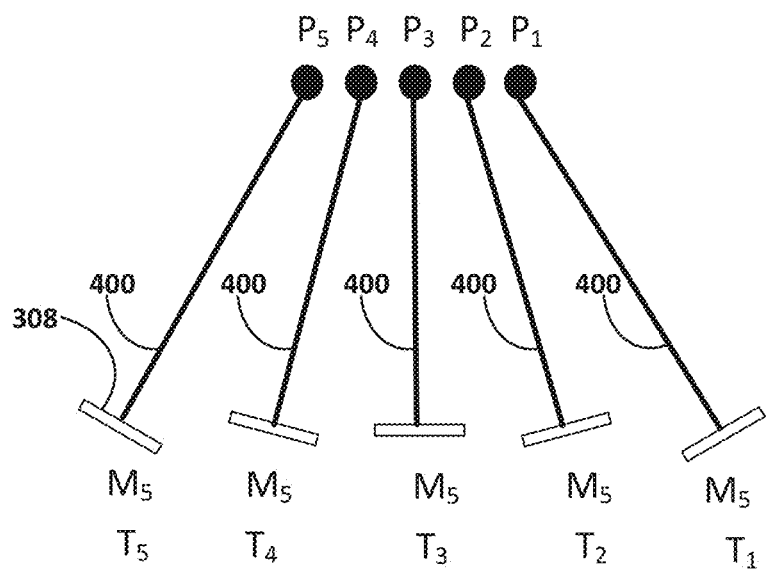
Figure 13O:
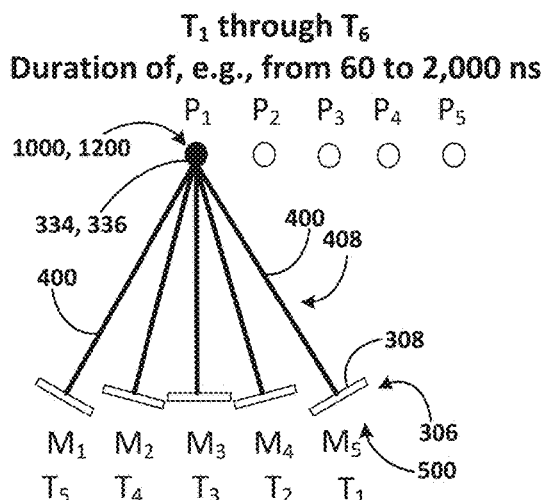
Figure 13P:
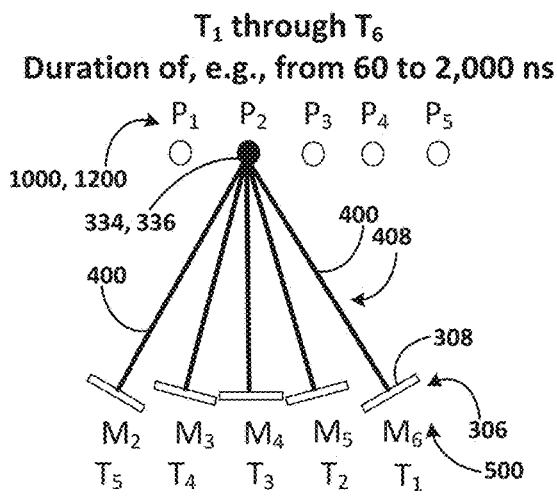
Figure 13Q:
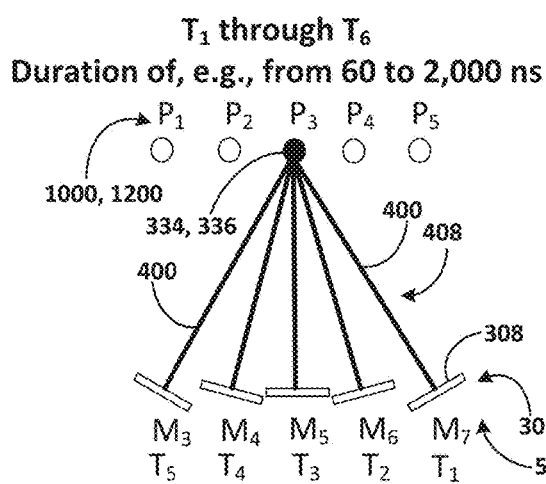
Figure 13R:
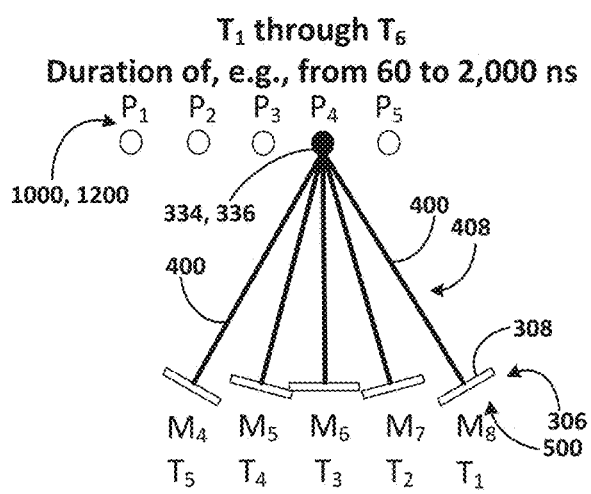
Figure 13S:
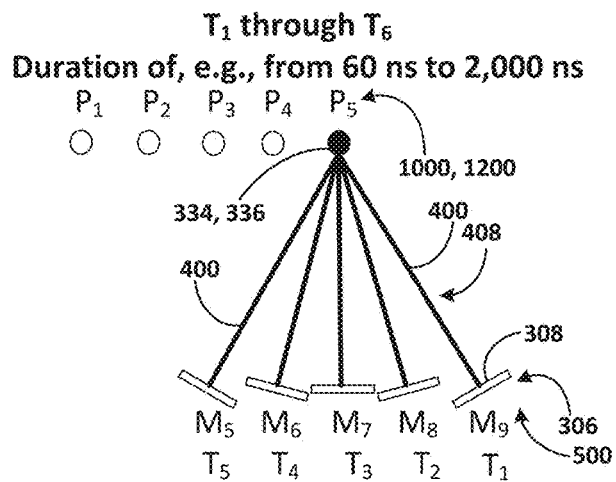

Referring now to FIGS. 13A-13S, and/or FIGS. 14A-14H-2, further exemplary irradiation sequence are described. The irradiation sequence described with reference to FIGS. 13A-13S, and/or FIGS. 14A-14H-2, may be performed together with the irradiation sequences described with reference to FIGS. 10A-10, FIGS. 11A-11G, and/or FIGS. 12A-12F, in whole or in part, such as concurrently in combination with one another and/or with respect to different regions of a build plane and/or different portions of an additive manufacturing process. Additionally, or in the alternative, the irradiation sequence described with reference to FIGS. 13A-13S, and/or FIGS. 14A-14H-2, may be performed as a stand-alone irradiation sequence, for example, without also utilizing the irradiation sequences described with reference to FIGS. 10A-10F, FIGS. 11A-11G, and/or FIGS. 12A-12F.

As shown in FIGS. 13A-13S, an energy beam 144 may become incident upon a micromirror array 306 of an optical modulator 302 when the micromirror elements 308 of the micromirror array 306 are oriented in one or more of a plurality of modulation states. An irradiation device 142 may be configured to synchronize the timing of pulses of the energy beam 144 from a beam generation device 300 with modulation of the micromirror elements 308 of the optical modulator. For example, in some embodiments, the beam generation device 300 may be controlled so as to provide pulses of the energy beam 144 at timing that coincides with respective micromirror elements 308 being located at a desired modulation state when the energy beam 144 becomes incident upon the respective micromirror elements 308. In some embodiments, the optical modulator 302 may dither at least some of the micromirror elements 308 between a plurality of modulation states, such as at a specified frequency, and the beam generation device 300 may pulse at specified times that coincides with respective micromirror elements 308 being located at a desired modulation state when the energy beam 144 becomes incident upon the respective micromirror elements 308. Additionally, or in the alternative, the beam generation device 300 may pulse, such as at a specified frequency, and the optical modulator may modulate at least some of the micromirror elements 308 to respective modulation states at timing that causes the respective micromirror elements 308 to be located at a desired modulation state when a respective energy beam 144 pulse becomes incident upon the respective micromirror elements 308.

The plurality of modulation states that may correspond to a plurality of deflection positions, such as deflection positions of (−2), (−1), (0), (+1), and (+2). The micromirror elements 308 may cycle through a sequence that progresses through a plurality of deflection positions. The respective beam segments 400 may be reflected to a respectively different combination zone 334, such as respective ones of a plurality of combination zones 334 in a combination zone array 1200, based at least in part on the modulation state of the respective micromirror element 308. In some embodiments, a beam generation device 300 (See, e.g., FIGS. 3A and 3B) may pulse an energy beam at pulse times that are synchronized with respective modulation states of the respective micromirror elements. The pulse times may be determined based at least in part on a time of flight for the energy beam 144 to become incident upon the micromirror array 306 and/or the respective micromirror elements 308 of the micromirror array 306. The beam generation device 300 may pulse an energy beam 144 at pulse times corresponding to modulation states exhibited by the micromirror elements 308 when the energy beam 144 becomes incident upon the micromirror array 306 and/or the respective micromirror elements 308 thereof. The addressable elements 310 of the optical modulator 302 may actuate to a plurality of different modulation states, for example, to position the corresponding micromirror elements 308 at respective deflection positions corresponding to the pulses of the energy beam 144. The micromirror elements 308 may respectively reflect a corresponding beam segment 400 to a common combination zone in the combination zone array 1200 that corresponds to the respective modulation state coinciding with the pulses of the energy beam 144. Additionally, or in the alternative, a continuous wave energy beam may be utilized, and the micromirror elements 308 may sweep respective beam segments 400 across the combination zone array 1200.

An exemplary modulation cycle may include the optical modulator 302 cycling the micromirror elements 308 though a plurality of modulation states coinciding to respectively different deflection positions with a frequency of about 100 nanoseconds (ns) to about 10,000 ns, such as from about 100 ns to 2,500 ns, such as about 250 to about 1,000 ns, such as from about 250 ns to about 2,500 ns, such as from about 2,500 ns to about 5,000 ns or such as from about 5,000 ns to about 10,000 ns. The time of flight for a pulse, or a plurality of pulses, of the energy beam 144 to travel from the beam generation device 300 to the micromirror array 306 and/or to the respective micromirror elements 308 may be on the order of picoseconds, such as less than 10,000 picoseconds, such as less than 5,000 picoseconds, such as less than 1,000 picoseconds, such as less than 100 picoseconds, or such as less than 10 picoseconds. With the time of flight being several orders of magnitude shorter than the modulation frequency of the optical modulator 302, a pulses of the energy beam 144 may be reflected by the respective micromirror elements 308 at an effectively instantaneous deflection position. For example, an optical modulator 302 that includes addressable elements 310 configured to be actuated by a digital actuator, discrete signals from the digital actuator may cause the respective micromirror elements 308 to actuate between a plurality of specified modulation states. Additionally, or in the alternative, the discrete signals from the digital actuator may cause the respective micromirror elements 308 to sweep through a plurality of specified modulation states located at respectively different deflection positions within a range of motion of the respective micromirror element 308. For example, a first modulation state may correspond to a first mechanical stop 424 a first end of the range of motion, and a second modulation state may correspond to a second mechanical stop 424 at a second end of the range of motion. Additionally, or in the alternative, one or more modulation states may be located at deflection positions along the range of motion between the first mechanical stop 424 and the second mechanical stop 424 respectively located, for example, at opposite ends of a range of motion. For an optical modulator 302 for an optical modulator 302 that includes an addressable element configured to be actuated by an analog actuator, a signal may cause the analog actuator to drive and hold an addressable element 310 to a position corresponding to a modulation state a range of motion of the respective micromirror element 308. In coordination with the movement of respective micromirror elements to specified modulation states, the beam generation device 300 may provide a pulse, or a plurality of pulses, of the energy beam as or when the respective micromirror elements 308 become positioned at the specified modulation states. Regardless of whether the micromirror elements 308 are modulated by an addressable element actuated by a digital actuator, an analog actuator, or other actuator, a time interval for the beam generation device 300 to provide a pulse, or a plurality of pulses, of the energy beam 144 that coincided with the respective modulation state of the micromirror elements 308 may be orders of magnitude larger than the time of flight of the pulse, or the plurality of pulses, of the energy beam 144 from the beam generation device 300.

FIGS. 13A-13F show an exemplary irradiation sequence that includes a modulation cycle whereby a plurality of micromirror elements 308 cycle though a plurality of modulation states coinciding to respectively different deflection positions, such that a corresponding plurality of beam segments 400 are reflected to respectively different combination zones 334 in a combination zone array 1200. By way of example, as shown in FIGS. 13A-13F, an exemplary modulation cycle may have a frequency of about 60 nanoseconds (ns). However, it will be appreciated that the cycle frequency shown is provided by way of example only, and not to be limiting, and that any suitable cycle frequency may be provided. A beam generation device 300 may emit an energy beam 144, for example, in the form of a pulse, or a plurality of pulses, in coordination with the micromirror elements being oriented to a modulation state that coincided with a build point 1002 of a build array 1000 to be irradiated. In some embodiments, the beam generation device 300 may emit a pulse, or a plurality of pulses, according to a pulse frequency. The pulse frequency may be coordinated with the modulation states of the micromirror elements 308.

As shown in FIG. 13A, a plurality of micromirror elements 308 may exhibit a modulation state corresponding to a deflection position of (−2) at about a time of $T_1$ in a modulation cycle. The time $T_1$ may be about +10 nanoseconds (ns) from commencement of the modulation cycle at $T_0$. Alternatively, the time $T_1$ may commence the modulation cycle. In coordination with the time $T_1$, the beam generation device 300 may emit the energy beam 144, for example, in the form of one or more pulses. With the plurality of micromirror elements 308 exhibiting a modulation state corresponding to a deflection position of (−2) in coordination with the time $T_1$, a corresponding plurality of beam segments 400 may be reflected to a corresponding plurality of combination zones 334 of a combination zone array 1200. For example, a beam segment 400 corresponding to micromirror element 308 at location $M_5$ of the micromirror array 306 may coincide with a beam combination zone 334 located at $P_1$ in the combination zone array 1200. Additionally, or in the alternative, a beam segment 400 corresponding to micromirror element 308 at location $M_6$ of the micromirror array 306 may coincide with a beam combination zone 334 located at $P_2$ in the combination zone array 1200. Additionally, or in the alternative, beam segments 400 respectively corresponding to micromirror elements 308 at locations $M_7$, $M_8$, and $M_9$ of the micromirror array 306 may coincide with beam combination zones 334 respectively located at $P_3$, $P_4$, and $P_5$ in the combination zone array 1200.

As shown in FIGS. 13B through 13E, as the micromirror elements progress through the modulation cycle, the micromirror elements 308 may exhibit respective sequential modulation states at specified times in the modulation cycle. The respective modulation states may correspond to respective sequential deflection positions that coincide with respective combination zones 334 in the combination zone array 1200. In some embodiments, the beam segments 400 reflected at respective specified times in the modulation cycle may become incident upon a sequence of combination zones 334, such as an incremental sequence of combination zones 334, in the combination zone array 1200. In some embodiments, the sequence of combination zones 334, such as the incremental sequence of combination zones 334, may include adjacent combination zones 334. Additionally, or in the alternative, the combination zones 334 in the sequence may be spaced apart by a defined interval of the combination zone array 1200. After cycling through a plurality of deflection positions, such as shown in FIGS. 13A-13E and optionally FIG. 13F, the modulation cycle may proceed in a reverse order relative to a preceding order, or the modulation cycle may repeat the preceding order. After completing a modulation cycle, a plurality of beam segments 400 may become incident upon a plurality of combination zones 334.

As shown in FIG. 13B, the plurality of micromirror elements 308 may exhibit a modulation state corresponding to a deflection position of (−1) at about a time of $T_2$ in the modulation cycle. The time $T_2$ may be about +20 ns from commencement of the modulation cycle at $T_0$. Additionally, or in the alternative, the time $T_2$ may be about +10 ns from time $T_1$, shown in FIG. 13A. In coordination with the time $T_2$, the beam generation device 300 may emit the energy beam 144, for example, in the form of one or more pulses. With the plurality of micromirror elements 308 exhibiting a modulation state corresponding to a deflection position of (−1) in coordination with the time $T_2$, a corresponding plurality of beam segments 400 may be reflected to a corresponding plurality of combination zones 334 of a combination zone array 1200. For example, a beam segment 400 corresponding to micromirror element 308 at location $M_4$ of the micromirror array 306 may coincide with a beam combination zone 334 located at $P_1$ in the combination zone array 1200. By way of comparison, at the time $T_1$ shown in FIG. 13A, the beam segment 400 coinciding with the combination zone 334 located at $P_1$ in the combination zone array 1200 was reflected by the micromirror element 308 at location $M_5$ of the micromirror array 306. As further shown in FIG. 13B, at time $T_2$, a beam segment 400 corresponding to micromirror element 308 at location $M_5$ of the micromirror array 306 may coincide with a beam combination zone 334 located at $P_2$ in the combination zone array 1200. Additionally, or in the alternative, beam segments 400 respectively corresponding to micromirror elements at locations $M_6$, $M_7$, and $M_8$ of the micromirror array 306 may coincide with beam combination zones 334 respectively located at $P_3$, $P_4$, and $P_5$ in the combination zone array 1200.

As shown in FIG. 13C, the plurality of micromirror elements 308 may exhibit a modulation state corresponding to a deflection position of (0) at about a time of $T_3$ in the modulation cycle. The time $T_3$ may be about +30 ns from commencement of the modulation cycle at $T_0$. Additionally, or in the alternative, the time $T_3$ may be about +10 ns from time $T_2$, shown in FIG. 13B. In coordination with the time $T_3$, the beam generation device 300 may emit the energy beam 144, for example, in the form of one or more pulses. With the plurality of micromirror elements 308 exhibiting a modulation state corresponding to a deflection position of (0) in coordination with the time $T_3$, a corresponding plurality of beam segments 400 may be reflected to a corresponding plurality of combination zones 334 of a combination zone array 1200. For example, a beam segment 400 corresponding to micromirror element 308 at location $M_3$ of the micromirror array 306 may coincide with a beam combination zone 334 located at $P_1$ in the combination zone array 1200. By way of comparison, at the time $T_2$ shown in FIG. 13B, the beam segment 400 coinciding with the combination zone 334 located at $P_1$ in the combination zone array 1200 was reflected by the micromirror element 308 at location $M_4$ of the micromirror array 306. As further shown in FIG. 13C, at time $T_3$, a beam segment 400 corresponding to micromirror element 308 at location $M_4$ of the micromirror array 306 may coincide with a beam combination zone 334 located at $P_2$ in the combination zone array 1200. Additionally, or in the alternative, beam segments 400 respectively corresponding to micromirror elements at locations $M_5$, $M_6$, and $M_7$ of the micromirror array 306 may coincide with beam combination zones 334 respectively located at $P_3$, $P_4$, and $P_5$ in the combination zone array 1200.

As shown in FIG. 13D, the plurality of micromirror elements 308 may exhibit a modulation state corresponding to a deflection position of (+1) at about a time of $T_4$ in the modulation cycle. The time $T_4$ may be about +40 ns from commencement of the modulation cycle at $T_0$. Additionally, or in the alternative, the time $T_4$ may be about +10 ns from time $T_3$, shown in FIG. 13C. In coordination with the time $T_4$, the beam generation device 300 may emit the energy beam 144, for example, in the form of one or more pulses. With the plurality of micromirror elements 308 exhibiting a modulation state corresponding to a deflection position of (+1) in coordination with the time $T_4$, a corresponding plurality of beam segments 400 may be reflected to a corresponding plurality of combination zones 334 of a combination zone array 1200. For example, a beam segment 400 corresponding to micromirror element 308 at location $M_2$ of the micromirror array 306 may coincide with a beam combination zone 334 located at $P_1$ in the combination zone array 1200. By way of comparison, at the time $T_3$ shown in FIG. 13C, the beam segment 400 coinciding with the combination zone 334 located at $P_1$ in the combination zone array 1200 was reflected by the micromirror element 308 at location $M_3$ of the micromirror array 306. As further shown in FIG. 13D, at time $T_4$, a beam segment 400 corresponding to micromirror element 308 at location $M_3$ of the micromirror array 306 may coincide with a beam combination zone 334 located at $P_2$ in the combination zone array 1200. Additionally, or in the alternative, beam segments 400 respectively corresponding to micromirror elements at locations $M_4$, $M_5$, and $M_6$, of the micromirror array 306 may coincide with beam combination zones 334 respectively located at $P_3$, $P_4$, and $P_5$ in the combination zone array 1200.

As shown in FIG. 13E, the plurality of micromirror elements 308 may exhibit a modulation state corresponding to a deflection position of (+2) at about a time of $T_5$ in the modulation cycle. The time $T_5$ may be about +50 ns from commencement of the modulation cycle at $T_0$. Additionally, or in the alternative, the time $T_5$ may be about +10 ns from time $T_4$, shown in FIG. 13D. In coordination with the time $T_5$, the beam generation device 300 may emit the energy beam 144, for example, in the form of one or more pulses. With the plurality of micromirror elements 308 exhibiting a modulation state corresponding to a deflection position of (+2) in coordination with the time $T_5$, a corresponding plurality of beam segments 400 may be reflected to a corresponding plurality of combination zones 334 of a combination zone array 1200. For example, a beam segment 400 corresponding to micromirror element 308 at location $M_1$ of the micromirror array 306 may coincide with a beam combination zone 334 located at $P_1$ in the combination zone array 1200. By way of comparison, at the time $T_4$ shown in FIG. 13D, the beam segment 400 coinciding with the combination zone 334 located at $P_1$ in the combination zone array 1200 was reflected by the micromirror element 308 at location $M_2$ of the micromirror array 306. As further shown in FIG. 13E, at time $T_5$, a beam segment 400 corresponding to micromirror element 308 at location $M_2$ of the micromirror array 306 may coincide with a beam combination zone 334 located at $P_2$ in the combination zone array 1200. Additionally, or in the alternative, beam segments 400 respectively corresponding to micromirror elements at locations $M_3$, $M_4$, and $M_5$, of the micromirror array 306 may coincide with beam combination zones 334 respectively located at $P_3$, $P_4$, and $P_5$ in the combination zone array 1200.

In some embodiments, as shown, for example, in FIG. 13E, the plurality of micromirror elements 308 may exhibit a modulation state corresponding to a deflection position of (X) corresponding to an extraction beam path 318 that leads, for example, to a beam stop 314. A modulation cycle may include a modulation state corresponding to the deflection position of (X). An energy beam 144 incident upon the micromirror elements exhibiting a deflection position of (X) may be reflected along the extraction beam path 318. Additionally, or in the alternative, portions of the micromirror array 306 that correspond to build points 1002 of the build array 1000 that are intended to receive irradiation at a point in time of an irradiation sequence may exhibit a deflection position corresponding to an irradiation beam path 316, and/or portions of the micromirror array 306 that correspond to build points 1002 of the build array 1000 that are not intended to receive irradiation at the point in time of the irradiation sequence may exhibit a deflection position corresponding to an irradiation beam path 316. For example, modulation states corresponding to deflection positions of (−2), (−1), (0), (+1), and/or (+2) may correspond to an irradiation beam path 316, and a deflection position of (X) may correspond to an extraction beam path 318. Additionally, or in the alternative, modulation states corresponding to deflection positions of (−2), (−1), (0), (+1), and/or (+2) may respectively correspond to either the irradiation beam path 316 or the extraction beam path 318. For example, the modulation states corresponding to the deflection position of (+2) may correspond to the extraction beam path 318, while modulation states corresponding to deflection positions of (−2), (−1), (0), and (+1) may correspond to the irradiation beam path 316. As another example, the modulation states corresponding to the deflection position of (0) may correspond to the extraction beam path 318, while modulation states corresponding to deflection positions of (−2), (−1), (+1), and (+2) may correspond to the irradiation beam path 316.

Micromirror elements 308 and/or modulation groups 500 that correspond to portions of the build array 1000 that are not intended to receive irradiation at a point in time of an irradiation sequence may be modulated to, or sustained at, a modulation state corresponding to the extraction beam path 318, such as a modulation state corresponding to a deflection position of (X). Micromirror elements 308 and/or modulation groups 500 may be modulated to, or sustained, at, the modulation state corresponding to the extraction beam path 318 in coordination with portions of the build array 1000 that are not intended to receive irradiation at respective points in time of the irradiation sequence. Micromirror elements 308 and/or modulation groups 500 that correspond to portions of the build array 1000 that are intended to receive irradiation at a point in time of an irradiation sequence may be modulated to one or more modulation states corresponding to the irradiation beam path 316, such as a plurality of modulation states respectively corresponding to deflection positions of (−2), (−1), (0), (+1), and (+2). Additionally, or in the alternative, a modulation state corresponding to a deflection position of (X) may be included in the modulation cycle, for example, such that micromirror elements 308 may exhibit a modulation state corresponding to a deflection position of (X) in coordination with portions of the build array 1000 that are not intended to receive irradiation at that point in the irradiation sequence. The micromirror elements 308 exhibiting the deflection position of (X) may thereby reflect the respective beam segments 400 along the extraction beam path 318 and thereby avoid irradiating the portions of the build array 1000 that are not intended to receive irradiation at that point in the irradiation sequence.

For example, as shown in FIG. 13F, the plurality of micromirror elements 308 may exhibit a modulation state corresponding to a deflection position of (X) at about a time of $T_6$ in the modulation cycle. Additionally, or in the alternative, some micromirror elements 308 and/or some modulation groups 500, may remain at a deflection position of (X) while other micromirror elements 308 and/or other modulation groups 500 cycle through a plurality of deflection positions, such as shown in FIGS. 13A-13E. As shown in FIG. 13F, the time $T_6$ may be about +60 ns from commencement of the modulation cycle at $T_0$. Additionally, or in the alternative, the time $T_6$ may be about +10 ns from time $T_5$, shown in FIG. 13E. In coordination with the time $T_6$, the beam generation device 300 may emit the energy beam 144, for example, in the form of one or more pulses. With the plurality of micromirror elements 308 exhibiting a modulation state corresponding to a deflection position of (X) in coordination with the time $T_6$, a corresponding plurality of beam segments 400 may be reflected to an extraction beam path 318 leading, for example, to a beam stop 314. For example, a plurality of beam segments 400 respectively corresponding to micromirror elements 308 at locations $M_1$ through $M_9$ of the micromirror array 306 may be reflected to the extraction beam path 318.

Referring to FIGS. 13G-13L, another exemplary irradiation sequence that includes a modulation cycle will be described. As with the modulation cycle described with reference to FIGS. 13A-13F, the modulation cycle shown in FIGS. 13G-13L may include a plurality of micromirror elements 308 cycle though a plurality of modulation states coinciding to respectively different deflection positions, such that a corresponding plurality of beam segments 400 are reflected to respectively different combination zones 334 in a combination zone array 1200. The modulation cycle shown in FIGS. 13G-13L may have a frequency of about 1,500 nanoseconds (ns). In some embodiments, a modulation cycle may include a beam generation device 300 providing a plurality of pulses at a pulse interval and an optical modulator 302 modulating a plurality of micromirror elements 308 to a plurality of modulation states at a modulation interval. As used herein, the term "pulse interval" refers to a time interval within which an energy beam 144 becoming incident upon a plurality of micromirror elements 308 may coincide with a modulation state of the plurality of micromirror elements 308. As used herein, the term "modulation interval" refers to a time interval during which one or more micromirror elements 308, such as a plurality of micromirror elements 308 in a modulation group 500, transition to a sequential modulation state in coordination with a pulse interval, such as from a first modulation state to a second modulation state. For example, a plurality of micromirror elements 308 that are modulated to a plurality of modulation states respectively corresponding to deflection positions of (−2), (−1), (0), (+1), and (+2), may transition to a modulation state corresponding to a deflection position of (−2) to a modulation state corresponding to a deflection position of (−1) during a modulation interval. The transition to sequential modulation states may include an incremental transition and/or a cyclical transition. For example, a modulation interval may increment from a first modulation state to a second modulation state during a fraction of a modulation cycle frequency. Additionally, or in the alternative, a modulation interval that includes a cyclical transition may be greater than a modulation cycle frequency. For example, the modulation interval may include a time interval of a modulation cycle plus a time interval to increment to a sequential modulation state. A beam generation device 300 may provide an energy beam 144, for example, in the form of one or more pulses, at the pulse interval. In some embodiments, a plurality of pulses may be provided within a pulse interval corresponding to a modulation state. In some embodiments, a beam generation device 300 may provide an energy beam 144, for example, in the form of one or more pulses, at respective ones of a plurality of pulse intervals within a modulation cycle. Additionally, or in the alternative, a plurality of pulse intervals respectively corresponding to a plurality of modulation states may extend across a plurality of modulation cycles. For example, a pulse interval corresponding to a first modulation state may be provided at a first modulation cycle, and/or a pulse interval corresponding to a second modulation state may be provided at a second modulation cycle. The second pulse interval may correspond to a time of a modulation cycle plus a time of an incremental transition from the first modulation state to the second modulation state.

As shown in FIGS. 13G-13L, an irradiation sequence and/or a modulation cycle may include a pulse interval of about 10 ns. The pulse interval may occur at a modulation interval of about 250 ns. It will be appreciated that the pulse interval and the modulation interval shown are provided by way of example only, and not to be limiting, and that any suitable pulse interval and/or modulation interval may be provided. In some embodiments, as shown in FIGS. 13G-13L, the modulation cycle may be about 1250 ns. Additionally, or in the alternative, as shown in FIGS. 13G-13L, the modulation cycle may be about 250 ns, and the respective pulse intervals may be provided at sequential iterations of the modulation cycle. The irradiation sequence shown in FIGS. 13G-13L is otherwise similar to the irradiation sequence described with reference to FIGS. 13A-13F, and as such, the irradiation sequence shown in FIGS. 13G-13L may be further understood with reference to FIGS. 13A-13F and therefore will not be further described.

Referring now to FIG. 13M, over the course of one or more modulation cycles, such as according to the irradiation sequence described with reference to FIGS. 13A-13F and/or FIGS. 13G-13L, a plurality of beam segments 400 may be regarded as at least partially combined at a respective combination zone 334. For example, a combination zone 334 located at $P_3$ of the combination zone array 1200 may receive a plurality of beam segments 400 from a corresponding plurality of micromirror elements 308, such as micromirror elements located at $M_3$, $M_4$, $M_5$, $M_6$, and $M_7$ of the micromirror array 306. The respective beam segments 400 may occupy a spatial location of the combination zone 334 at respectively different points in time. For example, as shown in FIG. 13M, at a time $T_1$, a micromirror element located at $M_7$ of the micromirror array 306 may reflect a beam segment 400 coinciding with the combination zone 334 located at $P_3$ of the combination zone array 1200. Additionally, or in the alternative, at a time $T_2$, a micromirror element located at $M_6$ of the micromirror array 306 may reflect a beam segment 400 coinciding with the combination zone 334 located at $P_3$ of the combination zone array 1200. Additionally, or in the alternative, at times $T_3$, $T_4$, and $T_5$, micromirror elements 308 respectively located at $M_5$, $M_4$, and $M_3$ of the micromirror array 306 may reflect a respective beam segment 400 coinciding with the combination zone 334 located at $P_3$ of the combination zone array 1200. The beam segments 400 reflected by the micromirror elements 308 respectively located at $M_7$, $M_6$, $M_5$, $M_4$, and $M_3$ of the micromirror array 306 may define a beam segment-subset 408.

Although the respective beam segments 400 of the beam segment-subset 408 may become incident upon a build point 1002 corresponding to the combination zone 334 at respectively different times, the modulation cycle may have a frequency that is one or more orders of magnitude shorter than the time rate of heat conduction from the build point 1002. For example, the quantity of heat conducted away from the build point 1002 may be immaterial relative to the quantity of heat imparted to the build point by the beam segment-subset 408 over the duration of one or more modulation cycles. As such, a suitable power density may be imparted to a build point 1002 by a plurality of beam segments 400 becoming incident upon the build point 1002 over the duration of one or more modulation cycles. In some embodiments, a modulation cycle may have a frequency of from about 50 nanoseconds (ns) to about 10,000 ns, such as from about 50 ns to about 250 ns, such as from about 250 ns to about 500 ns, such as from about 500 ns to about 1,500 ns, such as from about 1,500 ns to about 2,500 ns, such as from about 2,500 ns to about 5,000 ns, or such as from about 5,000 ns to about 10,000 ns.

Referring now to FIG. 13N, over the course of one or more modulation cycles, such as according to the irradiation sequence described with reference to FIGS. 13A-13F and/or FIGS. 13G-13L, a respective micromirror element 308 may reflect a plurality of beam segments 400 to a corresponding plurality of combination zones 334. For example, a micromirror element 308 located at $M_5$ of the micromirror array 306 may reflect a plurality of beam segments 400 to combination zones 334 respectively located at $P_1$, $P_2$, $P_3$, $P_4$, and $P_5$ of the combination zone array 1200. At a time $T_1$, the micromirror element 308 located at $M_5$ of the micromirror array 306 may reflect a beam segment 400 to a combination zone 334 respectively located at $P_1$ of the combination zone array 1200. Additionally, or in the alternative, at a time $T_2$, the micromirror element 308 located at $M_5$ of the micromirror array 306 may reflect a beam segment 400 to a combination zone 334 respectively located at $P_2$ of the combination zone array 1200. Additionally, or in the alternative, at times $T_3$, $T_4$, and $T_5$, the micromirror element 308 located at $M_5$ of the micromirror array 306 may reflect beam segments 400 to combination zones 334 respectively located at $P_3$, $P_3$, and $P_5$ of the combination zone array 1200.

In some embodiments, a plurality of beam segment-subset 408 may be reflected to a corresponding plurality of combination zones 334. Respective ones of the beam segment-subsets 408 may include a plurality of beam segments 400 reflected by respective ones of a plurality of micromirror elements 308. The plurality of beam segments 400 may be reflected by respective ones of the plurality micromirror elements 308 at a corresponding plurality of different times in a modulation cycle and/or modulation interval. The plurality of micromirror elements 308 respectively corresponding to a beam segment-subset 408 may include at least one micromirror element 308 located at a respectively different position of a micromirror array 306 as between respective ones of the plurality of combination zones 334. For example, FIGS. 13O-13S show beam segment-subsets 408 respectively corresponding to a plurality of combination zones 334 in a combination zone array 1200. The beam segment-subsets 408 shown in FIGS. 13O-13S may be provided by an irradiation sequence that includes one or more modulation cycles shown in FIGS. 13A-13F and/or in FIGS. 13G-13L. The micromirror elements 308 providing the respective beam segments 400 included in the beam segment-subset 408 may increment with respect to sequential locations in the combination zone array 1200.

As shown in FIG. 13O, a combination zone 334 located at $P_1$ of the combination zone array 1200 may receive a beam segment-subset 408 that includes a plurality of beam segments 400 from a corresponding plurality of micromirror elements 308, such as micromirror elements located at $M_1$, $M_2$, $M_3$, $M_4$, and $M_5$ of the micromirror array 306. The respective beam segments 400 included in the beam segment-subset 408 may occupy a spatial location of the combination zone 334 at respectively different points in time. For example, at a time $T_1$, a micromirror element located at $M_5$ of the micromirror array 306 may reflect a beam segment 400 coinciding with the combination zone 334 located at $P_1$ of the combination zone array 1200. Additionally, or in the alternative, at a time $T_2$, a micromirror element located at $M_4$ of the micromirror array 306 may reflect a beam segment 400 coinciding with the combination zone 334 located at $P_1$ of the combination zone array 1200. Additionally, or in the alternative, at times $T_3$, $T_4$, and $T_5$, micromirror elements 308 respectively located at $M_3$, $M_2$, and $M_1$ of the micromirror array 306 may reflect a respective beam segment 400 coinciding with the combination zone 334 located at $P_1$ of the combination zone array 1200. The beam segments 400 reflected by the micromirror elements 308 respectively located at $M_5$, $M_4$, $M_3$, $M_2$, and $M_1$ of the micromirror array 306 may define a beam segment-subset 408 corresponding to the combination zone 334 located at $P_1$ of the combination zone array 1200.

As shown in FIG. 13P, a combination zone 334 located at $P_2$ of the combination zone array 1200 may receive a beam segment-subset 408 that includes a plurality of beam segments 400 from a corresponding plurality of micromirror elements 308 respectively located at $M_2$, $M_3$, $M_4$, $M_5$, and $M_6$ of the micromirror array 306. At a time $T_1$, the micromirror element located at $M_6$ of the micromirror array 306 may reflect a beam segment 400 coinciding with the combination zone 334 located at $P_2$ of the combination zone array 1200. Additionally, or in the alternative, at a time $T_2$, the micromirror element located at $M_5$ of the micromirror array 306 may reflect a beam segment 400 coinciding with the combination zone 334 located at $P_2$ of the combination zone array 1200. Additionally, or in the alternative, at times $T_3$, $T_4$, and $T_5$, the micromirror elements 308 respectively located at and $M_4$, $M_3$, and $M_2$ of the micromirror array 306 may reflect a respective beam segment 400 coinciding with the combination zone 334 located at $P_2$ of the combination zone array 1200. The beam segments 400 reflected by the micromirror elements 308 respectively located at $M_6$, $M_5$, $M_4$, $M_3$, and $M_2$ of the micromirror array 306 may define a beam segment-subset 408 corresponding to the combination zone 334 located at $P_2$ of the combination zone array 1200.

As shown in FIG. 13Q, a combination zone 334 located at $P_3$ of the combination zone array 1200 may receive a beam segment-subset 408 that includes a plurality of beam segments 400 from a corresponding plurality of micromirror elements 308 respectively located at $M_3$, $M_4$, $M_5$, $M_6$, and $M_7$ of the micromirror array 306. At a time $T_1$, the micromirror element located at $M_7$ of the micromirror array 306 may reflect a beam segment 400 coinciding with the combination zone 334 located at $P_3$ of the combination zone array 1200. Additionally, or in the alternative, at a time $T_2$, the micromirror element located at $M_6$ of the micromirror array 306 may reflect a beam segment 400 coinciding with the combination zone 334 located at $P_3$ of the combination zone array 1200. Additionally, or in the alternative, at times $T_3$, $T_4$, and $T_5$, the micromirror elements 308 respectively located at $M_5$, $M_4$, and $M_3$ of the micromirror array 306 may reflect a respective beam segment 400 coinciding with the combination zone 334 located at $P_3$ of the combination zone array 1200. The beam segments 400 reflected by the micromirror elements 308 respectively located at $M_7$, $M_6$, $M_5$, $M_4$, and $M_3$ of the micromirror array 306 may define a beam segment-subset 408 corresponding to the combination zone 334 located at $P_3$ of the combination zone array 1200.

As shown in FIG. 13R, a combination zone 334 located at $P_4$ of the combination zone array 1200 may receive a beam segment-subset 408 that includes a plurality of beam segments 400 from a corresponding plurality of micromirror elements 308 respectively located at $M_4$, $M_5$, $M_6$, $M_7$, and $M_8$ of the micromirror array 306. At a time $T_1$, the micromirror element located at $M_8$ of the micromirror array 306 may reflect a beam segment 400 coinciding with the combination zone 334 located at $P_4$ of the combination zone array 1200. Additionally, or in the alternative, at a time $T_2$, the micromirror element located at $M_7$ of the micromirror array 306 may reflect a beam segment 400 coinciding with the combination zone 334 located at $P_4$ of the combination zone array 1200. Additionally, or in the alternative, at times $T_3$, $T_4$, and $T_5$, the micromirror elements 308 respectively located at $M_6$, $M_5$, and $M_4$ of the micromirror array 306 may reflect a respective beam segment 400 coinciding with the combination zone 334 located at $P_4$ of the combination zone array 1200. The beam segments 400 reflected by the micromirror elements 308 respectively located at $M_8$, $M_7$, $M_6$, $M_5$, and $M_4$ of the micromirror array 306 may define a beam segment-subset 408 corresponding to the combination zone 334 located at $P_4$ of the combination zone array 1200.

As shown in FIG. 13S, a combination zone 334 located at $P_5$ of the combination zone array 1200 may receive a beam segment-subset 408 that includes a plurality of beam segments 400 from a corresponding plurality of micromirror elements 308 respectively located at $M_5$, $M_6$, $M_7$, $M_8$, and $M_9$ of the micromirror array 306. At a time $T_1$, the micromirror element located at $M_9$ of the micromirror array 306 may reflect a beam segment 400 coinciding with the combination zone 334 located at $P_4$ of the combination zone array 1200. Additionally, or in the alternative, at a time $T_2$, the micromirror element located at $M_8$ of the micromirror array 306 may reflect a beam segment 400 coinciding with the combination zone 334 located at $P_5$ of the combination zone array 1200. Additionally, or in the alternative, at times $T_3$, $T_4$, and $T_5$, the micromirror elements 308 respectively located at $M_7$, $M_6$, and $M_5$ of the micromirror array 306 may reflect a respective beam segment 400 coinciding with the combination zone 334 located at $P_5$ of the combination zone array 1200. The beam segments 400 reflected by the micromirror elements 308 respectively located at $M_9$, $M_8$, $M_7$, $M_6$, and $M_5$ of the micromirror array 306 may define a beam segment-subset 408 corresponding to the combination zone 334 located at $P_5$ of the combination zone array 1200.

Now turning to FIGS. 14A-14H-2, exemplary irradiation sequences are further described. An irradiation sequence may include a pulse cycle that includes a plurality of pulses of an energy beam 144 from a beam generation device 300. The pulse cycle may be coordinated with a modulation cycle of an optical modulator 302. The optical modulator may modulate respective ones of a plurality of micromirror elements 308 of a micromirror array 306 to a plurality of modulation states. The micromirror elements 308 may be grouped into modulation groups 500 respectively including a plurality of micromirror elements 308, and the respective modulation groups 500 may be modulated in coordination with the pulses of the energy beam 144. The plurality of modulation states may respectively correspond to a plurality of deflection positions, such as deflection positions of (−2), (−1), (0), (+1), and (+2), and, optionally, (X). The beam generation device 300 may provide one or more pulses of an energy beam 144 in coordination with the respective modulation states.

FIGS. 14A-14H-2 graphically depict exemplary pulse cycles that may be coordinated with exemplary modulation cycles in an irradiation sequence. As shown in FIGS. 14A-14H-2, shaded spots represents points in the modulation cycle when one or more pulses of an energy beam 144 are provided, and unshaded spots represent points in the modulation cycle when a pulse of the energy beam is not provided. An exemplary modulation cycle may include a repeating and/or alternating progression through a sequence of a plurality of modulation states respectively corresponding to different deflection positions for a plurality of micromirror elements 308, such as deflection positions of (−2), (−1), (0), (+1), (+2), and (X). An exemplary pulse cycle may include a beam generation device 300 providing one or more pulses of an energy beam 144 at any suitable ones of a plurality of modulation cycle times corresponding to respective modulation states. As shown, for example, in FIGS. 14A and 14C, a modulation cycle may progress through a plurality of modulation states in alternating sequence. For example, a modulation cycle may include a progression from a modulation state corresponding to a deflection position of (−2) to a modulation state corresponding to a deflection position of (+2), and optionally, to a modulation state corresponding to a deflection position of (X). Next, a modulation cycle may include a progression in the opposite direction, from a modulation state corresponding to a deflection position of (+2) to a modulation state corresponding to a deflection position of (−2). The modulation cycle may progress through modulation states corresponding to deflection positions of (−1), (0), and (+1), between the modulation states corresponding to deflection positions of (−2) and (+2), as the modulation cycle proceeds in alternating directions. Additionally, or in the alternative, as shown in FIGS. 14B and 14D, a modulation cycle may progress through a plurality of modulation states in a repeating sequence. For example, a modulation cycle may include a progression from a modulation state corresponding to a deflection position of (−2) to a modulation state corresponding to a deflection position of (+2), and optionally, to a modulation state corresponding to a deflection position of (X). Next, a modulation cycle may return to a modulation state corresponding to a deflection position of (−2), and again progress to a modulation state corresponding to a deflection position of (+2). The modulation cycle may progress through modulation states corresponding to deflection positions of (−1), (0), and (+1), between the modulation states corresponding to deflection positions of (−2) and (+2), as the modulation cycle proceeds in a repeating manner.

A beam generation device 300 may provide one or more pulses of an energy beam 144 in coordination with any one or more of the modulations states exhibited by the micromirror elements during the modulation cycle. The pulses may be provided in the form of a pulse cycle, with pulses occurring at regular or irregular intervals. One or more pulses may be provided at any one or more modulation cycle times, as shown, for example, in FIGS. 14A-14D. For example, when an irradiation sequence indicates one or more build points 1002 to receive irradiation at a modulation cycle time, one or more pulses may be provided in coordination with the modulation cycle time. A plurality of micromirror elements 308 may reflect one or more beam segments 400 corresponding to the one or more pulses of the energy beam 144 to a corresponding plurality of build points 1002 of a build array 1000. The build points 1002 that receive the one or more beam segments 400 may depend at least in part on the modulation state of the plurality of micromirror elements 308 corresponding to the one or more pulses of the energy beam 144. Additionally, or in the alternative, when an irradiation sequence indicates that irradiation is not to be provided at a modulation cycle time, the beam generation device 300 may wait to provide further pulses of the energy beam 144 until such time corresponds with a next modulation cycle time when the irradiation sequence indicates that one or more build point 1002 are to receive irradiation. By way of example, as shown in FIGS. 14A and 14B, an irradiation sequence may include a pulse cycle in which one or more pulses are provided at respective ones of a sequential plurality of modulation cycle times. The sequential plurality of modulation cycle times may respectively correspond to a sequential plurality of modulation states respectively exhibiting a corresponding deflection position.

Additionally, or in the alternative, as shown in FIGS. 14C and 14D, an irradiation sequence may include a pulse cycle in which one or more pulses are provided at respective ones of an intermittent plurality of modulation cycle times. The intermittent plurality of modulation cycle times may respectively correspond to an intermittent plurality of modulation states respectively exhibiting a corresponding deflection position. As shown in FIG. 14C, an intermittent plurality of modulation cycle times may include one or more pulses provided at respective ones of a sequential plurality of modulation cycle times. The sequential plurality of modulation cycle times for which one or more pulses are provided may be followed by a sequential plurality of modulation cycle times for which irradiation is not provided, and as such, the beam generation device 300 may wait to provide further pulses of the energy beam 144 until such time corresponds with a next modulation cycle time when the irradiation sequence indicates that one or more build point 1002 are to receive irradiation. The sequential plurality of modulation cycle times for which irradiation is not provided may be followed by a next sequential plurality of modulation cycle times for which one or more pulses are provided. Additionally, or in the alternative, as shown in FIG. 14D, an intermittent plurality of modulation cycle times may include one or more pulses provided at respective ones of an alternating sequence of modulation cycle times. The alternating sequence of modulation cycle times may include an alternating sequence of one or more cycle times for which one or more pulses are provided followed by one or more cycle times for which is not provided.

As shown in FIG. 14E, a pulse cycle may include a pulse interval that is based at least in part on a function of modulation cycle time. The pulse interval may increment through a series of modulation states with sequential iterations of a modulation cycle. The pulse interval may progress through the series of modulation states in increments of one or more modulation states. For example, as shown in FIG. 14E, the pulse interval may increment to a next sequential modulation state with sequential iterations of the modulation cycle. The pulse interval may be described by the relationship: $P(T)=M(f)+(i)\cdot(t)$, where $P(T)$ is the pulse interval, $M(f)$ is the modulation cycle frequency, $(i)$ is the incremental number of modulation states per pulse interval, and $(t)$ is the incremental time between sequential modulation states in the modulation cycle. FIG. 14E shows an exemplary pulse interval where the incremental number of modulation states per pulse interval, $(i)$ equals one (1). A pulse interval $P(T)$ in which the incremental number of modulation states per pulse interval, $(i)$ equals zero (0) may sometimes be described with reference to a pulse interval and modulation cycle frequency that are synchronous with one another. A pulse interval $P(T)$ in which the incremental number of modulation states per pulse interval, $(i)$ does not equal zero (0) may sometimes be described with reference to a pulse interval and modulation cycle frequency that are asynchronous with one another.

As shown, at a first iteration of a modulation cycle, one or more pulses may be provided in coordination with a modulation state corresponding to a deflection position of (−2). At a second iteration of the modulation cycle, one or more pulses may be provided in coordination with a modulation state corresponding to a deflection position of (−1). During the first iteration of the modulation cycle, the beam generation device 300 may wait to provide further pulses of the energy beam 144 until the second iteration of the modulation cycle progresses to the modulation state corresponding to a deflection position of (−1). As shown, sequential pulses may be provided at the pulse interval, such that one or more pulses are provided at incremental modulation states with sequential iterations of the modulation cycle. For example, one or more pulses may be provided in coordination with the modulation state corresponding to a deflection position of (0) with a third iteration of the modulation cycle, in coordination with the modulation state corresponding to a deflection position of (+1) with a fourth iteration of the modulation cycle, in coordination with the modulation state corresponding to a deflection position of (+2) with a fifth iteration of the modulation cycle, and/or in coordination with the modulation state corresponding to a deflection position of (X) with a sixth iteration of the modulation cycle.

Referring now to FIG. 14F, FIG. 14G, and FIGS. 14H-1 and 14H-2, in some embodiments, a modulation cycle may include a staggered modulation cycle, in which progression through a plurality of modulation states may be staggered between respective ones of a plurality of micromirror elements 308 and/or between respective ones of a plurality of modulation groups 500. At respective times in the modulation cycle, the plurality of micromirror elements 308 may exhibit respective ones of a plurality of modulation states. The plurality of modulation states respectively correspond to a plurality of deflection positions. By way of example, as shown, a staggered modulation cycle may include respective ones of a plurality of micromirror elements 308 staggered by an interval that corresponds to the incremental time between modulation states, (t). By way of example, as shown in FIG. 14F, a staggered modulation cycle may include a plurality of micromirror elements 308 oriented at respective ones of a plurality of modulation states at a respective time in the staggered modulation cycle. For example, at a modulation cycle time $(t_5)$, a micromirror element 308 located at $M_1$ in a micromirror array 306 may exhibit a modulation state corresponding to a deflection position of (+2). Additionally, or in the alternative, at the modulation cycle time $(t_5)$, a micromirror element 308 located at $M_2$ in the micromirror array 306 may exhibit a modulation state corresponding to a deflection position of (+1), a micromirror element 308 located at $M_3$ in the micromirror array 306 may exhibit a modulation state corresponding to a deflection position of (0), a micromirror element 308 located at $M_4$ in the micromirror array 306 may exhibit a modulation state corresponding to a deflection position of (−1), and/or a micromirror element 308 located at $M_5$ in the micromirror array 306 may exhibit a modulation state corresponding to a deflection position of (−2).

In some embodiments, a pulse interval and modulation cycle may have an asynchronous frequency. For example, as shown in FIG. 14F, one or more pulses are provided according to a pulse cycle that includes a pulse interval $P(T)$ in which the incremental number of modulation states per pulse interval, $(i)$ equals one (1). At respective pulse intervals, the respective ones of the plurality of micromirror elements 308 may increment through the plurality of modulation states. For example, a first pulse interval $P(T_1)$ may correspond to a modulation cycle time $(t_5)$, with the respective micromirror elements 308 located at $M_1$ through $M_5$ of the micromirror array 306 oriented at the respective modulation states mentioned above. With sequential pulse intervals in the pulse cycle, the respective micromirror elements 308 located at $M_1$ through $M_5$ of the micromirror array 306 may respectively increment to a corresponding next modulation state. For example, a modulation cycle time $(t_{12})$ may correspond to a second pulse interval $P(T_2)$. At the second pulse interval $P(T_2)$, a micromirror element 308 located at $M_1$ in a micromirror array 306 may exhibit a modulation state corresponding to a deflection position of (X). Additionally, or in the alternative, at the second pulse interval $P(T_2)$ and/or the modulation cycle time $(t_{12})$, a micromirror element 308 located at $M_2$ in the micromirror array 306 may exhibit a modulation state corresponding to a deflection position of (+2), a micromirror element 308 located at $M_3$ in the micromirror array 306 may exhibit a modulation state corresponding to a deflection position of (+1), a micromirror element 308 located at $M_4$ in the micromirror array 306 may exhibit a modulation state corresponding to a deflection position of (0), and/or a micromirror element 308 located at $M_5$ in the micromirror array 306 may exhibit a modulation state corresponding to a deflection position of (−1). Additionally, or in the alternative, a modulation cycle time $(t_{19})$ may correspond to a third pulse interval $P(T_3)$. At the third pulse interval $P(T_3)$, a micromirror element 308 located at $M_1$ in a micromirror array 306 may exhibit a modulation state corresponding to a deflection position of (−2). Additionally, or in the alternative, at the third pulse interval $P(T_3)$ and/or the modulation cycle time $(t_{19})$, a micromirror element 308 located at $M_2$ in the micromirror array 306 may exhibit a modulation state corresponding to a deflection position of (X), a micromirror element 308 located at $M_3$ in the micromirror array 306 may exhibit a modulation state corresponding to a deflection position of (+2), a micromirror element 308 located at $M_4$ in the micromirror array 306 may exhibit a modulation state corresponding to a deflection position of (+1), and/or a micromirror element 308 located at $M_5$ in the micromirror array 306 may exhibit a modulation state corresponding to a deflection position of (0).

Additionally, or in the alternative, after completing a pulse cycle, the respective ones of the plurality of micromirror elements 308 may exhibit the respective modulation states as exhibited at the beginning of the pulse cycle. For example, the pulse cycle shown in FIG. 14F includes six (6) pulse intervals P(T). As shown, at a seventh pulse interval $P(T_7)$, which may correspond to a modulation cycle time $(t_{47})$, the pulse cycle may repeat, with a micromirror element 308 located at $M_1$ in a micromirror array 306 may exhibit a modulation state corresponding to a deflection position of (+2). Additionally, or in the alternative, at the seventh pulse interval $P(T_7)$ and/or the modulation cycle time $(t_{47})$, a micromirror element 308 located at $M_2$ in the micromirror array 306 may exhibit a modulation state corresponding to a deflection position of (+1), a micromirror element 308 located at $M_3$ in the micromirror array 306 may exhibit a modulation state corresponding to a deflection position of (0), a micromirror element 308 located at $M_4$ in the micromirror array 306 may exhibit a modulation state corresponding to a deflection position of (−1), and/or a micromirror element 308 located at $M_5$ in the micromirror array 306 may exhibit a modulation state corresponding to a deflection position of (−2).

As shown in FIG. 14G, in some embodiments, a pulse interval P(T) and a modulation cycle may have a synchronous frequency. With a frequency that is synchronous, the incremental number of modulation states per pulse interval, (i) equals zero (0). As shown, the plurality of micromirror elements 308 respectively located at $M_1$ through $M_5$ in the micromirror array 306 may exhibit the same respectively staggered set of modulation states at respective pulse intervals P(T). For example, for respective ones of a plurality of pulse intervals, $P(T_1$ through $T_{(n+1)})$, the plurality of micromirror elements 308 may exhibit the same respectively staggered set of modulation states. As shown, for respective ones of a plurality of pulse intervals, $P(T_1$ through $T_{(n+1)})$, a micromirror element 308 located at $M_1$ in a micromirror array 306 may exhibit a modulation state corresponding to a deflection position of (+2). Additionally, or in the alternative, for respective ones of a plurality of pulse intervals, $P(T_1$ through $T_{(n+1)})$, a micromirror element 308 located at $M_2$ in the micromirror array 306 may exhibit a modulation state corresponding to a deflection position of (+1), a micromirror element 308 located at $M_3$ in the micromirror array 306 may exhibit a modulation state corresponding to a deflection position of (0), a micromirror element 308 located at $M_4$ in the micromirror array 306 may exhibit a modulation state corresponding to a deflection position of (−1), and/or a micromirror element 308 located at $M_5$ in the micromirror array 306 may exhibit a modulation state corresponding to a deflection position of (−2).

Figures 2, 14H:
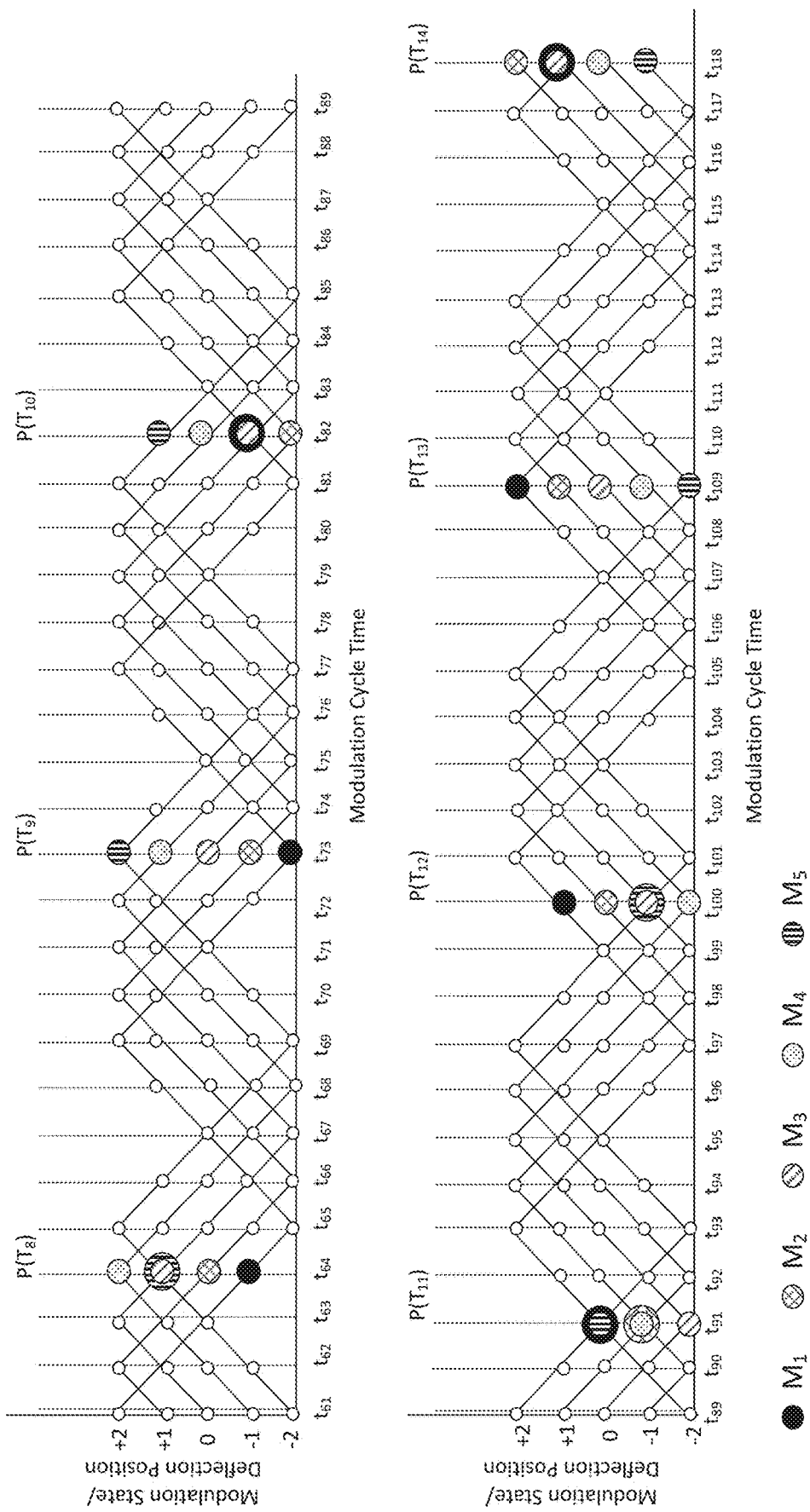

As shown in FIGS. 14H-1 and 14H-2, in some embodiments, a pulse cycle may be configured such that at least some of the plurality of micromirror elements 308 may have a common modulation state on at least some instances of a pulse interval P(T). Additionally, or in the alternative, the plurality of micromirror elements 308 may have respectively different modulation states on at least some instances of a pulse interval P(T). Additionally, or in the alternative, a pulse cycle may be configured such that respective ones of the plurality of modulations states have a variable number of micromirror elements 308 at respective pulse intervals P(T). By configuring a pulse cycle to provide a variable number of micromirror elements 308 exhibiting respective ones of a plurality of modulations states at respective pulse intervals P(T), the intensity and/or power density of the irradiation directed to respective combination zones 334 and/or build points 1002 may be augmented, for example, increased or decreased. The intensity and/or power density directed to respective combination zones 334 and/or build points 1002 may be decreased, for example, without requiring that a portion of the energy beam 144 be directed to an extraction beam path 318, by providing a pulse interval corresponding to a point in the modulation cycle when the plurality of micromirror elements are not exhibiting a respective modulation state but instead are exhibiting other modulation states from among the plurality of modulation states in the modulation cycle. Additionally, or in the alternative, the intensity and/or power density directed to respective combination zones 334 and/or build points 1002 may be increased, for example, without requiring additional pulses from the energy beam 144 and/or without requiring that the intensity and/or power density of the energy beam 144 be increased, by providing a pulse interval corresponding to a point in the modulation cycle when at least some of the plurality of micromirror elements exhibit a common modulation state. Additionally, or in the alternative, a nominal intensity and/or power density may be directed to respective combination zones 334 and/or build points 1002, for example, by providing a pulse interval corresponding to a point in the modulation cycle when respective ones of the plurality of micromirror elements exhibit respectively different modulation states.

Additionally, or in the alternative, in some embodiments, the intensity and/or power density directed to respective combination zones 334 and/or build points 1002 may be shifted to selected regions of the combination zone, for example, by providing a pulse interval corresponding to a point in the modulation cycle when the plurality of micromirror elements exhibit a common modulation state, and/or when the plurality of micromirror elements are not exhibiting a respective modulation state but instead are exhibiting other modulation states from among the plurality of modulation states in the modulation cycle. For example, a plurality of beam segments 400 may at least partially overlap at a combination zone 334. The intensity and/or power density of a beam spot 336 corresponding to a combination zone 334 may be shifted from a first region of the beam spot 336 to a second region of the beam spot 336 at least in part by providing a pulse interval corresponding to a point in the modulation cycle when at least some of the plurality of micromirror elements exhibit a common modulation state that corresponds to the second region of the beam spot 336 and/or when the plurality of micromirror elements are not exhibiting a modulation state that corresponds to the first region of the beam spot 336. By way of example, the first region of the beam spot 336 may correspond to a central region of the beam spot 336, such as a radially inward portion of the beam spot 336, away from which the intensity and/or power density may be shifted. Additionally, or in the alternative, the second region of the beam spot 336 may be an outward region of the beam spot 336, such as a radially outward portion of the beam spot 336, towards which the intensity and/or power density may be shifted. In some embodiments, a shift in intensity and/or power density of the beam spot 336 from a radially inward portion of the beam spot 336 to a radially outward portion of the beam spot 336 may provide an annular beam spot 336. Such an annular beam spot 336 may be particularly suitable for a conduction irradiation regime in some embodiments.

In some embodiments, the number of micromirror elements 308 exhibiting a respective modulation state may vary by a modulation factor set. Any suitable modulation factor set may be provided. By way of example, as shown in FIGS. 14H-1 and 14H-2, the modulation factor set may include modulation factors of (0, 1, and 2). With respect to a modulation state for which the number of micromirror elements 308 varies by a modulation factor of (1), the number of micromirror elements 308 exhibiting such modulation state is nominal, or unchanged. With respect to a modulation state for which the number of micromirror elements 308 varies by a modulation factor of (0), the number of micromirror elements 308 exhibiting such modulation state augmented by a factor of zero, meaning the number of micromirror elements 308 exhibiting such modulation state is zero. With respect to a modulation state for which the number of micromirror elements 308 varies by a modulation factor of (2), the number of micromirror elements 308 exhibiting such modulation state augmented by a factor of (2), meaning the number of micromirror elements 308 exhibiting such modulation state is doubled.

In some embodiments, as shown, for example, in FIGS. 14H-1 and 14H-2, a pulse cycle may be configured such that respective ones of the plurality of modulation states exhibit respective ones of the plurality of modulation factors upon at least one of the pulse intervals P(T) in the pulse cycle. Additionally, or in the alternative, a pulse cycle may be configured such that respective ones of the plurality of micromirror elements exhibit respective ones of the plurality of modulation states upon at least one of the pulse intervals P(T) in the pulse cycle. For a pulse cycle configured such that respective ones of the plurality of modulation states exhibit respective ones of the plurality of modulation factors upon at least one of the pulse intervals P(T) in the pulse cycle and such that respective ones of the plurality of micromirror elements exhibit respective ones of the plurality of modulation states upon at least one of the pulse intervals P(T) in the pulse cycle, any one or more of the respective ones of the plurality of micromirror elements 308 may be augmented by the modulation factor with respect to any one or more of the respective ones of the plurality of modulation states. The modulation factor may be applied to respective ones of the plurality of micromirror elements 308 and/or to respective ones of the plurality of modulation states by configuring the pulse cycle such that the pulse intervals P(T) correspond to the respective micromirror elements 308 and/or to the respective modulation states for which the modulation factor is intended to be applied.

By way of example, as shown in FIG. 14H-1, at a first pulse interval $P(T_1)$, a plurality of micromirror elements 308 at locations $M_1$ through $M_5$ of a micromirror array 306 may exhibit respective ones of a plurality of modulation states respectively corresponding to deflection positions (−2) through (+2). By way of example, the pulse intervals shown in FIGS. 14H-1 and 14H-2 may have a pulse cycle of eight (8) pulse intervals $P(T_1)$, meaning that the sequence repeats every eight (8) pulse intervals. At a second pulse interval $P(T_2)$, a modulation factor of (0) may be imparted to the modulation state corresponding to a deflection position of (+2), meaning that none of the plurality of micromirror elements 308 at locations $M_1$ through $M_5$ of a micromirror array 306 exhibit the modulation state corresponding to the deflection position of (+2). Additionally, or in the alternative, a modulation factor of (2) may be imparted to the modulation state corresponding to a deflection position of (−1), meaning that the number of micromirror elements 308 exhibiting the modulation state corresponding to the deflection position of (−1) has been doubled. As shown, the micromirror elements 308 at locations $M_1$ and $M_3$ of a micromirror array 306 may exhibit the modulation state corresponding to the deflection position of (−1) at the second pulse interval $P(T_2)$.

At a third pulse interval $P(T_3)$, a modulation factor of (0) may be imparted to the modulation states respectively corresponding to a deflection position of (+2) and (+1), meaning that none of the plurality of micromirror elements 308 at locations $M_1$ through $M_5$ of a micromirror array 306 exhibit those modulation states. Additionally, or in the alternative, a modulation factor of (2) may be imparted to the modulation states respectively corresponding to a deflection position of (−1) and (0), meaning that the number of micromirror elements 308 exhibiting those modulation states has been doubled. As shown, at the third pulse interval $P(T_3)$, the micromirror elements 308 at locations $M_1$ and $M_5$ of a micromirror array 306 may exhibit the modulation state corresponding to the deflection position of (0), and/or the micromirror elements 308 at locations $M_2$ and $M_4$ of the micromirror array 306 may exhibit the modulation state corresponding to the deflection position of (−1). At a seventh pulse interval $P(T_7)$, a modulation factor of (0) may be imparted to the modulation states respectively corresponding to a deflection position of (−2) and (−1), meaning that none of the plurality of micromirror elements 308 at locations $M_1$ through $M_5$ of a micromirror array 306 exhibit those modulation states. Additionally, or in the alternative, a modulation factor of (2) may be imparted to the modulation states respectively corresponding to a deflection position of (+1) and (0), meaning that the number of micromirror elements 308 exhibiting those modulation states has been doubled. As shown, at the seventh pulse interval $P(T_7)$, the micromirror elements 308 at locations $M_2$ and $M_4$ of a micromirror array 306 may exhibit the modulation state corresponding to the deflection position of (+1), and/or the micromirror elements 308 at locations $M_1$ and $M_5$ of the micromirror array 306 may exhibit the modulation state corresponding to the deflection position of (0).

By way of further example, referring to FIG. 14H-2, at a seventh pulse interval $P(T_8)$, a modulation factor of (0) may be imparted to the modulation states respectively corresponding to a deflection position of (−2), meaning that none of the plurality of micromirror elements 308 at locations $M_1$ through $M_5$ of a micromirror array 306 exhibit those modulation states. Additionally, or in the alternative, a modulation factor of (2) may be imparted to the modulation states respectively corresponding to a deflection position of (+1), meaning that the number of micromirror elements 308 exhibiting that modulation state has been doubled. As shown, at the eighth pulse interval $P(T_8)$, the micromirror elements 308 at locations $M_3$ and $M_5$ of a micromirror array 306 may exhibit the modulation state corresponding to the deflection position of (+1), and/or the micromirror elements 308 at locations $M_2$ and $M_4$ of the micromirror array 306 may exhibit the modulation state corresponding to the deflection position of (+2). At a ninth pulse interval $P(T_9)$, the pulse cycle shown in FIGS. 14H-1 and 14H-2 repeats.

In some embodiments, a pulse cycle that includes a plurality of pulse intervals $P(T_1)$ may be configured to increase and/or decrease the number of beam segments 400 that become incident upon respective micromirror elements 308 in a respective modulation state. For example, in the pulse cycle shown in FIGS. 14H-1 and 14H-2, energy beam segments 400 may become incident upon micromirror elements preferentially at modulation states that have deflection positions of (−1), (0), and (+1). As shown, forty (40) energy beam segments 400 become incident upon the micromirror elements 308 at locations $M_1$ and $M_5$, of which, ten (10) energy beam segments 400 become incident upon micromirror elements 308 at modulation states that have deflection positions of (−1), (0), and (+1), respectively, and five (5) energy beam segments 400 become incident upon micromirror elements at modulation states that have deflection positions of (−2) and (+2), respectively. This can be observed in FIGS. 14H-1 and 14H-2 by counting the number of pulses over one pulse cycle.

While only a selection of the pulse intervals P(T) in FIGS. 14H-1 and 14H-2 have been mentioned, it will be appreciated that, as illustrated in FIGS. 14H-1 and 14H-2, over the course of a pulse cycle, each of the modulation states may be augmented by respective ones of the modulation factors in the modulation factor set, such as a modulation factor set that includes deflection positions of (0, 1, and 2). Additionally, it will be appreciated that as illustrated in FIGS. 14H-1 and 14H-2, over the course of a pulse cycle, respective ones of a plurality of micromirror elements 308, such as a plurality of micromirror elements 308 included in a modulation group 500, may exhibit respective ones of the plurality of modulation states corresponding to respective deflection positions, including, for example, at respective pulse intervals corresponding to respective ones of the plurality of modulation factors in the modulation factor set.

Now turning to FIG. 15, and exemplary control system 104 will be described. A control system 104 may be configured to perform one or more control operations associated with an additive manufacturing system 100 and/or an additive manufacturing machine 102. The control operations may include, one or more control commands may be configured to control operations of an energy beam system 134, including, for example, control operations of one or more irradiation devices 142 and/or one or more optical modulators 302 included in a respective irradiation device 142.

Figure 15:
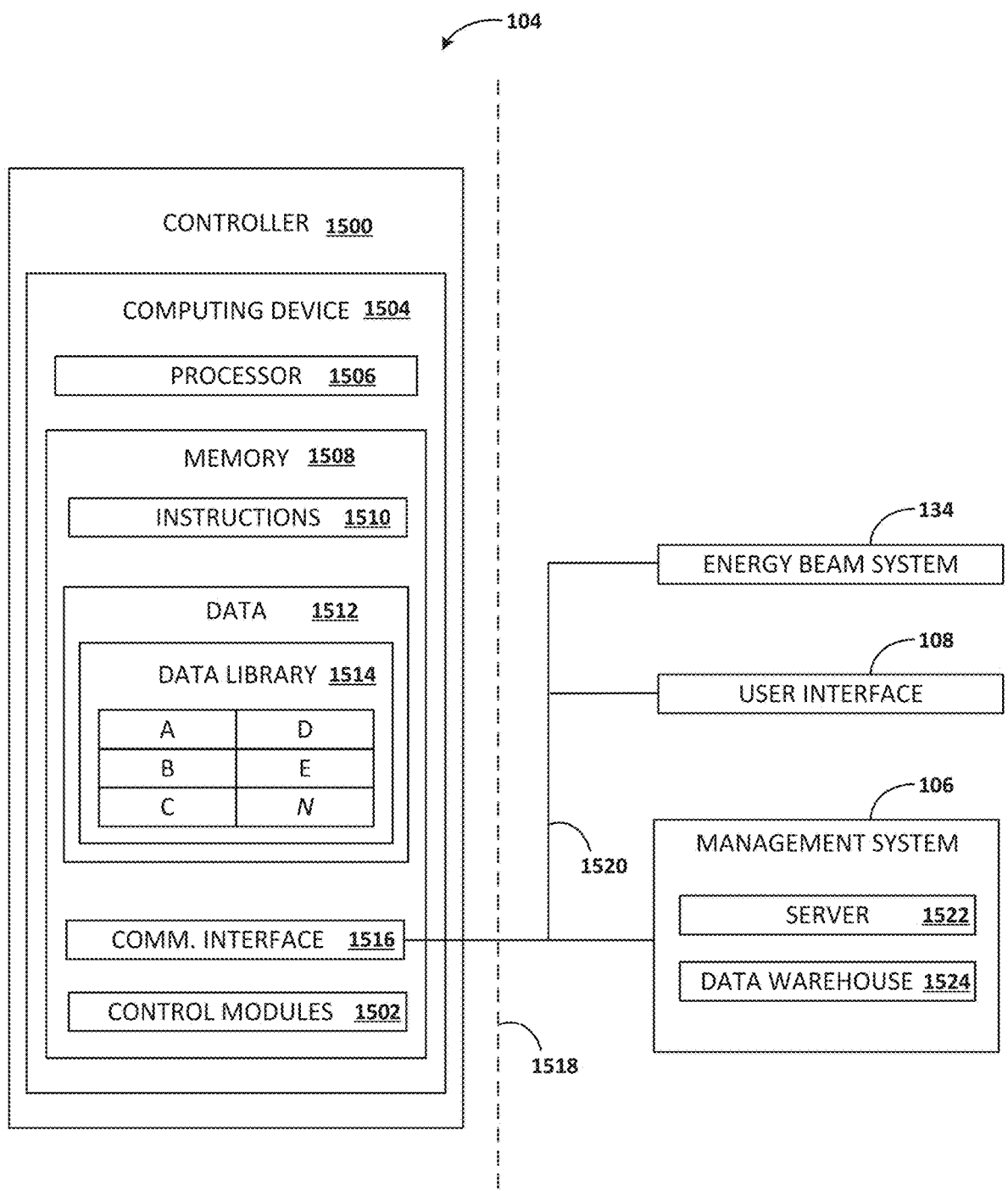
FIG. 15 schematically depicts an exemplary controls system that may be configured to control an additive manufacturing system or machine.

As shown in FIG. 15, an exemplary control system 104 may include a controller 1500. The controller may include one or more control modules 1502 configured to cause the controller 1500 to perform one or more control operations. The one or more control modules 1502 may include control logic executable to provide control commands configured to control one or more controllable components associated with an additive manufacturing machine 102, such as controllable components associated with an energy beam system 134, one or more irradiation devices 142, and/or one or more optical modulators 302. For example, a control module 1502 may be configured to provide one or more control commands executable to control operation of one or more components of an irradiation device 142, such as operation of a beam generation device 300, an optical modulator 302, and/or a modulation sensor 330, and/or any one or more other components thereof.

The controller 1500 may be communicatively coupled with an additive manufacturing machine 102. The controller 1500 may be communicatively coupled with one or more components of an additive manufacturing machine 102, such as one or more components of an energy beam system 134 and/or an irradiation device 142, such as a beam generation device 300, an optical modulator 302, and/or a modulation sensor 330, and/or any one or more other elements thereof. The controller 1500 may also be communicatively coupled with a management system 106 and/or a user interface 108.

The controller 1500 may include one or more computing devices 1504, which may be located locally or remotely relative to an additive manufacturing machine 102, an energy beam system 134, and/or an irradiation device 142. The one or more computing devices 1504 may include one or more processors 1506 and one or more memory devices 1508. The one or more processors 1506 may include any suitable processing device, such as a microprocessor, microcontroller, integrated circuit, logic device, and/or other suitable processing device. The one or more memory devices 1508 may include one or more computer-readable media, including but not limited to non-transitory computer-readable media, RAM, ROM, hard drives, flash drives, and/or other memory devices 1508.

As used herein, the terms "processor" and "computer" and related terms, such as "processing device" and "computing device", are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. A memory device 1508 may include, but is not limited to, a non-transitory computer-readable medium, such as a random access memory (RAM), and computer-readable nonvolatile media, such as hard drives, flash memory, and other memory devices. Alternatively, a floppy disk, a compact disc-read only memory (CD-ROM), a magneto-optical disk (MOD), and/or a digital versatile disc (DVD) may also be used.

As used herein, the term "non-transitory computer-readable medium" is intended to be representative of any tangible computer-based device implemented in any method or technology for short-term and long-term storage of information, such as, computer-readable instructions, data structures, program modules and sub-modules, or other data in any device. The methods described herein may be encoded as executable instructions embodied in a tangible, non-transitory, computer readable media, including, without limitation, a storage device and/or a memory device. Such instructions, when executed by a processor, cause the processor to perform at least a portion of the methods described herein. Moreover, as used herein, the term "non-transitory computer-readable medium" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

The one or more memory devices 1508 may store information accessible by the one or more processors 1506, including computer-executable instructions 1510 that can be executed by the one or more processors 1506. The instructions 1510 may include any set of instructions which when executed by the one or more processors 1506 cause the one or more processors 1506 to perform operations, including beam modulation operations, calibration operations, and/or additive manufacturing operations. Additionally, or in the alternative, the instructions, when executed by the one or more processors 1506, may cause the one or more processors 1506 to perform an irradiation sequence as described herein, including, for example, an irradiation sequence that includes a modulation cycle and/or a pulse cycle as described herein.

The memory devices 1508 may store data 1512 accessible by the one or more processors 1506. The data 1512 can include current or real-time data 1512, past data 1512, or a combination thereof. The data 1512 may be stored in a data library 1514. As examples, the data 1512 may include data 1512 associated with or generated by an additive manufacturing system 100 and/or an additive manufacturing machine 102, including data 1512 associated with or generated by the controller 1500, an additive manufacturing machine 102, an energy beam system 134, one or more irradiation devices 142, one or more beam generation devices 300, one or more optical modulators 302, one or more modulation sensors 330, a management system 106, a user interface 108, and/or a computing device 1504, such as operational data 1512 and/or calibration data 1512 pertaining thereto. The data 1512 may also include other data sets, parameters, outputs, information, associated with an additive manufacturing system 100 and/or an additive manufacturing machine 102.

The one or more computing devices 1504 may also include a communication interface 1516, which may be used for communications with a communication network 1518 via wired or wireless communication lines 1520. The communication interface 1516 may include any suitable components for interfacing with one or more network(s), including for example, transmitters, receivers, ports, controllers, antennas, and/or other suitable components. The communication interface 1516 may allow the computing device 1504 to communicate with various nodes on the communication network 1518, such as nodes associated with the additive manufacturing machine 102, the energy beam system 134, the one or more irradiation devices 142, the one or more beam generation devices 300, the one or more optical modulators 302, the one or more modulation sensors 330, the management system 106, and/or the user interface 108. The communication network 1518 may include, for example, a local area network (LAN), a wide area network (WAN), SATCOM network, VHF network, a HF network, a Wi-Fi network, a WiMAX network, a gatelink network, and/or any other suitable communication network 1518 for transmitting messages to and/or from the controller 1500 across the communication lines 1520. The communication lines 1520 of communication network 1518 may include a data bus or a combination of wired and/or wireless communication links.

The communication interface 1516 may allow the computing device 1504 to communicate with various components of an additive manufacturing system 100 and/or an additive manufacturing machine 102 communicatively coupled with the communication interface 1516 and/or communicatively coupled with one another. The communication interface 1516 may additionally or alternatively allow the computing device 1504 to communicate with the management system 106 and/or the user interface 108. The management system 106 may include a server 1522 and/or a data warehouse 1524. As an example, at least a portion of the data 1512 may be stored in the data warehouse 1524, and the server 1522 may be configured to transmit data 1512 from the data warehouse 1524 to the computing device 1504, and/or to receive data 1512 from the computing device 1504 and to store the received data 1512 in the data warehouse 1524 for further purposes. The server 1522 and/or the data warehouse 1524 may be implemented as part of a control system 104 and/or as part of the management system 106.

Now turning to FIGS. 16A and 16B, exemplary methods 1600 of additively manufacturing a three-dimensional object will be described. Exemplary methods may be performed at least in part by a control system 104, a controller 1500, and/or one or more control modules 1502 associated with the control system 104 and/or the controller 1500. Additionally, or in the alternative, exemplary methods may be performed at least in part by an additive manufacturing system and/or an additive manufacturing machine 102, for example, by a control system 104 and/or a controller 1500 associated therewith.

Figure 16A:
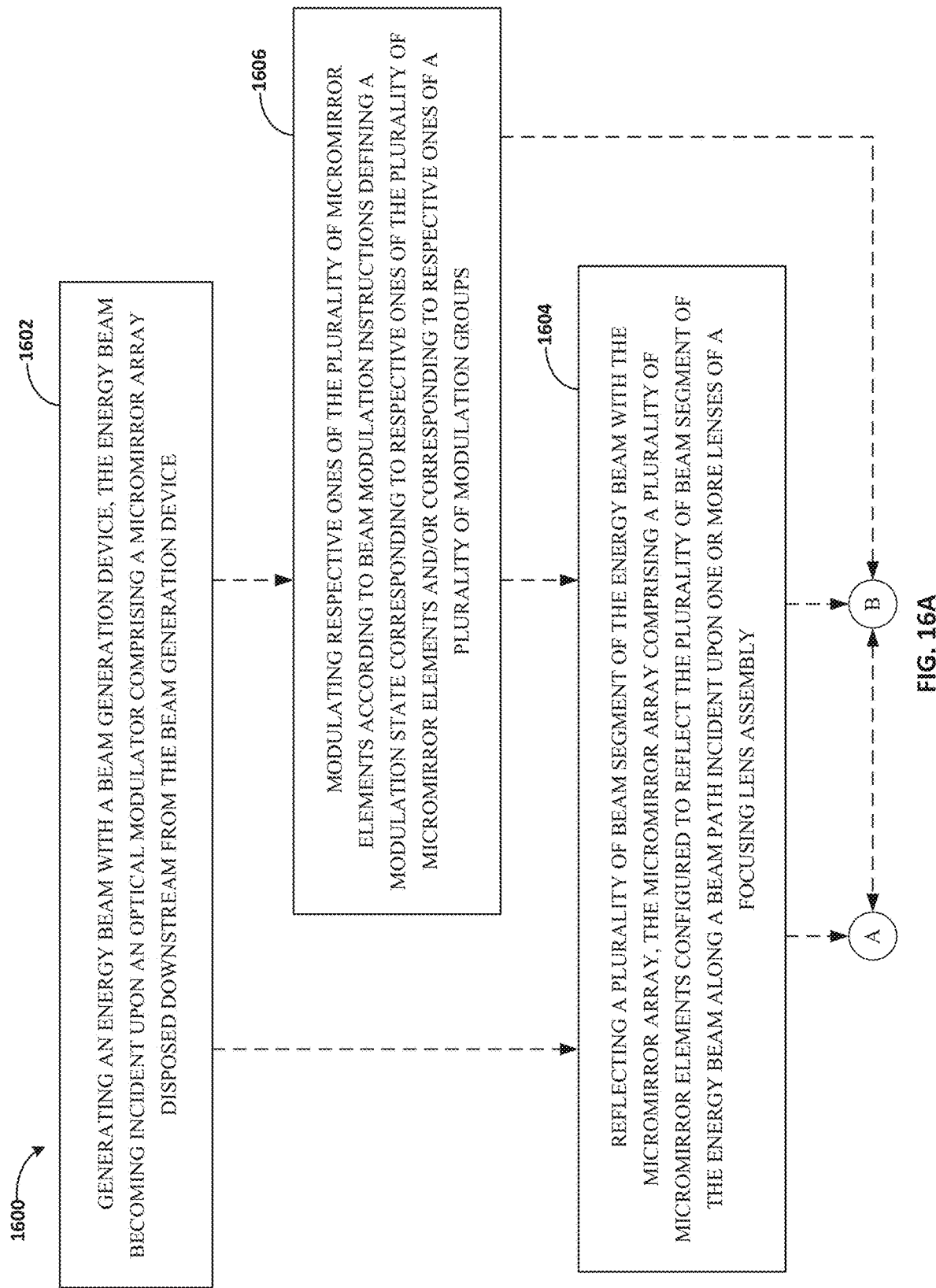

As shown in FIG. 16A, an exemplary method 1600 may include, at block 1602, generating an energy beam with a beam generation device 300. The energy beam 144 may become incident upon an optical modulator 302 disposed downstream from the beam generation device 300. The optical modulator 302 may include a micromirror array 306. The micromirror array 306 may include a plurality of micromirror elements 308. At block 1604, an exemplary method 1600 may include reflecting a plurality of beam segment 400 of the energy beam 144 with the micromirror array 306. The micromirror array 306 may include a plurality of micromirror elements 308 configured to reflect the plurality of beam segment 400 of the energy beam 144 along a beam path 316 incident upon one or more lenses 600 of a focusing lens assembly 312. At block 1606, an exemplary method 1600 may include modulating respective ones of the plurality of micromirror elements 308 according to beam modulation instructions defining a modulation state corresponding to respective ones of the plurality of micromirror elements 308 and/or corresponding to respective ones of the plurality of modulation groups 500.

As shown in FIG. 16B, an exemplary method 1600 may continue with blocks 1608 and 1610, and/or with blocks 1612 and 1614. At block 1608, an exemplary method 1600 may include focusing the plurality of beam segments 400 such that for respective ones of a plurality of modulation groups 500 that include a subset of micromirror elements 308 from among the plurality of micromirror elements 308, a corresponding subset of beam segments 400 are focused by one or more lenses 600 of the focusing lens assembly 312 to at least partially overlap with one another at least at a respective one of a plurality of combination zones 334. The plurality of combination zones 334 may respectively correspond to the respective ones of the plurality of modulation groups 500. At block 1610, an exemplary method 1600 may include propagating a plurality of beam spots 336 across a build plane 130 by way of relative motion between the build plane 130 and the plurality of beam spots 336. The plurality of beam spots 336 may respectively correspond to respective ones of the plurality of combination zones 334. The build plane 130 may include a build array 1000 defining a plurality of build points 1002. Respective ones of the plurality of build points 1002 may receive irradiation from a respective ones of the plurality of beam spots 336 corresponding to a respective one of the plurality of combination zones 334.

Additionally, or in the alternative, at block 1612, an exemplary method 1600 may include focusing the plurality of beam segments 400 upon a build plane 130 that includes a build array 1000 defining a plurality of build points 1002, such that for respective ones of a plurality of modulation groups 500 including a subset of micromirror elements 308 from among the plurality of micromirror elements 308, a corresponding plurality of subset of beam segments 400 become incident upon a corresponding subset of build points 1002 from among the plurality of build points 1002. At block 1614, an exemplary method 1600 may include propagating the plurality of beam segments 400 incrementally across the build array 1000 by way of relative motion between the build plane 130 and the plurality of beam segments 400, such that for respective ones of the plurality of modulation groups, the corresponding subset of build points 1002 receives irradiation sequentially from the corresponding subset of beam segments 400.

The exemplary method described with reference to FIGS. 16A and 16B may be performed in connection with any suitable irradiation sequence described herein, including, for example, the irradiation sequences described with reference to FIGS. 10A-10F, FIGS. 11A-11G, FIGS. 12A-12F, FIGS. 13A-13S, and/or FIGS. 14A-14H-2.

This written description uses exemplary embodiments to describe the presently disclosed subject matter, including the best mode, and also to enable any person skilled in the art to practice such subject matter, including making and using any devices or systems and performing any incorporated methods. The patentable scope of the presently disclosed subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An irradiation device for additively manufacturing three-dimensional objects, the irradiation device comprising:
 a housing assembly;
 a beam generation device configured to generate an energy beam, the beam generation device contained within the housing assembly;
 a positioning system configured to move the housing assembly;
 an optical modulator comprising a micromirror array disposed downstream from the beam generation device;
 a focusing lens assembly disposed downstream from the optical modulator; wherein the micromirror array comprises a plurality of micromirror elements configured to reflect a corresponding one of a plurality of beam segments of the energy beam along a beam path incident upon the focusing lens assembly; and wherein the focusing lens assembly comprises one or more lenses configured to converge the plurality of beam segments into a plurality of beam spots having a linear arrangement; and
 a controller configured to modulate respective ones of the plurality of micromirror elements according to beam modulation instructions defining a modulation state,
 wherein the plurality of beam spots are adjacent to each other in the linear arrangement to form a line, wherein the plurality of beam spots have a space between adjacent beam spots on a surface of a powder bed, wherein a width of the space between the adjacent beam spots corresponds to a width between adjacent micromirror elements of the optical modulator, and wherein the controller is configured to adjust a number of the plurality of micromirror elements included in a modulation group to provide irradiation to the powder bed with an intensity that varies with respect to a respective combination zone corresponding to the modulation group.

2. The irradiation devices of claim 1, wherein the one or more lenses is a cylindrical lens.

3. The irradiation device of claim 1, further comprising:
 a controller, wherein the controller is configured to cause the irradiation device to perform an irradiation sequence, the irradiation sequence comprising:
 modulating the plurality of micromirror elements to respective ones of a plurality of modulation states.

4. The irradiation device of claim 1, wherein the beam modulation instructions include a build file that defines build points of a build array to be irradiated to additively manufacture the three-dimensional objects.

5. The irradiation device of claim 1, wherein the controller is configured to scan a plurality of beam spots coinciding with the respective combination zones across the powder bed in a pattern comprising a linear or curvilinear arrangement of beam spots.

6. The irradiation device of claim 1, wherein the controller is configured to cause a first modulation group to provide preheating and a second modulation group to provide melting or sintering, the first modulation group and the second modulation group irradiating the powder bed in sequence.

7. An irradiation device for additively manufacturing three-dimensional objects, the irradiation device comprising:
 a housing assembly;
 a beam generation device configured to generate an energy beam, the beam generation device contained within the housing assembly;
 a positioning system configured to move the housing assembly;
 an optical modulator comprising a micromirror array disposed downstream from the beam generation device;
 a focusing lens assembly disposed downstream from the optical modulator; wherein the micromirror array comprises a plurality of micromirror elements configured to reflect a corresponding one of a plurality of beam segments of the energy beam along a beam path incident upon the focusing lens assembly; and
 a controller configured to modulate respective ones of the plurality of micromirror elements according to beam modulation instructions defining a modulation state;
 wherein the focusing lens assembly comprises one or more lenses configured to focus the plurality of beam segments such that for respective ones of a plurality of modulation groups comprising a subset of micromirror elements from among the plurality of micromirror elements, a corresponding subset of beam segments are focused by the one or more lenses to at least partially overlap with one another at least at a respective one of a plurality of combination zones, the plurality of combination zones respectively corresponding to the respective ones of the plurality of modulation groups, and wherein the controller is configured to adjust a number of the plurality of micromirror elements included in the plurality of modulation groups to provide irradiation to a powder bed with an intensity that varies with respect to the plurality of combination zones corresponding to the plurality of modulation groups.

8. The irradiation device of claim 7, wherein the plurality of combination zones together exhibit a pattern comprising a linear or curvilinear arrangement of at least some of the combination zones.

9. The irradiation device of claim 7, wherein the plurality of combination zones respectively provide an increased intensity and/or power density relative to a point upstream from the optical modulator.

10. The irradiation device of claim 9, wherein the intensity of the plurality of combination zones corresponds to a conduction irradiation regime.

11. The irradiation device of claim 7, wherein the beam modulation instructions include a build file that defines build points of a build array to be irradiated to additively manufacture the three-dimensional objects.

12. The irradiation device of claim 7, wherein respective ones of the plurality of modulation groups comprise a row or column of micromirror elements, and wherein respective ones of the plurality of modulation groups comprise a sub-array of micromirror elements,
wherein a number of micromirror elements in respective ones of the plurality of modulation groups is determined based at least in part on one or more irradiation parameters associated with the plurality of combination zones respectively corresponding to the plurality of modulation groups, and
wherein the one or more irradiation parameters comprises the intensity of irradiation to be imparted to the powder bed by the plurality of beam segments corresponding to a respective one of the plurality of combination zones.

13. The irradiation device of claim 7, wherein the focusing lens assembly comprises one or more cylindrical lenses.

14. The irradiation device of claim 7, wherein the focusing lens assembly comprises a first one or more lenses configured to focus the plurality of beam segments along a first axis, and wherein the first one or more lenses are configured to collimate the plurality of beam segments along a second axis.

15. The irradiation device of claim 7, wherein the irradiation device comprises a plurality of optical modulators and a plurality of focusing lens assemblies respectively corresponding to respective ones of the plurality of optical modulators, wherein respective ones of the plurality of optical modulators and corresponding ones of the plurality of focusing lens assemblies respectively define a plurality of beam combination groups, the plurality of beam combination groups respectively configured to provide a plurality of beam segment-subsets with corresponding combination zones that exhibit a linear or curvilinear pattern, and
wherein the plurality of beam combination groups comprises a first beam combination group and a second beam combination group, the first beam combination group configured to provide a first plurality of beam spots and the second beam combination group configured to provide a second plurality of beam spots, wherein the first plurality of beam spots exhibit a first linear or curvilinear pattern, and the second plurality of beam spots exhibit a second linear or curvilinear pattern.

16. The irradiation device of claim 7, comprising:
a beam conditioning assembly, the beam conditioning assembly comprising one or more optical elements configured to focus the energy beam prior to becoming incident upon the optical modulator, wherein the one or more optical elements comprises a beam collimator or a beam homogenizer.

17. The irradiation device of claim 7, comprising:
a modulation sensor, the modulation sensor configured to provide data pertaining to modulation of the energy beam by the optical modulator.

18. The irradiation device of claim 7, wherein the controller is configured to cause the irradiation device to perform an irradiation sequence, the irradiation sequence comprising:
modulating the plurality of micromirror elements to respective ones of a plurality of modulation states.

* * * * *